US008683163B2

(12) United States Patent
Morfey et al.

(10) Patent No.: US 8,683,163 B2
(45) Date of Patent: Mar. 25, 2014

(54) PROCESSOR AND INTERFACE

(75) Inventors: Alistair G. Morfey, Cambridge (GB); Karl Leighton Swepson, Cambridge (GB); Neil Edward Johnson, Cambridge (GB); Martin David Cooper, Cambridge (GB); Alan Mycroft, Cambridge (GB)

(73) Assignee: Cambridge Consultants Ltd. (GB)

(*) Notice: Subject to any disclaimer, the term of this patent is extended or adjusted under 35 U.S.C. 154(b) by 1341 days.

(21) Appl. No.: 11/983,754

(22) Filed: Nov. 8, 2007

(65) Prior Publication Data

US 2008/0320247 A1 Dec. 25, 2008

Related U.S. Application Data

(63) Continuation of application No. PCT/GB2006/001756, filed on May 12, 2006.

(30) Foreign Application Priority Data

May 20, 2005 (GB) .................................. 05097381
Dec. 5, 2005 (GB) .................................. 05247721

(51) Int. Cl.
*G06F 12/00* (2006.01)

(52) U.S. Cl.
USPC .................................. 711/167; 711/E12.069

(58) Field of Classification Search
USPC .................................. 711/167
See application file for complete search history.

(56) References Cited

U.S. PATENT DOCUMENTS

| | | | |
|---|---|---|---|
| 5,099,417 | A | 3/1992 | Magar et al. |
| 5,226,153 | A | 7/1993 | DeAngelis et al. |
| 5,590,349 | A | 12/1996 | Robinson et al. |
| 5,815,144 | A | 9/1998 | Strothmann |

(Continued)

FOREIGN PATENT DOCUMENTS

| | | |
|---|---|---|
| DE | 4130000 | 3/1993 |
| EP | 1089182 A2 | 4/2001 |

(Continued)

OTHER PUBLICATIONS

"International Application Serial No. GB0524772.1, Uk Search Report Aug. 13, 2007", 2 pgs.

(Continued)

*Primary Examiner* — Reginald Bragdon
*Assistant Examiner* — Hamdy S Ahmed
(74) *Attorney, Agent, or Firm* — Schwegman Lundberg & Woessner, P.A.

(57) ABSTRACT

A data processing apparatus comprises a processor constructed to operate under control of a sequence of program instructions selected from a predetermined instruction set; master circuitry to request access to storage locations of the processor; an interface circuit to provide an interface for an external apparatus to signal a request for access to the storage locations and an interface for the master circuitry to signal a request for access to the storage locations; and control to provide access between the storage locations and the interface circuit in response to the request only at predetermined points in execution of the stored program, the control being operable to fix periods of time for providing such access relative to the sequence of program instructions such that execution timing of the stored instructions is independent of whether a request is supplied to the interface.

28 Claims, 76 Drawing Sheets

(56) References Cited

U.S. PATENT DOCUMENTS

| | | | | |
|---|---|---|---|---|
| 5,870,602 | A | 2/1999 | Miller et al. | |
| 6,311,263 | B1 | 10/2001 | Barlow et al. | |
| 7,793,261 | B1 * | 9/2010 | Edwards et al. | 717/124 |
| 2003/0051192 | A1 * | 3/2003 | Pillay et al. | 714/39 |
| 2007/0052403 | A1 * | 3/2007 | Stoichita | 323/316 |

FOREIGN PATENT DOCUMENTS

| | | | |
|---|---|---|---|
| EP | 1182812 | A2 | 2/2002 |
| GB | 2156550 | A | 10/1985 |
| GB | 2217059 | A | 10/1989 |
| GB | 2329984 | A | 4/1999 |
| GB | 2352064 | | 1/2001 |
| GB | 2382759 | A | 6/2003 |
| WO | WO-0200867 | A1 | 1/2002 |
| WO | WO-02088940 | A1 | 11/2002 |
| WO | WO-2005034175 | A2 | 4/2005 |

OTHER PUBLICATIONS

"International Application Serial No. PCT/GB2006/001756 International Search Report Mar. 7, 2007", 10 pgs.

"International Application Serial No. GB0524772.1 GB Search Report Jul. 27, 2006", 1 pg.

"International Application Serial No. PCT/GB2006/001756 Written Opinion Mar. 7, 2007", 9 pgs.

AMD, "AMD64 Technology, AMD64 Architecture Programmer's Manual", vol. 3. Revision 3.09, [Online]. Retrieved from the internet:<URL:Http://web.archive.org/web/20050128172406/ Http://www.amd.com/us-en/assets/content_type/white_papers_ and_tech_docs/24594.pdf>,(Sep. 2003),xvii, 17, 49, 183, 222, 232, 252, 261.

Ascierto, Jerry "AMD Provides a Glimpse of Hammer MPU", *EE Times*, XP002424906, [Online] , Retrieved from the Internet <Url: Http://www.eetimes.com/story/0EG20011016S0092>,(Oct. 16 2001).

McGeady, Ed S., "A programmer's view of the 80960 architecture", *COMPCON Spring '89. Thirty-Fourth IEEE Computer Society International Conference: Intellectual Leverage, Digest of Papers*., (Feb. 27, 1989),4-9.

"European Application Serial No. EP08016826, Partial European Search Report mailed Feb. 11, 2009", 1 pg.

"European Application Serial No. EP08016826.3, Communication noting loss of rights pursuant to Rule 112(1) EPC mailed Sep. 12, 2010", 1 pg.

"European Application Serial No. EP08016826.3, Communication pursuant to Rule 112(1) EPC mailed Nov. 15, 2011", 1 pg.

"European Application Serial No. EP08016826.3, Decision to Refuse a European Patent Application mailed Oct. 19, 2012", 8 pgs.

"European Application Serial No. EP08016826.3, European Search Report mailed May 19, 2009", 9 pgs.

"European Application Serial No. EP08016826.3, Grounds of Appeal filed Feb. 28, 2013", 32 pgs.

"European Application Serial No. EP08016826.3, Minutes of Oral Proceedings mailed Oct. 19, 2012", 4 pgs.

"European Application Serial No. EP08016826.3, Notice of Appeal filed Dec. 17, 2012", 4 pgs.

"European Application Serial No. EP08016826.3, Office Action mailed Jan. 26, 2010", 1 pg.

"European Application Serial No. EP08016826.3, Office Action mailed Mar. 29, 2011", 6 pgs.

"European Application Serial No. EP08016826.3, Partial European Search Report mailed Feb. 19, 2009", 4 pgs.

"European Application Serial No. EP08016826.3, Replacement Summons to Attend Oral Proceedings mailed Jun. 28, 2012", 3 pgs.

"European Application Serial No. EP08016826.3, Response filed Jan. 25, 2012 to Communication pursuant to Rule 112(1) EPC mailed Nov. 15, 2011", 12 pgs.

"European Application Serial No. EP08016826.3, Response filed Nov. 23, 2010 to Communication pursuant to Rule 112(1) EPC mailed Sep. 12, 2010", 15 pgs.

"European Application Serial No. EP08016826.3, Result of Consultation mailed Sep. 7, 2012", 5 pgs.

"European Application Serial No. EP08016826.3, Summary of Oral Proceedings mailed Oct. 19, 2012", 3 pgs.

"European Application Serial No. EP08016826.3, Summons to Attend Oral Proceedings mailed May 21, 2012", 9 pgs.

"European Application Serial No. EP08016826.3, Written Submissions filed Aug. 30, 2012", 13 pgs.

"United Kingdom Application No. GB0524772.1, Warning of refusal under Section 20(I) mailed Dec. 11, 2009", (Dec. 11, 2009), 2 pgs.

Harkin, Jim, et al., "On-chip and Off-chip Real-Time Debugging for Remotely-Accessed Embedded Programmable Systems", Proceedings, 13th International Conference oOn Field-Programmable Logic and Applications (Sep. 1-3, 2003 Lisbon, Portugal) (Lecture Notes in Computer Science, vol. 2778), (Sep. 1, 2003), 1079-1082.

Weiss, Ray, "PowerPC On-Chip Debug Hardware Resources", [Online] Oct. 1, 2001, Retrieved from the Internet: [retrieved on Mar. 17, 2011, URL:http://electronicdesign.com/print/embedded/ powerpc-on-chip-debug-hardwareresources3675.aspx ], (Oct. 1, 2001), 3 pgs.

* cited by examiner

The ASIC contains one SIF interface. It is used for software development, test, debug, data-acquisition. P = Parity bit. E = Error bit. The SIF can support up to 8 on-chip SIF Processors. Each SIF Processor can have its own or shared address space. The SIF Processors can be of the same or different types.

*Fig. 33b*

Special Registers

| | 31 … 0 | 31 … 0 | 31 … 0 | 31 … 0 | |
|---|---|---|---|---|---|
| Flags | FLAGS | | | | %flags |
| Saved Flags | | SFLAGS_S | SFLAGS_I | SFLAGS_N | %sflags_s/i/n |
| Global Pointer (GP) | GP_U | GP_S | GP_I | GP_I | %gp_u/s/i |
| Interrupt Vector Table Base Address | IVTB | | | | %ivtb |
| Breakpoint Enable | BRKE | | | | %brke |

Breakpoint Registers

| | 31 … 0 | |
|---|---|---|
| Breakpoint 0 | BRK0 | %brk0 |
| Breakpoint 1 | BRK1 | %brk1 |
| Breakpoint 2 | BRK2 | %brk2 |
| Breakpoint 3 | BRK3 | %brk3 |
| Breakpoint 4 | BRK4 | %brk4 |
| Breakpoint 5 | BRK5 | %brk5 |
| Breakpoint 6 | BRK6 | %brk6 |
| Breakpoint 7 | BRK7 | %brk7 |
| Breakpoint 4 Count | BRK4COUNT | %brk4count |
| Breakpoint 5 Count | BRK5COUNT | %brk5count |
| Breakpoint 6 Count | BRK6COUNT | %brk6count |
| Breakpoint 7 Count | BRK7COUNT | %brk7count |
| Breakpoint 6 Mask | BRK6MASK | %brk6mask |
| Breakpoint 7 Mask | BRK7MASK | %brk7mask |
| Breakpoint 6 Data | BRK6DATA | %brk6data |
| Breakpoint 7 Data | BRK7DATA | %brk7data |

Register Encodings

| FLAGS SFLAGS_S SFLAGS_I SFLAGS_N | 31 | 30 | 29 | 28 | 27 | 26 | 25 | 24 | 23 | 22 | 21 | 20 | 19 | 18 | 17 | 16 | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|---|---|---|---|---|---|---|---|---|---|---|---|---|---|---|---|
| | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | E | T | B | M1 | M0 | V | C | N | Z |

| | 31 | 30 | 29 | 28 | 27 | 26 | 25 | 24 | 23 | 22 | 21 | 20 | 19 | 18 | 17 | 16 | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|---|---|---|---|---|---|---|---|---|---|---|---|---|---|---|---|
| BRKE | 0 | E7 | R7 | W7 | 0 | E6 | R6 | W6 | 0 | E5 | R5 | W5 | 0 | E4 | R4 | W4 | 0 | E3 | R3 | W3 | 0 | E2 | R2 | W2 | 0 | E1 | R1 | W1 | 0 | E0 | R0 | W0 |

It is possible to change from NMI, Interrupt and Supervisor mode to any of the 4 modes by a Software Instruction.

This diagram only shows the mode changes expected in normal Interrupt Handlers.

| | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|
| **Nibble** | N3 | | | | N2 | | | | N1 | | | | N0 | | | |
| and.r, or.r, xor.r, add.r, sub.r, mult.r, add.i, mov.r, cmp.r | Rd / Rs | | | | Rt / Rs | | | | OP16A0 | | | | OP16=000 | | | 0 |
| OP16B0 | Rd / Rs / Ra | | | | OP16B0 | | | | OP16A0=0000 | | | | OP16=000 | | | 0 |
| ld.r, ld.16z.r, ld.8z.r | Rx | | | Ra | | | Rd | | OP16A0 | | | | OP16=000 | | | 0 |
| st.r, st.16.r, st.8.r | Rx | | | Ra | | | Rs | | OP16A0 | | | | OP16=000 | | | 0 |
| add.i Rd, Rd, #imm | Rd | | | 0 | 0 | Immediate [6:0] s | | | | | | | OP16=001 | | | 0 |
| add.i Rd, R15, #imm | Rd | | | 0 | 1 | Immediate [8:2] s | | | | | | | OP16=001 | | | 0 |
| cmp.i Rs, #imm | Rs | | | 1 | 0 | Immediate [6:0] u | | | | | | | OP16=001 | | | 0 |
| mov.i Rd, #imm | Rd | | | 1 | 1 | Immediate [6:0] u | | | | | | | OP16=001 | | | 0 |
| ld.8z.i | Rd | | | Ra | | | 0 | 0 | Offset [3:0] u | | | | OP16=010 | | | 0 |
| ld.16z.i | Rd | | | Ra | | | 0 | 1 | Offset [4:1] u | | | | OP16=010 | | | 0 |
| st.8.i | Rs | | | Ra | | | 1 | 0 | Offset [3:0] u | | | | OP16=010 | | | 0 |
| st.16.i | Rs | | | Ra | | | 1 | 1 | Offset [4:1] u | | | | OP16=010 | | | 0 |

*Fig. 43a*

| Instruction | Fields | | | | | | | |
|---|---|---|---|---|---|---|---|---|
| ld.i | Rd | Ra | Offset [6:2] u | OP16=011 | 0 | | | |
| st.i | Rs | Ra | Offset [6:2] u | OP16=100 | 0 | | | |
| movm | 0 | RdPair | RsB | RsA | OP16=101 | 0 | | |
| bra.p | 1 | Offset [11:1] s | OP16=101 | 0 | | | | |
| beq, bne | 0 | Cond | Offset [10:1] s | OP16=110 | 0 | | | |
| bge.s, blt.s | 1 | 0 | Cond | Offset [9:1] s | OP16=110 | 0 | | |
| bcc, bcs, bpl, bmi | 1 | 1 | Cond | Offset [8:1] s | OP16=110 | 0 | | |
| rlinm | 0 | Mode | S | Rd | Immediate [4:0] s | OP16=111 | 0 | |
| ldm | 1 | 0 | 0 | Ra | RegMask [5:1] | OP16=111 | 0 | |
| stm | 1 | 0 | 1 | Ra | RegMask [5:1] | OP16=111 | 0 | |
| push, push.r | 1 | 1 | 0 | RegMask [5:1] | RegSet | OP16=111 | 0 | |
| pop | 1 | 1 | 1 | 0 | RetVal | Offset [3:2] u | RegSet | OP16=111 | 0 |
| pop.ret | 1 | 1 | 1 | 1 | RetVal | Offset [3:2] u | RegSet | OP16=111 | 0 |

*Fig. 43b*

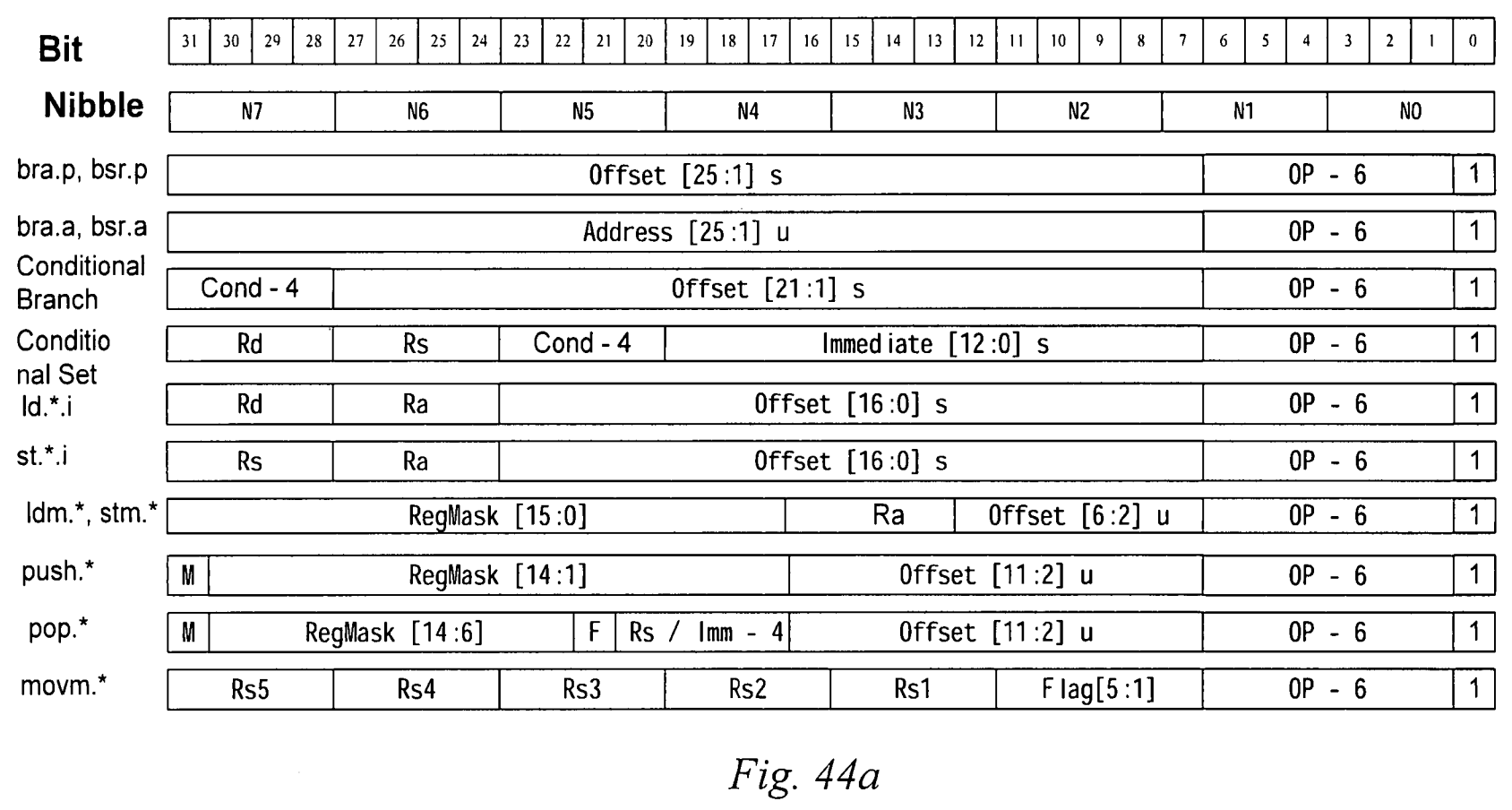

| Bit | 31 | 30 | 29 | 28 | 27 | 26 | 25 | 24 | 23 | 22 | 21 | 20 | 19 | 18 | 17 | 16 | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|---|---|---|---|---|---|---|---|---|---|---|---|---|---|---|---|

| Nibble | N7 | N6 | N5 | N4 | N3 | N2 | N1 | N0 |
|---|---|---|---|---|---|---|---|---|

| Instruction | Fields (bit 31 → bit 0) | | | | | | | |
|---|---|---|---|---|---|---|---|---|
| bra.p, bsr.p | Offset [25:1] s | OP - 6 | 1 | | | | | |
| bra.a, bsr.a | Address [25:1] u | OP - 6 | 1 | | | | | |
| Conditional Branch | Cond - 4 | Offset [21:1] s | OP - 6 | 1 | | | | |
| Conditional Set | Rd | Rs | Cond - 4 | Immediate [12:0] s | OP - 6 | 1 | | |
| ld.*.i | Rd | Ra | Offset [16:0] s | OP - 6 | 1 | | | |
| st.*.i | Rs | Ra | Offset [16:0] s | OP - 6 | 1 | | | |
| ldm.*, stm.* | RegMask [15:0] | Ra | Offset [6:2] u | OP - 6 | 1 | | | |
| push.* | M | RegMask [14:1] | Offset [11:2] u | OP - 6 | 1 | | | |
| pop.* | M | RegMask [14:6] | F | Rs / Imm - 4 | Offset [11:2] u | OP - 6 | 1 | |
| movm.* | Rs5 | Rs4 | Rs3 | Rs2 | Rs1 | Flag[5:1] | OP - 6 | 1 |

*Fig. 44a*

| | | | | | | | | | |
|---|---|---|---|---|---|---|---|---|---|
| mov.p | Offset [25:1] s | | | | | | | OP - 6 | 1 |
| mov.g | Offset [24:2] u | Rd[1:0] | | | | | | OP - 6 | 1 |
| RRI ALU *.i | Rd | Rs | Immediate [16:0] s | | | | | OP - 6 | 1 |
| RRI ALU *.h | Rd | Rs | Immediate [31:15] h | | | | | OP - 6 | 1 |
| rlinm | Rd | Rs | 0 | S | Shift [4:0] u | HighBit [4:0] u | LowBit [4:0] u | OP - 6 | 1 |
| OPA | Rd | Ra / Rs | OPA - 4 | Immediate - 13 | | | | OP = 111111 | 1 |
| OPB | Rd | Ra / Rs | OPA = 1111 | OPB - 4 | Immediate - 9 | | | OP = 111111 | 1 |
| OPC | Rd | Ra / Rs | OPA = 1111 | OPB = 1111 | OPC - 4 | Immediate - 5 | | OP = 111111 | 1 |
| RRR ALU *.r | Rd | Rs | OPA = 1111 | OPB = 1111 | OPC - 4 | Rt | C | OP = 111111 | 1 |
| ld.*.r, st.*.r, swap.r | Rd / Rs | Ra | OPA = 1111 | OPB = 1110 | OPC14 - 4 | Rx | 0 | OP = 111111 | 1 |
| OPD | Rd | Ra / Rs | OPA = 1111 | OPB = 1111 | OPC = 1111 | OPD - 4 | I | OP = 111111 | 1 |
| OPE | Rd / Rs /Ra | OPE - 4 | OPA = 0000 | Immediate - 13 | | | | OP = 111111 | 1 |
| OPF | OPF - 4 | OPE = 0000 | OPA = 0000 | Immediate - 13 | | | | OP = 111111 | 1 |

*Fig. 44b*

The ASIC contains one SIF interface.
Accessed on-chip by the parallel iSIF and off-chip by the serial xSIF.
It is used for software development, test, debug, data-acquisition.
P = Parity bit. E = Error bit. The SIF can support up to 8 on-chip SIF Processors. Each SIF Processor can have its own or shared address space. The SIF Processors can be of the same or different types.

XAP3a - Hardware Architecture

XAP3a has a single pipeline.
It supports a single memory bus (32bit data (in & out), 32bit address) only (even XAP3a_CORE).
Instructions are implemented in the minimum number of clocks.
RRR & RRI instructions will take 1 clock.
LD & ST instructions will take 2 clocks.
This implies quite long combinational paths.

XAP4a - Hardware Architecture

XAP4a has a 2-stage pipeline.
It supports a single memory bus (16bit data (in & out), 16bit address).
Instructions are implemented in the minimum number of clocks.
RRR & RRI instructions take 1 clock (16-bit instr) or 2 clocks (32-bit instr).
LD, ST instructions take 2 clocks (16-bit instr), or 3 clocks (32-bit instr).

| | | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|---|
| Bit | | 15 | 14 | 13 | 12 | 11 | 10 | 9 | 8 | 7 | 6 | 5 | 4 | 3 | 2 | 1 | 0 |
| Nibble | | N3 | | | | N2 | | | | N1 | | | | N0 | | | |
| | | OPD | | | OPC | | | OPB | | | OPA | | | | OP | | |
| | | OPD | | | OPG | | OPF | | | | | | | | OP | | |
| | | OPD | | | OPG | | OPH | | | | OPA | | | | OP | | |
| ld.i Rd, @(offset[8:1], Ra) | Rd = R0, R1, R2, R3 | Ra | | | Rd | | offset [8:1] u | | | | | | | | 0 | | |
| ld.i Rd, @(offset[8:1], Ra) | Rd = R4, R5, R6 | Ra | | | 0 - 2 | | offset [8:1] u | | | | | | | | 1 | | |
| ld.8z.i Rd, @(offset[7:0], Ra) | Rd = R0 | Ra | | | 3 | | offset [7:0] u | | | | | | | | 1 | | |
| st.i Rs, @(offset[8:1], Ra) | Rs = R0, R1, R2, R3 | Ra | | | Rs | | offset [8:1] u | | | | | | | | 2 | | |
| st.i Rs, @(offset[8:1], Ra) | Rs = R4, R5, R6 | Ra | | | 0 - 2 | | offset [8:1] u | | | | | | | | 3 | | |
| st.8.i Rs, @(offset[7:0], Ra) | Rs = R0 | Ra | | | 3 | | offset [7:0] u | | | | | | | | 3 | | |
| mov.i Rd, #imm[7:0] | | Rd | | | 0 | | immediate [7:0] u | | | | | | | | 4 | | |
| cmp.i Rs, #imm[7:0] | | Rs | | | 1 | | immediate [7:0] u | | | | | | | | 4 | | |
| and.i Rd, Rd, #imm[7:0] | | Rd / Rs | | | 2 | | immediate [7:0] u | | | | | | | | 4 | | |
| add.i Rd, Rd, #imm[7:0] | | Rd / Rs | | | 3 | | immediate [7:0] s | | | | | | | | 4 | | |

*Fig. 73a*

| | | | | | |
|---|---|---|---|---|---|
| beq, bne, ble.s, bgt.s #imm[8:1] | 0 | 0 - 3 | offset [8:1] s | | 5 |
| blt.s, bge.s, ble.u, bgt.u #imm[8:1] | 1 | 0 - 3 | offset [8:1] s | | 5 |
| FREE | 2 | 0 - 3 | offset [8:1] s | | 5 |
| bra.p #imm[8:1] | 3 | 0 | offset [8:1] s | | 5 |
| push, pop, pop.ret - {reglist[3:0]}, #offset[4:1] | 3 | 1 - 3 | reglist [3:0] | offset [4:1] u | 5 |
| shiftr.s.i, shiftr.u.i, shiftl.i, rotatel.i - Rd, Rs, #shift | 4 - 7 | Rs | Rd | shift [3:0] u | 5 |
| or.i, stz.i, mov.i, add.i | 4 - 7 | 7 | Rd | imm [ ] u | 5 |
| cmp.8.i, cmp.i, add.i | 4 - 7 | Rd / Rs | 7 | imm [3:0] u | 5 |
| Note - no ld.8s.r ld.r, ld.8z.r - Rd, @(Rx, Ra) | Rd | Ra | Rx | 0 - 1 | 6 |
| st.r, st.8.r - Rs, @(Rx, Ra) | Rs | Ra | Rx | 2 - 3 | 6 |

*Fig. 73b* mult.r : Rd = Rs * Rt
Rd = Rs = Rt = 16-bit

| | | | | | |
|---|---|---|---|---|---|
| and.r, or.r, xor.r, mult.r - Rd, Rs, Rt | Rd | Rs | Rt | 4 - 7 | 6 |
| add.r, add.c.r, sub.r, sub.c.r - Rd, Rs, Rt | Rd | Rs | Rt | 8 - 11 | 6 |
| shiftr.s.r, shiftr.u.r, shiftl.r, rotatel.r - Rd, Rs, Rt | Rd | Rs | Rt | 12 - 15 | 6 |
| cmp.8.r, cmp.8c.r, cmp.r, cmp.c.r - Rs, Rt | 7 | Rs | Rt | 4 - 7 | 6 |
| bra.r, bsr.r - Ra | 7 | Ra | 0 - 1 | 12 | 6 |
| sext.r Rd | 7 | Rd | 2 | 12 | 6 |
| irqs, print.r, ver, lic Rd / Rs | 7 | Rd / Rs | 4 - 7 | 12 | 6 |
| irqe, irqd, rtie, brk, halt, sleepnop, sleepsif, nop, sif | 7 | 0 - 7 | 0 | 13 | 6 |
| sif | 7 | 0 | 1 | 13 | 6 |
| FREE | 7 | 0 - 7 | 2 - 7 | 13 | 6 |
| mov.r Rd, Rs | 7 | Rs | Rd | 14 | 6 |
| mov.32.r Rd, Rs | 7 | Rs | Rd | 15 | 6 |

*Fig. 73c*

| | Instruction | OPE (Bit 31–16; N 7, N 6, N 5, N 4) | OPD (Bit 15–12; N 3) | OPC (Bit 11–8; N 2) | OPB (N 2–N 1) | OPA (N 1–N 0) | OP (N 0) |
|---|---|---|---|---|---|---|---|
| | ld.i Rd, @(offset[15:0], Ra) | offset [15:0] | Rd | Ra | 0 | 0 | 7 |
| | ld.8z.i Rd, @(offset[15:0], Ra) | offset [15:0] | Rd | Ra | 1 | 0 | 7 |
| | st.i Rd, @(offset[15:0], Ra) | offset [15:0] | Rs | Ra | 2 | 0 | 7 |
| | st.8.i Rd, @(offset[15:0], Ra) | offset [15:0] | Rs | Ra | 3 | 0 | 7 |
| | and.i Rd, Rs, #imm[15:0] | immediate [15:0] | Rd | Rs | 4 | 0 | 7 |
| | or.i Rd, Rs, #imm[15:0] | immediate [15:0] | Rd | Rs | 5 | 0 | 7 |
| | xor.i Rd, Rs, #imm[15:0] | immediate [15:0] | Rd | Rs | 6 | 0 | 7 |
| Rd = Rs * imm Rd, Rs, imm = 16-bit | mult.i Rd, Rs, #imm[15:0] | immediate [15:0] | Rd | Rs | 7 | 0 | 7 |
| | add.i Rd, Rs, #imm[15:0] | immediate [15:0] | Rd | Rs | 0 | 1 | 7 |
| | add.c.i Rd, Rs, #imm[15:0] | immediate [15:0] | Rd | Rs | 1 | 1 | 7 |
| | sub.x.i Rd, Rs, #imm[15:0] | immediate [15:0] | Rd | Rs | 2 | 1 | 7 |
| | sub.xc.i Rd, Rs, #imm[15:0] | immediate [15:0] | Rd | Rs | 3 | 1 | 7 |

*Fig. 74a*

| | | | | Size Carry Order | | | | |
|---|---|---|---|---|---|---|---|---|
| | cmp.8*.i Rs, #imm [15:0] | 0000 0000 | immediate [7:0] | 0 C 0 | Rs | 4 | 1 | 7 |
| | cmp.*.i Rs, #imm [15:0] | immediate [15:0] | | 1 C 0 | Rs | 4 | 1 | 7 |
| | stz.i, stz.8.i @(offset[15:0], Ra) | offset [15:0] | | 0 - 1 | Ra | 5 | 1 | 7 |
| | stz.p, stz.8.p @(offset[15:0]) | offset [15:0] | | 2 - 3 | 0 | 5 | 1 | 7 |
| | mov.i Rd, #imm[15:0] | immediate [15:0] | | Rd | 0 | 6 | 1 | 7 |
| | mov.p Rd, #imm[15:0] | immediate [15:0] | | Rd | 1 | 6 | 1 | 7 |
| | ld.p Rd, @(offset[15:0]) | offset [15:0] | | Rd | 4 | 6 | 1 | 7 |
| | ld.8z.p Rd, @(offset[15:0]) | offset [15:0] | | Rd | 5 | 6 | 1 | 7 |
| | st.p Rs, @(offset[15:0]) | offset [15:0] | | Rs | 6 | 6 | 1 | 7 |
| | st.8.p Rs, @(offset[15:0]) | offset [15:0] | | Rs | 7 | 6 | 1 | 7 |
| | FREE | immediate [15:0] | | 0 - 7 | 0 - 7 | 7 | 1 | 7 |
| | FREE | immediate [15:0] | | 0 - 7 | 0 - 7 | 0 - 1 | 2 | 7 |
| Rd = Rs * #imm<br>Rs, #imm = 16-bit<br>Result = 32-bit = {R(d+1), Rd} | mult.32s.i Rd, Rs, #imm [15:0] | immediate [15:0] | | Rd | Rs | 2 | 2 | 7 |
| | mult.32u.i Rd, Rs, #imm [15:0] | immediate [15:0] | | Rd | Rs | 3 | 2 | 7 |
| | Conditional Branches | offset [15:1] | 0 | 0 - 7 | 0 | 4 | 2 | 7 |
| | Conditional Branches (cont) | offset [15:1] | 0 | 0 - 5 | 0 | 5 | 2 | 7 |
| | bra.a address | address [15:1] | 0 | 0 | 0 | 6 | 2 | 7 |

*Fig. 74b*

| | | | | | | | | |
|---|---|---|---|---|---|---|---|---|
| bsr.a address | address [15:1] | 0 | 1 | 0 | 6 | 2 | 7 |
| bra.p offset | offset [15:1] | 0 | 2 | 0 | 6 | 2 | 7 |
| bsr.p offset | offset [15:1] | 0 | 3 | 0 | 6 | 2 | 7 |
| trap.i #imm [15:0] | immediate [15:0] | | 4 | 0 | 6 | 2 | 7 |
| FREE | immediate [15:0] | | 5 - 7 | 0 - 7 | 6 | 2 | 7 |
| FREE | immediate [15:0] | | 0 - 7 | 0 - 7 | 7 | 2 | 7 |
| div.*.i Rd, Rs, #imm [15:0] | immediate [15:0] | | Rd | Rs | 0 - 3 | 3 | 7 |
| rem.*.i Rd, Rs, #imm [15:0] | immediate [15:0] | | Rd | Rs | 4 - 7 | 3 | 7 |
| divrem.*.i Rd, Rs, #imm[15:0] | immediate [15:0] | | Rd | Rs | 0 - 3 | 4 | 7 |
| FREE | immediate [15:0] | | Rd | Rs | 4 - 7 | 4 | 7 |
| FREE | immediate [15:0] | | 0 - 7 | 0 - 7 | 0 - 7 | 5 - 14 | 7 |
| FREE | immediate [15:0] | | 0 - 7 | 0 - 7 | 0 - 6 | 15 | 7 |
| 32-bit RRRI Instructions | immediate [15:0] | | 0 - 7 | 6 | 7 | 15 | 7 |
| 32-bit RRR Instructions | immediate [15:0] | | 0 - 7 | 7 | 7 | 15 | 7 |

Rd, R(d+1), Rs, #imm = 16-bit
Rd = Rs / #imm
R(d+1) = Rs % #imm

*Fig. 74c*

| | | | | | | | | | | |
|---|---|---|---|---|---|---|---|---|---|---|
| Bit | 31 30 29 | 28 27 26 25 | 24 23 | 22 21 | 20 19 18 17 16 | 15 14 13 | 12 11 10 | 9 8 7 | 6 5 4 3 | 2 1 0 |
| Nibble | N7 | N6 | N5 | N5 | N4 | N3 | N2 | N2 / N1 | N1 / N0 | N0 |
| | OPE | | | | | OPD | OPC | OPB | OPA | OP |
| | OPD2 | OPC2 | OPB2 | OPJ | OPI | | | | | |
| | OPD2 | OPC2 | OPB2 | OPA2 | OP2 | | | | | |
| FREE | Rd | Rs | Rt | 0 - 3 | imm [4:0] | 0 - 6 | 6 | 7 | 15 | 7 |
| mult.sh.r Rd, Rs, Rt, #shift[4:0] | Rd | Rs | Rt | 0 | shift [4:0] u | 7 | 6 | 7 | 15 | 7 |
| shiftr.32s.i Rd, Rs, #shift[4:0] | Rd | Rs | 0 | 1 | shift [4:0] u | 7 | 6 | 7 | 15 | 7 |
| shiftr.32u.i Rd, Rs, #shift[4:0] | Rd | Rs | 1 | 1 | shift [4:0] u | 7 | 6 | 7 | 15 | 7 |
| shiftl.32.i Rd, Rs, #shift[4:0] | Rd | Rs | 2 | 1 | shift [4:0] u | 7 | 6 | 7 | 15 | 7 |
| rotatel.32.i Rd, Rs, #shift[4:0] | Rd | Rs | 3 | 1 | shift [4:0] u | 7 | 6 | 7 | 15 | 7 |
| FREE | Rd | Rs | 4 - 7 | 1 | imm [4:0] | 7 | 6 | 7 | 15 | 7 |
| FREE | Rd | Rs | Rt | 2 - 3 | imm [4:0] | 7 | 6 | 7 | 15 | 7 |

*Fig. 75a*

| | | | | | | | | | | | | |
|---|---|---|---|---|---|---|---|---|---|---|---|---|
| | FREE | Rd | Rs | Rt | 0 - 15 | 0 - 7 | 0 - 6 | 7 | 7 | 15 | 7 |
| | movr2s, movs2r, movr2b, movb2r ?d, ?s | ?d | ?s | 0 | 0 - 3 | 0 | 7 | 7 | 7 | 15 | 7 |
| | trap.r Rs | 0 | Rs | 0 | 4 | 0 | 7 | 7 | 7 | 15 | 7 |
| | swap.r Rd, @(%r0, Ra) | Rd | Ra | 0 | 5 | 0 | 7 | 7 | 7 | 15 | 7 |
| Rd = 32-bit<br>Rs = Rt = 16-bit | mult.32s.r Rd, Rs, Rt | Rd | Rs | Rt | 6 | 0 | 7 | 7 | 7 | 15 | 7 |
| Rd = 32-bit<br>Rs = Rt = 16-bit | mult.32u.r Rd, Rs, Rt | Rd | Rs | Rt | 7 | 0 | 7 | 7 | 7 | 15 | 7 |
| Rd = Rs = 32-bit<br>Rt = 16-bit | shiftr.32s.r Rd, Rs, Rt | Rd | Rs | Rt | 8 | 0 | 7 | 7 | 7 | 15 | 7 |
| Rd = Rs = 32-bit<br>Rt = 16-bit | shiftr.32u.r Rd, Rs, Rt | Rd | Rs | Rt | 9 | 0 | 7 | 7 | 7 | 15 | 7 |
| Rd = Rs = 32-bit<br>Rt = 16-bit | shiftl.32.r Rd, Rs, Rt | Rd | Rs | Rt | 10 | 0 | 7 | 7 | 7 | 15 | 7 |
| Rd = Rs = 32-bit<br>Rt = 16-bit | rotatel.32.r Rd, Rs, Rt | Rd | Rs | Rt | 11 | 0 | 7 | 7 | 7 | 15 | 7 |
| | stz.r @(Rx, Ra) | 0 | Ra | Rx | 12 | 0 | 7 | 7 | 7 | 15 | 7 |
| | stz.8.r @(Rx, Ra) | 0 | Ra | Rx | 13 | 0 | 7 | 7 | 7 | 15 | 7 |
| | FREE | Rd | Rs | Rt | 14 - 15 | 0 | 7 | 7 | 7 | 15 | 7 |

*Fig. 75b*

| | | | | | | | | | | | |
|---|---|---|---|---|---|---|---|---|---|---|---|
| | div.*.r Rd, Rs, Rt | Rd | Rs | Rt | 0 - 3 | 1 | 7 | 7 | 7 | 15 | 7 |
| | rem.*.r Rd, Rs, Rt | Rd | Rs | Rt | 4 - 7 | 1 | 7 | 7 | 7 | 15 | 7 |
| Rd, R(d+1), Rs, Rt = 16-bit<br>Rd = Rs / Rt<br>R(d+1) = Rs % Rt | divrem.*.r Rd, Rs, Rt | Rd | Rs | Rt | 8 - 11 | 1 | 7 | 7 | 7 | 15 | 7 |
| | FREE | Rd | Rs | Rt | 12 - 15 | 1 | 7 | 7 | 7 | 15 | 7 |
| Rd = DsrPtr, Rs =<br>SrcPtr, Rt = Size<br>Rd = Rs = Rt = Bytes | blkcp.r Rd, Rs, Rt | Rd | Rs | Rt | 0 | 2 | 7 | 7 | 7 | 15 | 7 |
| Rd = DsrPtr, Rs =<br>SrcPtr, Rt = Size<br>Rd = Rs = Rt = Bytes | blkcps.r Rd, Rs, Rt | Rd | Rs | Rt | 1 | 2 | 7 | 7 | 7 | 15 | 7 |
| Rd = DsrPtr, Rs =<br>SrcReg, Rt = Size<br>Rd = Rt = Bytes | blkst.r Rd, Rs, Rt | Rd | Rs | Rt | 2 | 2 | 7 | 7 | 7 | 15 | 7 |
| Rd = DsrPtr, Rs =<br>SrcReg, Rt = Size<br>Rd = Rt = Bytes | blkst.8.r Rd, Rs, Rt | Rd | Rs | Rt | 3 | 2 | 7 | 7 | 7 | 15 | 7 |
| | FREE | Rd | Rs | Rt | 4 - 15 | 2 | 7 | 7 | 7 | 15 | 7 |
| | FREE | Rd | Rs | Rt | 0 - 15 | 3 - 6 | 7 | 7 | 7 | 15 | 7 |
| | sif | 7 | 7 | 7 | 15 | 7 | 7 | 7 | 7 | 15 | 7 |

*Fig. 75c*

PROCESSOR AND INTERFACE

RELATED APPLICATIONS

This is a continuation under 35 U.S.C 111(a) of PCT/GB2006/01756, filed May 12, 2006 and published in English as WO 2006/120470 A2 on Nov. 16, 2006, which claimed priority to United Kingdom application no. 0524772.1 filed on Dec. 5, 2005, and United Kingdom application no. 0509738.1 filed on May 12, 2005; which applications and publications are incorporated in their entirety herein by reference and made a part hereof.

The present invention relates to a processor, to an interface—in particular a serial interface—associated with the processor, and to methods of operation of the processor and the interface. The invention also relates to an instruction set and to methods of programming operation of the processors and the interface. The invention also relates to a data processing apparatus. The invention also relates to a family of processors.

Broadly, according to an aspect of the invention, there is provided a family of processors, which share a number of common characteristics, and in which substantially the only differences between the processors are as a result of the different sizes thereof.

According to another aspect of the invention, there is provided a processor forming part of a family of similar processors each having a number of common characteristics, and in which the only differences between the processors and the other processors in the family are as a result of the different sizes of the processors.

Preferably, the processors are similar in that that they share one or more of the characteristics listed in Table 1 below. More preferably, each of the processors is unique in accordance with one or more of the parameters listed in Table 1 below.

Broadly, according to another aspect of the invention, there is provided a data processing apparatus including one or more processors, each processor having associated memory, registers and debug instructions, and an interface capable of communicating with the or each processor, wherein the interface provides non-invasive access to the or each processor memory, registers or debug instructions.

Preferably, the data processing apparatus is implemented in a single semiconductor device or chip, which contains one interface and one or more processors. The processors are preferably slaves to the interface. More preferably, the processors form part of the family of processors as hereinbefore described.

The term "semiconductor device" as used herein is preferably intended to connote an ASIC or FPGA implemented in silicon or germanium or gallium-arsenide or some other semiconductor material. The semiconductor device is also referred to as a chip.

The term "SIF" relates to a Serial Interface.

The term "high code density" as used herein refers to the size of the compiled program. Thus, for the same original (high level) program code a smaller sized compiled program will have a higher code density than a larger sized complied program.

The terms XAP3, XAP4 and XAP5 as employed herein refer to a number of closely related processors.

Preferably, the processors are optimised for embedded use in ASICs and FPGAs. More preferably, the processors may be of different sizes.

Preferably, the interface is optimised for embedded use in ASICs and FPGAs.

Preferably, the interface, which is also referred to as a SIF interface, can support an off-chip master and an on-chip master. Preferably, the off-chip master uses an external (xSIF) interface. Preferably, the on-chip master uses an internal (iSIF) interface. In this way, the interface may be controlled, and hence provide access to the processor's memory, registers and debug instructions provided, either via an external source (using an off-chip master), or via an on-chip device, such as a further processor. Further details in this regard can be found in FIGS. 1, 2, 31 and 32.

Preferably, the masters can read and write the registers and memory of one or more on-chip processors. More preferably, the masters can also issue debug instructions to one or more on-chip processors. Preferably, the external interface is a serial interface. Preferably, the internal interface is a parallel interface.

Preferably, the interface comprises arbitration hardware for ensuring that communication bandwidth is shared between the internal and external masters.

Preferably, the processors are those described in table 1.

TABLE 1

| Processor Features | | | |
|---|---|---|---|
| | Processor 1 (XAP3) | Processor 2 (XAP4) | Processor 3 (XAP5) |
| Preferred Memory Width | 32 bit | 16 bit | 16 bit |
| Data Bus | 32 bit | 16 bit | 16 bit |
| Address Bus | 32 bit | 16 bit | 24 bit |
| Memory limit | 4 GB | 64 kB | 16 MB |
| Memory Organisation | Little Endian | Little Endian | Little Endian |
| Instructions | 16 bit - 50%<br>32 bit - 50% | 16 bit - 87.5%<br>32 bit - 12.5% | 16 bit - 87.5%<br>32 bit - 12.5% |
| xSIF Shift Register | 88 bit | 52 bit | 84 bit |
| iSIF Registers<br>Address, Control, Data, Status | 32, 8, 32, 16 bit | 16, 8, 16, 12 bit | 24, 8, 32, 20 bit |
| Processor Modes | 4 | 4 | 4 |
| User Registers | 16 * 32 bit, R0-R15 | 8 * 16 bit, R0-R7 | 8 * 16 bit, R0-R7 |
| Stack Pointer | R15 | R7 | Dedicated 24 bit SP |
| Link Register | R14 | R6 | Dedicated 24 bit LR |
| Program Counter | Dedicated 32 bit PC | Dedicated 16 bit PC | Dedicated 24 bit PC |
| Breakpoint Registers | 16 * 32 | 1 * 16 | 4 * 24 |
| int variable | 32 bit | 16 bit | 16 bit |

TABLE 1-continued

| Processor Features | | | |
|---|---|---|---|
| | Processor 1 (XAP3) | Processor 2 (XAP4) | Processor 3 (XAP5) |
| Data Pointers | 32 bit | 16 bit | 16 bit |
| Function Pointers | 32 bit | 16 bit | 32 bit |
| Software Toolkit | xIDE for XAP3 | xIDE for XAP4 | xIDE for XAP5 |
| C Compiler | xap3-gcc, xap3ncc | xap4-gcc | xap5-gcc |
| C Library | xap3-lib | xap4-lib | xap5-lib |
| Assembler | binutils | binutils | binutils |
| Linker | binutils | binutils | binutils |
| Code | PC-relative | PC-relative | PC-relative |
| Const | PC-relative | PC-relative | PC-relative |
| Global Variables | GP-relative | PC-relative | Absolute Address |

Furthermore, each of the processors in the family also share the following common features: the processors may all be Load-Store RISC processors; the processors may all support unaligned byte addressing; the processors may all have a Von Neumann architecture (having a single memory and/or memory bus for code and data); the processors may all be implemented in a synthesisable Verilog RTL (Register Transfer Level) language; the processors may all be optimised for code density so that a given program written in, for example C will compile to be as small as possible (giving lower cost and power consumption, while running at a faster speed); the processors may all have a mixture of 16 and 32 bit instructions. Preferably, these instructions can be freely mixed and are evaluated on an instruction by instruction basis. More preferably, a user does not have to specify whether to use a 16 or 32 bit instruction at the time of coding, the processors may all use the same style of instruction mnemonics; the processors may all have the same 4 processor modes: User, Supervisor, Interrupt, Non-Maskable Interrupt (NMI); the processors may all use a SIF interface for software debugging and data acquisition. The SIF interface supports an internal parallel iSIF interface and an external serial xSIF interface; the processors may all use the same developer environment for software development In preferred embodiments, the developer environment comprises the xIDE Toolkits; the processors may all have GCC (GNU Compiler Collection) compilers; the compilers and instruction sets for use with the processors may all be developed together for compatibility and optimal code density; the processors may have good hardware support for embedded operating systems.

Preferably, all code for these processors will be in C or another high-level language. Preferably, the code will normally use 8, 16 and 32 bit fixed-point data. The code will not normally use floating-point data. Some of this code will be custom developed for the application, but much will be off-the-shelf standard product software. Advantageously, the family of processors (XAP3, XAP4 and XAP5) all have good features for porting $3^{rd}$-party software.

As can be seen from Table 1, the processors (XAP3, XAP4 and XAP5) all have many aspects in common. This 'family' approach makes it possible for programmers easily to migrate code from one processor to another. It also makes it easy for programmers acquainted with one processor to learn how to use another processor in the family. These advantages are achieved because of the consistent philosophy applied across all the processors in the family.

The programmer will typically choose a particular processor based upon: required software size; speed requirements; cost (size of processor and memory) requirements; and power-consumption requirements.

The XAP4 processor is the smallest in size. The XAP3 processor is the largest, and the XAP5 processor is medium-sized.

A key feature of all the processors is good code density for compiled C code. In all cases this is achieved by instruction sets that are a mixture of 16 and 32 bit: some instructions are only available as 16 bit; some instructions are only available as 32 bit; and some instructions are available in 16 bit and in 32 bit form.

Preferably, the instruction mnemonics do not indicate whether an instruction is 16 or 32 bit. Thus, the programmer and compiler do not need to be aware of whether instructions are 16 or 32 bit Only the assembler has to choose between 16 or 32 bit encodings for a particular instruction. This is much more convenient for the programmer as he always has access to all of the processor and all of the instructions (some processors have modes which only allow the programmer to access a subset of the processor's hardware and instructions). The 16 and 32 bit instructions can be freely mixed and are evaluated by the hardware at run-time. This may provide good code-density while retaining a friendly programming interface.

It should also be noted that the above two aspects of the invention XAP3 and XAP4 are closely related, since they cover a family of closely related processors and an associated interface. Therefore, any, some and/or all features in one aspect may be applied to any, some and/or all features in the other aspect, in any appropriate combination.

Preamble

XAP3 Features disclosed herein may be combined in any appropriate combination.

A brief overview of aspects of the invention, and preferred embodiments, is first provided.

The SIF processor interface system is used in relation to a number of processors, including the XAP3.

In SIF communications, in the preferred embodiment a SIF Computer transfers data to and from one or more SIF Slaves via one or more SIF Pods. The SIF Slave is normally an integrated circuit.

Aspects of the SIF and associated processor are described in WO 96/09583, WO 03/048978, GB 2382889, United Kingdom Patent Application Nos. 9419246.5 and 0129144.2, each in the name of Cambridge Consultants Limited and each of which is hereby incorporated by reference.

SIF technology includes elements of the SIF inside the integrated circuit and external SIF elements found in the SIF Computer and SIF Pods.

The XAP3 and SIF Slave module are normally implemented together in the same integrated circuit. The integrated circuit may also contain other circuit elements. The integrated circuit may contain more than one processor, but normally contains just one SIF Slave module.

The XAP3 is a 32-bit processor that may be implemented in an integrated circuit. The integrated circuit may be a standard component or an Application Specific Integrated Circuit (ASIC) or a Field Programmable Gate Array (FPGA).

In embodiments of the XAP3 processor, the same width is used for data, registers and address and instruction, in accordance with good processor design, and preferably the same memory can be used to store data and store programs and store pointers.

The preferred embodiment of a SIF system comprises three main components: a SIF Slave module (which may also be referred to herein simply as the SIF module or SIF, in various contexts), usually located in an integrated circuit; a SIF Pod, located external to the integrated circuit and preferably located external to the circuit board upon which the integrated circuit is located; and a SIF computer (also referred to as a computer or control computer) which includes a SIF driver, preferably implemented in software. The SIF Pod and the SIF computer together may be referred to as a SIF master. Alternatively the SIF Pod alone is sometimes referred to as the SIF master. The SIF computer may be a laptop or desktop computer and may be, for instance, a PC or Mac.

An overview of the architecture of preferred embodiments of the SIF processor interface system can be seen in FIGS. 2 and 19.

The integrated circuit is referred to at various places herein as the SIF Slave ASIC (even though it may be an FPGA or standard component).

In the preferred embodiment, the SIF Slave ASIC contains a SIF Slave module, one or more processors, application-specific digital circuitry and application-specific analogue circuitry. In the preferred embodiment the processor is a XAP3 processor. In other embodiments the processor may be, for instance, a XAP1 or XAP2 processor.

A plurality of SIF Slave ASICs (or FPGAs) may be connected to a single SIF Pod, and a plurality of SIF Pods may be connected to a single SIF Computer, as can be seen for instance in FIG. 1.

The SIF Slave module in the preferred embodiment comprises a shift register with three interface signals (SIF_CLK, SIF_MOSI, SIF_MISO) and handshake circuitry with one interface signal (SIF_LOADB). The shift register has two inputs; SIF_CLK (to which a clock signal is applied to effect the movement of binary data between subsequent stages of the shift register) and SIF_MOSI (Master-Out, Slave-In) for receiving binary information in a serial manner from an external source (thereby allowing the information to be entered into the shift register and debug system). The shift register has a single output, SIF_MISO (Master-In, Slave-Cut) for allowing binary data to be output in a serial manner from the shift register to an external source. In preferred examples, the shift register is a 64-bit shift register (XAP2) or an 88 bit shift register (XAP3). Typically, the SIF_CLK, SIF_MOSI, SIF_MISO and SIF_LOADB signals connect the SIF Slave module to the SIF Pod.

The SIF Pod may comprise a hardware-based interface between the SIF Slave ASIC and a personal computer. The SIF Pod may be connected to the SIF Slave ASIC by a 16-wire interface and may be connected to the PC via a standard communications interface such as Ethernet, RS232 or USB (Universal Serial Bus).

The SIF Driver in the SIF Computer may comprise a computer program that translates information between the standard communications interface (such as Ethernet, RS232 or USB) and the xSIF API (Application Programmer's Interface). The enables application programs on the PC to simply control and transfer information with the SIF Slave ASICs. Further computer programs may also be executed on the PC, which programs may utilise the xSIF API to allow data to be written to and read from the SIF Slave devices. This data may then be analysed to determine the operation of the processor, such as for allowing debugging of programs being executed by the processor or processors in the SIF Slave ASIC. Alternatively or additionally, data read from the SIF Slave ASIC may be data relating to the operation of a sensor or other device and the SIF Slave ASIC may then operate as a data logging device.

The SIF interface system can be operated on the SIF Slave ASIC concurrently with other software being executed by the ASIC processor, such as an operating system and user-mode programs. Concurrent operation may be achieved by time-slicing, which provides time windows during which the ASIC processor performs NOP (No Operation) leaving the SIF Slave module free to execute debug control of the processor, or to access the processor's memory and registers.

Typically each processor comprises a Core, an MMU (Memory Management Unit), an IVC (Interrupt Vector Controller) and a SIF Slave Module. The Core communicates with memory external to the processor via the Memory Management Unit. In a preferred example, the Memory Management Unit can communicate with external memory including Flash memory (typically used for the storage of programs), RAM (Random Access Memory, typically used for the temporary storage of data variables to be manipulated by programs) and one or more registers.

The memory management unit typically has address and read-write lines and data lines. These signals are typically unidirectional when on-chip. The data lines are typically bi-directional when off-chip.

The SIF Slave Module in the preferred embodiment is connected to the Memory Management Unit, such that the SIF Slave module is able to control the memory control and address signals, thereby enabling it to read and write data from/to the processor's memory.

In the preferred embodiment, a number of further lines are provided to enable interaction of the processor Core with the SIF Slave module.

In the preferred embodiment a number of lines are provided between the SIF Slave module and the SIF Pod, including the SIF_CLK, SIF_MOSI, SIF_MISO and SIF_LOADB lines referred to above. A further input to the SIF Slave ASIC is the chip select line SIF_CS. The 16-wire interface from the SIF Pod contains 4 lines that may be used as separate SIF_CS lines to up to 4 SIF Slave ASICs.

XAP4 Features disclosed herein may be combined in any appropriate combination.

In one aspect there is provided a processor interface apparatus, comprising at least one processor, an interface connected to the processor and comprising means for writing data to and/or reading data from the processor, control means for controlling operation of the interface, the control means comprising master and slave modules, and wherein the master controlling module is located on the same chip as the or each processor.

The provision of a master on the same chip as the or each processor (i.e. an on-chip master) provides increased flexibility. In particular, it enables the interface to be used after the design of the chip has been finalised, i.e. in the final application, and not only during the design and debugging of the chip.

Preferably, the apparatus further comprises a master controlling module which is not located on the same chip as the or each processor, i.e. an off-chip master. The off-chip master may be in the form of, or implemented in, a separate piece of hardware, for example, a PC.

In this context, the term "chip" (and hence the terms "on-chip" and "off-chip") preferably refers to any single semiconductor device, such as an ASIC or FPGA including various processors and/or memory, manufactured from silicon, germanium, gallium-arsenide or any other semiconductor material.

The interface is also referred to herein as a SIF interface, which comprises at least one SIF master and at least one SIF slave.

Preferably, the SIF master controls the SIF slave. More preferably, the SIF slave is connected to the or each of the (on-chip) processors.

Thus, the SIF slave enables a SIF master to access one or more on-chip processors (as shown in FIG. 31).

Preferably, the off-chip SIF master communicates via an external (xSIF) interface.

Preferably, the SIF master can also be on-chip and communicate via an internal (iSIF) interface.

Preferably, read and/or write access to the processors via the (SIF) interface is non-invasive. Thus, the processor's functionality and timing remain unchanged.

Preferably, the on-chip processors can be of different types. Preferably, the processors are XAP processors.

The SIF interface is used in relation to a number of processors, including the XAP4.

The SIF interface provides a mechanism for masters to access the registers, memory and debug instructions of one or more on-chip processors. In the case where the master is an off-chip device the SIF interface is accessed via an external (xSIF) interface. In the case where the master is on-chip the SIF interface is accessed via an internal (iSIF) interface. Preferably, the external xSIF interface comprises a serial interface. Preferably, the internal iSIF interface comprises a parallel interface.

In xSIF communications, there is preferably one SIF slave per chip. In a preferred embodiment, a SIF Computer (xSIF master) transfers data to and from one or more on-chip processors via one or more SIF Pods and via one or more SIF slaves. Communications between the SIF pod and the SIF slave use the xSIF interface.

In iSIF communications, in a preferred embodiment, an iSIF master transfers data to and from one or more processors via the SIF slave using the on-chip iSIF (parallel) interface. The iSIF master, SIF slave and processors are normally on the same chip.

The iSIF master may be another processor or a hardware state machine.

The XAP4 and SIF Slave module are normally implemented together in the same integrated circuit. The integrated circuit may also contain other circuit elements. The integrated circuit may contain more than one processor, but normally contains just one SIF Slave module.

The XAP4 is a 16-bit processor that may be implemented in an integrated circuit. The integrated circuit may be a standard component or an Application Specific Integrated Circuit (ASIC) or a Field Programmable Gate Array (FPGA).

In embodiments of the XAP4 processor, the same width is used for data, registers and address and instruction, in accordance with good processor design, and preferably the same memory can be used to store data and store programs and store pointers.

A preferred embodiment of a SIF system (as shown in FIGS. 1, 2, 31 and 32) comprises three main components: one or more ASICs, a SIF Pod and a SIF computer. Each ASIC comprises a SIF slave module, one or more processors and optionally an iSIF master. The SIF pod and SIF computer are located external to the ASIC. The SIF computer includes a SIF driver, preferably implemented in software. The SIF Pod and the SIF computer together may be referred to as an xSIF master. Alternatively the SIF Pod alone is sometimes referred to as the xSIF master. The SIF computer may be a laptop or desktop computer and may be, for instance, a PC or Mac. All three components are required for xSIF communication. The SIF Pod and SIF Computer are not required for iSIF communication.

In the preferred embodiment, the SIF Slave ASIC contains a SIF Slave module, one or more processors, application-specific digital circuitry and application-specific analogue circuitry. In the preferred embodiment the processor is a XAP4 processor. In other embodiments the processor may be, for instance, a XAP1, XAP2, XAP3 or XAP5 processor.

The SIF Slave module in the preferred embodiment comprises the external xSIF interface, the internal iSIF interface and control logic.

The xSIF interface comprises a shift register with three interface signals (SIF_CLK, SIF_MOSI, SIF_MISO) and handshake circuitry with one interface signal (SIF_LOADB). The shift register has two inputs; SIF_CLK (to which a clock signal is applied to effect the movement of binary data between subsequent stages of the shift register) and SIF_MOSI (Master-Out, Slave-In) for receiving binary information in a serial manner from an external source (thereby allowing the information to be entered into the shift register and debug system). The shift register has a single output; SIF_MISO (Master-In, Slave-Out) for allowing binary data to be output in a serial manner from the shift register to an external source. In preferred examples, the shift register is a 64-bit shift register (XAP2), an 88 bit shift register (XAP3), a 52-bit shift register (XAP4), or a 84-bit shift register (XAP5). Typically, the SIF_CLK, SIF_MOSI, SIF_MISO and SIF_LOADB signals connect the SIF Slave module to the SIF Pod.

The iSIF interface comprises iSIF fields and iSIF control signals. The input fields to iSIF are: address, control and data_write. The output fields from iSIF are: data_read and status. The input control signals to iSIF are: isif_load and isif_cancel. The output control signal from iSIF is isif_done. There are multiplexers for the three iSIF input fields.

The SIF Pod may comprise a hardware-based interface between the SIF Slave ASIC and a personal computer. The SIF Pod may be connected to the SIF Slave ASIC by a 16-wire interface and may be connected to the PC via a standard communications interface such as Ethernet, RS232, LPT or USB (Universal Serial Bus). The 16 wire interface includes the xSIF interface.

The SIF Driver in the SIF Computer (which is an xSIF master) may comprise a computer program that translates information between the standard communications interface (such as Ethernet, RS232, LPT or USB) and the xSIF API (Application Programmer's Interface). This enables application programs on the PC to simply control and transfer information with the SIF Slave ASICs. Further computer programs may also be executed on the PC, which programs may utilise the xSIF API to allow data to be written to and read from the SIF Slave devices. This data may then be analysed to determine the operation of the processor, such as for allowing debugging of programs being executed by the processor or processors in the SIF Slave ASIC. Alternatively or additionally, data read from the SIF Slave ASIC may be data relating to the operation of a sensor or other device and the SIF Slave ASIC may then operate as a data logging device.

The SIF interface can be operated on the SIF Slave ASIC concurrently with other software being executed by the processors, such as operating systems and user-mode programs. Concurrent operation may be achieved by time-slicing, which provides time windows during which the ASIC processor performs NOP (No Operation) leaving the SIF Slave module free to execute debug control of the processor, or to access the processor's memory and registers. This mechanism is used both for iSIF and xSIF accesses.

Preferably, xSIF and iSIF use substantially the same instruction set Thus, the inclusion of iSIF functionality adds very little hardware to the existing xSIF system.

Typically each processor comprises a Core, an MMU (Memory Management Unit), an IVC (Interrupt Vector Controller) and a SIF Slave Module, see FIGS. 53 and 54 and 71. The Core communicates with memory external to the processor via the Memory Management Unit. In a preferred example, the Memory Management Unit can communicate with external memory including Flash memory, RAM and one or more registers.

The memory management unit typically has address and read-write lines and data lines. These signals are typically uni-directional when on-chip. The data lines are typically bi-directional when off-chip.

The SIF Slave Module in the preferred embodiment is connected via each processor to each respective processor's Memory Management Unit, such that the SIF Slave module is able to control the memory control and address signals, thereby enabling it to read and write data from/to the processor's memory. This is used identically for xSIF and iSIF accesses.

In the preferred embodiment, a number of further (control) lines are provided to enable interaction of the processor Core with the SIF Slave module.

In the preferred embodiment for an xSIF interface a number of lines are provided between the SIF Slave module and the SIF Pod, including the SIF_CLK, SIF_MOSI, SIF_MISO and SIF_LOADB lines referred to above. A further input to the SIF Slave ASIC is the chip select line SIF_CS. The 16-wire interface from the SIF Pod contains 4 lines that may be used as separate SIF_CS lines to up to 4 SIF Slave ASICs.

Preferably, the apparatus further comprises at least one control line, and wherein operation of the interface controller is dependent upon a signal applied to the control line.

Preferably, the apparatus processes instructions passed via the internal (iSIF) and external interfaces (xSIF) in alternate fashion.

Preferably, the apparatus further comprises means for arbitrating the processing of instructions passed via the internal (iSIF) and external (xSIF) interfaces.

Preferably, in particular for cancel purposes, the instructions passed via the external (xSIF) interface take precedence over instructions passed via the internal (iSIF) interface.

According to an aspect of the invention, there is provided a data processing apparatus including a processor, and an interface capable of communicating with the processor, each processor having associated memory, registers and debug instructions, and wherein the interface provides access to the memory, registers and debug instructions of the or each processor.

Preferably, the (SIF) interface comprises at least one (SIF) master module and at least one (SIF) slave module.

Preferably, the SIF slave enables a SIF master to access one or more on- or off-chip processors.

Preferably, the SIF master is provided on-chip. More preferably, the SIF master communicates via an internal (iSIF) interface.

Preferably, the SIF master further comprises an off-chip device. More preferably, the off-chip device communicates via an external (xSIF) interface.

Preferably, access via the SIF interface to the processors is non-invasive. Thus, the processor's functionality and timing remain unchanged by a SIF access.

Preferably, the data processing apparatus is in the form of a single semiconductor device or chip containing one interface and one or more processors.

Preferably, the term semiconductor device is intended to connote an ASIC or FPGA implemented in silicon or germanium or gallium-arsenide or some other semiconductor material. The semiconductor device is also referred to as a chip.

Preferably interface communications are initiated by a master and responded to by a slave.

Preferably, the interface master may be implemented on or off-chip.

Preferably, the master can read and write to the memory and registers of one or more processors.

Preferably, the master can also issue debug instructions to one or more processors.

Preferably, communications between the master and slave(s) may be from within the semiconductor device (internal) or from outside the semiconductor device (external).

Preferably, the internal interface is a parallel interface.

Preferably, the external interface is a serial interface.

Preferably, the internal interface master is implemented in hardware in the form of another processor or dedicated state machine.

Preferably, the internal master can read and write registers and memory of one or more processors. This can be used to download software after system reset, to capture and store processor state before turning processor power off, to restore processor state after turning processor power back on, to read memory mapped IO registers in real-time in a non-invasive manner. The IO register could be an ADC (analogue to digital converter).

Preferably, the internal master can also issue debug instructions to one or more processors. This can be used to start, stop, single step, set breakpoint, run to breakpoint and reset one or more processors.

The provision of an internal master enables all of the abovementioned functionality to be used in the final application and not only during product debug.

Preferably, the slave is adapted to support both an internal and external interface. The internal interface is to an internal master. The external interface is to an external master. More preferably, the internal interface is parallel and the external interface is serial.

It is also possible for internal and external masters to simultaneously read and write registers and memory of one or more processors.

Furthermore, it is possible for internal and external masters to issue debug instructions to one or more processors.

Network SIF Debug and Multiprocessor Support/Networked SIF/iSIF+xSIF

According to another aspect of the present invention, there is provided, a network which comprises a computer, one or more pods, one or more chips, each containing one or more processors and communications protocols, wherein the communications protocols allow the computer to interact with any of the processors.

According to another aspect of the present invention, there is provided, a network according to claim 1, wherein the communications between computer and processors may be non-invasive to the processor's functional behaviour, so does not affect that processor's functionality or timing.

References made herein to UK patent numbers GB2382889 and GB2294137 which relate to a non-invasive debug It is now proposed to perform a non-invasive debug over a network.

Many new electronic devices are for communications networks; they might be wireless (WiFi, Bluetooth, Zigbee, GSM, GPRS etc.) or wireline (Ethernet, USB, FireWire, Power-Line-Comms etc.). These devices are normally Integrated Circuits (IC or chip). They are designed to be configurable platforms. This is done by incorporating one or more microprocessors and using software to configure the chip to perform different functions. This creates a very difficult debug problem.

At a certain stage in the development there may be several chips running software and trying to communicate with each other. The software will contain bugs. It is difficult enough trying to debug a single processor with new software. The difficulty increases significantly when there is more than one processor in the chip. The difficulty increases hugely when there are several chips trying to communicate with each other via incomplete bug-ridden interfaces. This is why it is very important for each chip to contain a debug interface that allows them all to be connected in a debug network. It is also important that the debug interface is non-invasive. This allows each chip to continue functioning in its normal manner, without having its function or timing affected when the debug interface is in operation.

The original SIF interface (XAP patent, 1994) provided non-invasive debug to a single processor in a single chip. The new SIF interface (xSIF & iSIF) provides non-invasive debug to many chips each potentially containing many processors.

For example there might be a single computer connected to 10 chips via the SIF debug interface (locally via USB interface or remotely via ethernet interface). One of the functions of the chips is to communicate with each other (e.g. via a radio link or power-line communications). This functional interface may still many bugs. The debug computer may be able to monitor the packets of information travelling between the chips. It may also be able to download and debug software to all the processors in all the chips. This allows it to single-step or set break-points for all or any of the processors, and creates a very complete debug environment that allows the computer to find and fix software bugs within a complex network system.

The network debug system may also be used to find hardware bugs in the chip designs before they have been made into silicon. In this early stage, a hardware emulator based on an FPGA (Field Programmable Gate Array) may be created for each chip. The debug computer may be connected to the emulators via the SIF network in the same way as it would be to the final chips. This debug environment can be used to find hardware and software bugs. When a hardware bug is found, it may be fixed and the FPGA re-programmed. When a software bug is found, it can be fixed from the debug computer and downloaded to the relevant processor in the relevant chip.

The Network SIF Debug system may include many features to support the above functionality. In addition, these features may operate within the constraints of modem high-speed, low-power, software-configurable devices. These are described in the following sections.

The iSIF and or xSIF may contain one or more willing hardware slaves; they may be easy to turn off (low power), and or easy to read & write (program download, data acquisition).

The debug features should generally be available from off-chip and on-chip devices. Off-chip devices are served by xSIF which is a serial interface of 4 (or optionally 5) pins. On-chip devices are served by iSIF which is a parallel interface. In both cases this may allow the Master to: read and write to memory-mapped devices (RAM, ROM, Flash, IO Register); read and write to Processor Registers; and issue debug commands (e.g. Start, Stop, Single-Step, Run-to-Breakpoint, Reset).

The addition of iSIF to the existing xSIF has added very few gates which keeps the system cost low. This has been possible because the instruction codes used xSIF and iSIF are similar.

In practice, SIF networks (consisting of SIF Computer+SIF Pods+SIF Slaves) are likely to use xSIF for the following purposes: downloading software to target memory in selected processor in selected chip; executing debug instruction in selected processor in selected chip; and reading back data from memory of selected processor in selected chip (static data or continuous data for real-time data-acquisition).

iSIF makes these features available to an on-chip SIF Master. This is becoming more common as chip sizes increase and complete networks may exist in a single chip. The SIF Master might be another processor or might be a small hardware state machine. Either way, the on-chip Master may access the SIF instructions via the iSIF. Because it is all on-chip it is acceptable to have a parallel interface with many signals. By using a parallel interface, iSIF may enable much faster execution of SIF instructions than xSIF. iSIF is likely to be used for control of software download from non-volatile memory (e.g. Flash or EEPROM) to RAM at bootup time; data-acquisition from a Slave processor memory to the Master without affecting the Slave's timing or functionality; and full processor debug to all the Slave processors—e.g. if the Master processor already has its own debug interface (e.g. JTAG) it can enable full debug of all the processors from the original debug interface, via iSIF to all the SIF Slaves. This avoids the need to add any extra external pins to the chip. It also means that it may be possible to create a single debug tool on the computer that can be aware of all the processors on the chip, thus creating a fully integrated debug environment.

As the xSIF and iSIF are accessing the same SIF Slaves it could be possible for one interface to hog the SIF module and block accesses from the other. This would be unacceptable to the SIF Masters. Consequently the SIF module has been designed to have a ping-pong system that alternates between xSIF and iSIF requests. On completing an xSIF request the SIF module may process an iSIF request (if there is one) before processing the next xSIF request. Similarly on completing an iSIF request the SIF module may process an xSIF request (if there is one) before processing the next iSIF request. This means that the xSIF and iSIF channels will generally appear to be open to the SIF Masters. If both channels are being used simultaneously they may simply appear to have lower speeds to the respective SIF Master. XAP3 In a further aspect there is provided the ability to simultaneously monitor and debug a plurality of SIF Slaves. Multiprocessor debugging is provided. Multi-processor support in xIDE (a particular Integrated Development Environment) may be used. Data packets flowing between SIF Slaves (e.g. radio or power-line communications devices) may be monitored.

In a further aspect there is provided a device interface apparatus, comprising a plurality of interfaces each comprising respective means for writing data to and/or reading data from a respective device, and control means for controlling operation of the plurality of interfaces. Each device may be a slave and/or may comprise a processor.

Preferably, the apparatus further comprises a plurality of control means each adapted to control a respective plurality of interfaces.

Preferably each interface further comprises means for instructing operation of a respective device.

Preferably the apparatus further comprises a computer adapted to communicate with, and preferably control, the or each control means. Preferably the SIF computer is adapted to receive data from and/or send data to one or more devices via the or each control means.

Preferably the or each computer is adapted to communicate with a respective plurality of control means using a packet based protocol, for instance TCP/IP or ethernet.

Preferably the apparatus comprises means for detecting errors in packets sent between the or each computer and at least one of the control means.

Preferably, the or each interface comprises a register, preferably a shift register, and preferably the or each interface comprises a SIF slave module. Preferably the control means comprises a SIF Pod and/or a control computer.

Preferably the processor is a XAP3 processor.

Preferably the processor and the interface are on the same circuit board and/or form part of an ASIC or FPGA.

Preferably the interface and/or the control means and/or the computer comprises means for debugging the or each device and/or comprises means for capturing data from the or each device and/or comprises means for analysing data from the or each device.

FIG. 1 shows a plurality of networked SIF slaves linked to a SIF Pod/Master.

Networking of SIF slaves allows a single computer to access many SIF Slaves simultaneously which enables, for instance, de-bugging and/or data acquisition, on a wide scale.

Referring to the FIG. 1, software running on each of the SIF slaves (for instance ASICs or FPGAs) shown can be debugged, because packets can be observed from the computer going to each of them.

Multiprocessor de-bug may be operated and/or developed in the xIDE environment.

Debugging of multiprocessors in a single chip may also be provided.

This aspect may have particular application to meshing of networked radio devices, particularly when used for communication of non-voice data which a plurality of separate radio devices are able to identify and communicate with each other. By way of example, meshing may be used to control lights in a warehouse. A particular light may be controllable using a radio transmitter. In the case where the radio transmitter is out of range of the light, the radio signal from the transmitter may be passed via a plurality of radio devices (for instance located on other lights) located between the light and the transmitter. The radio devices work out, usually upon power up, how to communicate with each other and pass messages on to the intended recipient device.

Each radio device has a unique number. Each device may be used as stand-alone (often battery powered) device, passing data to and via other devices via radio links.

Each device may be connected via Ethernet in order to enable multi-processor debugging. Thus the devices (slaves) may communicate by radio links between themselves but may also each have an Ethernet connection to the SIF Computer to enable debugging and other data transfer.

The SIF may, for instance, be used for debugging and also for production test and data acquisition.

The SIF enables the reading of and writing to various specified addresses or registers inside a chip in real time without changing its functionality or timing. It is non-invasive. In general the timing of the chip is not changed.

This is particularly advantageous in, for instance, DSP systems having a fixed frequency plan and enables communications to take place between a SIF Computer and a SIF Slave, without changing the SIF Slave's timing.

A chip may be connected up in its real mode to, for instance, a sensor, to a radio, to a USB link, to a RS232 link, or to a CAN link and at the same time may have another wire (e.g. SIF) going in which may not be part of the application, allowing monitoring of operation without changing operation or timing.

In normal mode when a processor is running, SIF executions take place in a time slice manner.

XAP4 In a further aspect there is provided the ability to simultaneously monitor and debug a plurality of processors and associated memories. Multiprocessor debugging is provided. Multi-processor support in xIDE (a particular Integrated Development Environment) may be used. Data packets flowing between SIF Slaves (e.g. radio or power-line communications devices) may be monitored.

There can be a single xSIF master accessing multiple ASICs each having one xSIF interface. Furthermore, the xSIF master may also access multiple processors within each ASIC. Alternatively there can be a single iSIF master accessing multiple processors via an iSIF within the same ASIC. In this way, the xSIF and iSIF masters may access each processor's associated memory, registers and debug instructions.

Preferably the processor is a XAP4 processor.

A chip may be connected up in its real mode to, for instance, a sensor, to a radio, to a USB link, to a RS232 link, to a LPT link or to a CAN link and at the same time may have another wire (e.g. SIF) going in which may not be pan of the application, allowing monitoring of operation without changing operation or timing, SIF Parity Checking Exposes Stuck-at Fault There are more potential fault conditions in a network than in a simple point-to-point communications system. If the SIF Master encounters a fault condition it is important that it is able to recognise that there has been a fault and where it is occurring. If it is a permanent fault, it may alert the user to the problem. If it is an occasional fault, then the faulty data packets may be exposed so that they can be rejected.

SIF Slaves may contain a simple parity-checking scheme. This may have separate parity bits for. PARITY_AC for Address+Control fields (1 parity bit for both fields together), PARITY_D for Data field, and PARITY_S for Status field.

The SIF configurations for XAP3 and XAP4 can mean that if the SIF_MOSI or SIF_MISO pins are stuck high or low, parity errors may be reported in PARITY_AC and PARITY_S respectively. This is because in both cases the parity bits may be set for odd parity over an even number of bits. This configuration can generally expose both stuck high & low faults. If even parity is used or there are an odd number of bits being parity-protected, then some stuck at faults may not be exposed.

The Parity bits may expose any odd number of bit errors in each of the 3 protected fields. They do not generally expose an even number of errors. In practice this means that they can only be relied upon for up to 1 bit error in each field.

The extra benefit of being able to expose stuck faults on the SIF_MOSI and SIF_MISO lines is novel. Furthermore this is an added benefit which comes for free (no extra hardware needed). Normally parity bits are used to protect parallel words so the concept of exposing stuck faults on a single serial wire is not relevant. In this case the data is serial and synchronous, so such a scheme is possible. RS232 is a serial interface that uses parity bits, but it is an asynchronous system with start and stop bits, is it is not capable of implementing the SIF parity-protection scheme described herein.

XAP3 Parity bit checking, in and/or out of the SIF, may be provided.

In a further aspect there is provided an apparatus comprising an interface adapted to communicate with a processor, and a control means adapted to communicate with, and/or control operation of, the interface, the apparatus further comprising monitoring means for monitoring communication of data, preferably between the control means and the interface.

Preferably the monitoring means is adapted to perform an error checking procedure to determine whether there has been an error in communicating data between the interface and the control means.

Preferably the data comprises at least one parity bit and the monitoring means is adapted to carry out a parity checking procedure with respect to the or each parity bit.

Preferably the data comprises a plurality of fields, and at least one parity bit is included in or associated with at least one of the plurality of fields. Preferably the plurality of fields comprise at least one of an address field, a data field, a control field, and a status field.

Preferably the control field contains a parity bit, preferably a PARITY_AC bit. Preferably that parity bit is odd parity (including the parity bit itself) for the combined address and control fields. Preferably the whole field is an even number of bits.

Preferably the status field contains a parity bit, preferably a PARITY_D bit. Preferably that parity bit is odd parity (odd number of 1s) for the combined data field and the parity bit itself.

Preferably the status field contains a further parity bit, preferably a PARITY_S bit. Preferably that parity bit is odd parity (odd number of 1s) for the status field (including the further parity bit itself).

Preferably the apparatus is adapted to carry out a further operation on the data, or on a field included in the data, in dependence on the outcome of the parity checking procedure.

Preferably the monitoring means is adapted to monitor communication of data between the interface and the processor, and preferably the monitoring means is adapted to perform an error checking procedure to determine whether there has been an error in communicating data between the interface and the processor.

Preferably the monitoring means is adapted to monitor data received by the interface from the control means and/or is adapted to monitor data received by the control means from the interface.

Preferably the interface comprises a SIF, preferably the processor comprises an 8-bit, 16-bit, 32-bit, or 64-bit processor. Preferably the processor comprises a XAP1, XAP2, or XAP3 processor. Preferably the control means comprises a SIF master and/or a control computer. Preferably the apparatus comprises means for debugging or for acquiring data from, the interface and/or the processor. The processor may form part of an ASIC or FPGA and preferably the interface also forms part of the ASIC or FPGA. Preferably the processor and the interface are on the same circuit board.

XAP4 Parity bit checking, in and/or out of the SIF, may be provided. Parity bit checking is provided for both xSIF and iSIF accesses.

Preferably the interface comprises a SIF, preferably the processor comprises an 8-bit, 16 bit, 32-bit, or 64-bit processor.

Preferably the processor comprises a XAP1, XAP2, XAP3, XAP4 or XAP5 processor. Preferably the control means comprises a SIF master and/or a control computer. Preferably the apparatus comprises means for debugging, or for acquiring data from, the interface and/or the processor. The processor may form part of an ASIC or FPGA and preferably the interface also forms part of the ASIC or FPGA. Preferably the processor and the interface are on the same circuit board.

xIDE Support for Multi-Processors/SIF Enables Processor Functions to be Split Across Devices To be able to debug many processors on the debug network, the SIF Computer needs to run debug software that gives it control of substantially every processor on substantially every chip in the network.

This may be done by the xIDE software running on the SIF Computer. It may download software, read and write memory and run debug functions for substantially every processor in the debug network by using the SIF debug network. In addition it may support multiple processors sharing the same memory, which is a complicated debug problem.

XAP3 In a further aspect there is provided a processor apparatus comprising a first processor, a second processor and interface means adapted to enable communication between the first processor and the second processor.

Preferably the first processor and the second processor are adapted to co-operate together via the interface means, and preferably the first processor is adapted to perform first aspects of a process and the second processor is adapted to perform second aspects of a process.

Preferably the second processor is programmable, so that the second aspects of the process may be varied. Preferably the second aspects comprise aspects relating to a user interface, and/or pricing aspects, and/or language aspects (i.e. functions that may need to be modified during product lifetime). Preferably the first aspects comprise critical functionality of the process. Preferably the first aspects comprise aspects of the process which require regulatory approval. Preferably the first aspects comprise functionality that is likely to remain fixed throughout the product lifetime.

Preferably the first processor is adapted to carry out the first aspects of the process in dependence upon instructions that may be stored in ROM (because they are likely to remain fixed). Preferably the second processor is adapted to carry out the second aspects in dependence upon instructions stored in RAM, or Flash memory, or in some other rewritable memory (because they are unlikely to remain fixed).

Preferably the interface further comprises means for instructing operation of the first processor and/or the second processor.

Preferably the first processor is part of an ASIC or FPGA. Preferably the interface comprises a SIF interference.

SIF enables silicon partitioning. Two chip solutions to separate fixed operational features from short-term marketing-driven features. This reduces the risk of affecting operation of operational features when altering marketing-driven features.

There are provided two chips, and preferably alteration of functionality of one chip does not affect functionality of the other chip.

As SIF can be used in real applications, it is easier to do partitioning of functionality between chips. Typically, critical functionality may be provided by one chip and less critical functionality (which may vary for particular products and/or for regulatory or marketing reasons).

A SIF may be used for monitoring and data logging and analysis in, for instance, production, monitoring, and analysis systems.

In one embodiment, a SIF is used in a gas meter system. An ASIC is used for front end applications. The ASIC in effect implements all of the critical functionality of the system but different products are made for the German, French, British and American markets due to the different regulatory requirements.

A separate ASIC is not produced for each market. Instead, an external microprocessor is provided which talks to the ASIC over the SIF. The microprocessor can access the ASIC in a way which is not invasive. The design is partitioned so that the critical science functionality cannot be tampered with, as it is locked in the ASIC. Whereas the external microprocessor may vary from one market to another.

In another embodiment, there is separation between features of Bluetooth functionality which have obtained regulatory approval, and features which do not require regulatory approval. A chip is provided which includes features of Bluetooth functionality which require or have obtained regulatory approval. A separate software development environment is provided which can be used (for instance by a customer) to customise features of the product, for instance, buttons and LED's. It is ensured that in customising features, the Bluetooth functionality cannot be broken, or changed in such a way that it would be needed to reapply for radio approvals.

XAP4 Preferably the first processor is part of an ASIC or FPGA. Preferably the interface comprises a SIF interface. This may be an xSIF or iSIF interface.

In a two-chip solution the second processor is an xSIF master and on a separate chip from the first processor.

In a one-chip solution the two processors are both on the same chip. In this case the second processor is an iSIF master.

Four SIF Fields (e.g. Address, Control, Data, Status)

Previous SIFs only supported 2 fields; address and data. The computer software drivers constrained these field sizes to be 1 to 32 bits. The address field was used for address and control (read/write, prog/data side, word size etc) functions. This meant that in practice the address and data buses could not be a full 32 bits. The data field was used for data and status (e.g. time-stamp) functions. This meant that in practice the data bus could not be a full 32 bits.

The SIFs described herein may use 4 fields: address, control, data, and status. All 4 fields may be parameterised to be any size from 1 to 32 bits. This means that it is able to support 32-bit processors with full 32-bit address bus & 32-bit data bus. Aspects of this new SIF system (from SIF Computer, through the SIF Pods and onto SIF Slaves containing several processors) reflect these 4 fields. e.g. the xSIF API in the SIF Computer (as used by xIDE and Matlab tools) reflects these 4 SIF fields. The field sizes are configured differently for XAP3, XAP4 or other processors.

An important point is that these 4 fields enable a SIF computer to perform substantially all SIF instructions to substantially all processors in substantially all SIF chips on the SIF network. The SIF Computer is generally a Master, it generally initiates SIF instructions. The processors in the chip (SIF Slave) are generally slaves and generally respond to the request initiated by the Master. The SIF instructions may be executed in a non-invasive manner. Even with network debug they do not generally affect the timing or functionality of the selected processor. This is essential for any system that needs to maintain a frequency plan. This is a requirement for many applications, for example the DSP functions for a radio system.

The 4 SIF fields help to identify a particular processor on the selected chip. The xSIF API helps to identify which chip the SIF Master wants to communicate with. This all helps full non-invasive network debug to be supported.

By having a long instruction word (built of the 4 fields) the SIF Master can specify exactly what it wants the SIF Slave to do in every SIF Instruction. It doesn't need to assume any state, such as 'SIF Instructions to this chip are currently going to Processor 3'. This kind of assumption is necessary for many short-word protocols. This makes it very difficult for the SIF Master because it is frequently impossible for it to make any assumptions about processor state. Consequently it has to send multiple instructions every time (& even they are not atomic—might be split by a request from a different Master) which makes the whole network much slower & sometimes cannot work at all.

XAP3 In a further aspect there is provided a processor interface apparatus comprising a register adapted to be connected to a processor and to read data from and/or write data to the processor. Preferably the register comprises a plurality of fields, preferably at least three fields, each field comprising at least one bit.

Preferably the plurality of fields comprises at least one of, and preferably all of: an address field, a control field, a data field, and a status field.

Preferably the address field comprises an address in the processor from which data is to be read or to which data is to be written, and/or the address field comprises information which identifies an operation, for instance a debug operation, to be performed by the processor.

Preferably the data field comprises data to be written to, or data which has been read from, the processor. Preferably the apparatus is adapted to write the data to the address specified in the address field. Preferably the apparatus is adapted to read the data from the address specified in the address field.

Preferably the control field comprises data relating to control of the processor and/or the register and/or a further component of the processor interface apparatus, and/or relating to control of communication between the register and the processor and/or a further component of the processor interface apparatus.

Preferably the control field comprises data relating to at least one of: error checking, parity checking, processor identification, type of operation to be carried out (for instance read or write), mode information (for instance debug mode, SIF mode), and data-size information.

Preferably the status field comprises data relating to the status of at least one of the processor, the register, and a further component of the processor interface apparatus, and/or relating to communication between at least one of the processor, the register, and a further component of the processor interface apparatus. Preferably the status field comprises data relating to the status of a process carried out by at least one of the processor, the register, and a further component of the processor interface apparatus. Preferably the status field comprises at least one of an error code a parity code and a timestamp. Preferably the contents of the status field are independent of the address.

An error code may comprise a SIF error code or a processor error code. An error code may be included in the status field.

Preferably the register comprises 88 bits. Preferably the address field comprises 32 bits. Preferably the control field comprises 8 bits. Preferably the data field comprises 32 bits. Preferably the status field comprises 16 bits. Such a configuration of the fields is typically used in the XAP3 processor.

Alternatively, the register may comprise 52 bits. In that case, preferably the address field comprises 16 bits. Preferably the control field comprises 8 bits. Preferably the data field comprises 16 bits. Preferably the status field comprises 12 bits.

Preferably the further component of the apparatus comprises at least one of a SIF Pod or SIF Master, communicating with a SIF Computer running SIF Driver software.

Preferably, the register comprises a shift register, and preferably the register forms part of a SIF Slave module. Preferably the SIF Slave module is adapted to communicate with a SIF Pod or SIF Master. Preferably the processor is a XAP3 processor.

Preferably the processor and the register are on the same circuit board and/or form part of an ASIC.

Four SIF fields may be provided. Each of the four fields may be up to 32 bits long. The four fields may be address, control, data and status fields.

The address and data fields for certain embodiments must be 32 bits in length.

Transfer of data to and from the address, control, data and status fields in the preferred embodiment is illustrated diagrammatically in FIG. 19.

An Application Programming Interface (API) is preferably provided.

The API enables a programmer to program an application which talk to SIF Slaves via SIF Pods. The application may, for instance, be written in xIDE or SIF Toolkit or Matlab. The API may be an xSIF API or a SIF API.

The SIF API has the concept of two fields (address, data), each of which can be up to 32 bits, the lengths being parameterisable. This can be used, for instance, with XAP1 and XAP2 processors. XAP1 may have a 36 bit shift register. XAP2 may have a 64 bit shift register.

The XAP3 processor requires an 88 bit shift register. This cannot be supported by the SIF API, which can only support shift registers up to 64 bits in length.

The xSIF API has the concept of four fields (address, control, data, status), each of which can be up to 32 bits, the lengths being parameterisable. The xSIF API is capable of supporting the 88-bit shift register used by the XAP3 processor.

It is preferable for the SIF and xSIF APIs to be portable across several different computer platforms and programming languages.

In alternative embodiments, two fields are provided (address & data), each of 64 bits. This can also support the 88-bit shift register used by the XAP3 processor.

In the preferred embodiment, address and data fields have to be 32 bits, and address is interpreted the same way in the SIF as in the processor.

There is provided multi-processor de-bug within a single chip whilst still only having a single SIF. The SIF may have, for instance, four or five pins.

In the preferred embodiment, the XAP3 SIF allows access to up to 8 processors on the same chip.

Preferably in the control field, there is a write bit which identifies whether a SIF instruction is a read or a write.

Preferably in the control field, there is a debug bit which identifies whether a SIF instruction is a normal instruction or a debug instruction.

The same approach may be used for XAP 2.

Preferably in the control field, there are two size bits which say whether a read or write is to use 8, 16 or 32-bit d XAP4 The sizes of each the respective four SIF fields must be the same for the xSIF and iSIF interfaces.

Preferably the register comprises 52 bits. Preferably the address field comprises 16 bits. Preferably the control field comprises 8 bits. Preferably the data field comprises 16 bits. Preferably the status field comprises 12 bits. Such a configuration of the fields is typically used in the XAP4 processor. Thus, the SIF address field is the same width as the processor address bus and the SIF data field is the same width as the processor data bus. However, the SIF control and status fields are independent of any processor bus widths. Advantageously, the SIF control field is identical in all preferred embodiments of the invention. Thus, a single SIF device may be used to debug a variety of processors on the same chip.

Preferably, the register comprises a shift register, and preferably the register forms part of a SIF Slave module. Preferably the SIF Slave module is adapted to communicate with a SIF Pod or SIF Master. Preferably the processor is a XAP4 processor.

Transfer of data to and from the address, control, data and status fields in the preferred embodiment is illustrated diagrammatically in FIG. 50.

The XAP4 processor requires a 52 bit shift register. The SIF API, can support a shift register having two fields, each up to 32 bit in length (i.e. a total of 64 bits in length), However, the XAP4 processor requires a shift register having four fields.

The xSIF API has the concept of four fields (address, control, data, status), each of which can be up to 32 bits, the lengths being parameterisable. The xSIF API is thus capable of supporting the 52-bit shift register used by the XAP4 processor.

In alternative embodiments, two fields are provided (address & data), each of 64 bits. This can also support the 52-bit shift register used by the XAP4 processor.

In the preferred embodiment, the XAP4 SIF allows access to up to 8 processors on the same chip.

Preferably in the control field, there is a write bit which identifies whether a SIF instruction is a read or a write.

Single Chip (Single SIF) Support for Multiple Processors

XAP3 Multiple processors per SIF—multi processor support, direct SIF instruction (talking direct to the SIF).

In a further aspect there is provided apparatus comprising an interface adapted to be connected to a plurality of processors, and adapted to communicate with each processor individually. Preferably the interface is also adapted to communicate with the plurality of processors together.

Preferably the interface is responsive to a processor identifier. Preferably each of the processors is responsive to at least one respective processor identifier. Preferably the apparatus is arranged to establish communication between the interface and one or more of the processors in dependence on a processor identifier. Preferably the processor identifier is included in a portion of data, and the interface is adapted to process the portion of data, and in particular to send the portion of data to, or receive the portion of data from, a particular processor or processors, in dependence upon the processor identifier. Preferably the interface is adapted to read data from or write data to a particular processor or processors in dependence upon the device identifier.

Preferably the apparatus is adapted to read the portion of data into and/or out of a register, preferably a shift register.

Preferably the interface is adapted to send a reset instruction to a particular processor or processors identified by the processor identifier. The reset instruction may be one of a plurality of reset instructions. One of the reset instructions may be such as to reset the particular processor or processors to a normal mode of operation, preferably running in the normal mode of operation. Another one of the reset instructions may be such as to reset the particular processor or processors to a debug mode of operation, preferably stopped in the debug mode of operation.

A processor identifier may identify a plurality of the processors, preferably all of the processors.

Preferably the interface comprises a SIF or SIF module, preferably each processor comprises an 8 bit, 16 bit, 32 bit, or 64 bit processor. Preferably each processor comprises a XAP1, XAP2, or XAP3 processor. Preferably each interface forms part of an interface apparatus which preferably includes means for debugging, or for acquiring data from, the interface and/or the or each processor. The processors may form part of an ASIC or FPGA and preferably the interface also forms part of the ASIC or FPGA. Preferably the processors and the interface are on the same circuit board.

In the preferred embodiment, particular bits may be allocated in every SIF instruction which identify a processor, if any, with which the instruction is concerned.

Typically one SIF per chip is provided, and multiple processors per SIF. Multiple processors per chip may be provided. The chip may comprise an ASIC or FPGA. Each SIF instruction may be directed to any one or ones of the multiple processors.

SIF Command Mode

In the preferred embodiment, there are various ways which allow a master to talk just to the SIF. There are various ways in which the master can find out about the SIF as well as or instead of about a plurality of processors associated with the SIF. For instance command mode enables information concerning the SIF to be obtained. Direct de-bug SIF instructions in normal mode also enable information concerning the SIF to be obtained.

Processor debug SIF instructions may specify one or more of the plurality of processors to which those instructions are to be sent.

By way of example, a particular chip may be connected to a computer. The computer, using a SIF master installed on or connected to the computer, may go into command mode.

In command mode, the SIF master may talk to the SIF to find out how many processors there are on the chip and what types they are. It may read various addresses and subsequently (when having left normal mode) communicate with any of the processors. It may also find out from the SIF what the lengths are of the various SIF fields. It may also obtain an ASIC identifier, if one exists which would tell it more about the chip it is connected to. Subsequently the computer may put the system into normal mode and could then, for instance, debug processor 0 while leaving processor 1 and 2 running. Processor 0 and 1 may be, say, XAP3 whereas processor 2 may be, say, XAP2. Individual processors can be reset or the whole chip can be reset Single step or run to break point operation may be set on one processor whilst another is set to run normally. All of these functions are provided in the preferred embodiment without adding any extra pins.

In a further aspect there is provided a processor interface apparatus, comprising an interface for writing data to and/or reading data from a plurality of processors, and control means for controlling operation of the interface. Using a single interface to access several processors uses fewer chip pins than having a separate interface for each processor. For example, a single SIF interface with 4 chip pins may be used to access 8 on-chip processors.

Preferably the interface further comprises means for instructing operation of each of the plurality of processors.

Preferably the plurality of processors form part of a single chip. Preferably the plurality of processors form part of an ASIC or FPGA.

Preferably the interface comprises a SIF Slave module. Preferably the control means comprises a SIF Pod and/or a control computer.

Preferably each of the plurality of processors comprises one of a XAP1 processor, a XAP2 processor and a XAP3 processor.

Single chip support for multiple processors is provided.

XAP4 Multiple processors per SIF—multi processor support, direct SIF instruction (talking direct to the SIF). Multiprocessor support is provided for xSIF and iSIF accesses.

Preferably the interface comprises a SIF or SIF module, preferably each processor comprises an 8 bit, 16 bit, 32 bit, or 64 bit processor. Preferably each processor comprises a XAP1, XAP2, XAP3, XAP4 or XAP5 processor. Preferably each interface forms part of an interface apparatus which preferably includes means for debugging, or for acquiring data from, the interface and/or the or each processor. The processors may form part of an ASIC or FPGA and preferably the interface also forms part of the ASIC or FPGA. Preferably the processors and the interface are on the same circuit board.

In command mode, the SIF master may talk to the SIF to find out how many processors there are on the chip and what types they are. It may read various addresses and subsequently (when having left normal mode) communicate with any of the processors. It may also find out from the SIF what the lengths are of the various SIF fields. It may also obtain an ASIC identifier, if one exists which would tell it more about the chip it is connected to. Subsequently the computer may put the system into normal mode and could then, for instance, debug processor 0 while leaving processor 1 and 2 running. Processor 0 and 1 may be, say, XAP4 whereas processor 2 may be, say, XAP2. Individual processors can be reset or the whole chip can be reset Single step or run to break point operation may be set on one processor whilst another is set to run normally. All of these functions are provided in the preferred embodiment without adding any extra pins.

Preferably each of the plurality of processors comprises one of a XAP1 processor, a XAP2 processor and a XAP4 processor.

Single chip support for multiple processors is provided.

Direct SIF Instructions for Reset.

The XAP3 and XAP4 hardware may have 2 asynchronous reset inputs (resetb_xap, resetb_sif). The XAP3 and XAP4 hardware may also have 4 synchronous reset outputs. These may be controlled by direct SIF instructions. If connected up correctly they can individually cause resets to occur in separate regions of the chip: reset a selected XAP (or other) processor, reset the SIF (or other) chip debug section; reset User Gates (on-chip). The hardware designer can decide what circuitry should be reset by this signal; and reset off-chip devices. This signal is an external pin if used.

This means that the central SIF Computer can accurately send specific reset signals to the desired region of every processor in substantially every chip on the debug network. This may be necessary because it is often necessary to put substantially all the SIF Slave devices into a known state and then start them together or in a known sequence in order to debug a complex network system.

The 'Reset SIF' instruction may be a direct SIF instruction that can be executed at any time. It does not generally require the SIF to be put into debug mode. Generally, there is only one SIF module per chip, so it is not necessary to specify a processor. The instruction may be accompanied by a required data value, to reduce the risk of a SIF reset being caused by accident.

The 'Reset XAP' instruction may also be a direct SIF instruction. It may require the selected XAP processor to already be in Debug mode. This is to reduce the risk of a XAP reset being caused by accident.

Also note that it may be possible to reset the XAP into a running or stopped state (both are needed for different types of system). This is achieved with the force_stop input signal and the self force_stop output signal.

XAP3 In a further aspect there is provided a processor interface apparatus, comprising a processor, an interface and means for a resetting operation of at least part of the apparatus.

Preferably the resetting means is adapted to reset at least part of the processor, at least part of the interface, at least part of at least one further processor, and/or at least part of an associated device. Each of these reset operations can be selected individually or together as a simultaneous group.

Preferably the resetting means is adapted to reset operation of the at least part of the apparatus, preferably the processor or the at least one further processor, independent of the state of operation of the processor or of the at least one further processor.

Alternatively, the resetting means is adapted to reset operation of the at least part of the apparatus, preferably the processor or the at least one further processor, only if the processor or the at least one further processor is in a specified mode, preferably in a debug mode.

Preferably the interface further comprises means for instructing operation of the processor.

Preferably the interface comprises a SIF interface comprising at least one of a SIF Slave module and a SIF Pod. Preferably the processor comprises at least one of a XAP1, XAP2, or XAP3 processor. Preferably the processor forms part of an ASIC or FPGA.

In a further aspect there is provided the following features, alone or in any appropriate combination: direct SIF debug instruction for reset; RST normal/running; RST debug mode; debug/stopped; options everything off chip; ASIC/SIF selected processor, and selected user gates.

SIF instructions are either normal SIF instructions or debug SIF instructions. Debug SIF instructions may be direct debug SIF instructions which are executed in the SIF and do not access any processor, or may be processor debug SIF instructions which refer to a selected processor.

The various reset instructions coming from the SIF may be direct SIF instructions.

Two different styles of reset may be provided, which can differentiate between going into the normal reset mode and going into the reset debug mode. Resets may be to everything, or to a chip, or to specific processors, or to the SIF.

XAP3 Reset instructions from the SIF give precise control of which bits are reset.

How things are put into and come out of reset is important as a de-bug feature.

XAP4 In a further aspect there is provided a processor interface apparatus, comprising a processor, an interface and means for a resetting operation of at least part of the apparatus.

The SIF instruction set is identical for xSIF and iSIF accesses. As such, the SIF reset instructions are identically available to xSIF and iSIF.

Preferably the interface comprises a SIF interface comprising at least one of a SIF Slave module and a SIF Pod. Preferably the processor comprises at least one of a XAP1, XAP2, XAP3, XAP4 or XAP5 processor. Preferably the processor forms part of an ASIC or FPGA.

Normal SIF instructions are shown first in the table, followed by direct debug instructions, followed by other debug instructions.

SIF instructions are either normal SIF instructions or debug SIF instructions. Debug SIF instructions may be direct debug SIF instructions which are executed in the SIF and do not access any processor, or may be processor debug SIF instructions which refer to a selected processor.

Direct SIF Instructions to Read, Preferably to Read Four Counters/SIF Status Counters and Direct SIF Instructions to Read Them There may be Direct SIF instructions to read the values on 4 debug counters. These may monitor the number of reads, writes, errors and cancels that have occurred in the SIF since it was last cancelled. This can allow the SIF Computer to verify that the number of SIF Instructions seen by the SIF Slave is the same as the SIF Computer thinks has happened. This can allow the SIF Computer to monitor data integrity on the debug network and alert the user if errors are found.

This is particularly useful in a debug network that may contain hundreds of SIF Slave devices.

XAP3 In a further aspect there is provided a processor interface apparatus, comprising a processor and an interface, the interface comprising means for reading data from and/or writing data to the processor, and the apparatus further comprising means for monitoring operation of the interface and/or operation of the processor and/or communication between the processor and the interface.

Preferably the interface further comprises means for instructing operation of the processor.

Preferably the monitoring means is adapted to monitor at least one of: the number and/or type and/or timing of data read or write operations between the interface and the processor, the number and/or type and/or timing of errors occurring in the interface, the processor or in communication between the processor and the interface; the number and/or type and/or timing of reset operations and/or cancellation operations occurring in the interface, the processor, or in communication between the interface and the processor, the quantity of data read, write or transferred; and the timing of data readings by the processor.

Preferably the interface comprises a SIF interface comprising at least one of a SIF Slave module and a SIF Pod. Preferably the processor comprises at least one of a XAP1, XAP2, or XAP3 processor. Preferably the processor forms part of an ASIC or FPGA.

In a further aspect there is provided at least one self monitoring SIP counter. The SIF itself may monitor the number of reads, writes, errors and number of cancellations, preferably using direct SIF instructions.

The SIF itself has at least one counter, and preferably four counters, which monitor SIF activity. Preferably the SIF counters monitor at least one of: the number of SIF reads since reset, the number of writes, the number of errors which have occurred and the numbers of times SIF operation has been cancelled.

This aspect is particularly useful in connection with the running of, say, a data acquisition system, particularly an overnight data acquisition system, gathering large quantities of data. It enables a user to identify if there had been any problems during the data acquisition process.

In the preferred embodiment, there are Direct SIF Instructions in the SIF Slave module to enable a SIF Computer to read the value of these 4 counters via a SIF Pod.

XAP4 Preferably the interface comprises a SIF interface comprising at least one of a SIF Slave module and a SIF Pod. Preferably the processor comprises at least one of a XAP1, XAP2, XAP3, XAP4 or XAP5 processor. Preferably the processor forms part of an ASIC or FPGA.

In the preferred embodiment, there are Direct SIF Instructions in the SIF Slave module to enable a SIF Computer to read the value of these 4 counters via a SIF Pod.

SIF Cancel Methods

When a SIF Master issues a SIF instruction to a SIF Slave, it may be that the SIF Slave is running code in normal mode that does not contain any sif or sleeps if instructions. This would mean that the SIF Slave could not generally respond to the SIF Instruction and may cause the xSIF or iSIF bus (the one used for the request) to hang. This may crash a part of the debug network. So it is necessary to detect and fix such a problem when it occurs. This is particularly important in a large network that may contain hundreds of SIF Slave devices. The SIF Computer may be able to detect any part of the network that has crashed and be able to repair it automatically.

This may be done by the SIF Master monitoring the time from the SIF request and causing a time-out if it has to wait too long. This is equally the case for an on-hip SIF Master using iSIF or an off-chip SIF Master using xSIF. Having detected the problem, the SIF Master may have a Cancel method to fix it.

For iSIF this may be achieved with the isif_cancel input signal. When the iSIF Master pulls this signal high, it may cancel the pending SIF instruction which the iSIF Master can see because the isif_done output signal will go high. For xSIF this may be done by one of several methods including: pulling SIF_CS low, SIF_CS is an optional pin, so this will not always be possible; and toggling SIF_CLK 32 times and sampling SIF_MOSI for, for example, the last 8 clocks. This may indicate what type of Cancel to occur. Such a Cancel can specify whether to cancel an xSIF instruction or an iSIF instruction or both.

Note that generally, iSIF cannot cancel an xSIF instruction, but xSIF can cancel an iSIF instruction. i.e. xSIF has priority. This means that an external debug system (xSIF Master) can generally guarantee to put the chip into a known state, despite what lockup condition it has got into. It would not be good to let the iSIF Master cancel an xSIF request. If the iSIF Master software had bugs it could crash the system and prevent the external debug system from recovering the situation and putting the chip back into a known state. That is why generally the iSIF Master cannot cancel an xSIF instruction.

XAP3 In a further aspect there is provided a processor interface apparatus comprising an interface and a processor, the interface being adapted to communicate with the processor when the processor is in a communication mode.

Preferably the processor is adapted to enter the communication mode in response to a signal from the interface. Preferably the processor is adapted to exit the communication mode in response to an indication that a communication process has been completed successfully.

Preferably the interface is adapted to communicate with the processor only when the processor is in a communication mode and the interface is in a communication mode. Preferably the interface is adapted to enter the communication mode in response to a signal from the processor that the processor is in the communication mode.

Preferably the interface and the processor are adapted to communicate using a handshake procedure.

Preferably there is provided means for making the processor and/or the interface exit the communication mode after a specified time delay, preferably a specified time delay from entry into the communication mode. Preferably the means for making the processor and/or the interface exit the communication mode is included in a control means.

Preferably the processor is adapted to exit the communication mode in response to a signal, preferably a signal from the interface, regardless of whether the communication process has been completed successfully or not.

Preferably the processor is adapted to exit the communication mode in response to the interface stopping requesting communication. Preferably the interface is adapted to stop requesting communication in response to a cancel signal from a or the control means.

Preferably the interface comprises a SIF interface comprising at least one of a SIF Slave module and a SIF Pod. Preferably the processor comprises a XAP3 processor. Preferably the processor forms part of an ASIC or FPGA. Preferably the control means comprises a SIF pod and/or a SIF computer.

In a further aspect there is provided at least one SIF cancel method.

Preferably the master/pod detects SIF lockup with a time out.

The slave may tell the master that it made an illegal request

In known handshake procedures, a master may queue up a request and a slave may be waiting to process the request but may never get an answer and thus may stay stuck low. In that case, a SIF may not be usable thereafter, and may produce an error message such as ‘SIF error’ (even though the error would not have been with the SIF).

Furthermore, if a number of devices are on the same pod, then if one of them pulls SIF_LOADB low then not only is that device stuck but the pod cannot contact any of the devices because the SIF is being shared by the devices.

Examples of when SIF_LOADB may get stuck low, in known handshake procedures, occur when an invalid request is made, for instance when: an undefined SIF instruction is given; if it is requested to write to a register which is read-only; a request is made which requires being in debug mode but the SIF is not in debug mode; or a request is made whilst a processor is running which requires the processor to be stopped or to execute a processor-sif or processor-sleeps if instruction.

The SIF Cancel Method features provide solutions to the problems outlined in the preceding three paragraphs.

Two methods for cancelling SIF operation may be provided.

In the first method, the master pulls the slave chip select pin (SIF_CS) low, causing the slave to no longer be selected and clearing any pending SIF cycles which are stuck.

In the second method, the slave automatically stops pulling the relevant pin low, regardless of actions that have taken place, after a certain number of clock cycles, for instance 32 cycles on SIF_CLK. Thus the SIF is cleared simultaneously for all the slaves.

The first method typically requires that each slave be cleared in turn. However, usually no more than one slave should be selected at any one time, so no more than one slave should be stuck at any one time in any event. The second method typically clears all slaves simultaneously.

Typically if a pod makes a request that can’t be completed by the slave because it has not received the relevant processor-sif or processor-sleepsif instructions it leaves SIF_LOADB stuck low. That tells the pod that it has requested something that it shouldn’t have done. Typically the SIF Computer detects a timeout and then issues a SIF CANCEL procedure which will clear the stuck SIF and allow SIF_LOADB to go high again.

XAP4 The means for cancelling a SIF access is available to both the xSIF and iSIF interfaces.

If an iSIF master has to wait too long for an iSIF access it performs a time-out and cancels the iSIF access with the isif_cancel signal.

If an xSIF master has to wait to long for an xSIF access it performs a time-out and cancels the xSIF access using one of the xSIF cancel methods.

The following paragraphs in this section refer in particular to methods an xSIF master may use to issue a SIF cancel.

Preferably the interface comprises a SIF interface comprising at least one of a SIF Slave module and a SIF Pod. Preferably the processor comprises a XAP4 processor. Preferably the processor forms part of an ASIC or FPGA. Preferably the control means comprises a SIF pod and/or a SIF computer.

In the second method, the slave automatically stops pulling the relevant pin low, regardless of actions that have taken place, after a certain number of clock cycles, for instance 32 cycles on SIF_CLK. Thus the SIF is cleared simultaneously for all the slaves. This method can cannel an xSIF, an iSIF or both accesses. These different types of cancels are distinguished by the SIF slave sampling SIF_MOSI for the last 8 cycles of SIF_CLK.

SIF Timestamp. Use of SIF Status Field.

A common SIF instruction is for the SIF Master to read a memory location of a specified address on a specified processor on a specified SIF Slave device. In a debug network, it may be that the response data values arrive in a different order from that in which the requests were issued. It is very useful to know whether the SIF instruction executed cleanly or with an error. If there was an error it is useful to know what type of error it was. For all responses, it is useful to know the exact time at which the SIF Slave formed its response (Data and Status fields).

The Status field may be used for error reporting and for capturing the value of any user-selected hardware register in the ASIC at the time the SIF instruction is completed (for SIF read or write). It is often useful to make this register a hardware timestamp, i.e. a counter that is clocked at some known rate. This means that when the SIF Master receives the response from the SIF instruction, that it will generally know the time at which the SIF instruction was completed in the SIF Slave.

This is very useful for data-acquisition systems. It means that the SIF Computer may reconstruct a series of data samples with the connect time interval between them. It also may expose whether there are any missing data samples (which is important when trying to characterise an analogue cell such as an ADC).

Having the Status field for the timestamp means that the Data field is left free for a full 32-bit data bus.

XAP3 In a further aspect, there is provided a processor interface apparatus comprising a register, preferably a shift register, adapted to be connected to a processor and to read data from and/or write data to the processor.

Preferably the register is adapted to include time stamp data.

Preferably the register comprises a plurality of fields, preferably at least three fields, and more preferably four fields, each field comprising at least one bit, and preferably the time stamp data is included in at least one of the fields.

Preferably the time stamp data corresponds to a portion of data, preferably to a portion of data written to or read from the register. Preferably the time stamp data indicates when the portion of data was written to or read from the register and/or written to or read from the processor. Preferably the portion of data is data from a device, preferably a sensing device, associated with the processor, and the timestamp indicates when the portion of data was recorded by the device.

Preferably the plurality of fields comprises at least one of, and preferably all of: an address field, a control field, a data field, and a status field.

Preferably the time stamp data is included in the status field. The corresponding portion of data may be included in the data field.

Preferably the register comprises 88 bits. Preferably the address field comprises 32 bits. Preferably the control field comprises 8 bits. Preferably the data field comprises 32 bits. Preferably the status field comprises 16 bits.

Preferably the further component of the apparatus comprises at least one of a SIF Pod or SIF Master together with a SIF Computer running SIF Driver software.

Preferably, the register comprises a shift register, and preferably the register forms part of a SIF Slave module. Preferably the SIF Slave module is adapted to communicate with a SIF Pod, or SIF Master. Preferably the processor is a XAP3 processor.

In a further aspect, a SIF time stamp is provided.

The status field is 16 bits in the preferred embodiment, and the top two bits used are as parity bits (PARITY_S PARITY_D). STAT is a time stamp, this is discussed in more detail below.

Processors according to the invention, and in particular XAP processors, may be used, for instance, in software debug, production tests or data acquisition. In preferred embodiments, the SIF is used to acquire data from a processor relating to each of those activities.

In the preferred embodiments, for data acquisition, the master continuously requests data from the slave. The slave attaches a time stamp to each piece of data that it sends to the master. The master can analyse the timestamps to see if it has missed any piece of data, or whether it has received two or more pieces of data from the same sampling period at the master, or whether it has received two or more pieces of data with the same timestamp.

Typically the timestamp is synchronised with a data sampling rate at the master.

Preferably in performing software de-bug, a pod controls transfer of data, and the pod does not have to respond to transactions initiated by the slave.

Preferably, the same SIF interface, with the same pins, is used for debug and for data acquisition. In the preferred embodiment, the data-transfers are always initiated by the SIF Pod and Computer, never by the SIF Slave. This means that in the preferred embodiment the SIF Slave never ‘throws’ data, even during data-acquisition. The SIF Slave in the preferred embodiment always responds to requests from the SIF Pod, whether it is being used for control or data-acquisition. This makes it much easier to create a deterministic data-transfer system. The problem is that during data-acquisition, some data samples may be acquired more than once, and other samples may be missed. The SIF timestamp is a system solution to this problem.

One example of the use of a data acquisition process is the use of an ADC (analogue to digital converter). Preferably the signal being sampled is over-sampled to ensure that no samples are missed. In characterising an ADC it is important not to miss any samples. It is also important to know whether two copies of the same data have been obtained.

A typical software loop for an ASIC processor comprises: obtaining new data; then executing the software; then issuing a processor-sleepsif instruction to enable the external SIF Pod to obtain data from the ASIC. In the processor-sleepsif window the SIF can get many reads of the same data. The SIF does not know at that time whether it is in cycle n or cycle n+1.

Preferably there is provided a hardware counter which is incremented at some known rate normally correlated to the data acquisition rate within the chip (for instance about 24 kHz).

Preferably the status field is arranged to give extra data which is independent of the address. In the case where a lot of reads are being carried out, the data is from the address requested. The status field is independent of the address requested and can be used for any ASIC register or memory at any address.

Preferably the status field is used to provide a time stamp. In the example given above, the time stamp is an indication of sample number. Accordingly, it is possible to determine whether duplicate copies of the same data have been obtained, or whether samples have been missed.

In certain embodiments, over sampling takes place, and the data obtained may be post-processed, for instance in Matlab. Duplicate copies of data may then be discarded. Accordingly one, and only one, copy of the relevant data is obtained by the post processing.

This feature is particularly useful when using PCs in a data acquisition process as PCs can occasionally miss data acquisition for periods of time, typically 2 to 3 millisecond in length. The use of a time stamp enables identification of periods where data is missing.

Thus 32 bit data can be read, together with a time stamp associated with that 32 bit data.

Considering the time stamp in more detail, shift register bit definitions for the preferred embodiment are provided.

It can be seen that the shift register bits are divided between address, control, data and status fields in the preferred embodiment, and that there are 32 address bits, 8 control bits, 32 data bits, and 16 status bits.

Transfer of data to and from the address, control, data and status fields in the preferred embodiment is illustrated diagrammatically in FIG. 19.

It can be seen that in the preferred embodiment the 8 bits of the control field are made up of three processor bits (control bits 2:0), one debug bit (control bit 3), two size bits (control bits 5:4), one parity bit (control bit 6), and one write bit (control bit 7).

It can be seen from the description of shift register bits 40 to 71 (which make up the 32 bit data field) that in the preferred embodiment the data field may be used for 8, 16, or 32 bit read and write operations.

In the preferred embodiment the status field can be used for a variety of purposes. It can be seen that two of the status bits are used as parity bits, six of the status bits are used as error bits, and eight of the status bits are used for other status purposes, which may include being used as a time stamp.

In other embodiments, bits, in particular status bits, may be used for other purposes or in different combinations. For instance, thirteen of the sixteen status bits could be used as a time stamp, or for other status purposes.

Preferably, status and control fields are broken down into individual bits, each bit having its own function either alone or in combination with other bits.

Time stamp data may be included in the data field, typically when there is no status field.

The value of the status field is preferably independent of the address field.

The time stamp frequency may be chosen to suit a particular purpose, and may be chosen on command of a user.

Preferably the time stamp is dependent on operation of the SIF and/or of the processor. It may be synchronised with a data acquisition update rate or a software loop rate.

Preferably, the time stamp comprises a count of a number of clock pulses.

Data written to the status field may comprise a software register written to by the processor, as well as or instead of time stamp data.

XAP4 Preferably the register comprises 52 bits. Preferably the address field comprises 16 bits. Preferably the control field comprises 8 bits. Preferably the data field comprises 16 bits. Preferably the status field comprises 12 bits.

The use of this timestamp in the SIF status field can be exploited by xSIF and iSIF accesses.

Preferably, the register comprises a shift register, and preferably the register forms part of a SIF Slave module. Preferably the SIF Slave module is adapted to communicate with a SIF Pod, or SIF Master. Preferably the processor is a XAP4 processor.

It can be seen that the status field is 12 bits in the preferred embodiment, and that the top two bits used are as parity bits (PARITY_S, PARITY_D). STAT is a time stamp, discussed in more detail below.

Thus 16 bit data can be read, together with a time stamp associated with that 16 bit data Considering the time stamp in more detail, shift register bit definitions for the preferred embodiment are provided.

It can be seen that the shift register bits are divided between address, control, data and status fields in the preferred embodiment, and that there are 16 address bits, 8 control bits, 16 data bits, and 12 status bits.

Transfer of data to and from the address, control, data and status fields in the preferred embodiment is illustrated diagrammatically in FIG. 50.

It can be seen from the description of shift register bits 24 to 39 (which make up the 32 bit data field) that in the preferred embodiment the data field may be used for 8, 16, or 32 bit read and write operations.

In other embodiments, bits, in particular status bits, may be used for other purposes or in different combinations. For instance, nine of the twelve status bits could be used as a time stamp, or for other status purposes.

SIF Command Mode

The SIF Computer may be connected to many SIF Slave chips via the SIF debug network. It is important that the SIF Computer is able to recognise what kind of device each SIF Slave is, for the network may be connected to many different types of SIF Slave device. Different SIF Slave devices may have different SIF shift register lengths and be connected to different numbers of internal processors, each of which needs to be identified.

SIF command mode may allow a SIF Master to automatically interrogate a SIF Slave device via xSIF. Generally, it is not necessary for iSIF as the on-chip processor types will be known at chip design time.

SIF command mode may be a standard protocol which uses substantially all the xSIF pins except SIF_LOADB. This means that the SIF commands do not generally cause a SIF instruction to be executed, which is a desirable feature. Generally, identifying what kind of device the SIF Slave is should not affect its behaviour or operation.

SIF command mode reveals to the SIF Master: the size of the 4 SIF fields (address, control, data, status); what kind of processor (if any) there is at each of the 8 on-chip processor locations from 0 to 7; the ASIC identifier.

This is enough information to allow the SIF Master to communicate with on-chip processors on substantially every SIF Slave device. The SIF Master may perform this automatically and there is not generally any need for manual configuration by the user. This is an essential feature for a debug network which may contain hundreds of SIF Slave devices.

XAP3 The SIF command mode enables plug and play. Different SIFs may be of different length: the SIF command mode may be used mainly for query functions. Use of the SIF command mode enables query functions without the need to add extra pins, without affecting normal operation and without having any ambiguity of command.

In a further aspect there is provided an interface apparatus comprising an interface, adapted to communicate with a device, for instance a processor, and a control means adapted to communicate with and/or control the interface, the interface being adapted to send data concerning itself to the control means and the control means being adapted to configure itself, or the interface, dependent upon the data.

Preferably the interface is adapted to send the data concerning itself to the control means when in a specified mode, preferably a Command mode. Preferably there is provide a command set for use in the Command mode, the command set comprising a plurality of commands. Preferably the interface is one of a plurality of interfaces, and preferably each interface is adapted to recognise a respective sub-set of the command set or all of the command set. Preferably all of the interfaces recognise a common sub-set of the command set.

By providing such features, interface interrogation functionality is provided without the need to add additional hardware, for instance additional pins, and without affecting existing modes of operation. Existing modes of operation may comprise, for instance, Normal SIF instructions, Debug SIF instructions, and SIF Cancel operations.

Preferably the data comprises at least one of a specific processor or chip identifier, or a generic interface identifier identifying the type of interface, preferably the type of SIF interface, or data representing at least one individual characteristic of at least one component of the interface, preferably a SIF interface. The at least one individual characteristic may comprise a field length, for instance an address, control, data, or status field length. Also the at least one individual characteristic may comprise information concerning the bits within a field, in particular within the control and/or status fields.

Preferably, the interface may be one of a plurality of interfaces. Preferably each interface comprises a respective shift register. Preferably each shift register comprises a plurality of fields.

Preferably, the interface is adapted to send data concerning itself in response to a request signal from the control means. Preferably the request signal comprises a specified sequence of signals. Preferably the apparatus is arranged so that the request signal may be sent from the control means to the interface over a channel which is normally used to send other signals between the control means and the interface, and the interface is adapted to recognise and respond to the request signal when sent over the channel.

Preferably the request signal comprises a specified sequence of 8, 16, 32, 64, 128, or 256 bits or other data units. Preferably the interface is adapted to enter a command mode in response to the request signal. Preferably the interface is adapted to exit the command mode in response to a further request signal, which may be the same as or different to the request signal.

Preferably the interface comprises a SIF. Preferably the control means comprises a SIF Pod and/or a control computer. Preferably the processor comprises an 8 bit, 16 bit, 32 bit or 64 bit processor. The processor may be a XAP1 processor, a XAP2 processor or a XAP3 processor. The processor may form part of an ASIC or FPGA and preferably the interface also forms part of the ASIC or FPGA. Preferably the processor and the interface are on the same circuit board. Preferably the request signal represents a command in Command mode.

SIF normally operates in Normal mode. In the preferred embodiment a Command mode is provided for interrogation purposes, in particular to ascertain characteristics of a particular SIF.

In preferred embodiments, all SIFs recognise certain common commands in Command mode, and all SIFs enter the Command mode in the same way. However, particular SIFs may not be adapted to recognise all commands in Command mode.

Different SIFs may have shift registers of different lengths.

In preferred embodiments, all SIFs recognise request commands requesting a chip identifier, or SIF type, or number or type of processors associated with the SIF, or SIF field length, or information concerning bits within a SIF field.

In preferred embodiments, in Command mode, if the SIF does not recognise a command it generates a response of 0xFF. The range of responses to any valid command in Command mode is 0x00 to 0xFE.

The Command mode enables a SIF plug and play functionality.

SIF characteristics may vary, and in particular characteristics of the SIF shift register or SIF shift register fields, in particular SIF shift register length or SIF shift register field length, may vary for different SIFs and/or for different processors with which a SIF may be associated.

For instance, for XAP1, XAP2, and XAP3 processors the SIF shift register length is typically 32 bits, 64 bits, and 88 bits respectively.

In the preferred embodiment, a command mode is provided. When the SIF is in the command mode, the master can interrogate the SIF, typically using query functions. When in the command mode, in the preferred embodiment, the SIF does not access the associated processor, the SIF is returned to normal mode when access to the associated processor by the SIF is required.

In the preferred embodiment, the command mode is entered in response to a series of 256 clocks/bits representing successive 'Hex 33333 . . . ' signals on the SIF_MOSI line.

In command mode, in the preferred embodiment, all commands are 8 bits in and 8 bits out.

When the SIF is in command mode, the master can ask various questions, for instance 'what is the address field length?' 'what is the control field length?' 'What is the data field length?' 'How many processors do you have?' 'what types of processors are they at the various places?'. There is provided an instruction set which the SIF can recognise in command mode.

Then when you either shift in an instruction of zeros or you pull chip select low or you pull SIF_LOADB low it immediately reverts to normal mode.

Thus the ability to interrogate an interface, or part of an interface, and to set up control means, so as to communicate with and/or control the interface, is provided without adding any extra pins to the SIF and in a way which does not affect normal operation. In the preferred embodiment command mode can be entered without having to pull SIF_LOADB low.

Typically, in the preferred embodiment, when a device is first plugged in, command mode is entered, the device is interrogated, the apparatus is tailored to the device if necessary, and then normal mode is entered.

XAP4 SIF command mode is in generally used for xSIF accesses.

Preferably the interface is adapted to send the data concerning itself to the control means when in a specified mode, preferably a Command mode. Preferably there is provided a command set for use in the Command mode, the command set comprising a plurality of commands. Preferably the interface is one of a plurality of interfaces, and preferably each interface is adapted to recognise a respective sub-set of the command set or all of the command set. Preferably all of the interfaces recognise a common sub-set of the command set.

Preferably the interface comprises a SIF. Preferably the control means comprises a SIF Pod and/or a control computer. Preferably the processor comprises an 8 bit, 16 bit, 32 bit or 64 bit processor. The processor may be a XAP1 processor, a XAP2 processor a XAP3 processor or a XAP4 processor. The processor may form part of an ASIC or FPGA and preferably the interface also forms part of the ASIC or FPGA. Preferably the processor and the interface are on the same circuit board. Preferably the request signal represents a command in Command mode.

For instance, for XAP1, XAP2, XAP3, XAP4 or XAP5 processors the SIF shift register length is typically 32 bits, 64 bits, 88 bits and 52 bits respectively.

In the preferred embodiment, a command mode is provided. When the SIF is in the command mode, the master can interrogate the SIF, typically using query functions. When in the command mode, in the preferred embodiment, the SIF does not access the associated processor, the SIF is returned to normal mode when access to the associated processor by the SIF is required.

Multi Processor SIF Support

According to a further aspect of the present invention, there are provided multiple processors per chip and or multiple chips.

Many modem chips contain more than one processor. It is common to have a control processor and a data processor (e.g. a DSP). Sometimes there will be more than 2 processors on a given chip. These processors may each have their own memories or may share memory. Either way, it is important that the network debug system is still able to access all the processors and their associated memories in every chip on the network. Furthermore these features should be provided in a non-invasive manner and with fast access times.

Some debug systems (e.g. JTAG) only allow a 1-dimensional daisy chain access to all the on-chip devices. This can result in very long shift registers and slow access times if there are many on-chip processors.

By contrast SIF may provide a random access, 2-dimensional access to substantially every processor and substantially every memory on the chip. This means that the network debug is provided in a fast manner via xSIF and iSIF to substantially all the on-chip devices. This is vastly superior to a 1-dimensional solution.

The default SIF module in XAP3 and XAP4 systems may support up to 8 on-chip processors in this 2-dimensional parallel manner.

Another useful feature is that the SIF Master may issue a direct SIF instruction which will cause substantially every processor in a single chip to stop when any of those processors hit a breakpoint. This is a very valuable feature when debugging multiple-processor systems. There is also the more conventional simple direct SIF instruction which causes a single processor to stop when it hits a breakpoint. Both features are needed in a network debug system.

XAP3 Multiple processors per SIF—multi processor support, direct SIF instruction (talking direct to the SIF).

In a further aspect there is provided apparatus comprising an interface adapted to be connected to a plurality of processors, and adapted to communicate with each processor individually. Preferably the interface is also adapted to communicate with the plurality of processors together.

Preferably the interface is responsive to a processor identifier. Preferably each of the processors is responsive to at least one respective processor identifier. Preferably the apparatus is arranged to establish communication between the interface and one or more of the processors in dependence on a processor identifier. Preferably the processor identifier is included in a portion of data, and the interface is adapted to process the portion of data, and in particular to send the portion of data to, or receive the portion of data from, a particular processor or processors, in dependence upon the processor identifier. Preferably the interface is adapted to read data from or write data to a particular processor or processors in dependence upon the device identifier.

Preferably the apparatus is adapted to read the portion of data into and/or out of a register, preferably a shift register.

Preferably the interface is adapted to send a reset instruction to a particular processor or processors identified by the processor identifier. The reset instruction may be one of a plurality of reset instructions. One of the reset instructions may be such as to reset the particular processor or processors to a normal mode of operation, preferably running in the normal mode of operation. Another one of the reset instructions may be such as to reset the particular processor or processors to a debug mode of operation, preferably stopped in the debug mode of operation.

A processor identifier may identify a plurality of the processors, preferably all of the processors.

Preferably the interface comprises a SIF or SIF module, preferably each processor comprises an 8 bit, 16 bit, 32 bit, or 64 bit processor. Preferably each processor comprises a XAP1, XAP2, or XAP3 processor. Preferably each interface forms part of an interface apparatus which preferably includes means for debugging, or for acquiring data from, the interface and/or the or each processor. The processors may form part of an ASIC or FPGA and preferably the interface also forms part of the ASIC or FPGA. Preferably the processors and the interface are on the same circuit board.

In the preferred embodiment, particular bits may be allocated in every SIF instruction which identify a processor, if any, with which the instruction is concerned.

Typically one SIF per chip is provided, and multiple processors per SIF. Multiple processors per chip may be provided. The chip may comprise an ASIC or FPGA. Each SIF instruction may be directed to any one or ones of the multiple processors.

In the preferred embodiment, there are various ways which allow a master to talk just to the SIF. There are various ways in which the master can find out about the SIF as well as or instead of about a plurality of processors associated with the SIF. For instance command mode enables information concerning the SIF to be obtained. Direct de-bug SIF instructions in normal mode also enable information concerning the SIF to be obtained.

Processor debug SIF instructions may specify one or more of the plurality of processors to which those instructions are to be sent.

By way of example, a particular chip may be connected to a computer. The computer, using a SIF master installed on or connected to the computer, may go into command mode.

In command mode, the SIF master may talk to the SIF to find out how many processors there are on the chip and what types they are. It may read various addresses and subsequently (when having left normal mode) communicate with any of the processors. It may also find out from the SIF what the lengths are of the various SIF fields. It may also obtain an ASIC identifier, if one exists which would tell it more about the chip it is connected to. Subsequently the computer may put the system into normal mode and could then, for instance, debug processor 0 while leaving processor 1 and 2 running. Processor 0 and 1 may be, say, XAP3 whereas processor 2 may be, say, XAP2. Individual processors can be reset or the whole chip can be reset Single step or run to break point operation may be set on one processor whilst another is set to run normally. All of these functions are provided in the preferred embodiment without adding any extra pins.

In a further aspect there is provided a processor interface apparatus, comprising an interface for writing data to and/or reading data from a plurality of processors, and control means for controlling operation of the interface. Using a single interface to access several processors uses fewer chip pins than having a separate interface for each processor. For example, a single SIF interface with 4 chip pins may be used to access 8 on-chip processors.

Preferably the interface further comprises means for instructing operation of each of the plurality of processors.

Preferably the plurality of processors form part of a single chip. Preferably the plurality of processors form part of an ASIC or FPGA.

Preferably the interface comprises a SIF Slave module. Preferably the control means comprises a SIF Pod and/or a control computer.

Preferably each of the plurality of processors comprises one of a XAP1 processor, a XAP2 processor and a XAP3 processor.

Single chip support for multiple processors is provided.

XAP4 Multiple processors per SIF—multi processor support, direct SIF instruction (talking direct to the SIF). Multiprocessor support is provided for xSIF and iSIF accesses.

Preferably the interface comprises a SIF or SIF module, preferably each processor comprises an 8 bit, 16 bit, 32 bit, or 64 bit processor. Preferably each processor comprises a XAP1, XAP2, XAP3, XAP4 or XAP5 processor. Preferably each interface forms part of an interface apparatus which preferably includes means for debugging, or for acquiring data from, the interface and/or the or each processor. The processors may form part of an ASIC or FPGA and preferably the interface also forms part of the ASIC or FPGA. Preferably the processors and the interface are on the same circuit board.

In command mode, the SIF master may talk to the SIF to find out how many processors there are on the chip and what types they are. It may read various addresses and subsequently (when having left normal mode) communicate with any of the processors. It may also find out from the SIF what the lengths are of the various SIF fields. It may also obtain an ASIC identifier, if one exists which would tell it more about the chip it is connected to. Subsequently the computer may put the system into normal mode and could then, for instance, debug processor 0 while leaving processor 1 and 2 running. Processor 0 and 1 may be, say, XAP4 whereas processor 2 may be, say, XAP2. Individual processors can be reset or the whole chip can be reset Single step or run to break point operation may be set on one processor whilst another is set to run normally. All of these functions are provided in the preferred embodiment without adding any extra pins.

Preferably each of the plurality of processors comprises one of a XAP1 processor, a XAP2 processor and a XAP4 processor.

Single chip support for multiple processors is provided.

Synchronise FIFO with SIF_LOADB or isif_load for Data Acquisition

When a SIF Master is doing data acquisition from a SIF Slave, it may be possible for the SIF Slave to control the rate of data requests. The SW Master may sit in a loop continually requesting SIF reads from the SIF Slave. The SIF Slave may only let the SIF read instruction complete when it is ready (by holding isif_done of SIF_LOADB low). This allows the SIF Slave to reduce noise and interference caused by xSIF transactions while it is making sensitive ADC readings from its analogue circuitry. This is valuable as it can increase the accuracy of the analogue readings.

One way the SIF Slave can achieve this is in software, by not executing a sif or sleepsif instruction until the ADC readings are complete.

Another way is in hardware. The SIF Slave can contain FIFO (First-In, First-Out) hardware for capturing the data samples. The FIFO can be hardware-coupled to the SIF, so that the SIF instruction is only completed when a new piece of data has arrived in the FIFO. Generally, only at this point is isif_done (for iSIF) or SIF_LOADB (for xSIF) allowed to go high. It is generally only when the xSIF MAster sees that SIF_LOADB has gone high that it will shift the SIF results out on xSIF (thus causing potential noise and interference). But at this point it doesn't matter as the analogue data sample has already been captured cleanly. This hardware method may leave the processor free to get on with other processing while the FIFO is waiting for the next data sample.

XAP3 Synchronising a FIFO with SIF_LOADB for data acquisition, without extra pins.

In a further aspect there is provided an interface apparatus comprising an interface and a processor, the processor comprising a register for temporary storage of data, and the interface being adapted to read data stored in the register.

Preferably the apparatus further comprises means for sending a signal to the interface indicating that the register has been updated, the interface being adapted to read updated data stored in the register in response to the update signal.

Preferably the apparatus further comprises control means adapted to communicate with the interface. Preferably the apparatus comprises means for sending to the control means data read from the register by the interface.

Preferably the control means is adapted to establish a communication session with the interface. Preferably the sending means is adapted to send the data from the interface to the control means during a communication session. Preferably the sending means is adapted to maintain a communication session between the control means and the interface pending updated data becoming available to be sent from the interface to the control means.

Preferably the interface comprises an interface register arranged so that data read from the register is read to the interface register. Preferably the register comprises a FIFO (first in, first out).

Preferably the interface comprises a SIF, preferably the processor comprises an 8 bit, 16 bit, 32 bit, or 64 bit processor. Preferably the processor comprises a XAP1, XAP2, or XAP3 processor. Preferably the control means comprises a SIF master and/or a control computer. Preferably the apparatus comprises means for debugging or for acquiring data from, the interface and/or the processor. The processor may form part of an ASIC or FPGA and preferably the interface also forms part of the ASIC or FPGA. Preferably the processor and the interface are on the same circuit board.

Preferably when a master issues a SIF instruction to read the FIFO address the SIF_LOADB handshake will not be completed until the FIFO has been updated with new data and then the processor executes a processor-sif instruction or a processor-sleepsif instruction.

There is provided a FIFO inside a slave. An associated SIF may read data from the FIFO.

A handshake procedure may be provided between the SIF and a master. The master may make a request and the SIF_LOADB may stay low until the new data obtained from the FIFO. The SIF would then release the new data to the master.

XAP4 xSIF accesses may synchronise a FIFO with SIF_LOADB for data acquisition, without extra pins.

iSIF accesses may synchronise a FIFO with isif_load for data acquisition.

Preferably the interface comprises a SIF, preferably the processor comprises an 8 bit, 16 bit, 32 bit, or 64 bit processor. Preferably the processor comprises a XAP1, XAP2, XAP3, XAP4 or XAP5 processor. Preferably the control means comprises a SIF master and/or a control computer. Preferably the apparatus comprises means for debugging, or for acquiring data from, the interface and/or the processor. The processor may form part of an ASIC or FPGA and preferably the interface also forms part of the ASIC or FPGA. Preferably the processor and the interface are on the same circuit board.

A handshake procedure may be provided between the SIF and an xSIF master. The xSIF master may make a request and the SIF_LOADB may stay low until the new data is obtained from the FIFO. The SIF would then release the new data to the xSIF master.

A handshake procedure may be provided between the SIF and an iSIF master. The iSIF master may make a request with isif_load and the isif_done signal may stay low until the new data is obtained from the FIFO. The SIF would then release the new data to the iSIF master.

SIF Pod Protocol and Associated Error Correction

Plays to modem interface packet protocols: high bits/s and low packets/s; i.e. favours high granularity data.

Modem communication protocols are based on packets of data. They have high bit-rate, but low packet-rate. i.e. the data packets are large. Wireline protocols such as Ethernet and USB both display this characteristic. The same also applies to wireless protocols such as WiFi (IEEE 802.11) and Bluetooth.

To take advantage of such communications channels the SIF should also be capable of high granularity data transactions. The xSIF API contains simple low granularity instructions such as: xsif_read ( ), xsif_write ( ).

However the xSIF API also contains high granularity instructions that can achieve high data throughput, such as: xsif_read_array ( ), xsif_read_block ( ), xsif_write_block ( ).

XAP3 In a further aspect there is provided apparatus comprising a control means, preferably a SIF pod, adapted to be connected to a control computer, preferably a SIF computer, and to send data to and/or receive data from the control computer, and means for performing an error checking and connection procedure on the data. Preferably the error checking procedure is based upon checking CRC codes included in the data.

Preferably the SIF pod is adapted to be connected to the control computer via an ethernet or USB or RS232 or LPT link.

XAP4 Preferably the SIF pod is adapted to be connected to the control computer via an Ethernet or USB or RS232 or LPT link.

Sleepsif and Sleepnop Instructions Enable External Debugging

This is a software method to solve the problem described herein of keeping interference and noise low while acquiring sensitive analogue signals.

Many software loops consist of: process new data samples, go to sleep, wakeup and re-start execution when there is a hardware wakeup (indicating that a new set of data samples is ready).

If the software is happy for xSIF or iSIF transactions to occur during the sleep period, it should use a sleepsif instruction. If it is not happy for xSIF or iSIF instructions to occur during the sleep period, it should use the sleepnop instruction.

The normal sif and sleepsif instructions enable iSIF or xSIF instructions to be executed.

In a further aspect, the XAP can individually enable just iSIF or just xSIF instructions by using the instructions: isif, xsif, sleepisif, and sleepxsif.

XAP3 In a further aspect there is provided an instruction for a processor adapted to communicate via an interface, the instruction when processed by the processor causing communication from the interface to the processor and/or from the processor to the interface to be stopped or not allowed, preferably for a fixed period and/or until a further instruction is processed.

In a further aspect them is provided an interface for communication with a processor, the interface being responsive to an instruction from the processor to stop communication with the processor and/or to not allow communication with the processor and/or to not allow transmission of data from the interface to the processor, preferably for a fixed period and/or until receipt of a further instruction.

A sleepsif instruction may allow external debugger access to processor registers and memory while the processor is in the low-power sleep state. A sleepnop instruction may prevent SIF accesses. These two instructions allow an application programmer to control precisely when a SIF has access to the system's resources.

Distinct sleepnop and sleepsif instructions may be provided. Control from the slave end is thus provided, enabling it to ensure that the SIF is quiet, for instance allowing the slave to take readings.

Preferably the processor has two states: a "sleeping" state and an "awake" state. In the sleeping state at least part of the operation of the processor may be suspended, for example by suspending the execution of any further instructions, which may reduce the power consumed by the processor. In the awake state, the processor may be capable of a greater degree of operation than is possible in the sleeping state: for example the processor may execute instructions that are not available in the sleeping state. Thus, the greater degree of activity permitted in the awake state results in the processor consuming more power whilst in the awake state than whilst in the sleeping state.

The sleeping state may comprise two sub-states: a sleepsif state and a sleepnop state. In the sleepsif state the processor may be capable of performing functions related to debugging, and in particular a SIF Module may be fully operable. However, in the sleepsif state, other functionality of the processor may not operable and in particular the processor may not operable to execute instructions unrelated to debugging such as those of User Mode programs.

In the sleepnop state, the processor may not be operable to execute any instructions: more particularly, neither instructions related to debugging nor instructions unrelated to debugging may be executed in the sleepnop state. Thus, in the sleepnop state, the SIF Module may be inoperable. The provision of the sleepnop state can further reduce the power consumption of the processor relative to that of the sleepsif state and the processor awake state. Additionally, by deactivating the SIF Module in the sleepnop state, electrical noise that may be produced by the SIF Module may be reduced, which may allow more accurate measurements to be made by an analogue to digital converter that is incorporated in an electrical circuit comprising the microprocessor.

Aspects of the Processor-sif Instruction and SIF Instructions/SIF Instr=all 1's or all 0's Sometimes a chip is powered up with the processor running and the memory has not been initialised. This is not a healthy design, but during hardware development it may well occur.

It is useful if the SIF Computer can execute SIF instructions even in this state to read and write memory. Generally, some Direct SIF Instructions are enabled even when there is no sif or sleepsif instruction in the processor code. However other SIF instructions may require a sif or sleepsif instruction to be executed.

In such a situation, it is quite likely that the memory will start up in an all high or all low state. For this reason, the XAP3 sif instruction has been defined to be all 1s (32-bit version) and all 0s (16 bit version). This means that the processor is likely to execute sif instructions (which is a useful state) even from uninitialised memory.

XAP3 The processor-sif (background debug interface) instruction may be all-1's in 32-bit form, and/or all-0's in 16-bit form. This allows, for example, external SIF control (from the SIF Pod) when the internal ASIC processor data bus is stuck at all-1s or all-0s.

In a further aspect there is provided a processor adapted to execute a debug instruction automatically upon the occurrence of a fault. Preferably the fault is an unintended or unforeseen mode of operation of a computer program being executed by the processor. Preferably the debug instruction is encoded by a binary word corresponding to logic levels that are likely to be found on a bus of the processor following a fault. Preferably the bus is a program memory data bus. Preferably the debug instruction is encoded by a binary word in which all bits are 1 or as a binary word in which all bits are 0.

Preferably the processor is capable of executing one or more instructions encoded as a binary word having a first length and one or more instructions encoded as a binary word having a second length, wherein the first length is greater than the second length. Preferably the processor is adapted to execute a long debug instruction encoded as a word of the first length and a short debug instruction encoded as a word of the second length. Preferably the short debug instruction is encoded by a word equal to the one's complement of the least significant bits of the long debug instruction.

In the preferred embodiment, operation of the SIF Slave module may be initiated when a dedicated processor-sif instruction is executed by the processor Core. The processor-sif instruction may be stored in program memory (typically on a flash memory device) and read into the Core via the Memory Management Unit.

In certain embodiments, when a processor-sif instruction is read by the Core, the Core completes execution of its current instruction and sends a signal to the SIF Slave module by setting the Core's "SIF" output signal to a defined logic-level. The execution of further instructions by the Core is suspended until a "CONTINUE" signal is received by the Core from the SIF Slave module (the Core "CONTINUE" input signal typically using the sane logic level as the "CONTINUE" output from the SIF Slave module). By suspending the execution of further instructions by the Core in this manner, the SIF Slave module and debugger can be permitted to have uninhibited access to registers in the Core and to the rest of the apparatus. This can also allow debug access via the SIF Slave module to be easily synchronised with software being executed on the processor.

In a preferred example of a processor which executes 32-bit instructions, the SIF instruction is encoded as 0x00000000. In another preferred example of a processor which executes. 32-bit instructions, the SIF instruction is encoded as 0xFFFFFFFF. In other words, the SIF instruction is denoted by an instruction in which all bits are zero and/or in which all bits are 1. Thus, when a SIF instruction is read from program memory into the Core, all of the 32 lines of the program memory data bus are high or all of the 32 lines of the program memory data bus are low. Such an arrangement of logic levels on the program memory data bus is also likely to occur following a fault (such as may be caused by incorrect operation of a program being executed by the Core, for example) or when no software has yet been loaded. Therefore, by encoding the SIF instruction with a binary word that is likely to be found on the program memory data bus following a fault, the processor can be caused automatically to execute a SIF instruction immediately following such a fault. This can allow operation of the SIF module to be initiated in response to the fault thereby allowing software to be debugged.

In a preferred example in which the processor is capable of executing both 16-bit an 32-bit instructions, in 16-bit instruction mode the SIF instruction is encoded as 0x0000 and in 32-bit mode as 0xFFFFFFFF.

Performance of an operation may require a processor-sif instruction. In certain circumstances, errors may result in the data bus being stuck at all 1s or all 0s.

By making the processor-sif debug instruction all 1s or all 0s, external SIF control, and debugging, is enabled when such errors occur.

SIF instructions are either normal SIF instructions or debug SIF instructions. Debug SIF instructions may be direct debug SIF instructions which are executed in the SIF and do not access any processor, or may be processor debug SIF instructions which refer to a selected processor.

The first three instructions in table 50, by way of example, are SIF normal instructions, for reading from and writing to memory. The size of the data field, whether 8 bit, 16 bit or 32 bit, is specified. In order to carry out the read or write process, a processor-sif or a processor-sleepsif instruction is first required from the processor.

Some debug instructions may be executed immediately and may not need to wait for a SIF cycle.

In the preferred embodiment, instructions for, for instance, going into debug mode; coming out of debug mode; reading status; reading version number, and reading license number, may be carried out without being in debug mode.

Once in debug mode, a wide range of actions may be performed, for instance Stop, Run, Single Step, Run to Break In the normal mode of the preferred embodiment, a SIF operation comprises three stages:—shift in stage, handshake stage and shift out stage.

In certain circumstances there may be some ambiguity, as an operation may be validly waiting for something to happen, may be operating with a time delay, or may be stuck (an error having occurred). In each case there may a significant amount of time after the shift in stage, before a handshake occurs, during which time it may not be clear whether the processor is operating normally, and the handshake will occur in due course, or whether the processor has locked up.

XAP4 The processor-sif (background debug interface) instruction may be all-1's in 32-bit form, and/or all-0's in 16-bit form. This allows, for example, external SIF control (from the SIF Pod) when the internal ASIC processor data bus is stuck at all-1s or all-0s. This may be exploited by xSIF and iSIF accesses.

As mentioned above, it can be seen that in preferred embodiments, SIF instructions are either normal SIF instructions or debug SIF instructions. Debug SIF instructions may be direct debug SIF instructions which are executed in the SIF and do not access any processor, or may be processor debug SIF instructions which refer to a selected processor.

The first two instructions in table 71, by way of example, are SIF normal instructions, for reading from and writing to memory. The size of the data field, whether 8 bit, or 6 bit, is specified. In order to carry out the read or write process, a processor-sif or a processor-sleepsif instruction is first required from the processor.

In the normal mode of the preferred embodiment, a SIF operation comprises three stages:—shift in stage, handshake stage and shift out stage.

Processor Features for High Density

XAP3 In a further aspect there is provided a processor instruction set which is not regular, but which is tailored to compiler behaviour and/or calling convention.

Preferably registers are not all treated symmetrically by instructions. The instructions may play to the coding conventions used by the compiler. In particular instruction set support for the compiler's conventions for function entry and exit can achieve significant improvement in code density.

In the preferred embodiment, certain registers are used for certain functions by the C compiler. For instance there may be certain things that may require to be done by register R5 which are not required to be done with register R6. Accordingly, there may be particular instructions for, say, R5 and not for R6.

In the preferred embodiment the first five function arguments are passed in registers R1 to R5 and subsequent function arguments are passed on the stack (ie in memory). Therefore, in the preferred embodiment there are also provided instructions which have preferential support for registers R1 to R5.

Examples of instructions which have preferential support for R1 to R5 in the preferred embodiment include:—the 16 and 32 bit forms of movm and movm.x; the 16 and 32 bit forms of pop.ret; the 16 bit forms of ldm and stm.

In the preferred embodiment the function return value is passed in register R1 Therefore, in the preferred embodiment there are also provided instructions which have preferential support for register R1.

In preferred embodiments, R14 is used as a link register. This contains the function return address.

In preferred embodiments, R15 is used as a stack pointer. This contains the base address of the stack.

All addresses, in preferred embodiments, are stored in registers as 32 bit byte addresses.

Some instructions may, in practice be used often and other instructions may be used less often. In the preferred embodiments, 16 bit codings are given to those instructions which are used often, and only 32 bit codings are given to those instructions which are used less often.

Preferably there are provided compound instructions, each compound instruction being adapted to carry out a plurality of actions. Thus fewer instruction fetches are required Examples of such compound instructions in the preferred embodiment include: movm.*; ldm.*; stm.*; push; push.r; pop; pop.ret; blkst.r; blkst.8.r and blkcps.r (where * is a wildcard character).

Preferably the processor comprises an 8 bit, 16 bit, 32 bit, or 64 bit processor. Preferably the processor comprises a XAP1, XAP2, or XAP3 processor. The processor may form part of an ASIC or FPGA and preferably the interface also forms part of the ASIC or FPGA. Preferably the processor and the interface are on the same circuit board or chip.

In a further aspect there is provided a processor having a variety of instruction sizes determined on an instruction by instruction basis.

That enables higher code density than would be achieved with a single fixed instruction size whilst still being simple for the programmer to use.

Preferably an immediate value of 0 is interpreted to represent −1. This is possible in the case where a register (in the preferred embodiment R0) represents zero. Thus code density may be further improved.

Efficient function entry and exit is essential for good code density. In the preferred embodiment, efficient function entry is provided by the push and push.r instructions.

Efficient function entry and exit is essential for good code density. In the preferred embodiment, efficient function exit is provided by the pop and pop.ret instructions.

In a further aspect uneven register visibility in instructions, for instance in 16 bit instructions is provided to optimise for code density.

XAP4 In the preferred embodiment, certain registers are used for certain functions by the C compiler. For instance there may be certain things that may require to be done by register R2 which are not required to be done with register R3. Accordingly, there may be particular instructions for, say, R2 and not for R3.

In the preferred embodiment the first three function arguments are passed in registers R0 to R2 and subsequent function arguments are passed on the stack (ie in memory). Therefore, in the preferred embodiment there are also provided instructions which have preferential support for registers R0 to R2.

Examples of instructions which have preferential support for R0 to R2 in the preferred embodiment include: pop; pop.ret; and push.

In the preferred embodiment the function return value is passed in register R0 Therefore, in the preferred embodiment there are also provided instructions which have preferential support for register R0.

Examples of such instructions which have preferential support for RD in the preferred embodiment include: pop.ret.

In preferred embodiments, R6 is used as a link register. This contains the function return address.

In preferred embodiments, R7 is used as a stack pointer. This contains the base address of the stack All addresses, in preferred embodiments, are stored in registers as 16 bit byte addresses.

Preferably there are provided compound instructions, each compound instruction being adapted to carry out a plurality of actions. Thus fewer instruction fetches are required. Examples of such compound instructions in the preferred embodiment include: push; pop; and pop.ret. Preferably the processor comprises an 8 bit, 16 bit, 32 bit, or 64 bit processor. Preferably the processor comprises a XAP1, XAP2, XAP3, XAP4 or XAP5 processor. The processor may form part of an ASIC or FPGA and preferably the interface also forms part of the ASIC or FPGA. Preferably the processor and the interface are on the same circuit board or chip.

Preferably a 3 bit field identifies whether the instruction is 16 or 32 bit. Preferably, 7 of the 3 bit values represent 16 bit instructions and the remaining $8^{th}$ value represents 32 bit instructions. This ratio may result in close to optimum code density for a 16 bit processor. This leads to 56 k 16 bit instructions and 512M 32 bit instructions.

Efficient function entry and exit is essential for good code density. In the preferred embodiment, efficient function entry is provided by the push instruction.

In another aspect, there is provided a processor which is provided without a constant zero register. In this way, compiled code density may be improved.

Preferably, the instruction includes both a read and a write form, in which case the instruction either reads data from or writes data to a memory location specified in part by the register. In a preferred embodiment (XAP4), the read instruction is in the form of a load instruction (ld.p) and the write instruction is in the form of a store instruction (st.p). In this way code density may be improved.

Preferably, both the offset and PC are interpreted as byte addresses.

These instructions are used for global data which can be variables and constants. Such instructions improve code density.

Features for Efficient Entry & Exit

XAP3 Examples of instructions which have preferential support for R1 to R5 in the preferred embodiment include:—the 16 and 32 bit forms of movm and movm.x; the 16 and 32 bit forms of pop; the 16 and 32 bit forms of pop.ret; the 16 bit forms of ldm and stm; the 16 bit forms of push and push.r.

Preferably there are provided compound instructions, each compound instruction being adapted to carry out a plurality of actions. Thus fewer instruction fetches are required. Examples of such compound instructions in the preferred embodiment include:—movm.*; ldm.*; stm.*; push; push.r; pop; and pop.ret (where * is a wildcard character).

In a further aspect there is provided an instruction for a processor, for writing each of a plurality of portions of data to a respective register. Preferably at least one of the portions of data comprises an immediate.

Preferably the instruction comprises a plurality of arguments, each argument comprising a respective one of the portions of data or a respective address (preferably a register selector).

Preferably there is associated with each portion of data a respective flag which indicates whether that portion of data should be interpreted as an address (for instance a register selector) or as an immediate.

Preferably an immediate value of 0 is interpreted to represent −1. This is possible in the case where a register (in the preferred embodiment R0) represents zero. Thus code density may be further improved.

Preferably the or each address comprises the address (preferably a register selector) where a respective portion of data is stored, and preferably the instruction, when performed, is such as to cause the portion of data stored at the or each address (preferably a register selector) to be written to a respective one of the registers. Preferably the or each address is a register address or identifier, such as a register selector. Preferably the instruction comprises a series of arguments and the instruction, when performed, is such as to cause each of the series of arguments, or a respective portion of data obtained by processing of each of the series of arguments, to be written, in order, to a respective one of a series of registers.

Preferably the processor comprises an 8 bit, 16 bit, 32 bit, or 64 bit processor. Preferably the processor comprises a XAP1, XAP2, or XAP3 processor. The processor may form part of an ASIC or FPGA.

In the preferred embodiment, the movm instruction can move up to five registers or small immediate values into R1-R5, thus replacing up to five mov instructions with a single movm instruction.

In the preferred embodiment, the order of writing to registers for movm is from R1 to R5. In contrast, the order of writing to registers for movm.x is from R5 to R1. By providing both movm and movm.x, chained copies of registers is possible from low to high registers and from high to low registers.

In a further aspect there is provided an instruction for a processor which moves each of a plurality of data elements into a respective one of a plurality of registers, the instruction comprising at least one identifier and a plurality of arguments, each argument being representative of a respective one of the plurality of data elements, the at least one identifier identifying, for each argument, the type of data of which that argument is representative. Preferably each argument, when processed, is processed in dependence upon the type of data of which it is representative. Preferably the types of data comprise register data and immediates, and each argument comprises one of a register address and an immediate value.

In the preferred embodiment, both movm source and pop.ret return value fields can be registers or immediates, encoded as a 5-bit field: one bit specifies register/immediate, the remaining four bits specifying either one of R0-R15, or an immediate value of −1, 1, . . . , 15.

In the preferred embodiment, memory is only accessed through a load, from memory to register, or a store, from register to memory, or multiples of such operations, or through push and pop instructions, which are other multi-cycle instructions associated with the stack or with the swap instruction.

In a further aspect there is provided an instruction (for instance push and push.r in the preferred embodiment) which writes multiple registers to a stack, allocates space for local (automatic) variables, and updates a stack pointer register accordingly.

In the preferred embodiment, the push instruction pushes all selected registers from R1 to R14 onto the stack. This saves many instructions at the beginning of a function for saving call-save registers on the stack. This reduces power consumption.

In the preferred embodiment, the push.r instruction pushes registers from R6 upwards, and then copies any of registers R1-R5 to matching registers from R6 onwards. This saves many instructions at the beginning of a function for saving call-save registers on the stack and copying argument registers into the upper registers. This uses even fewer memory accesses than the push instruction, thereby further reducing power consumption.

In the preferred embodiment, both the push and push.r instructions assume that R15 is the stack pointer.

Efficient function entry and exit is essential for good code density. In the preferred embodiment, efficient function entry is provided by the push and push.r instructions.

In a further aspect there is provided an instruction for a processor (for instance a pop or pop.ret instruction in the preferred embodiment) which loads at least one register from memory, via a stack pointer, removes zero or more words of automatic storage (for instance as allocated by an instruction such as a push or push.r instruction in the preferred embodiment), and updates the stack pointer.

Examples of instructions which have preferential support for R1 to R5 in the preferred embodiment include:—the 16 and 32 bit forms of movm and movm.x; the 16 and 32 bit forms of pop; the 16 and 32 bit forms of pop.ret, the 16 bit forms of ldm and stm; the 16 bit forms of push and push.r.

Examples of such instructions which have preferential support for R1 in the preferred embodiment include: the 16 and 32 bit forms of pop.ret.

Preferably there are provided compound instructions, each compound instruction being adapted to carry out a plurality of actions. Thus fewer instruction fetches are required Examples of such compound instructions in the preferred embodiment include:—movm.*; ldm.*; stm.*; push; push.r, pop; and pop.ret (where * is a wildcard character).

In the preferred embodiment, memory is only accessed through a load, from memory to register, or a store, from register to memory, or multiples of such operations, or through push and pop instructions, which are other multi-cycle instructions associated with the stack or with the swap instruction.

Preferably the instruction takes an additional argument (preferably a register or small immediate) and stores that argument in a register (for instance in R1 in the preferred embodiment), and updates condition flags as if that value was compared with 0. Preferably the instruction (for instance the pop.ret instruction in the preferred embodiment) then executes a return via another register (for instance the Link Register in the preferred embodiment). This reduces the number of instructions, thus reducing memory size and power consumption.

Efficient function entry and exit is essential for good code density. In the preferred embodiment, efficient function exit is provided by the pop and pop.ret instructions.

In the preferred embodiment, both movm source and pop.ret return value fields can be registers or immediates, encoded as a 5-bit field: one bit specifies register/immediate, the remaining four bits specifying either one of R0-R15, or an immediate value of −1, 1, . . . , 15.

In a further aspect there is provided a processor adapted to process portions of data of variable length, the processor comprising means for determining the length of a portion of data and being adapted to process the portion of data in dependence upon that determination.

In a further aspect uneven register visibility in instructions, for instance in 16 bit instructions is provided to optimise for code density.

In a further aspect there is provided a processor and associated instructions, in which registers of the processor are not all treated symmetrically by the processor instructions. Preferably the use of registers is tailored to the coding conventions used by the compiler. Certain registers are used for certain functions by the compiler.

In the preferred embodiment the design of the 16-bit instruction set has been further optimised to be even closer to the output of the compiler, for example, some 16-bit instructions allow access to R1-R4 and R6-R9, skipping R5 due to register usage behaviour of the compiler.

The preferred embodiment has been designed for code-density.

There are certain things that it may be desired to do with, say, register R5 which it is not desired to do with, say, register R6. Accordingly, in the preferred embodiment there are certain instructions for R5 and not for R6.

In a further aspect there is provided a processor instruction set which is not regular, but which is tailored to compiler behaviour and/or calling convention.

Preferably registers are not all treated symmetrically by instructions. The instructions may play to the coding conventions used by the compiler. In particular instruction set support for the compiler's conventions for function entry and exit can achieve significant improvement in code density.

In the preferred embodiment, certain registers are used for certain functions by the C compiler. For instance there may be certain things that may require to be done by register R5 which are not required to be done with register R6. Accordingly, there may be particular instructions for, say, R5 and not for R6.

In the preferred embodiment the first five function arguments are passed in registers R1 to R5 and subsequent function arguments are passed on the stack (ie in memory). Therefore, in the preferred embodiment there are also provided instructions which have preferential support for registers R1 to R5.

Examples of instructions which have preferential support for R1 to R5 in the preferred embodiment include: the 16 and 32 bit forms of movm and movm.x; the 16 and 32 bit forms of pop; the 16 and 32 bit forms of pop.ret; the 16 bit forms of ldm and stm; the 16 bit forms of push and push.r.

In the preferred embodiment the function return value is passed in register R1 Therefore, in the preferred embodiment there are also provided instructions which have preferential support for register R1.

Examples of such instructions which have preferential support for R1 in the preferred embodiment include: the 16 and 32 bit forms of pop.ret.

In preferred embodiments, R14 is used as a link register. This contains the function return address.

In preferred embodiments, R15 is used as a stack pointer. This contains the base address of the stack.

All addresses, in preferred embodiments, are stored in registers as 32 bit byte addresses.

Some instructions may, in practice be used often and other instructions may be used less often. In the preferred embodiments, 16 bit codings are given to those instructions which are used often, and only 32 bit codings are given to those instructions which are used less often.

Preferably there are provided compound instructions, each compound instruction being adapted to carry out a plurality of actions. Thus fewer instruction fetches are required. Examples of such compound instructions in the preferred embodiment include: movm.*; ldm.*; stm.*; push; push.r; pop; and pop.ret (where * is a wildcard character).

Preferably the processor comprises an 8 bit, 16 bit, 32 bit, or 64 bit processor. Preferably the processor comprises a XAP1, XAP2, or XAP3 processor. The processor may form part of an ASIC or FPGA and preferably the interface also forms part of the ASIC or FPGA. Preferably the processor and the interface are on the same circuit board or chip.

Move Multiple Instructions (movm, movm.x)

XAP3 These features are implemented in certain embodiments of the invention (such as XAP3), and not implemented in other embodiments (XAP4 or XAP5).

Preferably there are provided compound instructions, each compound instruction being adapted to carry out a plurality of actions. Thus fewer instruction fetches are required. Examples of such compound instructions in the preferred embodiment include: push; pop; and pop.ret.

XAP4 In a further aspect there is provided an instruction (for instance push in the preferred embodiment) which writes multiple registers to a stack, allocates space for local (automatic) variables, and updates a stack pointer register accordingly.

In the preferred embodiment, the push instruction pushes all selected registers from R3 to R6 onto the stack. This saves many instructions at the beginning of a function for saving call-save registers on the stack. This reduces power consumption.

In the preferred embodiment, the push instruction assumes that R7 is the stack pointer.

Efficient function entry and exit is essential for good code density. In the preferred embodiment, efficient function entry is provided by the push instruction.

Preferably the processor comprises an 8 bit, 16 bit, 32 bit, or 64 bit processor. Preferably the processor comprises a XAP1, XAP2, XAP3, XAP4 or XAP5 processor. The processor may form part of an ASIC or FPGA.

Examples of instructions which have preferential support for R0 to R2 in the preferred embodiment include:—pop; pop.ret; and push.

Examples of such instructions which have preferential support for R0 in the preferred embodiment include:—pop.ret.

Preferably there are provided compound instructions, each compound instruction being adapted to carry out a plurality of actions. Thus fewer instruction fetches are required. Examples of such compound instructions in the preferred embodiment include:—push; pop; and pop.ret.

Preferably the instruction takes an additional argument (preferably a register or small immediate) and stores that argument in a register (for instance in R0 in the preferred embodiment), and updates condition flags as if that value was compared with 0. Preferably the instruction (for instance the pop.ret instruction in the preferred embodiment) then executes a return via another register (for instance the Link Register R6 in the preferred embodiment). This reduces the number of instructions, thus reducing memory size and power consumption.

In the preferred embodiment, the design of the 16-bit instruction set has been further optimised to be even closer to the output of the compiler, for example, some 16-bit instructions allow access to R0-R6 but not to R7 due to register usage behaviour of the compiler.

There are certain things that it may be desired to do with, say, register R3 which it is not desired to do with, say, register R2. Accordingly, in the preferred embodiment there are certain instructions for R3 and not for R2.

In the preferred embodiment, certain registers are used for certain functions by the C compiler. For instance there may be certain things that may require to be done by register R2 which are not required to be done with register R3. Accordingly, there may be particular instructions for, say, R2 and not for R3.

In the preferred embodiment the first three function arguments are passed in registers R0 to R2 and subsequent function arguments are passed on the stack (ie in memory). Therefore, in the preferred embodiment there are also provided instructions which have preferential support for registers R0 to R2.

Examples of instructions which have preferential support for R0 to R2 in the preferred embodiment include:—pop; pop.ret; and push.

In the preferred embodiment the function return value is passed in register R0 Therefore, in the preferred embodiment there are also provided instructions which have preferential support for register R0.

Examples of such instructions which have preferential support for R0 in the preferred embodiment include:—pop.ret.

In preferred embodiments, R6 is used as a link register. This contains the function return address.

In preferred embodiments, R7 is used as a stack pointer. This contains the base address of the stack All addresses, in preferred embodiments, are stored in registers as 16 bit byte addresses.

Preferably there are provided compound instructions, each compound instruction being adapted to carry out a plurality of actions. Thus fewer instruction fetches are required Examples of such compound instructions in the preferred embodiment include: push; pop; and pop.ret.

Preferably the processor comprises an 8 bit, 16 bit, 32 bit, or 64 bit processor. Preferably the processor comprises a XAP1, XAP2, XAP3, XAP4 or XAP5 processor. The processor may form part of an ASIC or FPGA and preferably the interface also forms part of the ASIC or FPGA. Preferably the processor and the interface are on the same circuit board or chip.

In a further aspect there is provided a processor adapted to process portions of data of variable length, the processor comprising means for determining the length of a portion of data and being adapted to process the portion of data in dependence upon that determination.

In a further aspect uneven register visibility in instructions, for instance in 16 bit instructions is provided to optimise for code density.

In a further aspect there is provided a processor and associated instructions, in which registers of the processor are not all treated symmetrically by the pro r instructions. Preferably the use of registers is tailored to the coding conventions used by the compiler. Certain registers are used for certain functions by the compiler.

In the preferred embodiment, the design of the 16-bit instruction set has been further optimised to be even closer to the output of the compiler, for example, some 16-bit instructions allow access to R0-R6 but not to R7 due to register usage behaviour of the compiler.

The preferred embodiment has been designed for code-density.

There are certain things that it may be desired to do with, say, register R3 which it is not desired to do with, say, register R2. Accordingly, in the preferred embodiment there are certain instructions for R3 and not for R2.

Instructions May be Provided in 32 Bit or 16 Bit Forms.

XAP3 Preferably each instruction can be 16 bit or 32-bit, freely mixed on an instruction-by-instruction basis.

16-bit instruction decode may be done serially (16->32) as a decompression stage prior to full 32-bit decode.

In a further aspect there is provided a 16-bit instruction set which is a true subset of a 32-bit instruction set; each 16-bit instruction may be mapped onto a corresponding 32-bit instruction.

In a further aspect there is provided an instruction set having equivalent instructions in short and long forms. Preferably all instructions in the instruction set are available in long form and a sub-set of the instructions is available in short form. Preferably instructions which are used frequently and which can be coded in a short form are provided in a short form.

Being able to mix instructions freely on a long and short form basis means that the processor does not need to have distinct instruction length modes, which thus provides a simple programming model for the programmer.

In a further aspect there is provided a processor adapted to process portions of data of variable length, the processor comprising means for determining the length of a portion of data and being adapted to process the portion of data in dependence upon that determination.

Preferably the determining means is adapted to determine the length of a portion of data in dependence upon a length identifier, the length identifier preferably being included in or associated with the portion of data.

Preferably the processor is adapted to process a series of portions of data in turn, the determining means being adapted to determine the respective length of each portion of data in turn, and the processor being adapted to process each portion of data in dependence on the respective determined length.

Preferably the or each portion of data comprises an instruction.

Preferably the or each portion of data may comprise at least one operator and may also comprise at least one argument.

Preferably there is provided an instruction set, preferably for a processor as described herein, comprising an instruction provided in a first portion of data having a first length and an instruction provided in a second portion of data having a second length, the first length being greater than the second length. Preferably the first portion of data comprises an argument and the second portion of data comprises a further argument, the length of the argument of the first portion of data being longer than the argument of the second portion of data. Preferably the first portion of data comprises an operator and the second portion of data comprises the same operator. Preferably each of the first portion of data and the second portion of data comprises a respective length identifier identifying the length of that portion of data. Preferably the first portion of data has a length of 32 bits and the second portion has a length of 16 bits.

In a further aspect there is provided an instruction set comprising a first sub-set of instructions which are provided in both a first form and a second form, and a second sub-set of instructions which are provided in a first form. Preferably each instruction in its first form comprises a portion of data of a first length and each instruction in its second form comprises a portion of data of a second length, the first length being greater than the second length. Preferably each instruction comprises an operator and/or an argument. Preferably an or each instruction is provided in the second form or not in dependence on the length of a respective operator and/or in dependence on the length of a respective argument and/or in dependence on the likelihood that the instruction will occur in use of the instruction set. Preferably the instruction set is arranged so that commonly used instructions may be coded with arguments and/or operators that are sufficiently short that such commonly used instructions may be provided in both or either the first form and the second form. Preferably each instruction in its first form is a 32 bit instruction and each instruction in its second form is a 16 bit instruction.

Preferably the processor comprises an 8 bit, 16 bit, 32 bit, or 64 bit processor. Preferably the processor comprises a XAP1, XAP2, or XAP3 processor. The processor may form part of an ASIC or FPGA and preferably the interface also forms part of the ASIC or FPGA. Preferably the processor and the interface are on the same circuit board.

As can be seen, in the preferred embodiment there are provided both 16 bit instructions and 32 bit instructions. At least some instructions are provided in both 16 bit form and 32 bit form, depending on the length of the argument included with the instruction, such instructions generally providing identical functionality in both their 16 and 32 bit forms.

Commonly used instructions in the preferred embodiment are provided both in 16 bit and 32 bit forms (depending on the length of the argument included in the instruction).

In the preferred embodiment, processor memory includes both 32 bit instruction space and 16 bit instruction space. Typically far more 32 bit instruction space is provided than 16 bit instruction space. For instance there may by, say, 64,000 times more 32 bit instruction space than 16 bit instruction space.

In the preferred embodiment, the processor is defined by a 32 bit instruction set and a subset of that which is used frequently is coded in 16 bits. In the preferred embodiment there are around 32,000 different 16 bit instructions and around 2,000,000,000 different 32 bit instructions.

In the preferred embodiment the 32 bit instruction space overlaps the 16 bit instruction space. Instructions may be identical in their 16 bit form and 32 bit forms but they may they have different (i.e. smaller in the case of the 16 bit form) argument ranges.

Preferably the instruction set is arranged so that roughly 60 to 70% of operations carried out are from 16 bit instructions (with regard to this statement at least, an operation could be considered to be, say, adding 13 to register R5, whilst, say, adding 14 to register R5 would be considered to be a different operation).

In the preferred embodiment the compiler produces assembler code which does not indicate whether an instruction is 16 bit or 32 bit. For each piece of assembler code, the assembler then determines whether there is underlying 16 bit code, or only underlying 32 bit code, available.

Preferably there is provided a 16-32 bit converter adapted to convert 16 bit instructions to 32 bit instructions prior to execution.

As discussed, instructions have a minimum size of either 16 bits or 32 bits in the preferred embodiment. Preferably 16 bit instructions also have a 32 bit form.

Code numbers may be allocated in a way that makes the decode easier.

In the preferred embodiment, there are 6 bits in the primary op field and there are 64 primary op codes. In the preferred embodiment each primary op code can take a 25 bit argument. The 25 bit argument may be split into different fields.

In one embodiment, op codes 56 to 62 are left free. Op code 63 is an extended op code. All extended op code instructions have arguments which are less than 25 bits (arguments of 21 bits or less) in the preferred embodiment.

Preferably, some instructions are provided which have a separate prime opcode for each register (eg mov.p). This allows coding long immediates in single instructions.

XAP4 Preferably each instruction can be 16 bit or 32-bit, freely mixed on an instruction-by-instruction basis. 16 bit instructions require a single memory fetch. 32 bit instructions require a double memory fetch.

Some instructions are only available in 16 bit form. Some instructions are only available in 32 bit form. Some instructions are available in 16 and 32 bit forms.

Instruction decode is performed as soon as the full instruction is available. This will be after the first fetch for 16 bit instructions and after the second fetch for 32 bit instructions.

Preferably a 3 bit field identifies whether the instruction is 16 or 32 bit. Preferably, 7 of the 3 bit values represent 16 bit instructions and the remaining $8^{th}$ value represents 32 bit instructions. This ratio may result in close to optimum code density for a 16 bit processor. This leads to 56 k 16 bit instructions and 512 k 32 bit instructions.

In a further aspect there is provided an instruction set having equivalent instructions in short and long forms. Preferably instructions which are used frequently and which can be coded in a short form are provided in a short form.

Preferably the processor comprises an 8 bit, 16 bit, 32 bit, or 64 bit processor. Preferably the processor comprises a XAP1, XAP2, XAP3, XAP4 or XAP5 processor. The processor may form part of an ASIC or FPGA and preferably the interface also forms part of the ASIC or FPGA. Preferably the processor and the interface are on the same circuit board.

As can be seen, in the preferred embodiment there are provided both 16 bit instructions and 32 bit instructions. At least some instructions are provided in both 16 bit form and 32 bit form, depending on the length of the argument included with the instruction, such instructions generally providing identical functionality in both their 16 and 32 bit forms.

In the preferred embodiment, processor memory includes both 32 bit instruction space and 16 bit instruction space. Typically far more 32 bit instruction space is provided than 16 bit instruction space. For instance there may by, say, 8,000 times more 32 bit instruction space than 16 bit instruction space.

In the preferred embodiment, the processor is defined by a 32 bit instruction set and a subset of that which is used frequently is coded in 16 bits. In the preferred embodiment there are around 56,000 different 16 bit instructions and around 500,000,000 different 32 bit instructions.

In the preferred embodiment the 32 bit instruction space overlaps the 16 bit instruction space. Instructions may be identical in their 16 bit form and 32 bit forms but they may they have different (i.e. smaller in the case of the 16 bit form) argument ranges.

Preferably the instruction set is arranged so that roughly 80 to 90% of operations carried out are from 16 bit instructions (with regard to this statement at least, an operation could be considered to be, say, adding 13 to register R5, whilst, say, adding 14 to register R5 would be considered to be a different operation).

Code numbers may be allocated in a way that makes the decode easier.

In the preferred embodiment, there are 3 bits in the primary op field and there are 8 primary op codes. In the preferred embodiment each primary op code can take a 13 bit argument. The 13 bit argument may be split into different fields.

In one embodiment, op codes 0 to 6 are 16 bit instructions while op code 7 is for 32 bit instructions.

Little Endian/Big Endian

XAP3 In known systems, byte addresses are generally used to address memory for a range of processor sizes (for instance, 8 bit, 16 bit and 32 bit processors).

In known systems, processors include branch instructions to branch to the location of the next instruction to be executed. The address used in the branch instruction is normally the low address of the instruction being branched to (which is significant if the instruction contains more than one byte). That low address is commonly referred to as the low byte. In little endian systems the low byte represents the bottom 8 bits of the instruction (or data word). In big endian systems the low byte represents the top 8 bits of the instruction (or data word).

In a further aspect there is provided a processor having a variety of instruction sizes determined on an instruction by instruction basis.

That enables higher code density than would be achieved with a single fixed instruction size whilst still being simple for the programmer to use.

Preferably each instruction comprises at least one instruction size bit to indicate the instruction size.

Preferably the at least one instruction size bit is provided in the lowest byte, preferably in the lowest bit position, in a little endian architecture processor.

Alternatively, the at least one instruction size bit is provided in the highest byte, preferably in the highest bit position, in a big endian architecture processor.

Thus it is ensured that the at least one location size bit is always in the byte address branched to. Preferably this is the lowest byte address of the instruction.

Preferably unaligned memory access is supported. A portion of 32 bit data may have any address.

In a further aspect 32 bit instructions and/or 16 bit instructions are provided, and there is also provided a bit included in an instruction which indicates whether the instruction is a 16 bit instruction or a 32 bit instruction.

In a further aspect there is provided a method of processing data comprising a plurality of bits arranged in a series, the plurality of bits comprising at least one bit representing data of a first type and at least one bit representing data of a second type, the at least one bit representing data of a first type being provided in a selected position or range of positions in the series.

Preferably the first type data comprises argument data, preferably at least one immediate. Preferably the second type data comprises operating code. Preferably the data comprises 32 bit or 16 bit data. Preferably the first type data is provided from a particular bit upwards in series of bits. Preferably the first type data is provided from the 8$^{th}$ bit (bit 7 when counting from zero) upwards in a series of bits. Alternatively the first type data may be provided from a particular bit downwards in a series of bits (for instance if using a big endian architecture).

Preferably the first type data is processed before, and/or independently of, the second type data.

Preferably the processor comprises an 8 bit, 16 bit, 32 bit, or 64 bit processor. Preferably the processor comprises a XAP1, XAP2, or XAP3 processor. The processor may form part of an ASIC or FPGA and preferably the interface also forms part of the ASIC or FPGA. Preferably the processor and the interface are on the same circuit board.

In a further aspect there is provided a XAP3 processor adapted to run of the shelf software, for instance Gnu software, such as the Gnu C or C++ compiler, and/or adapted to communicate using TCP/IP protocol, and/or ethernet protocol and/or Bluetooth.

XAP4 In a further aspect there is provided a processor having an instruction set in which the ratio of 16 to 32 bit instructions is greater than 2:1 and less than 32:1 and preferably 7:1.

In an embodiment the data is in the form of an instruction.

Preferably the processor comprises an 8 bit, 16 bit, 32 bit, or 64 bit processor. Preferably the processor comprises a XAP1, XAP2, XAP3, XAP4 or XAP5 processor. The processor may form part of an ASIC or FPGA and preferably the interface also forms part of the ASIC or FPGA. Preferably the processor and the interface are on the same circuit board.

In a further aspect there is provided a XAP4 processor adapted to run off the shelf software, for instance GNU software, such as the GNU C or C++ compiler, and/or adapted to communicate using TCP/IP protocol, and/or ethernet protocol and/or Bluetooth Push and Push.r Instructions XAP3 In a further aspect there is provided an instruction (for instance push and push.r in the preferred embodiment) which writes multiple registers to a stack, allocates space for local (automatic) variables, and updates a stack pointer register accordingly.

In the preferred embodiment, the push instruction pushes all selected registers from R1 to R14 onto the stack. This saves many instructions at the beginning of a function for saving call-save registers on the stack. This reduces power consumption.

In the preferred embodiment, the push.r instruction pushes registers from R6 upwards, and then copies any of registers R1-R5 to matching registers from R6 onwards. This saves many instructions at the beginning of a function for saving call-save registers on the stack and copying argument registers into the upper registers. This uses even fewer memory accesses than the push instruction, thereby further reducing power consumption.

In the preferred embodiment, both the push and push.r instructions assume that R15 is the stack pointer.

Efficient function entry and exit is essential for good code density. In the preferred embodiment, efficient function entry is provided by the push and push.r instructions.

Preferably the processor comprises an 8 bit, 16 bit, 32 bit, or 64 bit processor. Preferably the processor comprises a XAP1, XAP2, or XAP3 processor. The processor may form part of an ASIC or FPGA.

XAP4 In a further aspect there is provided an instruction (for instance push in the preferred embodiment) which writes multiple registers to a stack, allocates space for local (automatic) variables, and updates a stack pointer register accordingly.

In the preferred embodiment, the push instruction pushes all selected registers from R3 to R6 onto the stack. This saves many instructions at the beginning of a function for saving call-save registers on the stack. This reduces power consumption.

In the preferred embodiment, the push instruction assumes that R7 is the stack pointer.

Efficient function entry and exit is essential for good code density. In the preferred embodiment, efficient function entry is provided by the push instruction.

Preferably the processor comprises an 8 bit, 16 bit, 32 bit, or 64 bit processor. Preferably the processor comprises a XAP1, XAP2, XAP3, XAP4 or XAP5 processor. The processor may form part of an ASIC or FPGA.

pop, pop.ret Instructions

XAP3 In a further aspect there is provided an instruction for a processor (for instance a pop or pop.ret instruction in the preferred embodiment) which loads at least one register from memory, via a stack pointer, removes zero or more words of automatic storage (for instance as allocated by an instruction such as a push or push.r instruction in the preferred embodiment), and updates the stack pointer.

Preferably the instruction takes an additional argument (preferably a register or small immediate) and stores that argument in a register (for instance in R1 in the preferred embodiment), and updates condition flags as if that value was compared with 0. Preferably the instruction (for instance the pop.ret instruction in the preferred embodiment) then executes a return via another register (for instance the Link Register in the preferred embodiment). This reduces the number of instructions, thus reducing memory size and power consumption.

Efficient function entry and exit is essential for good code density. In the preferred embodiment, efficient function exit is provided by the pop and pop.ret instructions.

XAP4

Preferably the instruction takes an additional argument (preferably a register or small immediate) and stores that argument in a register (for instance in R0 in the preferred embodiment), and updates condition flags as if that value was compared with 0. Preferably the instruction (for instance the pop.ret instruction in the preferred embodiment) then executes a return via another register (for instance the Link Register R6 in the preferred embodiment). This reduces the number of instructions, thus reducing memory size and power consumption.

Unaligned Registers Make GCC Port Easier

It is important that a 16-bit processor provides good support for 32-bit data variables. By contrast it is not so important that a 32-bit processor provides good support for 64-bit data variables (because they are seldom needed or used).

This means that it is more important for a 16-bit processor to have good support for register-pairs, than it is for a 32-bit processor. It is also important that a 16-bit processor contains instructions that directly use 32-bit values stored in register-pairs (e.g mov.32.r, mult.32s.i, div.32u.r). It is more efficient if the register-pair can be identified with one register-selector field (3 bits for an 8-register processor like the XAP4) than with 2 register selector fields (which would be 6 bits in the XAP4). This means that it is necessary to have a convention as to how the 2 registers in a register-pair are related.

A suggestion is to say that a register-pair is formed from 2 consecutive registers. e.g. R0/R1 or R4/R5. The XAP3/4/5 processors generally use little-endian memory organisation (low bits of a multi-byte word are located at the low byte address). So it is clearest if the registers are organised in the same way. The XAP3/4/5 processors generally organise registers in a little-endian manner for storing words that are too big to fit in a single register. e.g. for the 16-bit XAP4 (which contains 8 registers, R0-R7):{R3, R2}//R3=word[31:16], R2=word[15:0]; and {R1:R0}//R1=word[31:16], R0=word [15:0].

The difference of XAP4 and XAP5 processors over conventional processors is that they allow the register-pair to be unaligned as well as aligned.

If the register pairs are aligned, then the even registers are generally used for one part of the word (low bits in little-endian or high-bits in big-endian) and the odd registers are generally used for the other part of the word (high bits in little-endian or low bits in big-endian).

If the registers can be unaligned then substantially any contiguous register-pair may be used to stare a 32-bit word. The XAP4 and XAP5 support unaligned and aligned registers in a little-endian manner. The register-pair is referred to by the lower register of the pair: unaligned register-pair R1={R2, R1}//R2=word[31:16], R1=word[15:0]; and aligned register-pair R0={R1, R0}//R1=word[31:16], R0=word[15:0].

In practice we found that this was essential to get the GCC compiler to work for the XAP4 at all. GCC is really aimed at 32-bit processors with at least 16 registers. The XAP4 is a 16-bit processor with only 8 registers, so it has much harder to port GCC to it We have succeeded in this and achieved good code density because of the hardware features that we have incorporated. Support for unaligned register-pairs was essential for this.

Furthermore, the support for unaligned register-pairs means that the register allocator in the compiler has an easier job resulting in smaller code size & faster execution, because register-spills to the stack are not needed so often. For example, suppose the compiler is already using R0 and R3, but R1 and R2 are free. If it now needs to load a 32-bit variable into registers, it can do so into {R2, R1} if the processor supports unaligned registers, but otherwise it can't. If the processor only supported aligned registers it would have to push R3 onto the stack and then store the 32 bit variable in {R3, R2}. Later on it will have to pop the new stack variable back into a free register. This clearly takes more instructions, so increases code size, reduces execution speed and increases power consumption.

In addition the XAP4 and XAP5 may have 32-bit buses between the register file and the ALU. This means that the processor can access register-pair 32-bit variables in a single clock cycle. e.g. in mov.32.r you can move data from substantially any Rs (source register pair) to substantially any Rd (destination register pair) in a single clock cycle. So the hardware has been implemented to support the above register scheme (unaligned and aligned source and destination register-pairs) and to do so quickly (in a single clock cycle).

This philosophy of supporting unaligned registers can be extended further for longer words. e.g. for 64-bit words stored in 4 16-bit registers: aligned register-quad R0={R3, R2, R1, R0}, R3=word[63:48], R2=word[47:32], R1=word[31:16], R0=word[15:0]; unaligned register-quad R1={R4, R3, R2, R1}, R4=word[63:48], R3=word[47:32], R2=word[31:16], R1=word[15:0].

Generally, there is no hardware or instruction support for 64-bit data variables in XAP4 or XAP5, but the compiler does use the above convention when storing 64-bit words in registers. The fact that the 64-bit word can be stored in registers in an unaligned manner makes it much easier to port GCC and means that it is more efficient at run time, because the register-allocator has more freedom and therefore register-spills to the stack are required less frequently. This reduces code size, execution time and power consumption.

XAP3 Preferably unaligned memory access is supported. A portion of 32 bit data may have any address.

Immediates

XAP3 Preferably, some instructions are provided which have a separate prime opcode for each register (eg mov.p). This allows coding long immediates in single instructions.

Preferably, 17-bit immediates are provided, which allow both 17-bit signed (for instance −65536 . . . +65535) and unsigned (for instance 0 . . . 131069) value ranges to be encoded in a single immediate. This enables an implementation with smaller hardware and lower power consumption.

A 4n+1 (where n is an integer) format for the immediates may be provided. Preferably the arguments available in different instructions in the instruction set are of length 4n+1 (where n is an integer), for example, of length 25 bits, 21 bits, 17 bits, or 13 bits.

Preferably processor instructions sign extend or zero extend immediates to represent full word length. In the preferred embodiment, full word length is 32 bits.

Preferably reserved word features used in assembler would not be valid in C. Preferably any reference to a register or registers is prefixed by a percentage. Preferably immediates are prefixed with a hash. Preferably the assembler instructions are case sensitive. Preferably reserved words in assembler are lower case.

In a further aspect there is provided an instruction which allows a programmer to explicitly specify the value of the high bits in an immediate, and which provides that all unspecified low bits take the value of the least significant specified bit. This is effectively down-extending the least significant specified bit of the immediate.

In a further aspect there is provided an instruction for a processor, for performing an operation dependent on a first portion of data, the operation comprising setting the value or sign of a second portion of data dependent on the value of at least part of the first portion of data, or generating the second portion of data to have a value or sign dependent on the value of sign of at least part of the first portion of data.

Preferably the first portion of data is included in the instruction. Preferably the first portion of data comprise an immediate.

Preferably the operation comprises setting each bit of the second portion of data to be 0 or to be 1 or to be the same as a selected bit in the first portion of data. Preferably the selected bit is the lowest bit in the first portion of data.

Preferably the instruction may be referenced by an instruction reference, which is recognised by a processor, the instruction including a base instruction reference and an additional reference. Preferably the processor recognises the base instruction reference as being to a further instruction. Preferably the additional reference comprises a suffix to the base reference, and preferably comprises a type mnemonic, and preferably comprises .h, .i, or .r.

Preferably the processor comprises an 8 bit, 16 bit, 32 bit, or 64 bit processor. Preferably the processor comprises a XAP1, XAP2, or XAP3 processor. The processor may form part of an ASIC or FPGA.

In the preferred embodiment, the high-immediate ".h" instructions combined with the 17-bit immediate feature support the setting of the upper half of a 32-bit value to a 16-bit value together with setting the lower sixteen bits to 0 or 1. This is particularly useful in creating bit masks where the remaining bits of a 32-bit mask must be 0 or 1. ".h" instructions combine two instructions (setting the upper and lower halves of a 32-bit value) into a single instruction.

In the preferred embodiment, a single immediate instruction can be used to assign a full 32 bit immediate to a SIF where either all the top bits are all zeros or all ones or all the bottom bits are all zeros or all ones.

Thus, for example, in the case where it is only desired to do work in the top (or bottom) 16 bits, only one instruction rather than two is needed to set the other bits to an appropriate value. In the preferred embodiment, values are extended downwards.

It can be seen, for example, that instructions 32 to 37 are all .h instructions, and that instructions 38 to 46 are all .i instructions which all have the low immediate registry. In the preferred embodiment, the nomenclature used, after an index, is u for unsigned, s for signed and h for high (extending downwards).

In a further aspect there is provided an instruction for a processor which moves each of a plurality of data elements into a respective one of a plurality of registers, the instruction comprising at least one identifier and a plurality of arguments, each argument being representative of a respective one of the plurality of data elements, the at least one identifier identifying, for each argument, the type of data of which that argument is representative. Preferably each argument, when processed, is processed in dependence upon the type of data of which it is representative. Preferably the types of data comprise register data and immediates, and each argument comprises one of a register address and an immediate value.

In the preferred embodiment, both movm source and pop.ret return value fields can be registers or immediates, encoded as a 5-bit field: one bit specifies register/immediate, the remaining four bits specifying either one of R0-R15, or an immediate value of −1, 1, . . . , 15.

XAP4 Preferably, 16-bit immediates are provided, which allow both 16-bit signed (for instance −32768 . . . +32767) and unsigned (for instance 0 . . . 65535) value ranges to be encoded in a single immediate. This enables an implementation with smaller hardware and lower power consumption.

Preferably processor instructions sign extend or zero extend immediates to represent full word length. In the preferred embodiment, full word length is 16 bits.

Preferably reserved word features used in assembler would not be valid in C. Preferably any reference to a register or registers is prefixed by a percentage. Preferably immediates are prefixed with a hash. Preferably the assembler instructions are case sensitive. Preferably reserved words in assembler are lower case.

These features are implemented in certain embodiments of the invention (such as XAP3), and not implemented in other embodiments (XAP4 or XAP5).

Preferably, the encoding style for 16 bit instructions follows a 3,3,3,4,3 bit patter, with each group of bits representing a register address and or an immediate. Similarly, the encoding style for a 32 bit instruction will follow a 16,3,3,3,4,3 pattern. Thus, it is apparent that in this preferred embodiment the encoding of 16 and 32 bit instructions is largely the same, the only difference being that a 32 bit instruction has the ability to address more memory and/or to handle larger immediates.

Block Store Instructions

XAP4

In a further aspect, there is provided an instruction for a processor which executes a single and/or multiple similar sub-instructions repeatedly.

Preferably, the repeatedly executed sub-instructions are in the form of copy and/or store instructions.

Preferably, the instruction is interruptible. More preferably, on interrupt, a current sub-instruction is completed before processing the interrupt routine. The benefits of making such instructions interruptible is that interrupt latency ins reduced. Some instructions are not interruptible so that behaviour is always atomic and deterministic.

In particular, the instructions blkcp.r, blkcps.r, blkst.r and blkst8.r are provided.

Mov.p and Mov.g Instructions

XAP3 Preferably, some instructions are provided which have a separate prime opcode for each register (eg mov.p). This allows coding long immediates in single instructions.

In the preferred embodiment the PC relative instruction is mov.p. Other PC relative instructions include bra.p and bsr.p and all conditional branch instructions.

In the preferred embodiment the GP relative instruction is mov.g.

XAP4 In the preferred embodiment the instruction mnemonics are of the form base.parameters.type.size. All mnemonics include base. Parameters, type and size are optional but where they exist they are in the order base.parameters.type.size. Examples of such instruction mnemonics include: add.i, add.r, add.c.r, cmp.c.r, cmp.8c.r, cmp.16xc.r, or.i, or.h, or.r, bra.a, bra.a.4, bra.a.2, bra.p, mov.i, mov.r, mov.32.r, mov.p, ld.i, ld.8zp, ld.r, st.8.i, stz.r.

In the preferred embodiment the PC relative instructions include mov.p. Other PC relative instructions include ld.p, st.p, and stz.p, bra.p and bsr.p, and all conditional branch instructions.

mult.sh.r Instruction

Allows multiply result to be normalised as required for known data range. This allows the input & output registers to be the same size (16-bit in XAP4, 32-bit in XAP3).

Normally, a register multiply results in a register-pair result. This is unwieldy as there are fewer instructions that operate on a register-pair than on a single register. For example: XAP4—16*16 multiply produces a 32-bit result (=register-pair); or XAP3—32*32 multiply produces a 64-bit result (=register-pair).

Frequently the user needs to perform more arithmetic on the multiply result (e.g. DSP systems), but doesn't need so much resolution Consequently he uses a register-pair shift right to normalise the result before performing further arithmetic on it. This is slow and means that 2 registers have been used for Rd, when one would have done.

The mult.sh.r instruction solves this problem. The single instruction performs the multiply and shifts right by the specified amount (instruction parameter with 1-bit resolution), so that the result can be directly stored in a single register. This is fast, reduces the number of registers corrupted and increases code density.

It is a very valuable instruction for DSP systems. It means that normalisation can be done with integer arithmetic, avoiding the need to move to fractional arithmetic.

Breakpoint Features

XAP3 Processor code may have debug registers with a count conditional to trigger a breakpoint after some numbers of executions of the target instructions. This simplifies debugging of say, loops. This is in addition to being able to trigger on address, data or a mask value.

As this is part of the core, and not an external module, it facilitates common debug environment both for development and in-field debugging. Especially for debugging user mode code by an operating system.

There may be provided hardware breakpoint registers in the processor core which support software-implemented multi-stage breakpoint. The breakpoint registers may use in-core debug registers, and/or a debug module within OS, and/or a textual or graphical interface to specify the breakpoint state.

There is provided a SIF-Ethernet pod that allows for remote debugging of applications over the internet.

In a further aspect there is provided a processor core having a debugging means.

Preferably the debugging means is integral with the core. Preferably the debugging means is fully contained within the core.

A further aspect provides a debugging means. A yet further aspect provides a debugging means for a processor core.

Preferably the core is adapted to execute a computer program. Preferably the debugging means is adapted to facilitate the debugging of a computer program. For example, the debugging means may trigger a predetermined instruction (or sequence of instructions) upon the occurrence of one or more specified events in the program to be debugged, thereby enabling the operation of the computer program to be monitored by a programmer or engineer.

Preferably the debugging means is adapted to enable the execution of a debug processing step. For example, execution of the debug processing step may include the execution of one or more instructions, subroutines and/or computer programs.

Preferably the debugging means includes a breakpoint address register. Preferably the breakpoint register is adapted to reference (or to store information relating to) the address of a memory location. Preferably the breakpoint register is adapted to reference a memory location external to the processor core.

Preferably the debugging means is adapted to enable the execution of the debug processing step when predetermined processing is performed in relation to the address referenced by the breakpoint address register.

Preferably the predetermined processing includes one or more of: the address referenced by the breakpoint address register being accessed a predetermined number of times; a predetermined data value (or a range of predetermined data values) being read from and/or written to the address referenced by the breakpoint address register.

Preferably the debugging means is adapted to enable the execution of the debug processing step when the address referenced by the breakpoint address register has been accessed a predetermined number of times.

Preferably the debugging means is adapted to enable the execution of the debug processing step when the address referenced by the breakpoint address register has been accessed a predetermined number of times by a selected access mode. Preferably the access mode is selectable from the following: write (relating to the writing of data to memory); read (relating to the reading of data from memory); or fetch (relating to the reading of an instruction from memory).

Preferably the debugging means comprises a breakpoint control register for storing information relating to the selected access mode.

Preferably the debugging means comprises a count register for storing information relating to the number of times that the address referenced by the breakpoint address register has been accessed.

Preferably the debugging means is adapted to enable the execution of the debug processing step when a predetermined data value (or a range of predetermined data values) is read from and/or written to the address referenced by the breakpoint address register.

Preferably the debug processing step is selectable from a plurality of such debug processing steps.

Preferably the debug processing steps include one or more of the following: generating an exception, halting the processor.

Preferably the processor comprises a break enable flag for storing information relating to the selected debug processing step.

Preferably the core comprises a plurality of operating modes. Preferably the operating modes are selectable.

Preferably each of the operating modes has a respective privilege level. For example, the core may have one or more of the following operating modes: a privileged Supervisor Mode; a privileged Interrupt Mode; a privileged NMI (non-maskable interrupt) mode; and an unprivileged User Mode.

Preferably the debugging means comprises a register that is not accessible by a program operating in an unprivileged operating mode. Preferably the debugging means comprises a register to which data cannot be written by a program operating in an unprivileged operating mode. Preferably the debugging means comprises a register from which data cannot be read by a program operating in an unprivileged operating mode.

A software debugger may be used to debug a program being executed on a processor that does not comprise a hardware debugger, or that comprises a hardware debugger without this functionality. In the case of a software debugger, the registers and/or flags described herein may be implemented in software as variables.

Certain features of the preferred embodiment, and of possible alternative embodiments are now described in more detail, purely by way of example.

In the preferred embodiment, the processor executes a sequence of instructions comprising one or more programs. Such programs require testing, inspection and verification during development, and testing and correction when the product is in use The use of multiple processing units in a single system, or even a single integrated circuit, requires the support of an integrated and uniform debug and verification system to make it feasible to develop reliable and robust software within acceptable timescales.

In many applications of the processor the program is held in memory which is difficult or impossible to change once the product has been assembled.

A means is described in which the processor core itself can stop and examine the state of one or more programs currently executing on the processor. The invention is part of the core of the processor, and as such is present in all variations of the processor core. This facilitates a debug infrastructure (debug software, external debug interface, remote debug software, communication protocols, etc) common to all instances of the processor. This reduces development costs through design re-use, and easily supports the debugging of multi-processor designs through a common debug interface shared among the processor cores.

A processor includes a set of registers (the processor interface) and supporting hardware gates (the implementation).

Certain registers, known as breakpoint registers, can contain information relating to breakpoints. A breakpoint is a point of execution of a program that is characterised by either the address of an instruction in the program (or one program of several), or the address of a location in memory at which the program may access. Upon encountering a breakpoint execution may stop and control of the processor be taken by other software (e.g. operating system, debug executive, external debugger, etc).

These breakpoints may additionally be qualified by either or both of two predicates (conditions): a count of the number of times the instruction may execute, or memory be accessed, before causing a break; a predetermined data value (or one or more ranges of predetermined data values) transferred to or from memory external to the processor core.

In the preferred embodiment, the processor comprises a debug system supporting eight breakpoints, four of which are further qualified with a count predicate, and in which two of these count-qualified breakpoints are yet further qualified by data predicates.

In the preferred embodiment sixteen breakpoint registers and a breakpoint control register to describe the behaviour of eight breakpoint are provided. The sixteen breakpoint registers are named BRK0 through BRK7, BRKCOUNT4 through BRKCOUNT7, BRK6DATA, BRK6MASK, BRK7DATA and BRK7MASK. The breakpoint control register is named BRKE. A single bit in the processor's FLAGS register specifies if breakpoints should occur or be ignored.

The breakpoint address registers, BRK0 through BRK7, respectively describe a 32-bit wide address for each of the eight breakpoints. These addresses can either be the address of an instruction or the address of a unique memory element external to the processor core.

The count registers, BRKCOUNT4 through BRKCOUNT7, respectively describe a 32-bit wide count predicate corresponding to breakpoints 4 through 7 (as specified in the registers BRK4 through BRK7). A break occurs if an address match happens (that is, the address specified in a breakpoint address register matches the address to/from which an instruction or data is to be read, written or stored) and if the value of the count register corresponding to that breakpoint address register is zero. If an address match occurs, but the value of the corresponding count register is not zero, the value of the count register is decremented by one and no break occurs. The count register preferably cannot be decremented below zero: once it reaches zero, it remains at zero until a new value is written to it.

The default value of the count registers is zero, such that normal behaviour is the sane as for the first four breakpoints. That is, when the value in a count register is zero, the corresponding breakpoint behaves like a simple breakpoint.

The BRK6DATA and BRK6MASK registers further specify a data qualifier on the corresponding breakpoint as specified in register BRK6. These registers operate such that a break occurs when a data value read from (or written to) memory at the location specified in register BRK6 satisfies the data qualifier. It will be appreciated that the "data value" can preferably be either an instruction or data. The data qualifier is specified for each of the 32 bits in the data value. For each bit the qualifier is satisfied if either: the corresponding bit in the mask register, BRK6MASK, is a '1' and the corresponding bit in the data register, BRK6DATA, matches (that is, is equal to) the corresponding bit in the data value; or the corresponding bit in the mask register is '0'.

Thus, by setting a bit in the mask register to '1', the occurrence of a break is conditional upon the bit of the data value that corresponds to that bit of the mask register being equal to the corresponding bit of the data register. Alternatively, by setting a bit in the mask register to '0', a "don't care" condition is selected, and the occurrence of a break is not conditional upon the value of the corresponding bit of the data value.

The BRK7DATA and BRK7MASK registers operate similarly to the BRK6DATA and BRK6MASK registers, but in respect of the breakpoint specified in register BRK7.

Thus, a break can be caused when a predetermined data value is read from and/or written to a predetermined location in memory. By setting a plurality of bits of the mask register to '0', a break can be caused when a data value belonging to a set of predetermined data values is read from and/or written to memory. For particular values of the mask register, the set of predetermined data values can include one or more ranges of consecutive values.

The default value of the mask and data registers is zero, such that normal behaviour is the same as for the first six breakpoints. That is, when a mask register is set to zero, the corresponding breakpoint behaves like a simple breakpoint, since all bits of the mask register treated as “don’t cares” and the breakpoint will occur irrespective of the data value being read from and/or written to memory.

The breakpoint control register BRKE is a 32-bit wide register. It is split into eight 4 bit wide fields, where each field corresponds to one of the eight breakpoints.

Each field has three control bits and one unused bit; the fourth bit is left for future debug facilities, for example. The three control bits specify whether a breakpoint should occur if an instruction writes to the address matching the corresponding breakpoint address; if an instruction reads from the address matching the corresponding breakpoint address; if an instruction has been fetched for execution from the address matching the corresponding breakpoint address.

Finally, there is a breakpoint enable bit in the FLAGS register. If this bit is set and the processor is in the lowest privileged execution mode then breakpoints will cause an exception to occur to allow the debug software to take control of the processor and monitor and/or modify the state of the program or programs. Thus, by setting the breakpoint enable bit, an exception is generated rather than halting the processor.

XAP4 Preferably the predetermined processing includes one or more of: the address referenced by the breakpoint address register being accessed a predetermined number of times; a predetermined data value (or a range of predetermined data values) being read from and/or written to the address referenced by the breakpoint address register, enable bits for breaks to occur when the specified address is the instruction and/or a data read and/or a data write.

These breakpoints may additionally be qualified by either or both of two predicates (conditions): a count of the number of times the instruction may execute, or memory be accessed, before causing a break; a predetermined data value (or one or more ranges of predetermined data values) transferred to or from memory external to the processor core.

In the preferred embodiment eight breakpoint registers and a breakpoint control register to describe the behaviour of four breakpoints are provided. The eight breakpoint registers are named BRK0 through BRK3, BRK2COUNT through BRK3COUNT, BRK3DATA, and BRK3MASK. The breakpoint control register is named BRKE. A single bit in the processor’s FLAGS register specifies if breakpoints should occur or be ignored.

The breakpoint address registers, BRK0 through BRK3, respectively describe a 16-bit wide address for each of the four breakpoints. These addresses can either be the address of an instruction or the address of a unique memory element external to the processor core.

The count registers, BRK2COUNT through BRK3COUNT, respectively describe a 16-bit wide count predicate corresponding to breakpoints 2 through 3 (as specified in the registers BRK2 through BRK3). A break occurs if an address match happens (that is, the address specified in a breakpoint address register matches the address to/from which an instruction or data is to be read, written or stored) and if the value of the count register corresponding to that breakpoint address register is zero. If an address match occurs, but the value of the corresponding count register is not zero, the value of the count register is decremented by one and no break occurs. The count register preferably cannot be decremented below zero: once it reaches zero, it remains at zero until a new value is written to it.

The BRK2DATA and BRK2MASK registers further specify a data qualifier on the corresponding breakpoint, as specified in register BRK2. These registers operate such that a break occurs when a data value read from (or written to) memory at the location specified in register BRK2 satisfies the data qualifier. It will be appreciated that the “data value” can preferably be either an instruction or data. The data qualifier is specified for each of the 16 bits in the data value. For each bit, the qualifier is satisfied if either the corresponding bit in the mask register, BRK2MASK, is a ‘1’ and the corresponding bit in the data register, BRK2DATA, matches (that is, is equal to) the corresponding bit in the data value; or the corresponding bit in the mask register is ‘0’.

The BRK3DATA and BRK3MASK registers operate similarly to the BRK2DATA and BRK2MASK registers, but in respect of the breakpoint specified in register BRK3.

The breakpoint control register BRKE is a 16 bit wide register. It is split into four 4-bit wide fields, where each field corresponds to one of the four breakpoints.

Each field has three control bits and one unused bit; the fourth bit is left for future debug facilities, for example. The three control bits specify whether a breakpoint should occur if an instruction writes to the address matching the corresponding breakpoint address; if an instruction reads from the address matching the corresponding breakpoint address; if an instruction has been fetched for execution from the address matching the corresponding breakpoint address.

In summary, the invention relates to at least some of the following aspects which may be combined with one another in any appropriate combination: Processor Features for High Code Density, in particular, features for efficient function entry and exit; variable length instructions; unaligned registers; immediates; block store instructions; mov.p and mov.g instructions, as well as the mult.sh.r instruction and breakpoint features.

Generally herein, the invention extends to methods and/or apparatus substantially as herein described with reference to the accompanying drawings.

Any feature in one aspect of the invention may be applied to other aspects of the invention, in any appropriate combination. In particular, method aspects may be applied to apparatus aspects, and vice versa.

The invention also provides a computer program and a computer program product for carrying out any of the methods described herein and/or for embodying any of the apparatus features described herein, and a computer readable medium having stored thereon a program for carrying out any of the methods described herein and/or for embodying any of the apparatus features described herein.

The invention also provides a signal embodying a computer program for carrying out any of the methods described herein and/or for embodying any of the apparatus features described herein, a method of transmitting such a signal, and a computer product having an operating system which supports a computer program for carrying out any of the methods described herein and/or for embodying any of the apparatus features described herein.

Furthermore, features implemented in hardware may generally be implemented in software, and vice versa Any reference to software and hardware features herein should be construed accordingly.

It will be understood that the present invention is described below purely by way of example, and modification of detail can be made within the scope of the invention.

Each feature disclosed in the description, and (where appropriate) the drawings may be provided independently or in any appropriate combination.

The present invention will now be described, purely by way of example, with reference to the accompanying figures, in which:—

FIG. 43 shows the XAP3—16-bit Instructions;

FIG. 44 shows the XAP3—32-bit Instructions;

FIG. 73 shows the XAP4—16-bit Instructions;

FIG. 74 shows the XAP4—32-bit Instructions;

FIG. 75 shows a further embodiment of the XAP4—32-bit instructions;

DETAILED DESCRIPTION OF THE ILLUSTRATED EMBODIMENTS

Introduction

Figure 1:
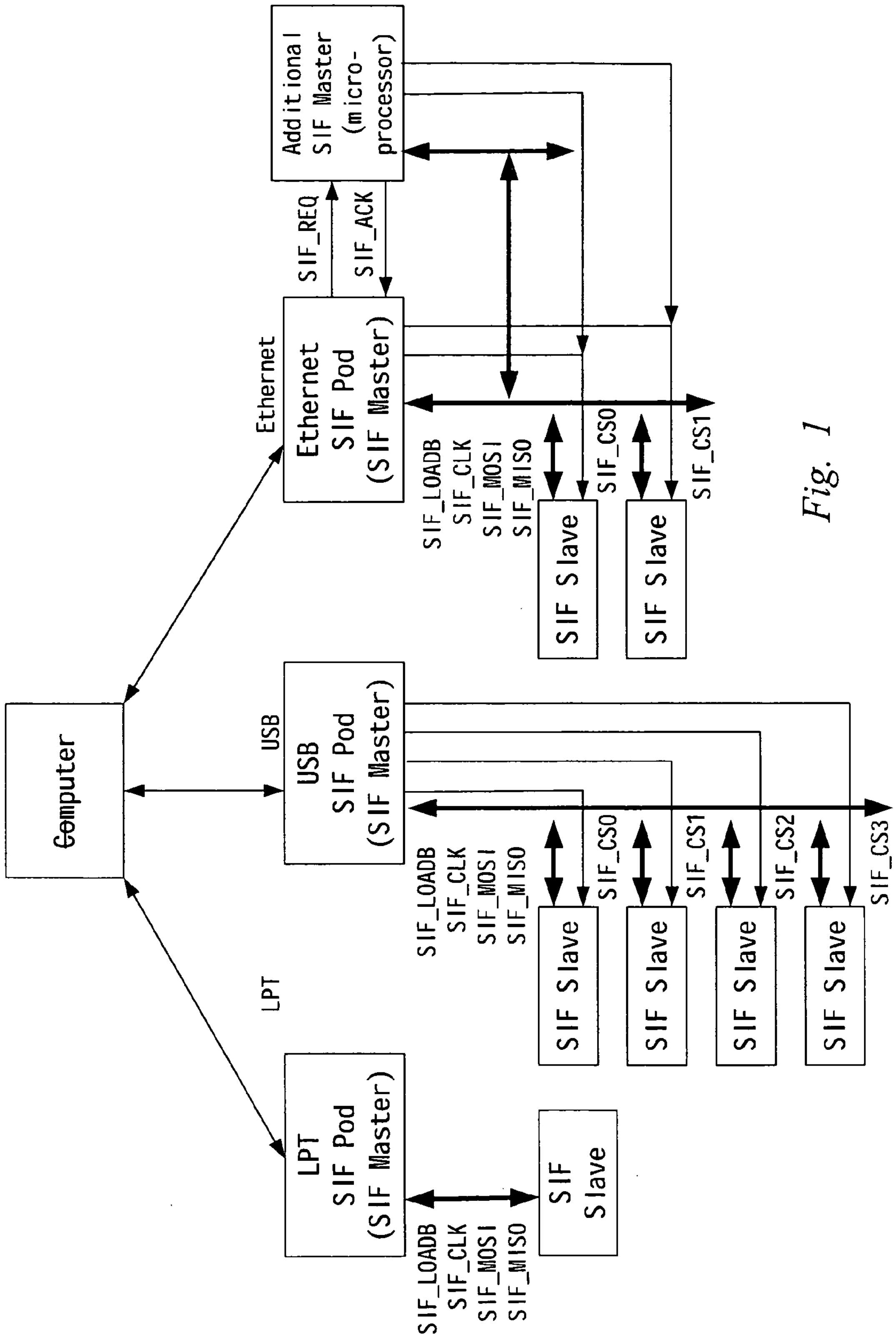
FIG. 1 shows how a computer can read or write data to any of the SIF Slaves.

There are three main embodiments to the present invention; each will be described separately herein. The three embodiments will be known respectively as:—

SIF Network Debug Interface (SIF)

XAP3 32-bit ASIC Processor (XAP3)

XAP4 16-bit ASIC Processor (XAP4)

The first section provides a generic description of the first embodiment; the SIF network debug interface. This is independent of any particular implementation of SIF. It describes the way SIF is used for a whole network and the details of how it is used in a SIF Computer a SIF Pod and in a SIF Chip and the interfaces between them. Inside the chip it describes the xSIF (external serial interface) and the iSIF (internal parallel interface). It describes how a single SIF module in a chip supports multiple processors in that chip.

The second section provides a description of the second embodiment; the XAP3 32-bit processor. It contains sections on the XAP3 Programmer's Model and the specific implementation of SIF used in a chip containing XAP3. The programmer's model, instruction set and compile chain for the XAP3 have been developed together to give very high code density. The XAP3 has 16 32-bit registers. The XAP3 processor supports up to 4 GB of memory. The XAP3 compile chain is GCC or NCC (compilers) and binutils (assembler and linker).

The final section of the description provides a description of the third embodiment; the XAP4 16-bit processor. It contains sections on the XAP4 Programmer's Model and the specific implementation of SIF used in a chip containing XAP4. The programmer's model, instruction set and compile chain for the XAP4 have been developed together to give very high code density. The XAP4 has 8 16-bit registers. The XAP4 processor supports up to 64 kB of memory. The XAP4 compile chain is GCC (compiler) and binutils (assembler and linker). Various aspects of XAP4 have been designed to ease the port of GCC to this small processor.

In addition reference is made to UK Patent Application Numbers 2382889 and 2294137 B whose content is herein incorporated by reference.

SIF Network Debug Interface

The following will provide a description of the first embodiment, SIF.

SIF is a non-invasive, real time, synchronous interface. SIF is used to debug and test ASICs, ASSP, SoC or FPGA.

The SIF Slave is typically an ASIC or FPGA or Integrated Circuit (IC) or chip. Each chip contains one SIF module which can communicate to one or more processors on the chip. The SIF module contains an xSIF interface (external serial) and an iSIF interface (internal parallel). The following sections sometimes refer simply to the SIF interface in the Slave. This normally refers to the xSIF serial interlace. However, the functions supported by the xSIF and iSIF interfaces are identical (memory read/write, register read/write, debug control instructions . . . ).

xSIF was developed first, iSIF was added later. The addition of iSIF functionality to xSIF has added very little hardware (silicon gates) because all the instruction decodes are identical for xSIF and iSIF. The difference is that xSIF instructions are loaded serially, whereas iSIF instructions are loaded in parallel, as described in further detail herein.

The SIF Master is typically a PC, Silicon Tester or Microprocessor. The SIF Master can read or write any memory-mapped address inside the SIF Slave in real time, without affecting the timing or functionality of the SIF Slave. This enables the SIF Master to setup and configure the SIF Slave and to do data-acquisition from it. The SIF Master can also develop and debug embedded software for the SIF Slave (debug functions include start, stop, run to breakpoint etc).

The standard SIF Slave interface has 4 pins; SIF_CLK, SIF_MOSI, SIF_MISO, SIF_LOADB. The first 3 pins are unidirectional signals to a shift register (which can be of different lengths for different circuits). SIF_LOADB is a bi-directional pin for hand-shaking. This interface will support a single-master, single-slave network. The addition of a $5^{th}$ pin, SIF_CS to the SIF Slave enables single-master, multi-slave networks. The addition of the SIF_REQ, SIF_ACK pins to the SIF Master enables multi-master, multi-slave networks.

SIF Applications

The following sections describe typical ways in which the SIF is used, throughout the life of an ASIC or FPGA. The FPGA could be the final product or an emulator for an ASIC before tape-out Software Debug SIF Slave ASICs normally contain one or more microprocessors (e.g. XAP1, XAP2, XAP3 or other). The SIF provides a debug interface for code development on these microprocessors and is used for functions such as:—

- Code download
- Memory read and write
- Debug functions (start, stop, set breakpoint, run to breakpoint, . . . )

Hardware Setup and Data Acquisition

The hardware in an ASIC can often be configured by software to have alternative functional behaviours. The configuration is set by writing the required values to specific addresses. This can be done by the on-chip processor, or by an external SIF Master using the SIF interface.

It is often useful to transfer data generated in an ASIC to a computer for detailed analysis. For example it is useful to analyse an ADC output stream in Matlab. The SIF enables such data acquisition to be done at high speed (>600 k 32-bit words/s with USB SIF Pod).

ASIC Production Test

SIF is often used by an ASIC tester (e.g. Teradyne Catalyst) in production test. This is especially useful for the analogue sections of an ASIC. The SIF can be used to configure the ASIC as required for a particular test, and then to read back the results. SIF can co-exist (and share 3 pins) with JTAG and ScanPath test interfaces.

In-Field Diagnostics

Support costs for a manufacturing company can be high when a product is out in the field (large volumes spread all over the world). If users have a problem with their product, the support costs are reduced if they can run software that provides good diagnostic information. Such computer software can access large regions of the ASIC (while it is running in normal functional mode) via the SIF. The acquired data can then be sent back to the product manufacturer to help them solve the problem.

SIF Overview

Block Diagram

FIG. 1 shows how a computer can read or write data to any of the SIF Slaves. The SIF Slaves can all be different devices running in their normal functional modes. The SIF reads and writes will not affect the timing or functionality of the SIF Slaves.

SIF Master Reads/Writes a SIF Slave

The purpose of the SIF is to let a SIF Master read or write data to one or more SIF Slaves. The reads and writes are always initiated by the SIF Master. The SIF Slave never initiates any reads or writes, it is only responsive. The data rates are determined by the SIF Master and can be faster or slower than the system clock used inside the SIF Slave.

The clever circuitry is in the SIF Slave. It is always implemented in hardware. It allows a SIF Master to read or write any address-mapped variable (normally a register or memory). The SIF Master is normally a computer which accesses the SIF Slave via a SIF Pod. The SIF Master functionality can be implemented in hardware or software.

SIF Pod Protocol

Old SIF Pods (ISA, LPT) do not have any intelligence. The pods are like combinational circuitry. There is no checking for data integrity between the computer and pod.

New SIF Pods (Universal=Ethernet, USB2, RS232) do have intelligence (contain a processor and FPGA). They support the new SIF Pod Protocol. This maintains data integrity between the computer and pod by sending packets with CRC codes.

16-IDC SIF Interface

Figure 2:
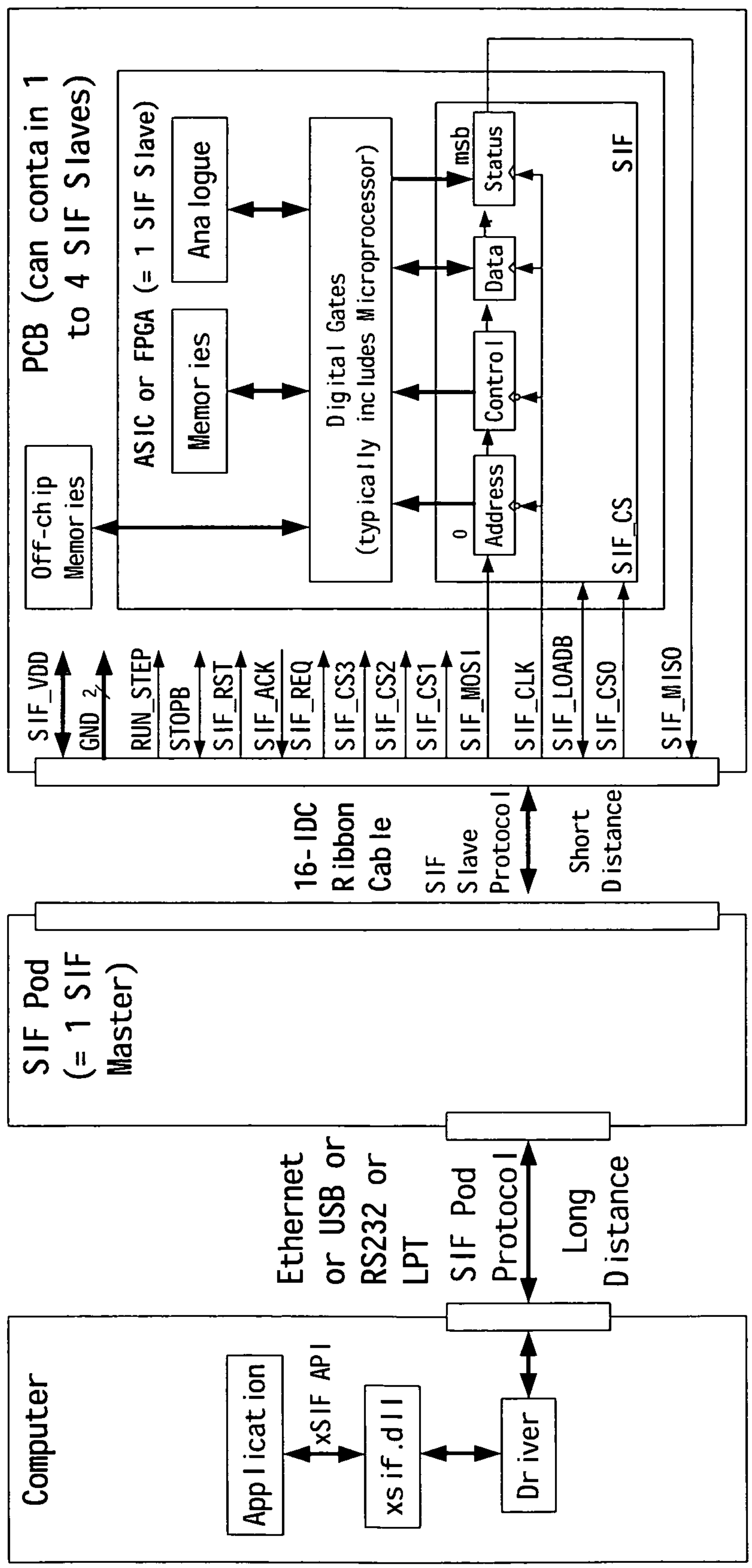
FIG. 2 shows a schematic of the connections between a computer, SIF pod, and a PCB containing a SIF slave.

The 16-IDC SIF interface used between a SIF Pod and a PCB (or PCBs) containing 1 to 4 SIF Slaves. The interface contains 3 power, 4 SIF and 9 IO pins. This enables the pod/master to read and write up to 4 slaves in Normal or Command mode. See FIG. 2.

Pin 1 is SIF_VDD. This allows the Pod to either supply power to the Slave PCB or to sense the voltage being used on it.

API

Computer drivers have been developed for the SIF. These support a number of operating systems and pods. The API (Application Programmer's Interface) for these drivers are:

xSIF API

This is the new API for SIF applications:

Supports 4 SIF Shift Register fields (Address, Control, Data, Status).

API for C, Matlab.

Used in SIF Toolkits 4.*.

Implemented as xsif.dll on Windows PCs (Win2k, WinXP)

Implemented as xsif.so on x86 Linux computers.

Implemented as xsif.so on MacOSX computers.

Used in 'xIDE for XAP3'.

SIF API

This is the old API for SIF applications:

Supports 2 SIF Shift Register fields (Address, Data).

API for C, Basic, Matlab 1998 to 2004.

Used in SIF Toolkits 1.*, 2.*, 3.*.

Implemented as sif.dll on Windows PCs (Win98, WinNT, Win2k, WinXP).

In SIF Toolkits 4.*, sif.dll is a thin 'twister' to xsif.dll.

Used in 'xIDE for XAP1'.

Used in 'xIDE for XAP2'.

SIF Pods

It is possible to manufacture a number of SIF hardware pods. These are used to connect computers (normally PCs) to SIF slaves. The connection from the pod to the PCB containing 1 to 4 SIF slaves is always a 16-IDC (ribbon and connectors). There are a variety of standard interfaces from the computer to the pod. SIF Toolkits contain drivers to support all these pods under a variety of computer operating systems.

ISA SIF Pods (Discontinued)

There were 2 ISA SIF Pods:

ISA SIF Pod 94

ISA SIF Pod 98

Characteristics are:

Both have been discontinued.

Both connect to the ISA SIF Card with a 50-IDC ribbon cable. The ISA SIF card is full length and plugs into a PC ISA Slot (not found in modem PCs). The signals in the 50-IDC interface are opto-isolated from the PC. The SIF_VDD and GND lines in the 50-IDC interface are DC-DC isolated from the PC.

Can supply low power on pin 1 SIF_VDD (100 mA). Or it can also sense the voltage at the Slave PCB. This option is set by jumpers.

Serial shift rates up to 2M6 bits/s.

Was used in many projects by Cambridge Consultants and clients (for development, functional test and production test).

Supported in SIF Toolkit 3.*.

Not supported in SIF Toolkit 4.*.

LPT SIF Pod

This is the simplest SIF pod available:

Pins 15 (STOPB) and 16 (RUN_STEP) in the 16-IDC are not connected. Therefore it cannot be used with XAP1.

Can be thought of as combinational circuitry. Does not contain any state.

Does not contain any microprocessor or FPGA.

Can only supply very low power on pin 1 SIF_VDD (~10 mA). Or it can also sense the voltage at the Slave PCB. This option is set by a jumper.

Serial shift rates up to 200 k bits/s.

USB SIF Pod

Defined in C7028-S-001. This is the fastest SIF pod available:

480 MHz USB2 bus-powered device.

Enables 32-bit data acquisition at speeds up to 600 kHz

Implements full 16-IDC SIF Interface.

Can supply low power on pin 1 SIF_VDD (~100 mA). Or it can also sense the voltage at the Slave PCB. This option is set by configuration software on the computer.

Serial shift rates up to 24M bits/s.

Universal SIF Pod

Latest design for SIF Pod:

Implements full 16-IDC SIF Interface.

10/100 BaseT Ethernet

480 MHz USB2 (device and host, enabling daisy-chaining of pods)

RS232

Can take a DC power input.

Can supply low power on pin 1 SIF_VDD (~100 mA). Or it can also sense the voltage at the Slave PCB. This option is set by configuration software on the computer.

SIF Toolkit

Environment

TABLE 1a

| SIF Toolkit Version | Language | Graphics | API | SIF Shift Register Fields (length) | Supported Operating Systems | Supported Pods |
|---|---|---|---|---|---|---|
| 3.* | C | MFC | SIF | Address (0 to 31)<br>WriteBit (1)<br>Data (0 to 32) | Win98<br>WinNT<br>Win2k<br>WinXP | ISA<br>LPT<br>USB |
| 4.* | C++ | Qt | xSIF | Address (0 to 32)<br>Control (0 to 32)<br>Data (0 to 32)<br>Status (0 to 32) | Win2k<br>WinXP<br>x86 Linux<br>MacOSX | LPT<br>USB<br>Ethernet<br>Universal |

Drivers

The new xSIF drivers run on Win2k, WinXP, x86 Linux PCs.

They implement the connection firm xSIF API to the relevant communications socket (Ethernet, USB, RS232, LPT).

Application Tools

The major tools included in SIF Toolkit 3.* are:

Configuration tool (enables manual setup for features that were not discovered automatically).

Data Writer (one-shot reads and writes to specified slaves and addresses).

Data Logger (continuous reads from specified slaves and addresses).

SIF Toolkit 4.* integrates the above functionality into a single tool called SIF Explorer. It also adds the following extra functionality:

Discovery tool. Finds what SIF pods and Slaves are available on the network and auto-configures them where possible. Some old SIF Slaves may still need to be configured manually.

Software Applications that Use SIF xIDE xIDE is an Integrated Development Environment developed by Cambridge Consultants. It is implemented in C++ and Qt. It consists of a standard kernel and custom plugins for particular processors or complete ASICs.

xIDE is used as the IDE for the XAP1, XAP2 and XAP3 ASIC processors. They all include software simulators. They also include SIF interfaces via pods to hardware emulators (normally based on xEMU). These xIDE toolkits are major applications that use the SIF and xSIF APIs to the SIF drivers in Windows, x86 Linux and MacOSX computers.

Matlab

Matlab is a powerful tool for controlling hardware tests in the lab. It is very popular with physicists. It is very useful for data-acquisition and analysis. As such xSIF provides a full Matlab API to SIF pods and slaves.

16-IDC SIF Interface

Pinout

TABLE 2

| Pin Name | Type | Pod Pad | Slave Pad ZPAD | Description |
|---|---|---|---|---|
| 1 SIF_VDD | Power | — | — | Power supply used by SIF Slaves.<br>Configured by Pod jumper or computer software to be one of:<br>Power from Pod to Slave PCB<br>Power from Slave PCB to Pod |
| 2 SIF_MISO | SIF | Input | Tristate Output ZT_5 | MasterIn, SlaveOut data signal:<br>Clocked out of Slave on posedge SIF_CLK<br>Clocked into Master at any time in window (from negedge SIF_CLK to just before posedge SIF_CLK). |
| 3 SIF_CS0 | IO | Bidir | Input ZI_TS_PD | General purpose IO.<br>Recommended use:<br>Chip Select 0 (Active High)<br>Pod Output<br>Slave Input<br>Sampled by Slave system clk |
| 4 SIF_MOSI | SIF | Output | Input ZI_TS_PD | MasterOut, Slave In data signal:<br>Clocked out of Master on posedge SIF_CLK<br>Clocked into Slave on negedge SIF_CLK |
| 5 GND | Power | — | — | Pod ground connected to Slave PCB ground by ribbon cable.<br>All signal voltages are relative to GND.<br>Pin 5 connected to Pin 7 in Slave PCB<br>Pin 5 connected to Pin 7 in Pod. |
| 6 SIF_CLK | SIF | Output | Input ZI_TS_PD | Clock signal for SIF_MOSI and SIF_MISO:<br>Asynchronous to Slave system clk |
| 7 GND | Power | — | — | Pod ground connected to Slave PCB ground by ribbon cable.<br>All signal voltages are relative to GND.<br>Pin 5 connected to Pin 7 in Slave PCB.<br>Pin 5 connected to Pin 7 in Pod. |
| 8 SIF_CS1 | IO | Bidir | Input ZI_TS_PD | General purpose IO.<br>Recommended use:<br>Chip Select 1 (Active High)<br>Pod Output<br>Slave Input<br>Sampled by Slave system clk |
| 9 SIF_LOADB | SIF | Open Drain Bidir | Open Drain Bidir ZB_TS_N_PU | Handshake signal for SIF Instructions (Normal mode SIF):<br>Normally high<br>Active low<br>Pulled low by Master then by Slave until SIF Instruction is completed<br>Sampled by Slave system clk<br>Changed on Slave system clk |
| 10 SIF_CS2 | IO | Bidir | Input ZI_TS_PD | General purpose IO.<br>Recommended use:<br>Chip Select 2 (Active High)<br>Pod Output |

TABLE 2-continued

| Pin Name | Type | Pod Pad | Slave Pad ZPAD | Description |
|---|---|---|---|---|
| | | | | Slave Input<br>Sampled by Slave system clk |
| 11 SIF_CS3 | IO | Bidir | Input<br>ZI_TS_PD | General purpose IO.<br>Recommended use:<br>Chip Select 3 (Active High)<br>Pod Output<br>Slave Input<br>Sampled by Slave system clk |
| 12 SIF_REQ | IO | Bidir | — | General purpose IO.<br>Recommended use:<br>Request from Pod to PCB Master in Multi-Master SIF systems.<br>Pod Output<br>PCB Master Input |
| 13 SIF_ACK | IO | Bidir | — | General purpose IO.<br>Recommended use:<br>Acknowledge from PCB Master to Pod in Multi-Master SIF systems.<br>PCB Master Output<br>Pod Input |
| 14 SIF_RST | IO | Bidir | Input<br>ZI_TS_PD | General purpose IO.<br>Recommended use:<br>Asynchronous reset signal (active High)<br>Pod Output<br>Slave Input |
| 15 STOPB | XAP1IO | Bidir | Bidir<br>ZB_TS_N_PU | General purpose IO.<br>Recommended use:<br>XAP1 debug signal. Special dedicated hardware (see section 0).<br>Pod Bidirectional<br>Slave Bidirectional |
| 16 RUN_STEP | XAP1IO | Bidir | Input<br>ZI_TS_PU | General purpose IO.<br>Recommended use:<br>XAP1 debug signal. Special dedicated hardware (see section 0).<br>Pod Output<br>Slave Input |

Figure 3:
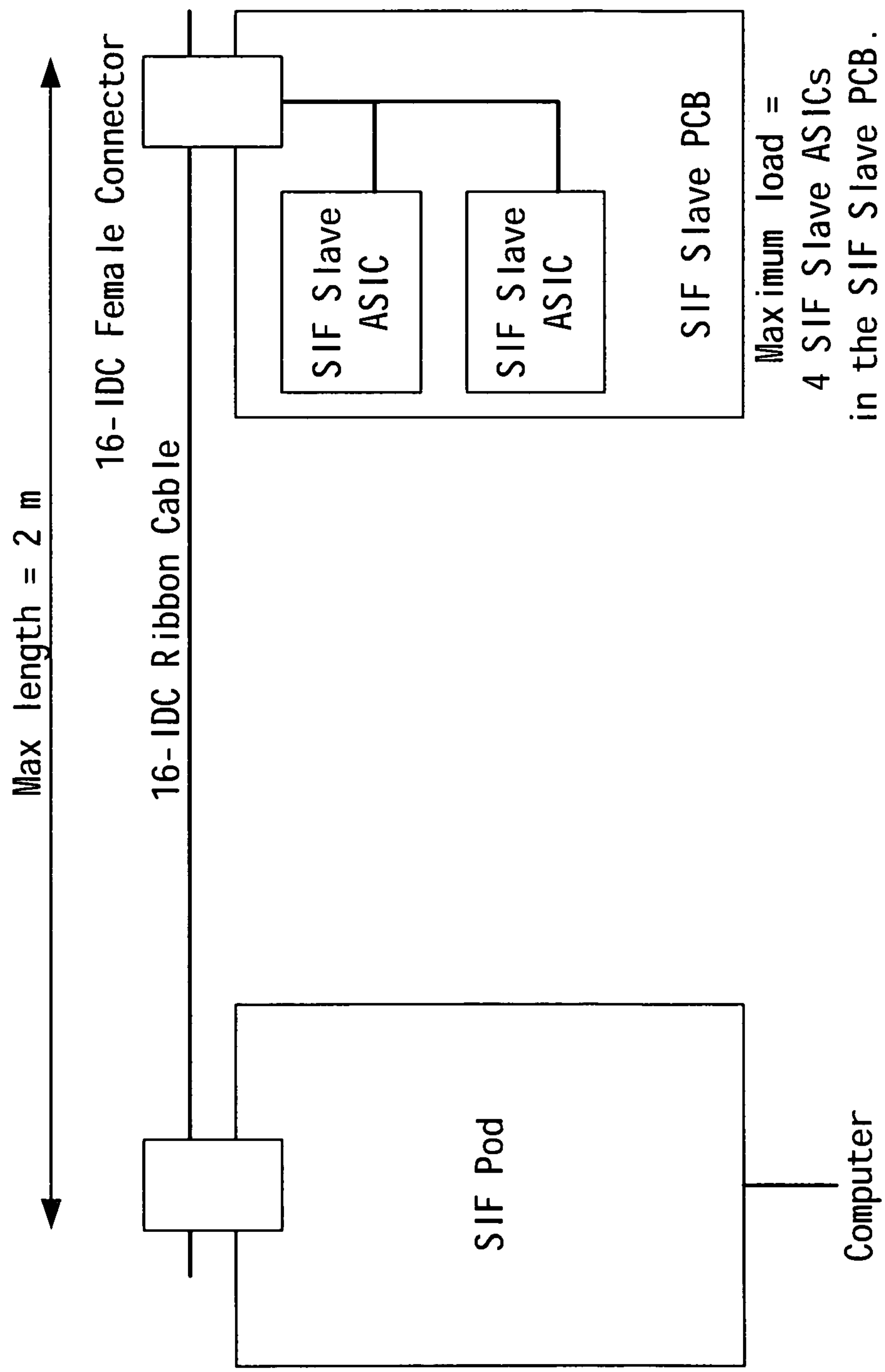
FIG. 3 shows a schematic of the connection between a SIF pod and a SIF slave PCB, detailing the connector type and maximum cable length.
Figure 4:
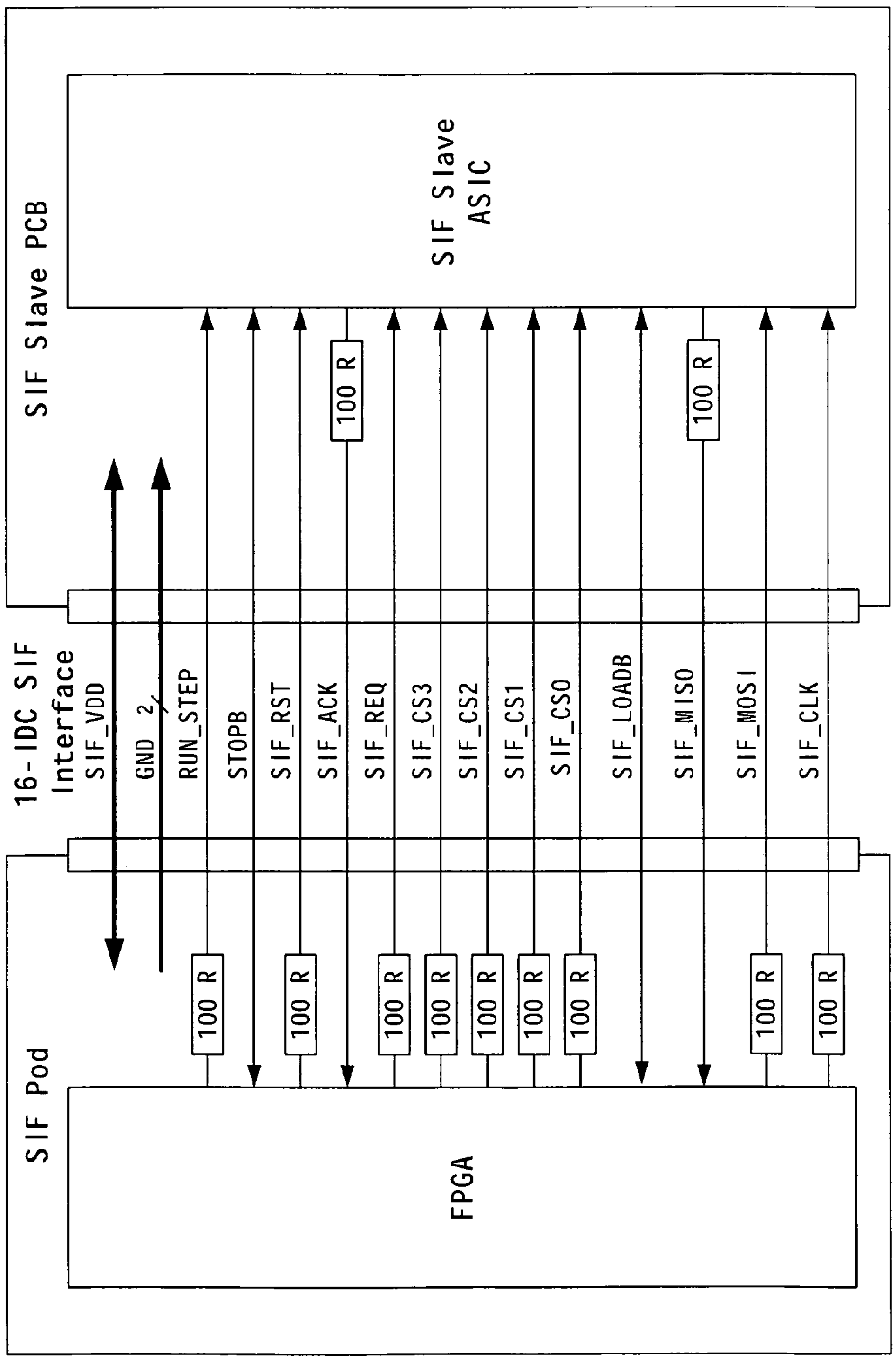
FIG. 4 shows the termination strategy used with the 16-IDC SIF Interface.
Figure 5:
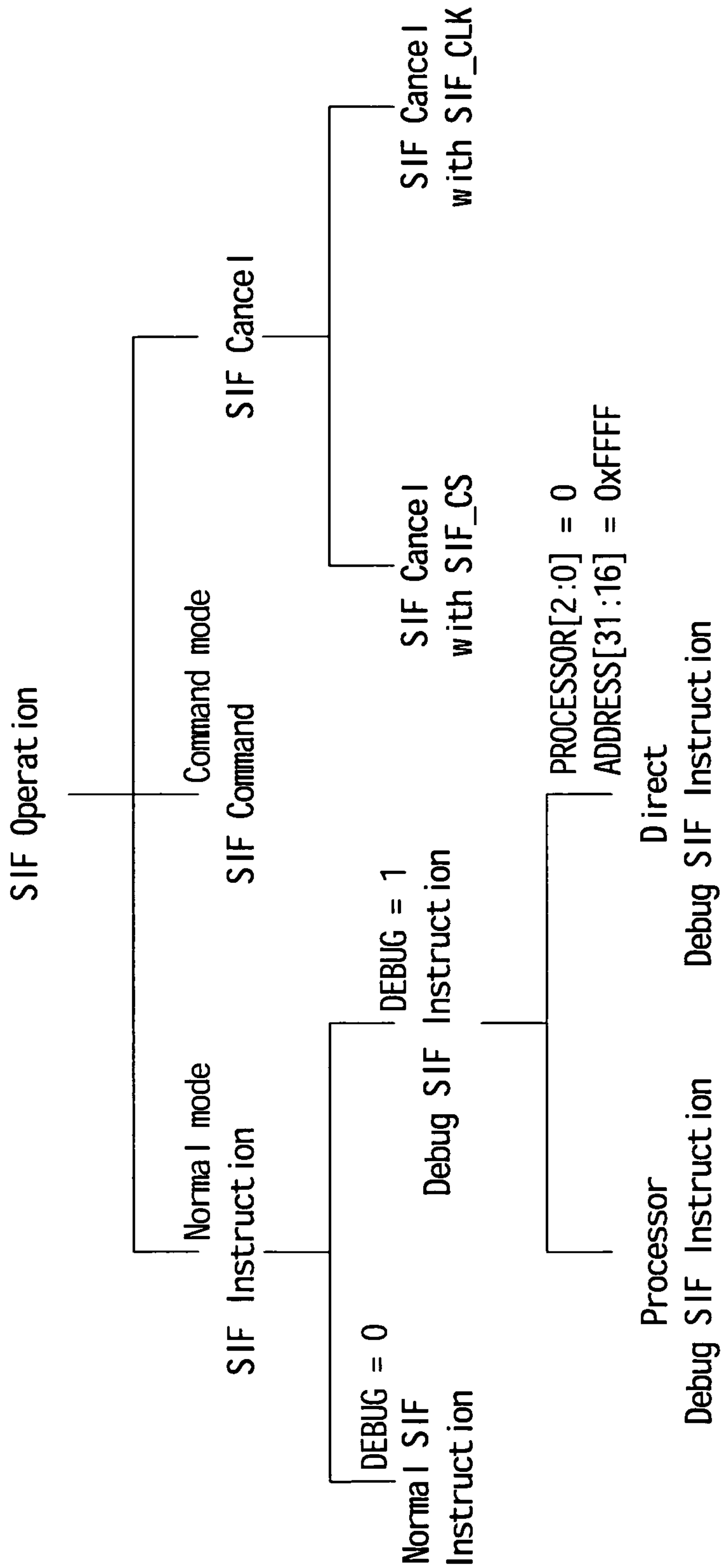
FIG. 5 shows the categorisation of SIF operations.

FIGS. 3 to 5 on buffering, protection and termination (for Pods and Slave PCBs) assume that the General Purpose IO pins are all being used in their recommended directions (as shown in Table 2).

SIF Slave Pad Types

Table 3 below refers to various ZPADs for the SIF Slave. The characteristics of these pads are:

TABLE 3

| ZPAD | Type | Description |
|---|---|---|
| ZI_TS_PD | TTL Input with Pulldown | TTL Threshold (0.8 V, 2.0 V)<br>Schmitt Trigger<br>5 V Tolerant<br>Pulldown resistor (10 kohm ?) |
| ZI_TS_PU | TTL Input with Pullup | TTL Threshold (0.8 V, 2.0 V)<br>Schmitt Trigger<br>5 V Tolerant<br>Pullup resistor (10 kohm ?) |
| ZT_5 | CMOS Tristate Output | 8 mA Sink and Source<br>Drive to 0 V or SIF_VDD or high-impedance<br>Slew-rate control |
| ZB_TS_N_PU | TTL Open-Drain Bidirectional with Pullup | TTL Threshold (0.8 V, 2.0 V)<br>Schmitt Trigger<br>5 V Tolerant<br>6 mA Sink<br>Pullup resistor (10 kohm ?)<br>Drive to 0 V or resistive to SIF_VDD<br>Slew-rate control |

Connector

Standard bump-polarised 16-IDC connector:

2*8 pins 2.54 mm pitch

Cable connectors=female

PCB connectors (on SIF Pod and SIF Slave PCB)=male

Cable, see FIG. 3

The cable should be standard 16-IDC ribbon cable:

1.27 mm pitch.

Straight cable or twisted pair (e.g Twist and Flat from 3M or Spectra Strip).

100 ohm impedance.

Max Length=2 m.

Max speed (bits per second) decreases as cable length increases.

Can have several female connectors along length of cable. Pod at one end. Termination block at other end. Slaves in between.

Termination

FIG. 4 shows the termination strategy used with the 16-IDC SIF Interface. More details on the actual complete circuits that should be used in the Slave PCB and Pod are described herein. In practise these circuits have to combine the requirements for termination and ESD/High Voltage protection.

The termination strategy is to have 100 ohm series source termination at each driver output, as shown in the diagram above. This is to match the standard impedance of the ribbon cable (which is 100 ohm).

This works well for point-to-point connections (i.e. a single Slave, as shown in FIG. 4). Any wave reflections from the destination should be perfectly absorbed in the 100 ohm series resistor at the source (thereby preventing multiple reflections).

However, it does not work so well when there are multiple Slaves in the Slave PCB (i.e. 2 to 4). The reflections will be seen by the intermediate Slaves which could cause errors. One way to deal with this is to use slower edge speeds and shift frequencies. Another is to add buffers to the Slave PCB so that the cable does only see point-to-point loads. This second method is recommended and shown in section 8 on SIF Slave PCBs.

In practice, the SIF Pod has ESD/High voltage protection on every signal anyway (see description on SIF Master). This includes a 100 series resistor. So in fact this resistor can double up as protection and source series termination for the Pod outputs. Actually, the Pod contains protection circuitry for the Inputs (SIF_MISO, SIF_ACK) & Bidirectionals (SIF_LOADB, STOPB) as well. This is not ideal but does not do much harm (as the gate inputs are such high impedance anyway).

It is necessary for the Slave PCB to have 100 ohm source series termination close to the SIF_MISO and SIF_ACK pins on each SIF Slave. It is best if the Slaves are positioned as close as possible to the 16-IDC SIF connector on the Slave PCB.

Maximum Shift Frequencies

The maximum frequency for SIF_CLK, SIF_MOSI and SIF_MOSI depends upon:

Maximum Pod shift frequency
Whether Slaves are buffered or not in the Slave PCB
Length of 16-IDC ribbon cable
Number of Slaves in the Slave PCB
Design of the SIF Slave PCB (termination & position of SIF Slaves relative to the 16-IDC SIF connector)

TABLE 4

Un-buffered Slave PCB (Production)

| Estimated Maximum Shift Frequency (MHz) | | Number of un-buffered Slaves in Slave PCB 1 | 2 | 3 | 4 |
|---|---|---|---|---|---|
| Length of 16-IDC Ribbon Cable (mm) | 50 | 25 | 10 | 10 | 10 |
| | 100 | 20 | 5 | 5 | 5 |
| | 300 | 15 | 1 | 1 | 1 |
| | 1000 | 10 | — | — | — |
| | 2000 | 5 | — | — | — |

TABLE 4a

Buffered Slave PCB (Test)

| Estimated Maximum Shift Frequency (MHz) | | Number of buffered Slaves in Slave PCB 1 | 2 | 3 | 4 |
|---|---|---|---|---|---|
| Length of 16-IDC Ribbon Cable (mm) | 50 | 50 | 20 | 20 | 20 |
| | 100 | 40 | 10 | 10 | 10 |
| | 300 | 30 | 5 | 5 | 5 |
| | 1000 | 20 | 2 | 2 | 2 |
| | 2000 | 10 | 1 | 1 | 1 |

SIF Slave Protocol

The SIF Slave protocol describes the way a SIF Master (e.g. a Pod) must control the SIF signals (SIF_CS, SIF_CLK, SIF_MOSI, SIF_MISO, SIF_LOADB) in order to read from and write to a SIF Slave (ASIC or FPGA).

SIF Operations are categorised as shown in FIG. 5.

There are 2 modes for SIP Operations:—

SIF Instructions in Normal mode
SIF Commands in Command mode

Pins Used for Normal and Command Modes

A SIF Slave is either in Normal or Command mode. At reset it is in Normal mode. Most of the time, the SIF Slave is used in Normal mode.

A full SIF Slave has 5 external SIF pins (SIF_CS, SIF_LOADB, SIF_CLK, SIF_MOSI, SIF_MISO).

If the SIF Slave will never be used in multi-slave networks, then it only needs to have 4 external SIF pins. In such cases SIF_CS should be tied high (=1) inside the slave.

To access a SIF Slave, SIF_CS should be 1 (for Normal and Command Modes). However, SIF_CS only affects the SIF_LOADB and SIF_MISO pins in a SIF Slave.

SIF_CS does not affect the 2 input pins to the shift register (SIF_CLK, SIF_MOSI). Data is always fed into the shift register, even if SIF_CS=0.

SIF_MISO is tri-state when SIF_CS=0. SIF_MISO is enabled when SIF_CS=1.

When SIF_CS=0, the internal copy of SIF_LOADB is forced to 1 (meaning that it is not possible to do a SIF Read or Write).

Normal mode uses all 5 SIF pins and supports variable length shift registers (from one ASIC design to another).

In effect, Command mode only uses 4 SIF Pins (SIF_LOADB not used). When in Command mode, the shift register is treated as fixed length (across all designs). 8-bit Commands are fed into SIF_MOSI and 8-bit Responses are generated from SIF_MISO.

Bit Order

All SIF Operations shift data MSB (most significant bit) first:—

From Master to Slave on SIF_MOSI
From Slave to Master on SIF_MISO
All SIF Instructions in Normal mode
All fields in Normal mode (Address, Control, Data, Status)
All SIF Commands in Command mode
All fields in Command mode (Command, Response)

SIF Pod Timing

The SIF Pod must obey various timing constraints on the signals it generates:—

SIF_CS
SIF_CLK
SIF_MOSI
SIF_LOADB_MASTER

The SIF Toolkit on the computer allows the user to set 2 times:—

SIF_CLK period (ns)
SIF_LOADB period (number of SIF_CLK periods). This is the pulse time that the SIF Pod holds SIF_LOADB low for.

The limits on these times vary from one SIF Pod to another. SIF Pods must obey these limits when performing the various SIF Operations described in the rest of this section.

SIF_CLK Duty Cycle

In between SIF Operations, the SIF Pod holds SIF_CLK low.

A SIF_CLK cycle is therefore defined as being in the following order:—

SIF Pod first pulls SIF_CLK high for Tclkhigh (changes SIF_MOSI on posedge)
SIF Pod then pulls SIF_CLK low for Tclklow (samples SIF_MISO on negedge)

The duty-cycle on SIF_CLK for Tclkhigh:Tclklow must be between:—

60:40

40:60

SIF Read

Single SIF Read

Figure 6:
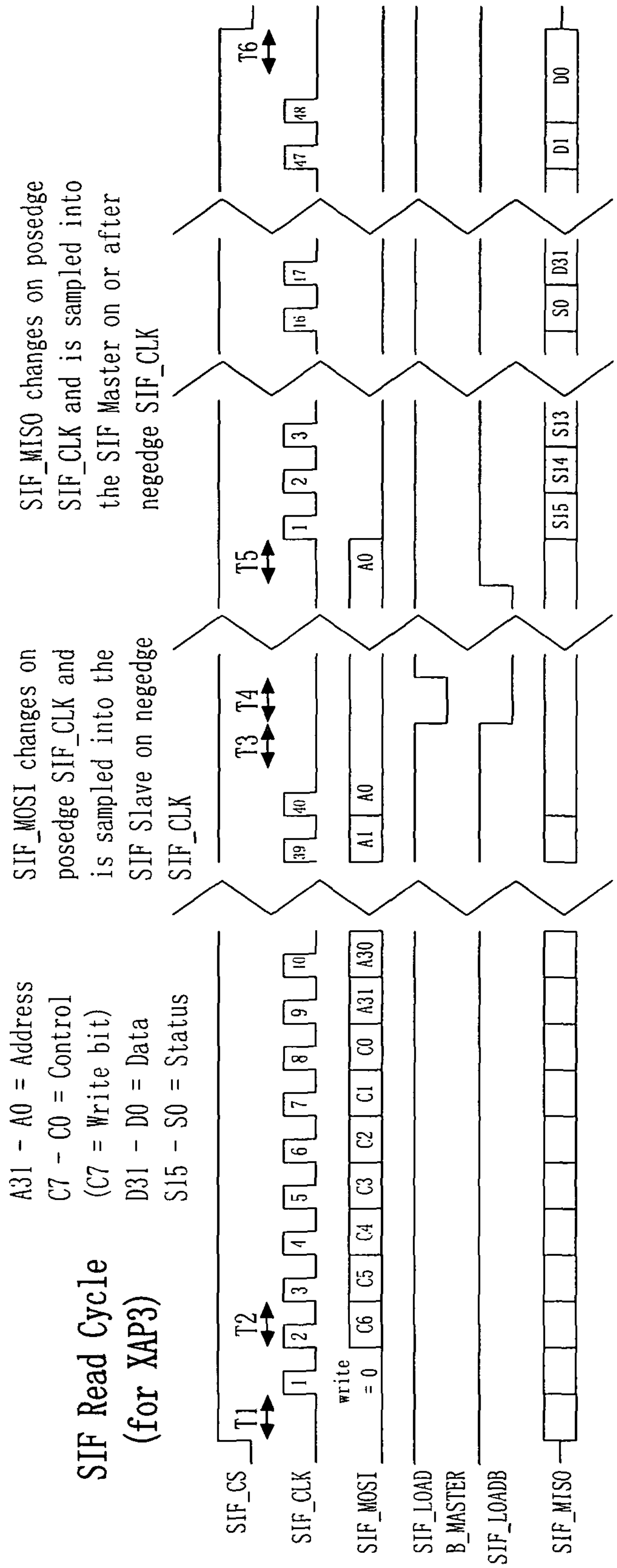
FIG. 6 shows the SIF read cycle.

The SIF Read sequence is, this may also be seen in FIG. 6:

SIF Master shifts Control then Address to SIF Slave on SIF_MOSI.

SIF Master pulls SIF_LOADB low for short pulse.

SIF Slave holds SIF_LOADB low until SIF Read is complete.

SIF Master shifts Status then Data out from SIF Slave on SIF_MISO.

The SIF Pod must obey this timing table:—

TABLE 5

| Name | Description | Min Time |
|---|---|---|
| T1 | posedge SIF_CS to first posedge SIF_CLK | SIF_CLK period |
| T2 | posedge SIF_CLK to posedge SIF_CLK | SIF_CLK period |
| T3 | end SIF_CLK cycle (end Tclklow) to negedge SIF_LOADB_MASTER | SIF_CLK period |
| T4 | negedge SIF_LOADB_MASTER to posedge SIF_LOADB_MASTER | SIF_LOADB period |
| T5 | posedge SIF_LOADB to posedge SIF_CLK | SIF_CLK period |
| T6 | end SIF_CLK cycle (end Tclklow) to negedge SIF_CS | SIF_CLK period |

Pipelined SIF Writes

Figure 9:
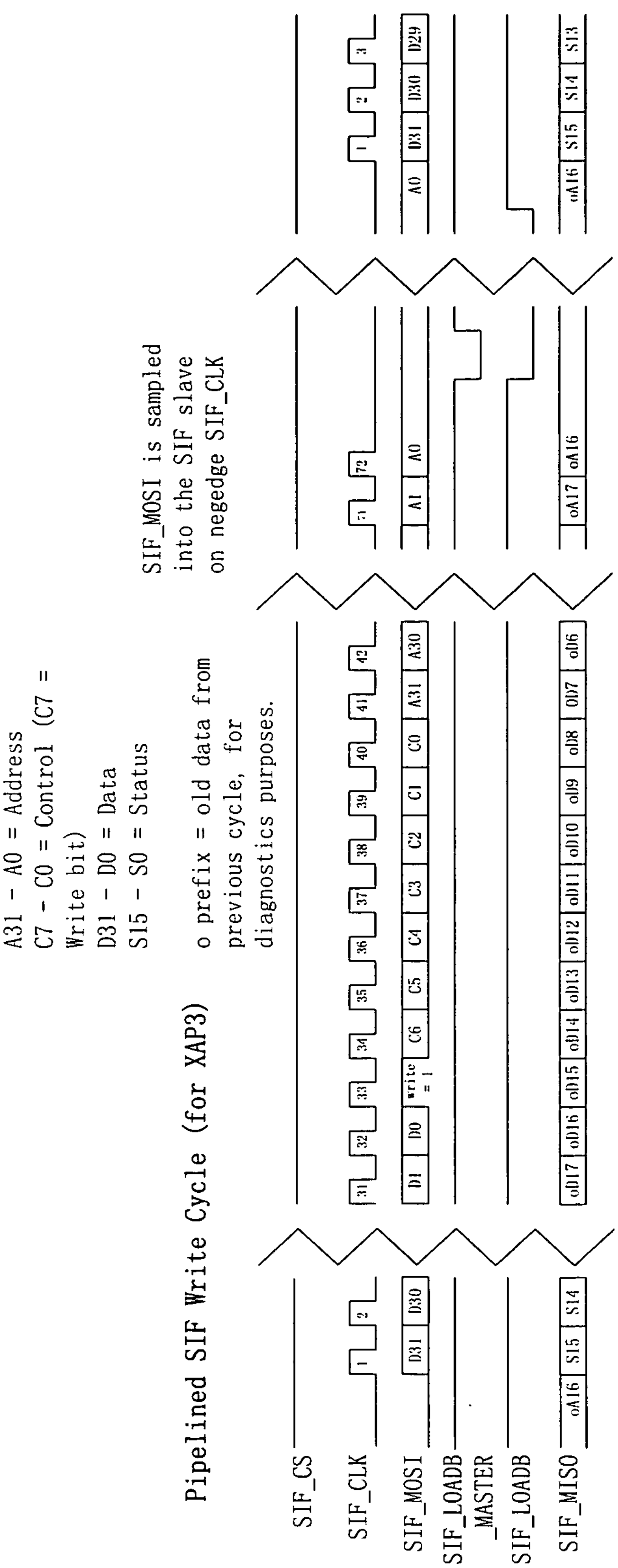
FIG. 9 shows the pipelined SIF write cycle.

Pipelined SIF Write performs n SIF Writes by iterating the following cycle n times, this may also be seen in FIG. 9:

SIF Master simultaneously shifts:

Data then Control then Address to SIF Slave on SIF_MOSI

Status (from previous Write) out from SIF Slave on SIF_MISO

The length of the shift is determined by the longer of the above two.

SIF Master pulls SIF_LOADB low for short pulse.

SIF Slave holds SIF_LOADB low until SIF Write is complete.

Status from the first cycle is ignored.

Pipelined SIF Reads

Figure 7:
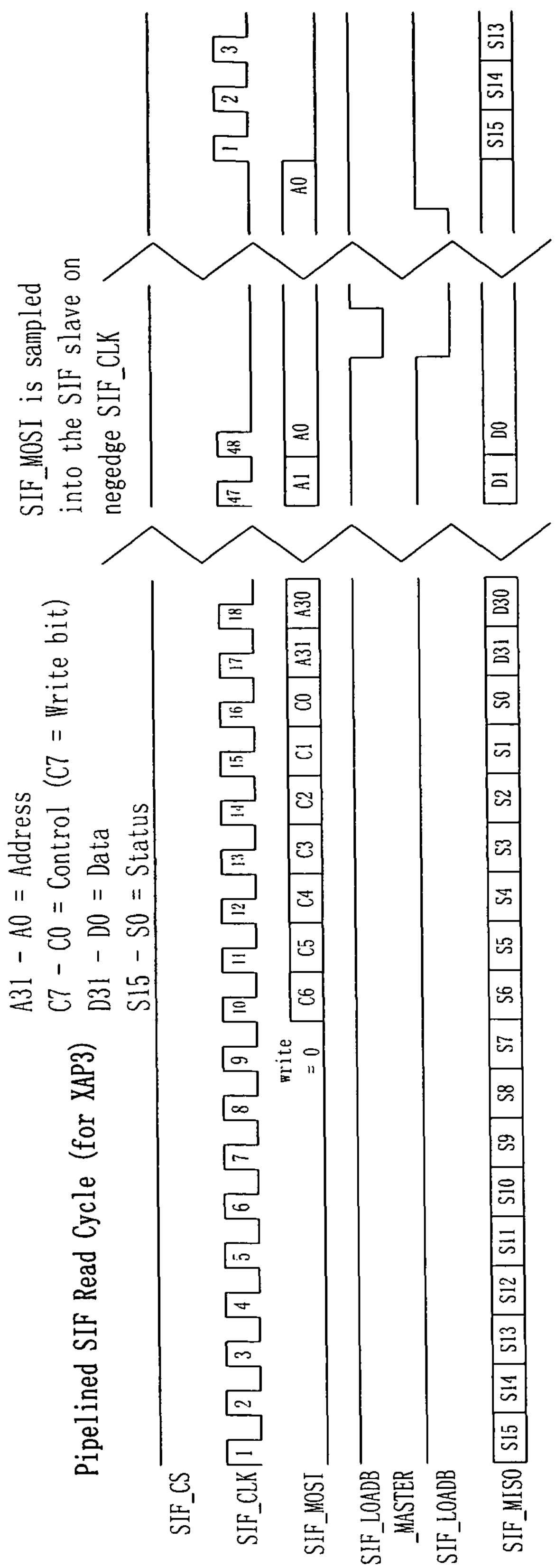
FIG. 7 shows the pipelined SIF read cycle.

Pipelined SIF Read performs n SIF Reads by iterating the following cycle n times, this may be seen in FIG. 7:

SIF Master simultaneously shifts:

Control then Address to SIF Slave on SIF_MOSI

Status then Data (from previous Read) out from SIF Slave on SIF_MISO

The length of the shift is determined by the longer of the above two.

SIF Master pulls SIF_LOADB low for short pulse.

SIF Slave holds SIF_LOADB low until SIF Read is complete.

{Status, Data} from the first cycle are ignored.

{Status, Data} are shifted out from SIF Slave on SIF_MISO after the nth cycle.

The SIF Pod must obey the same timing constraints as described for SIF Read.

SIF Write

Single SIF Write

Figure 8:
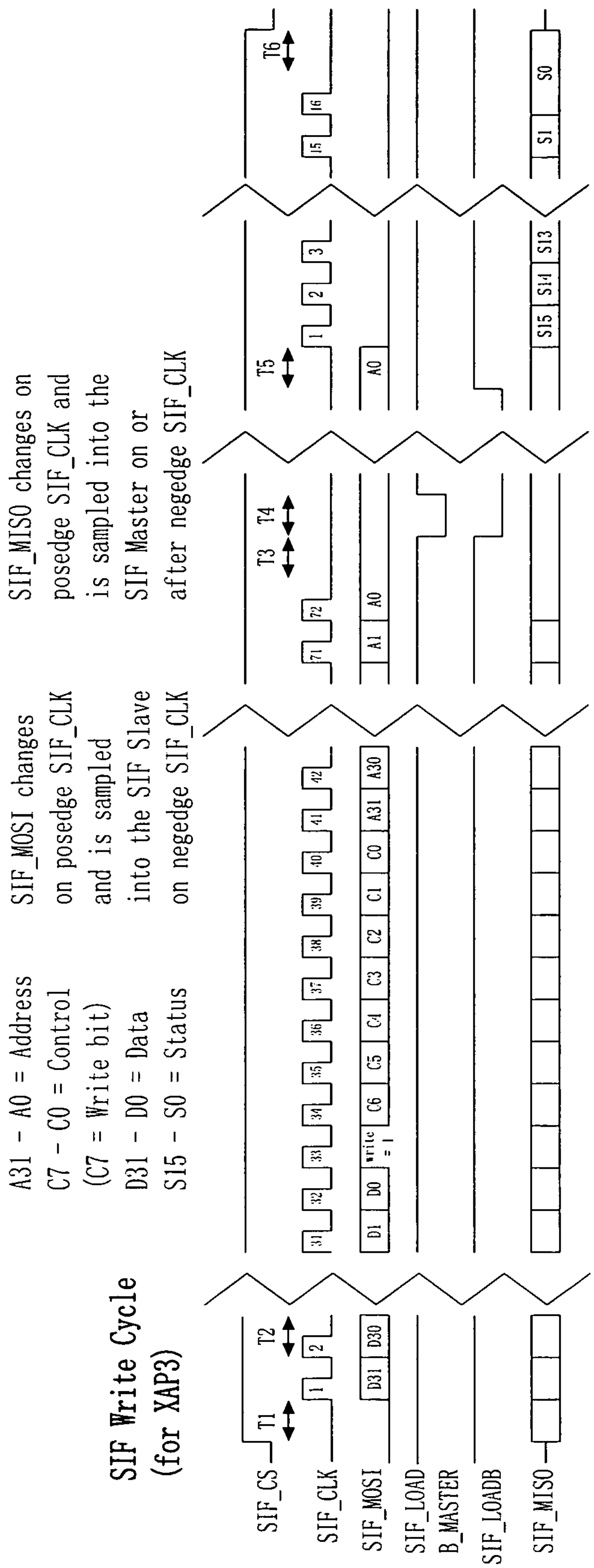
FIG. 8 shows the SIF write cycle.

The SIF Write sequence is, and may also be seen in FIG. 8:

SIF Master shifts Data then Control then Address to SIF Slave on SIF_MOSI.

SIF Master pulls SIF_LOADB low for short pulse.

SIF Slave holds SIF_LOADB low until SIF Write is complete.

SIF Master shifts Status out from SIF Slave on SIF_MISO.

The SIF Pod must obey this timing table

TABLE 6

| Name | Description | Min Time |
|---|---|---|
| T1 | posedge SIF_CS to first posedge SIF_CLK | SIF_CLK period |
| T2 | posedge SIF_CLK to posedge SIF_CLK | SIF_CLK period |
| T3 | end SIF_CLK cycle (end Tclklow) to negedge SIF_LOADB_MASTER | SIF_CLK period |
| T4 | negedge SIF_LOADB_MASTER to posedge SIF_LOADB_MASTER | SIF_LOADB period |
| T5 | posedge SIF_LOADB to posedge SIF_CLK | SIF_CLK period |
| T6 | end SIF_CLK cycle (end Tclklow) to negedge SIF_CS | SIF_CLK period |

Status is shifted out from SIF Slave on SIF_MISO after the nth cycle.

The SIF Pod must obey the same timing constraints as described for SIF Write.

Synchronising a FIFO with SIF_LOADB for Data Acquisition

SIF Instructions are always initiated by the SIF Master. The SIF Slave only ever responds. This can still be used for data acquisition tasks by using the Status field as a timestamp (e.g a counter where the LSB toggles at 1 to 100 kHz). The SIF Master can then reconstruct the acquired data, discarding duplicate samples and spotting if there are any missing samples.

For very fast data acquisition it can be simpler if the SIF Slave initiates the SIF transaction. The way to do this is as follows:—

SIF Slave contains a memory-mapped FIFO. The depth depends upon how much buffering the SIF Master requires. The FIFO can be read, but not written by the SIF. When SIF reads are made to this particular address, the SIF Slave can hold SIF_LOADB low until a valid new data sample is available. This is over and above the normal waits for a SIF or SLEEPSIF instructions when the selected SIF Processor is running.

SIF Master continuously reads the FIFO (via the SIF). When the selected SIF Processor is running, the SIF reads will occur at the first SIF or SLEEPSIF instruction after valid data is available in the FIFO. When the selected SIF Processor is stopped the SIF read will occur immediately after valid data is available.

SIF Slave writes data samples to the FIFO as they occur (regular frequency expected)

If the SIF Master gets ahead of the SIF Slave, the SIF Slave will hold SIF_LOADB low until the next SIF or SLEEPSIF instruction (if running) alter the next data sample is ready. This means that the SIF Master will never get any duplicate copies of data samples.

If the SIF Master falls behind the SIF Slave, the FIFO will get corrupted. The SIF Slave indicates this to the SIF Master by setting an overflow bit in the Status field.

This feature is application specific. Not all SIF Slaves will contain such a FIFO. SIF Slaves which do contain such a FIFO can hold SIF_LOADB for longer, when the SIF Master makes a SIF Read to the FIFO. However, SIF reads to any other address will behave as normal (without any stretching of SIF_LOADB).

SIF Cancel

If the SIF Master issues a SIF Instruction to a selected SIF Processor inside the Slave that cannot be completed, then the SIF Slave will continue to hold SIF_LOADB low for ever. This can happen for a variety of reasons, including:—

SIF Processor is running (in Normal or Debug mode). SIF Instruction requires a SIF or SLEEPSIF instruction, but there aren't any in the processor code.

The SIF Master must be able to detect that SIF_LOADB is stuck low and timeout after a specified period. The SIF is then locked and needs to be cleared by issuing a SIF Cancel instruction. This can be done using one of the following 2 methods.

When the SIF Master issues a SIF Cancel to the SIF Slave, it cannot be certain whether the previous SIF Instruction (read or write) will be executed or not. The Slave might execute the SIF Instruction in the period between the Master transmitting the start of the SIF Cancel and the Slave receiving the end of the SIF Cancel. However, the Master can assume that if the SIF Instruction is executed, that it will be exactly as requested. The Master doesn't know whether the read or write has occurred, but it does know that if it did occur, then it was executed correctly. The Slave will never execute any unrequested SIF Instructions (reads or writes during SIF Cancel or any other period).

SIF Cancel with SIF_CS

If the SIF Master pulls SIF_CS low (sampled by Slave system clock), the SIF Slave will no longer be selected. The SIF Slave will stop pulling SIF_LOADB low, allowing the signal to go high again. It does not matter what the values are on SIF_CLK, SIF_MOSI or SIF_LOADB. A SIF Slave cannot hold SIF_LOADB low if its SIF_CS pin is low. Some SIF Slaves do not use the SIF_CS pin (i.e. can only be used in Single Slave networks). In such devices, the SIF_CS signal is permanently tied high inside the chip. Therefore the method for clearing a locked SIF cannot be used in all SIF Slaves.

This feature is only implemented in SIF Slaves from 2005 onwards. It is implemented in the CVS Verilog repository for sif and xsif. It is implemented in XAP2 and XAP3. It is not implemented in XAP1.

SIF Cancel with SIF_CLK

If the SIF Master issues 32 cycles (high then low) on SIF_CLK, then on the $32^{nd}$ negedge the SIF Slave will stop pulling SIF_LOADB low, allowing the signal to go high again.

It does not matter what the values are on SIF_CS, SIF_MOSI or SIF_LOADB during this sequence. All SIF Slaves on the network will release SIF_LOADB after the $32^{nd}$ negedge on SIF_CLK Of course, this does not cause any change of state in SIF Slaves that were not holding SIF_LOADB low.

The reason this protocol works is because there should not be any cycles on SIF_CLK when SIF_LOADB is low. In fact SIF_CLK should always be low when SIF_LOADB is low.

This feature is implemented in SIF devices from 1999 onwards. It is implemented in the CVS Verilog repository for sif and xsif. It is implemented in XAP2 and XAP3. It is not implemented in XAP1.

SIF Command

The maximum frequency for SIF_CLK in Command mode is 1 MHz. This includes the 256 clock sequence to transfer from Normal to SIF Mode.

Figure 10:
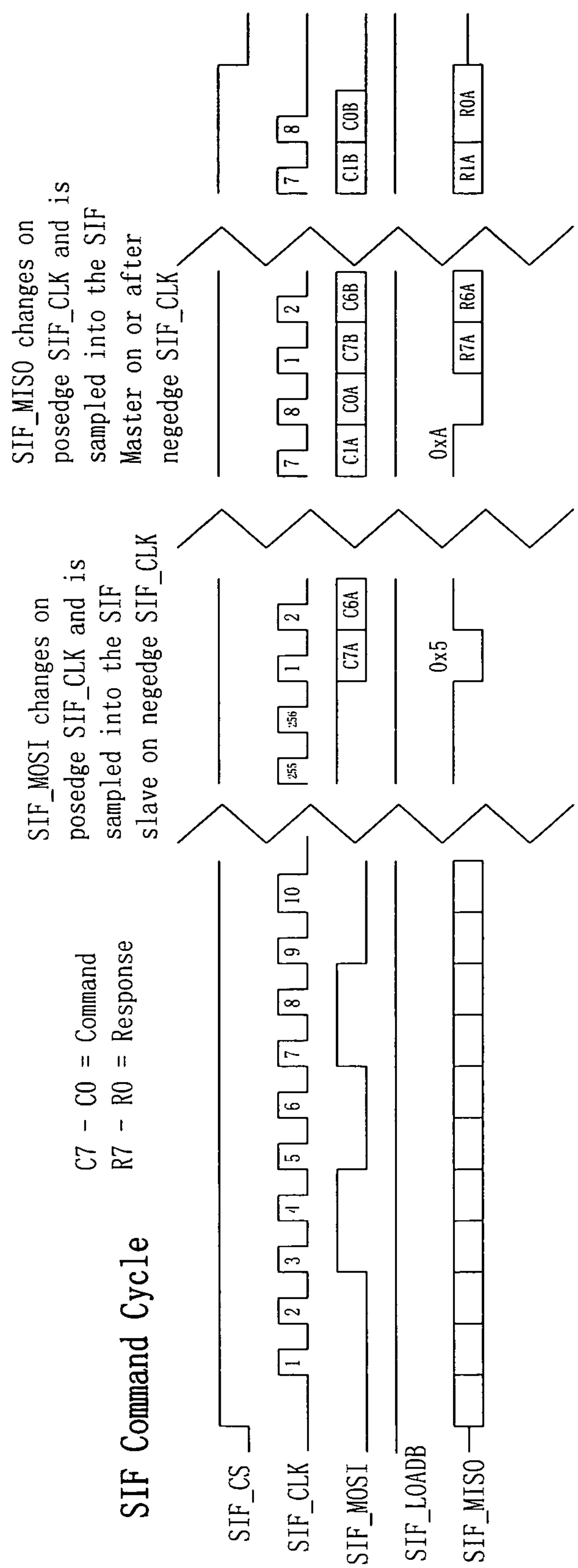
FIG. 10 shows the SIF command cycle.

At reset, the SIF Slave is in Normal mode. To use SIF Commands, the SIF Slave must first be put into Command mode. This is done by raising the SIF Command Mode Counter value to 256, which is done as follows, and may be seen in FIG. 10:—

SIF_CS=1. Sampled by Slave system clock.

SIF_LOADB=1 (not used). Sampled by Slave system clock.

256 cycles of SIF_CLK.

SIF_MOSI=0x33333 . . . (sampled on negedge SIF_CLK)

After the $256^{th}$ negedge on SIF_CLK, SIF goes in to Command mode which means:

SIF_MISO is not connected to STATUS[msb], but to the Response output instead.

SIF_LOADB is not used.

SIF_MOSI will be interpreted as fixed 8-bit Commands (msb fi, sampled on negedge SIF_CLK).

SIF_MISO will generate fixed 8-bit Responses (msb first changes on posedge SIF_CLK) to the previous command. Responses should be treated as unsigned numbers from 0x00 to 0xFE. 0xFF is used as the Response to any unrecognised Command.

Note that the SIF Slave only has Tclklow ($2^{nd}$ half of SIF_CLK cycle) from entering Command mode (negedge SIF_CLK) to putting Response[7] on SIF_MISO (posedge SIF_CLK). With a 1 MHz SIF_CLK this is 500 ns, and could be as low as 400 ns with a 40:60 duty cycle on SIF_CLK. This is the why the fastest frequency for Command mode is only 1 MHz.

The SIF Command Mode Counter goes back to 0 (thus putting the SIF back into Normal Mode) when any of the following occur:

SIF Command=0x00 (i.e. SIF_MOSI=0, for 8 cycles of SIF_CLK)

SIF_LOADB=0 (even if still in Normal Mode). Sampled by Slave system clock.

SIF_CS=0 (even if still in Normal Mode). Sampled by Slave system clock.

SIF Commands and Responses are always 8-bit. The Command is fed into the SIF Slave on SIF_MOSI, while the Response from the previous Command is simultaneously fed out on SIF_MISO. While the first Command is fed into SIF_MOSI, 0x5A is output on SIF_MISO. This confirms to the Master, that the Slave has successfully entered Command mode.

All of the SIF Commands defined so far are 'Get' functions. They all query the SIF configuration and in effect read a fixed ROM inside the SIF. They do not update the SIF Slave in any way. In future there may be some simple 'Set' functions for general IO lines inside the SIF. SIF Commands cannot be used to read or write any processor or memory address space in the SIF Slave. That can only be done by Normal mode SIF Instructions.

The SIF Slave must Pond to the following SIF Commands:

TABLE 7

| OpCode | Command | Response | XAP3 Response |
|---|---|---|---|
| 0x00 | Return to Normal Mode | End of Command Mode | — |
| 0x01 | Confirm synchronisation | 0x5A | 0x5A |
| 0x02 | SIF Type | 0 = Undefined<br>1 = 36-bit standard XAP1<br>2 = 64-bit standard XAP2<br>3 = 88-bit standard XAP3<br>4 = 52-bit standard XAP4 | 3 |
| 0x10 | Chip ID - byte 0<br>New Response added for each new chip. | 0 = Undefined<br>1 = $1^{st}$ Chip ID<br>0xFD = 253rd Chip ID<br>0xFE = Use Command 0x11 | 0 |
| 0x11 | Chip ID - byte 1<br>Use this when all Responses to Command 0x10 have been used. | 0 = $254^{th}$ Chip ID<br>1 = $255^{th}$ Chip ID<br>0xFE = Use Command 0x12 | NA<br>i.e 0xFF |
| 0x20 | Address Field Length | 1 to 32 | 32 |
| 0x30 | Control Field Length | 1 to 32<br>Includes Write Bit | 8 |
| 0x31 | Number of PROG_DATAB bits | 0 = Von Neumann<br>1 = Harvard architecture | 0 |
| 0x32 | Number of PROCESSOR bits | 0 to 8 | 3 |
| 0x33 | Number of DEBUG bits | 0 to 1 | 1 |
| 0x34 | Number of SIZE bits | 0 to 2 | 2 |
| 0x35 | Number of PARITY_AC bits | 0 to 1 | 1 |
| 0x36 | Write Bit Polarity | 1 = Active High Write<br>0 = Active Low Write | 1 |
| 0x40 | Data Field Length | 1 to 32 | 32 |
| 0x50 | Status Field Length | 0 to 32 | 16 |
| 0x51 | Number of STAT bits | 0 to 32 | 8 |
| 0x52 | Number of ERROR_CODE bits | 0 to 8 | 4 |
| 0x53 | Number of ERROR_TYPE bits | 0 to 1 | 1 |
| 0x54 | Number of ERROR bits | 0 to 1 | 1 |
| 0x55 | Number of PARITY_D bits | 0 to 1 | 1 |
| 0x56 | Number of PARITY_S bits | 0 to 1 | 1 |
| 0x60 | SIF Processor 0 | 0 = No Processor<br>1 = XAP1<br>2 = XAP2<br>3 = XAP3<br>4 = XAP4<br>0x11 = APE1<br>0x12 = APE2 | 3 |
| 0x61 | SIF Processor 1 | Response Values as above. | 0 |
| 0x62 | SIF Processor 2 | Response Values as above. | 0 |
| 0x63 | SIF Processor 3 | Response Values as above. | 0 |
| 0x64 | SIF Processor 4 | Response Values as above. | 0 |
| 0x65 | SIF Processor 5 | Response Values as above. | 0 |
| 0x66 | SIF Processor 6 | Response Values as above. | 0 |
| 0x67 | SIF Processor 7 | Response Values as above. | 0 |
| Any other OpCode | Unrecognised Command | 0xFF | 0xFF |

xIDE should use the following sequence to identify the chip and its SIF configuration:—

TABLE 8

| Step | Command | Response != 0 | Response = 0 |
|---|---|---|---|
| 1 | 0x10 | Chip ID defines everything about this particular chip design.<br>This should be used for ASIC designs. | Chip ID - not defined.<br>Proceed to Step 2. |
| 2 | 0x02 | SIF Type defines enough for xIDE to work with the chip.<br>Proceed to Step 3.<br>This should be used for FPGAs and demonstrators. | SIF Type - not defined.<br>Proceed to Step 4. |
| 3 | 0x60-0x67 | Identifies the SIF Processors inside the chip. | No SIF Processor at this ID. |
| 4 | 0x20-0x5F | Identifies the details for Address, Control, Data and Status fields for non-standard SIF Types.<br>This should be used for ASICs or FPGAs designed by $3^{rd}$ parties. | |

If Command 0x10 (Chip ID) is defined, then Commands 0x20-0x67 are optional.

If Command 0x02 (SIF Type) is defined, then Commands 0x20-0x5F are optional.

It is best if 0x02 is always defined, even when 0x10 is defined.

Commands 0x00, 0x01, 0x02, 0x10 should always be implemented (Response !=0xFF).

SIF Error Processing

Data Integrity

Data Integrity Between Computer and Pod

There will not be any data corruption between Computer and Pod because the SIF Pod Protocol includes a CRC check on each packet. This is used for all SIF Pods apart from the LPT Pod. In addition, Ethernet and USB protocols contain their own error-correction protocols (by error-checking and re-send) to guarantee data transfer without corruption.

There could be data corruption between Computer and the LPT Pod, because it does not implement the SIF Pod Protocol and therefore does not contain any error-correction protocol.

Data Integrity Between Pod and Slave

XAP3 SIF devices include hardware parity checking between the Master and Slave (more detail later).

Older devices such as XAP2 and XAP1 do not provide any error checking. In such devices there could be data corruption on the serial link between the SIF Pod (Master) and Slave (using SIF_CLK, SIF_MOSI, SIF_MISO over the 16-IDC ribbon interface).

It is safe to assume that the parallel loads inside the Slave between the SIF shift register and the memory bus will function correctly. This part of the Slave circuit will be correct by design. t will not change from one installation or Pod to another.

This means that if data integrity is maintained over the 16-IDC ribbon serial link, then there will not be any read or write errors between the Pod and Slave. This data-integrity may vary through time. For example, interference from switching motors or relays could cause data errors.

Error Correction

SIF does include error-correction protocols between the Computer and Pod.

SIF does not include any error-reaction between the Pod and Slave. However, the parity-checking does mean that single-bit corrupted SIF Instructions do not get executed. Such events are reported back to the Master by the error bits in the Status field Error Detection A variety of error-detection methods are used by SIF. Some are automatically implemented in the xSIF drivers (parity-checking and diagnostics). Others must be implemented at the software application level (e.g. CRC or checksum across large packets).

Parity Checking

XAP3 SIF devices include parity checking between the Master and Slave. This will expose single-bit, stuck-at-0 and stuck-at-1 faults on:

- SIF_MOSI from Master to Slave (stuck-at faults exposed by PARITY_AC)
- SIF_MISO from Slave to Master (stuck-at faults exposed by Parity_S)

The Slave will not execute a SIF Instruction if it finds a parity error in PARITY_AC (on the Address and Control fields). It will report this and other errors in the Status field returned to the Master. This means that single-bit corrupted SIF Reads will not be executed. Corrupted SIF Writes will be executed if the error is in the Data field (which is parity protected as an output, but not as an input). However, the Master will check the PARITY_D bit in the Status field, which will indicate that the data was corrupted. This tells the Master about the corrupt SIF Write after the event has taken place. The Master must then take corrective action.

The Master will always check the PARITY_D (on Data field) and PARITY_S (on Status field) bits in the Status field. This will tell the Master if the data transferred from the Slave has been corrupted (exposing all single-bit errors).

Data Integrity in Shift Registers and Cable

SIF computer applications can and should run diagnostics checks on the integrity of the serial links from Pod to Slave and back to Pod. This is possible because the SIF Slave shift register is continuous from the SIF_MOSI input to the SIF_MISO output (like JTAG, but unlike SPI and $I^2C$). This means it is possible to check that the data sent from Computer to Slave (via Pod) is the same as that received back from Slave to Computer. This is best if SIF_LOADB remains high (i.e. no read or write is performed). The SIF_CLK frequency can be increased until this test fails. This reveals the maximum frequency that the serial link can safely be run at.

Such checks can be done by the application software. They are also done automatically by the xSIF drivers when the appropriate diagnostics level is selected.

Diagnostics

The Computer can run data integrity checks on some or all (affects speed) of the data during SIF reads and writes. These checks are in addition to the parity-checks that always operate in the XAP3 SIF. The data integrity checks are performed by the driver when diagnostics is turned on (level 1=default case for all software applications). Thus the application software can continuously monitor the quality of the serial link between Pod and Slave during SIF operation. This is helpful in exposing hardware problems between the Pod and Slave.

SIF Diagnostics can be set to different levels:—

0Off

1 Run data integrity checks on all single SIF Reads and Writes (default setting)

2 Run data integrity checks on all single and multiple SIF Reads and Writes

User View of SIF Error-Handling

The SIF system (as seen from the controlling computer) will tell the user when anything is broken and make suggestions as to what it might be.

The SIF Slave does not perform any error-correction as this is too big an overhead. However, the SIF Pod and drivers do run automatic parity-checks (in XAP3 SIF) and diagnostic-checks (in all SIF devices when the Diagnostics level is set appropriately).

The SIF Pod does perform error-correction on the link to the computer, by using the CRC in each packet of the SIF Pod Protocol.

SIP Networks

The following sections show the 3 kinds of network you can have from a single SIF Pod. Even bigger networks can be built by using multiple SIF Pods. This is particularly powerful with Ethernet SIF Pods which can be physically located a long distance from the controlling computer. By using an Internet link the computer can even control SIF Slaves in remote countries.

It is possible to have multiple Computers on the network. However, at any one time:—

A SIF Slave can only be controlled by one Computer

A SIF Pod can only be controlled by one Computer

After the 3 network types, there are descriptions of the control and timing that must exist between the Master and its Slaves.

Single Master, Single Slave

Figure 11:
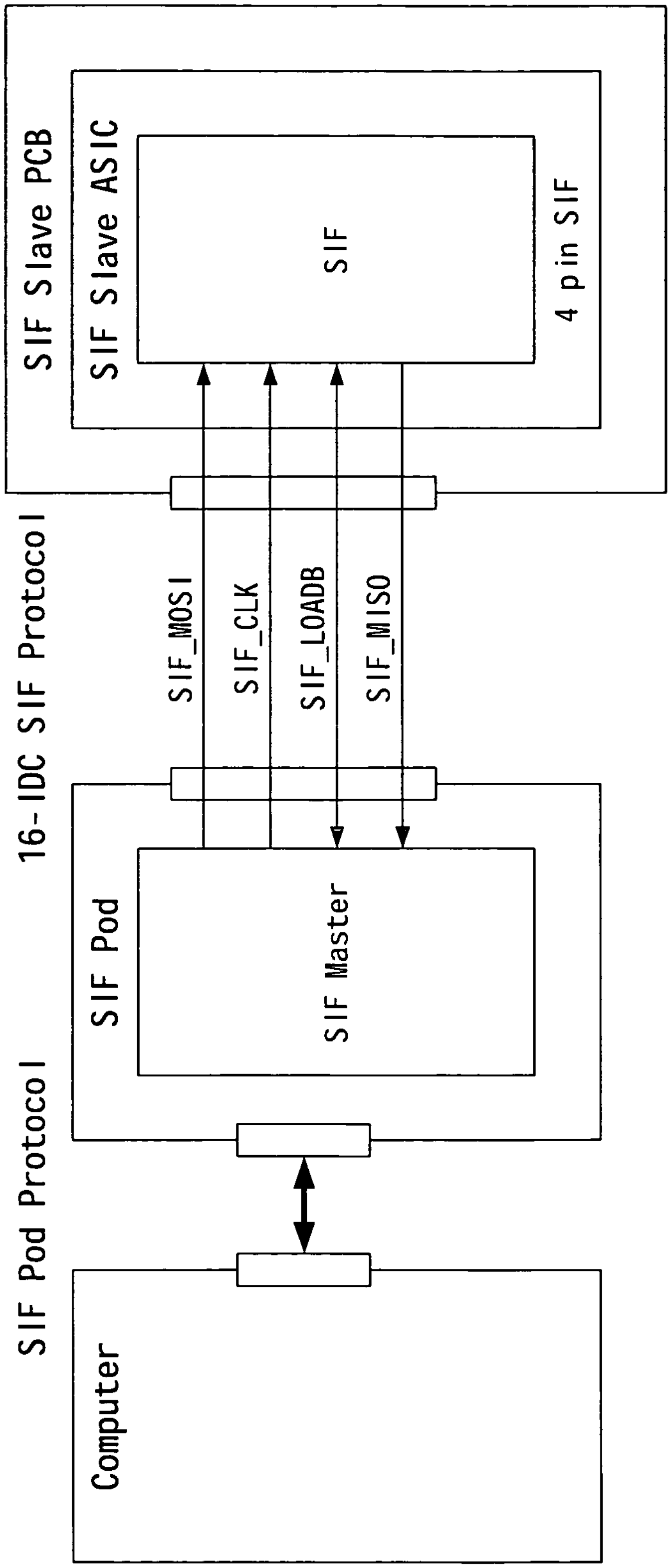
FIG. 11 shows a schematic of the single master, single slave configuration.

Without SIF_CS one can only have 1 SIF Master and 1 SIF Slave. This means that it is only possible to have one SIF Slave per SIF Pod, see FIG. 11.

Single Master, Multi Slave

Figure 12:
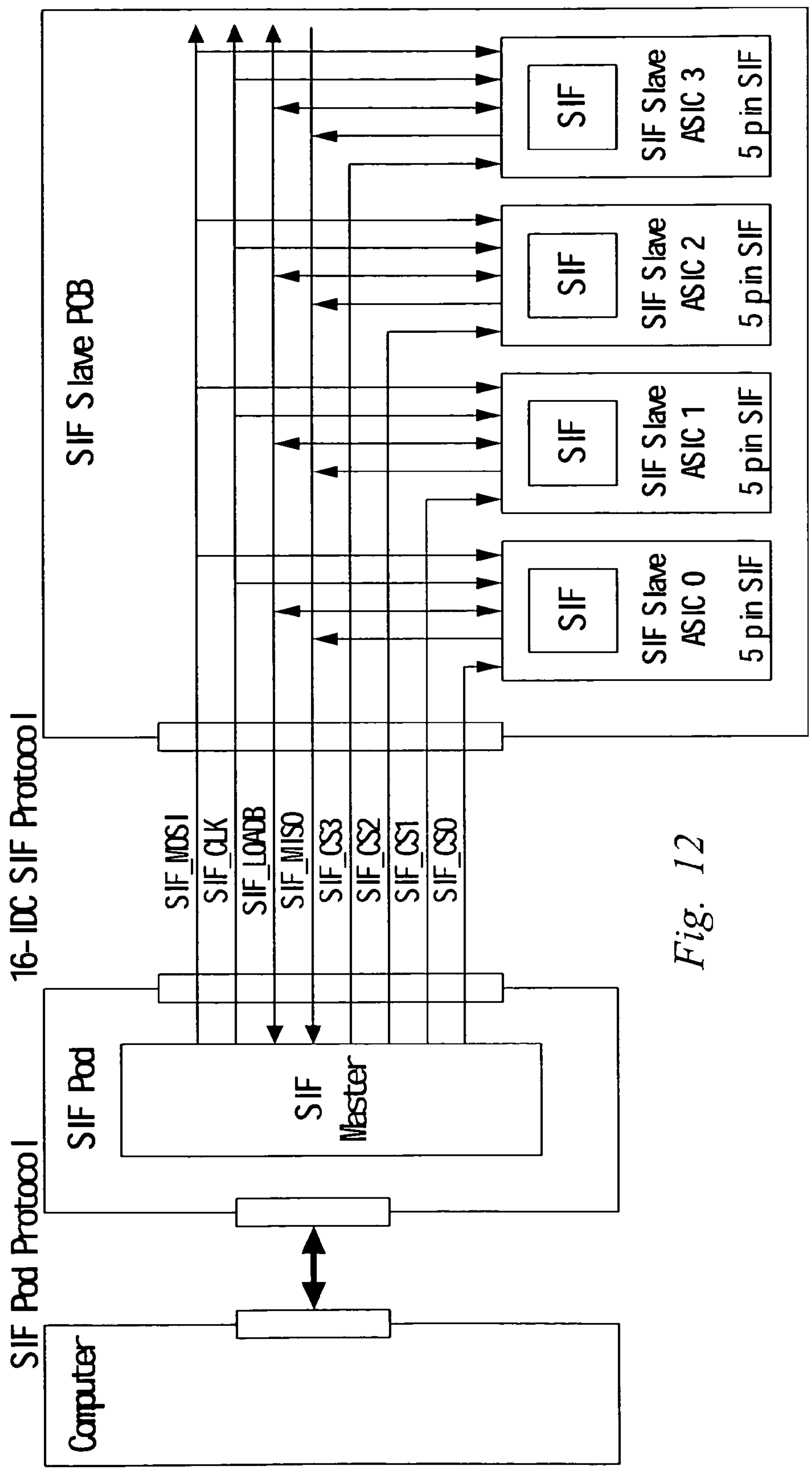
FIG. 12 shows a schematic of the single master multi-slave configuration.

If the SIF Slave ASICs have a SIF_CS input, you can have a network with 1 SIF Master (e.g. SIF Pod) and multiple SIF Slaves, see FIG. 12. The Master controls the SIF_CS inputs to each SIF Slave. SIF_MISO from each Slave is tristated when the associated SIF_CS input is low. SIF_MISO is enabled when SIF_CS is high. Thus the Master should never pull more than one SIF_CS line high at a time (or there will be contention on the SIF_MISO line).

When SIF_CS is low it does 2 things inside the Slave ASIC:

Tristates SIF_MISO

Disables SIF_LOADB

It does not affect SIF_CLK or SIF_MOSI in any way. It is still possible to clock new data into the SIF Shift Register even if SIF_CS is low. However, SIF_MISO will be tristated so this output will be high impedance even if the SIF Shift Register is clocked.

If SIF_CS is low, the Slave will ignore SIF_LOADB when it is pulled low by the Master. The Slave will not latch SIF_LOADB low and will not queue up a SIF Transfer for the next SIF cycle.

When SIF_CS is high it enables the SIF inside the Slave ASIC:

Enables SIF_MISO

Enables SIF_LOADB

Multi Master, Mufti Slave

Figure 13:
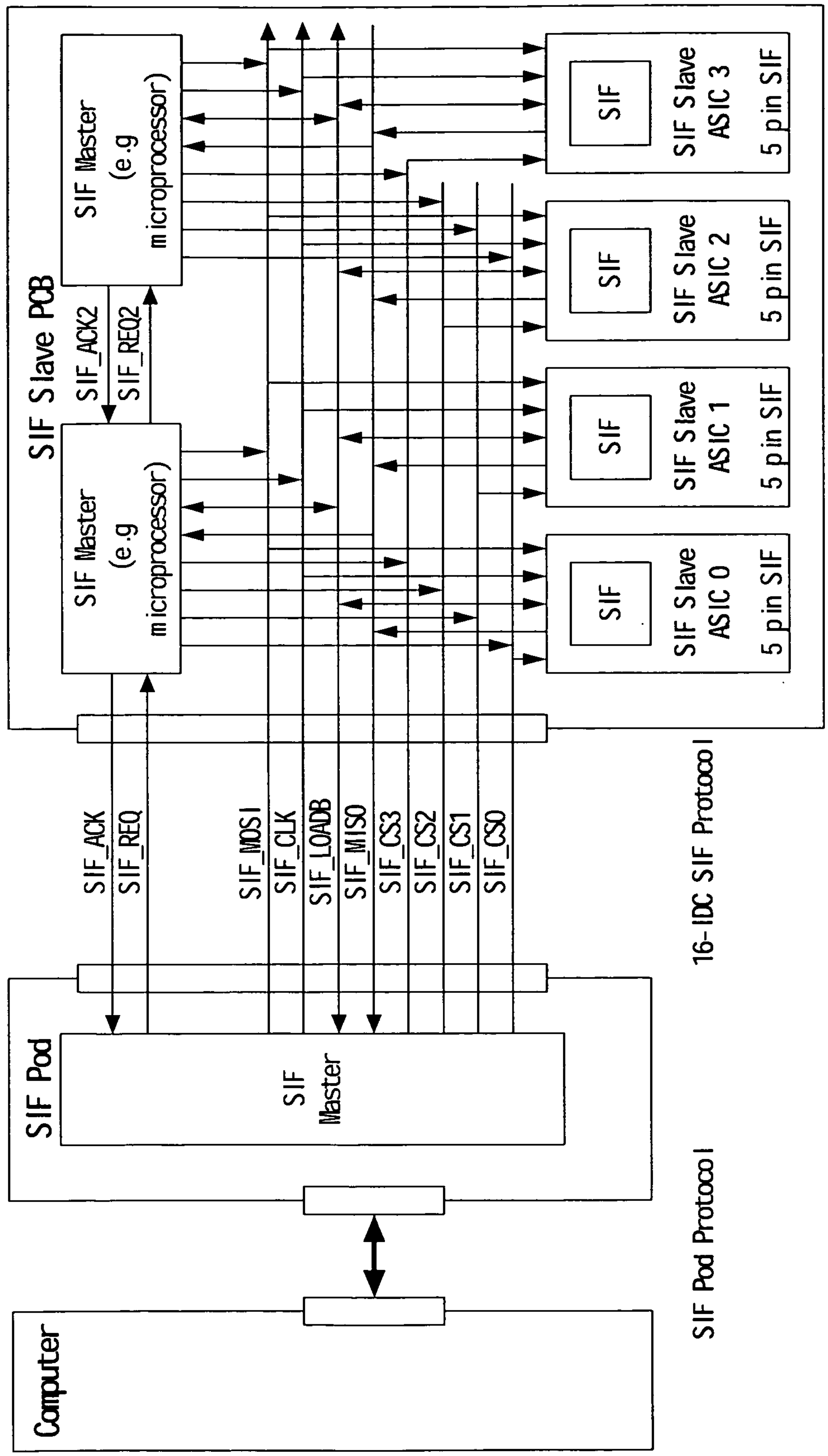
FIG. 13 shows a schematic of a multi-master, multi-slave configuration.

This configuration is not often used. It is useful when the end product contains a microprocessor and a SIF Slave ASIC, see FIG. 13. In this situation, the SIF Master can be the microprocessor or the SIF Pod. It allows the SIF Pod to negotiate with the microprocessor to decide who should have control of the SIF (thus enabling communication with the SIF Slaves). This is done with 2 signals:—

SIF_REQ (request from Pod to Microprocessor)

SIF_ACK (acknowledge from microprocessor to Pod)

When the SIF Pod wants to control of the SIF it:—

Pulls SIF_REQ high

Waits for SIF_ACK to go high

Enables its SIF signals (SIF_CS, SIF_CLK, SIF_MOSI, SIF_LOADB)

Performs its SIF Operations

When the SIF Pod wants to relinquish control of the SIF it:—

Tri-states its SIF signals (SIF_CS, SIF_CLK, SIF_MOSI, SIF_LOADB)

Pulls SIF_REQ low

Waits for SIF_ACK to go low

If there is more than one SIF Master on the SIF Slave PCB, then they should be daisy chained using extra SIF_REQ and SIF_ACK signals as shown in the diagram above.

Shift Registers and Clocks in Master and Slave

Figure 14:
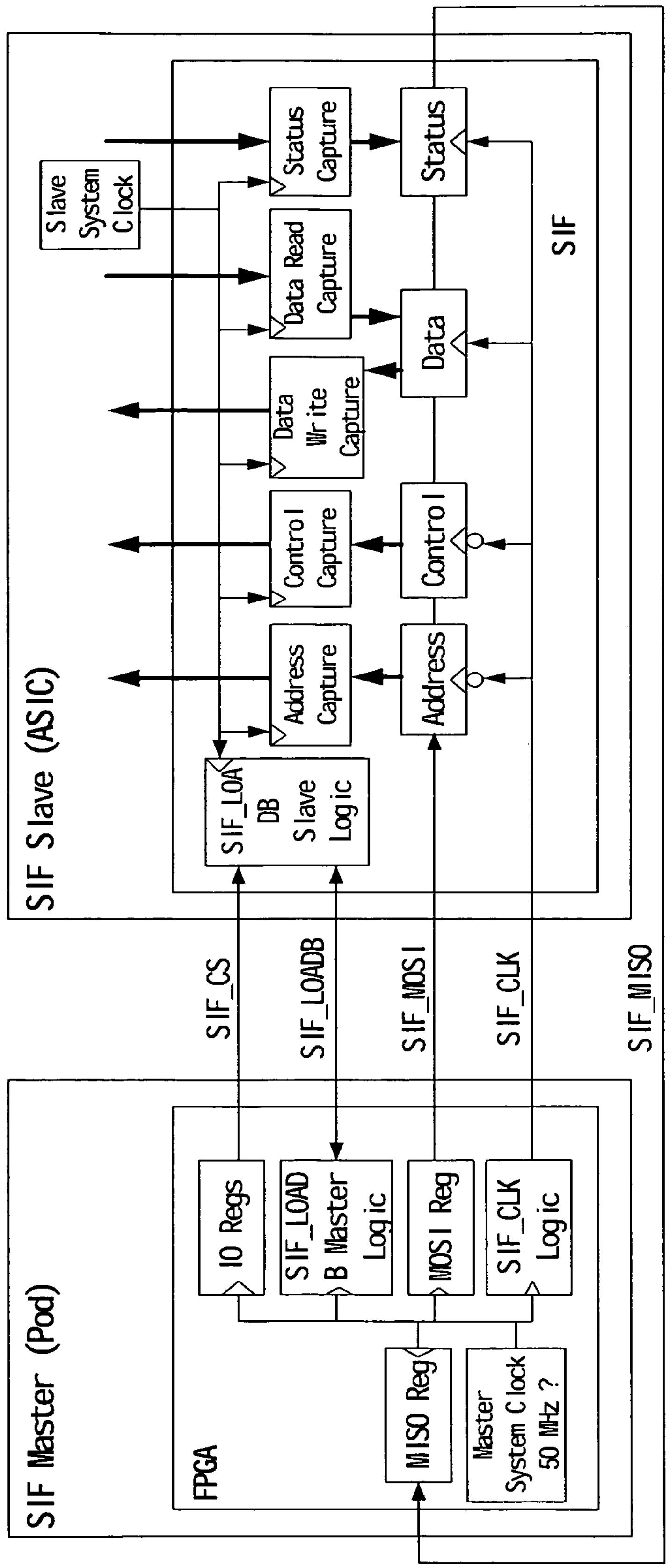
FIG. 14 shows how information is sent from the Master to the Slave and how it receives information back from the Slave on SIF_MISO.

FIG. 14 shows how information is sent from the Master to the Slave and how it receives information back from the Slave on SIF_MISO. The whole process is controlled by the Master. The SIF Operations are never initiated by the SIF Slave. The SIF Slave only responds to requests from the SIF Master.

This diagram also shows how clocks are used in the Master and Slave:—

SIF_CLK is generated by the Master. It is not used as a clock inside the Master.

SIF_CLK is used as a clock by the 4 shift register fields in the Slave; Address and Control on negedge, Data and Status on posedge.

Everything in the Master is clocked by its System clock. This will be a fast continuous running clock (probably 50 MHz).

SIF_MOSI and SIF_CLK change on posedge MasterSystemClk. SIF_MOSI changes at the point where a posedge is generated on SIF_CLK.

SIF_MISO is sampled into the Master on posedge MasterSystemClk. The sample can occur at any time on or after negedge SIF_CLK, but must be before posedge SIF_CLK. The fastest shift frequencies will be achieved if this sample point is as late as possible. In practise this means that the sample should be on the last posedge MasterSystemClk before posedge SIF_CLK.

Shift Register Timing Delays Between Master and Slave

Figure 15:
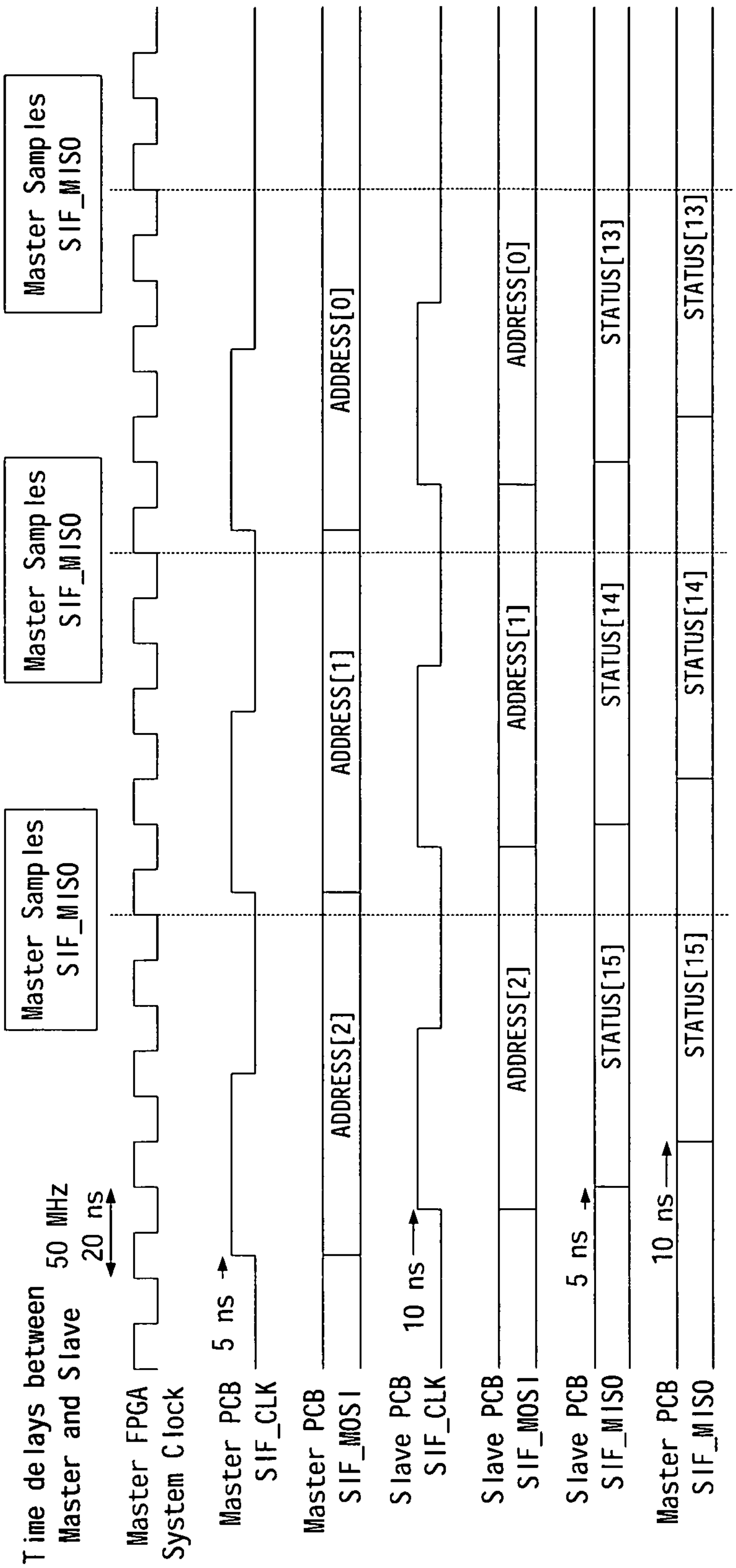
FIG. 15 shows a SIF Operation between the Master and Slave.

FIG. 15 shows a SIF Operation between the Master and Slave where:—

Only 3 bits are shifted. ADDRESS[2:0] from Master to Slave on SIF_MOSI. STATUS[15:13] from Slave to Master on SIF_MISO.

Master System Clock=50 MHz (period=20 ns). This means that the fastest SIF_CLK available is 25 MHz SIF_CLK=12.5 MHz (period=80 ns).

Silicon delay from Master System Clock to SIF_MOSI and SIF_CLK=5 ns.

Cable delay from Master to Slave on SIF_MOSI and SIF_CLK=10 ns.

Silicon delay from SIF_CLK to SIF_MISO in Slave=5 ns.

Cable delay from Slave to Master on SIF_MISO=10 ns.

The delay times are estimated and will vary from system to system. This shows the best time for the Master to sample SIF_MISO in red.

The Master and Slave can be thought of as one continuous shift register. However it is not symmetrical as SIF_CLK is generated in the Master. Shift registers go wrong if the clock to a downstream bit is late. They do not go wrong if the clock to a downstream bit is early. This is why it is safe to sample SIF_MISO in the Master almost on posedge SIF_CLK. It would not be safe to sample SIF_MOSI in the Slave on posedge SIF_CLK, which is why it is actually sampled on negedge SIF_CLK. So the summary operation of the Master and Slave shift Registers are:—

Master output SIF_MOSI changes on posedge SIF_CLK (though SIF_MOSI is not clocked by SIF_CLK).

Slave output SIF_MISO changes on posedge SIF_CLK.

SIF_MOSI is sampled into Slave on negedge SIF_CLK.

SIF_MISO is sampled into Master just before posedge SIF_CLK.

Master-Slave Handshake on SIF_LOADB

Figure 16:
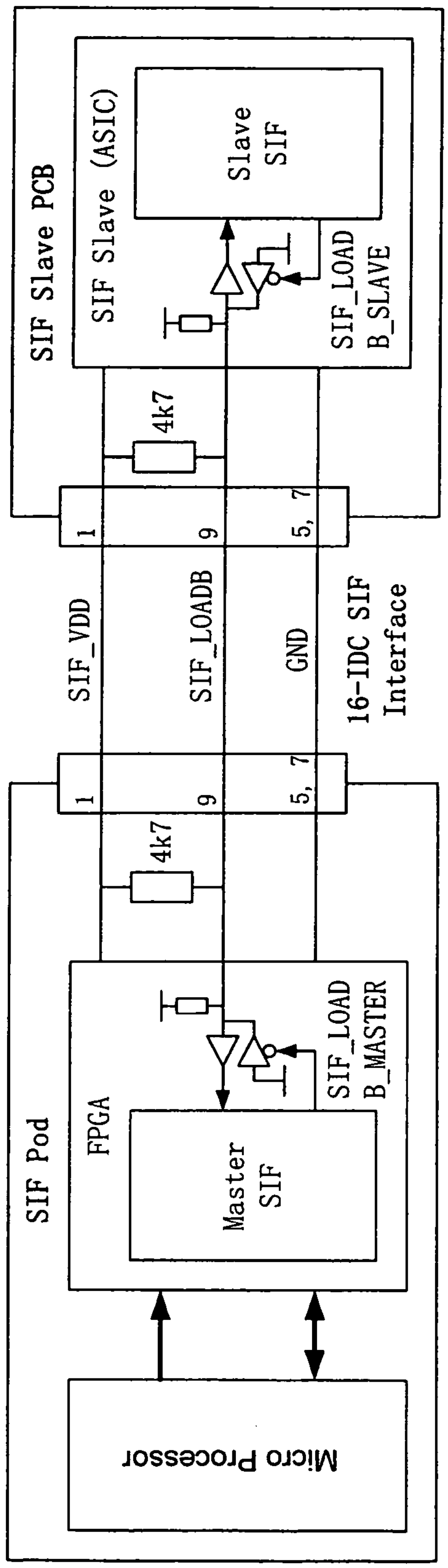
FIG. 16 shows the SIF_LOADB bidirectional handshaking signal between the SIF Master and the SIF Slaves.

SIF_LOADB is the bidirectional handshaking signal between the SIF Master and the SIF Slaves, see FIG. 16. The SIF_LOADB pins in Master and Slaves are open-drain bidirectionals with pullup resistors. In addition there is a pullup resistor (normally 10 k ohm) on the wire between the Master and Slaves. SIF_LOADB can be pulled low by the SIF Master or any SIF Slave.

SIF_LOADB is active-low. It is high when the SIF is not being used or when the SIF Master is shifting data to and from the SIF Slave. When SIF_LOADB is high, the Master can shift data through the Slave's shift register as much as it likes (taking care not to invoke Command mode!). Nothing will happen in the SIF Slave until the SIF Master pulls SIF_LOADB low.

A SIF Instruction (Read or Write) consists of 3 phases:—

SIF Master shifts the SIF request into the {Address, Control, Data} fields of the SIF Slave shift register.

Handshake between SIF Master and SIF Slave using the SIF_LOADB signal.

SIF Master shifts the SIF result out of the {Data, Status} fields of the SIF Slave shift register.

During the handshake phase, the SIF Master must:—

Hold SIF_CS high

Hold SIF_CLK low

Not change the value on SIF_MOSI

The handshake phase consists of:—

SIF Master pulls SIF_LOADB_MASTER low to indicate that the SIF shift register fields are correctly formatted and that the SIF Slave should perform the requested SIF Read or SIF Write. The Master must hold SIF_LOADB-_MASTER low for at least 3 CLK cycles (CLK=SIF Slave system clock). It is safe to assume that CLK frequency is always >1 MHz. Therefore 3 us is the longest SIF_LOADB pulse time ever needed.

SIF Master stops pulling SIF_LOADB_MASTER low. SIF_LOADB will remain low because of the SIF Slave.

SIF Slave holds SIF_LOADB low until it has completed the requested SIF Read or SIF Write. If the selected SIF Processor is running, this will not be until a SIF or SLEEPSIF instruction is executed. When the SIF Slave stops pulling SIF_LOADB low, the signal will return high (because of the pullup resistor on SIF_LOADB).

When the SIF Master sees SIF_LOADB go high, it knows that the requested SIF Read or Write has been completed. This means that it is able to proceed to the next shift phase.

If the SIF Master continues to pull SIF_LOADB low after the SIF Slave has let go, the SIF Slave will not perform any further SIF Instructions. The SIF Slave cannot perform another SIF Instruction until it sees SIF_LOADB go high and then low again.

Protection, Termination and Buffering Between Master and Slave

Figure 17:
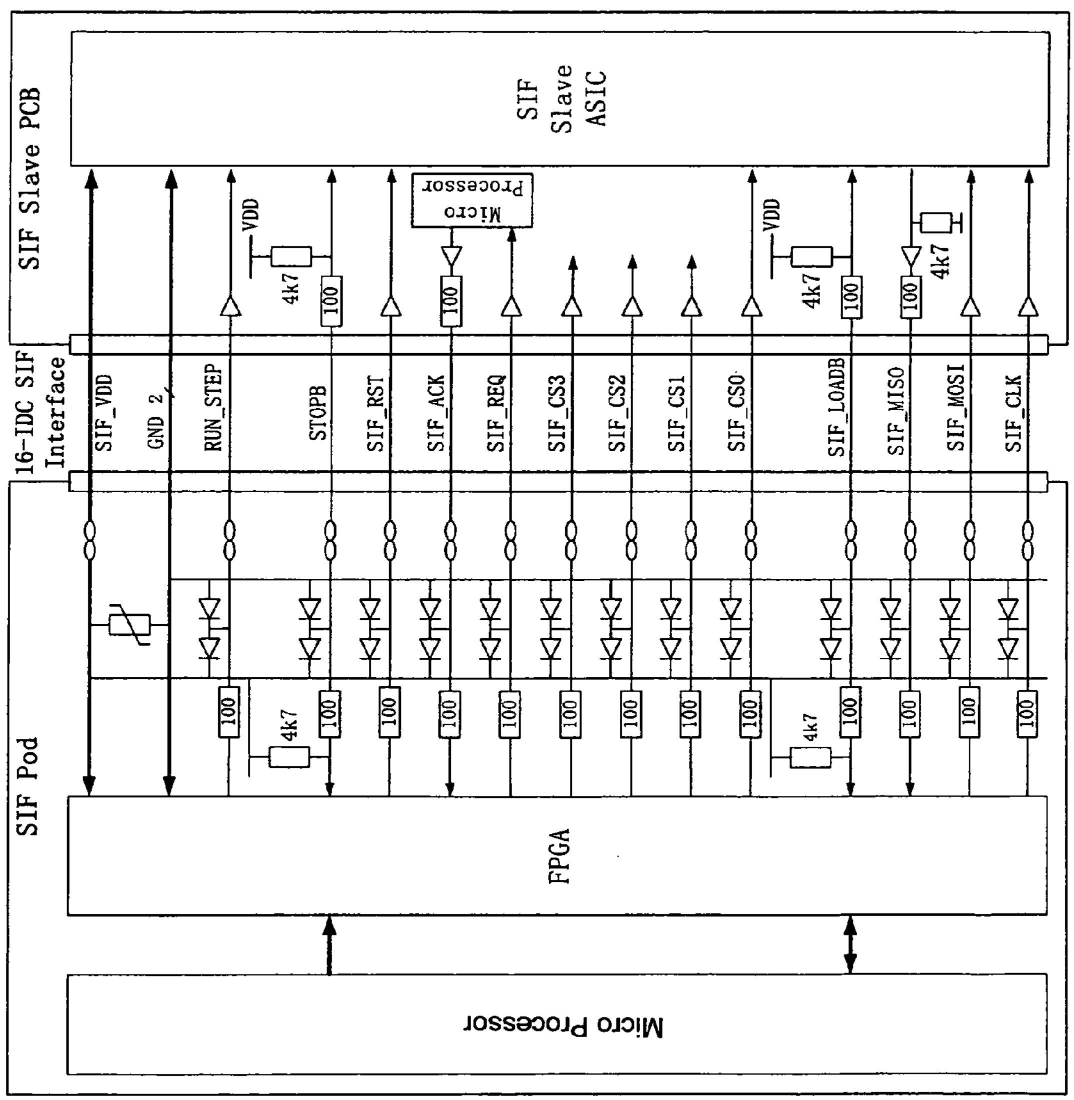
FIG. 17 shows the ESD/high voltage protection, buffering and termination that should be used in the Pod and Slave.

FIG. 17 shows the ESD/high voltage protection, buffering and termination that should be used in the Pod and Slave. The diagram shows all 13 SIF signals being used in the Slave PCB. In most cases it will only be the bottom 4 or 5 SIF signals that are actually used:

SIF_CS is not always implemented in the SIF Slave.

SIF_REQ and SIF_ACK are only used for Multi-Master systems (which is rare).

SIF_RST is not normally needed (reset instructions can be sent over the 4 main SIF signals).

STOPB and RUN_STEP are only needed for XAP1 They are not used by XAP2 or XAP3.

It was mentioned earlier that the circuitry required in the Pod is a compromise between the ESD/high voltage requirements and the termination requirements. The above scheme shows how the 13 signal pins are protected by a 100 ohm resistor, diodes (to SIF_VDD and GND) and a polyswitch fuse. Component numbers and values are given in section 9 on the SIF Master.

The Slave PCB is shown with buffers for all signals. These are recommended for FTB (Functional Test Board) and ATB (Analogue Test Board). They are not mandatory for production boards. The benefit of the buffers is:—

Good drive capability.

Protects ASICs from EMC on the cable.

Known speeds over various lengths of cable.

Maintain point-to-point cable connections even for multiple SIF Slaves.

The preferred buffers are NC7NZ17 in the US8 package. This is Fairchild TinyLogic. Each Spin pack contains 3 non-inverting buffers. They can deliver 24 mA and have a propagation time of 3.6 ns (typical) into a 50 pF load. They are rated for operation over −40 to +85 deg C. There may be some cases where an ATB needs to use a different buffer if the environmental test chamber needs to go above +85 deg C. (sometimes we need +125 deg C.). These devices are very fast and therefore must have good decoupling capacitors between SIF_VDD and GND (e.g 100 nF, 0603, X7R). Without this there will be interference on SIF_VDD when the buffers switch.

A 4k7 pulldown resistor is shown at the input to the SIF_MISO buffer. This is needed if the SIF Slave ASIC has a SIF_CS input pin, which tri-states the SIF_MISO ASIC output. The resistor prevents the buffer input from floating to mid-rail.

SIF Slave

A SIF slave is normally implemented as an ASIC or FPGA.

SIF slaves can operate in Normal or Command mode. All SIFs support Normal mode. The only design to support Command mode as of January 2005 is the XAP3.

The shift register length for Normal mode can vary from one slave design to another.

The shift register length for Command mode is always 8 bits. Command mode operates identically across all SIF slaves. It enables the SIF Master to discover the SIF configuration details of the SIF slaves in Normal mode (e.g shift register field lengths).

Block Diagram

Figure 18:
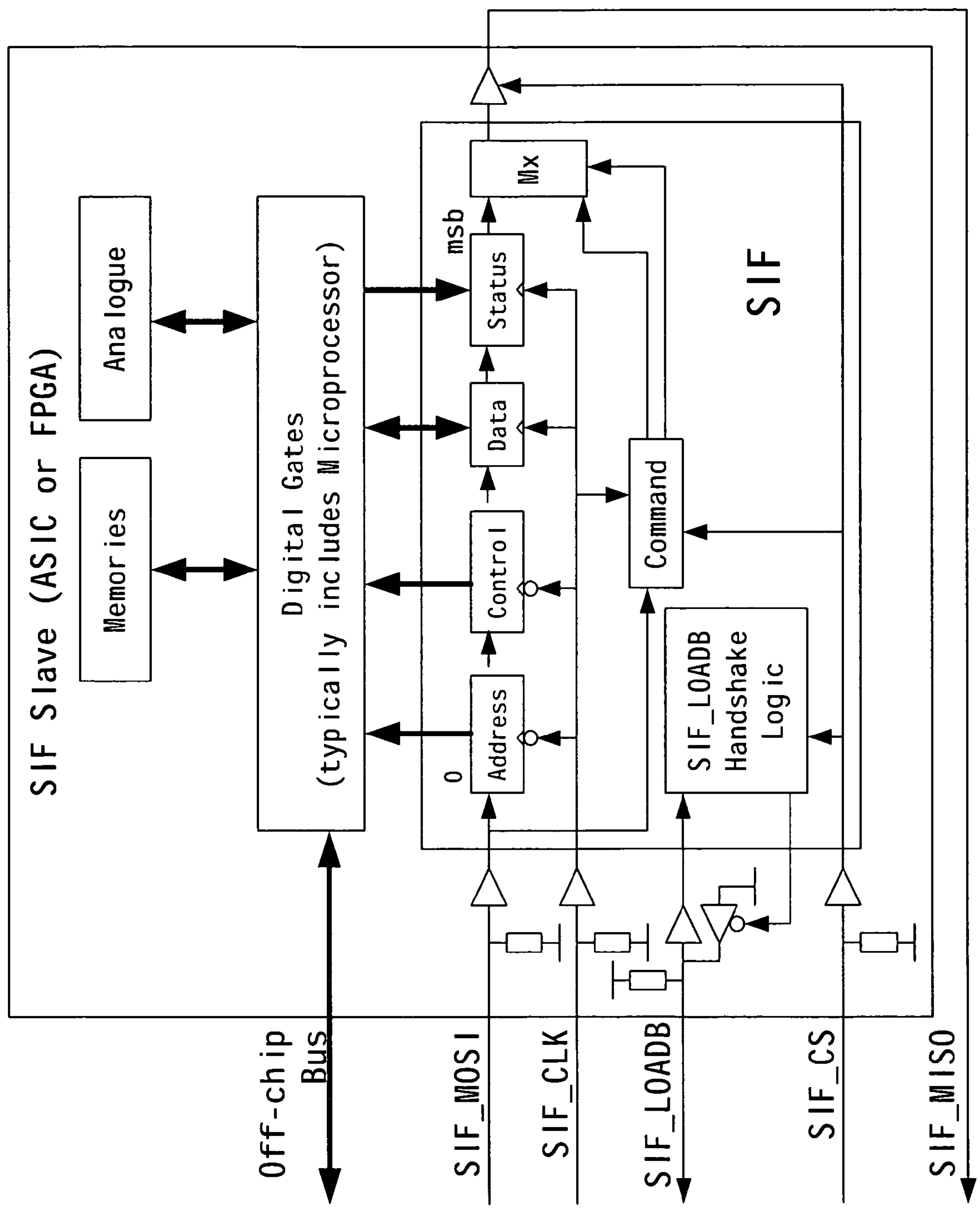
FIG. 18 shows a block diagram of a SIF slave.

FIG. 18 shows a block diagram of a SIF slave. The non-shaded blocks within it are for Normal mode. The shaded blocks within the SIF are for Command mode.

SIF Slave Containing Multiple SIF Processors

Figure 19:
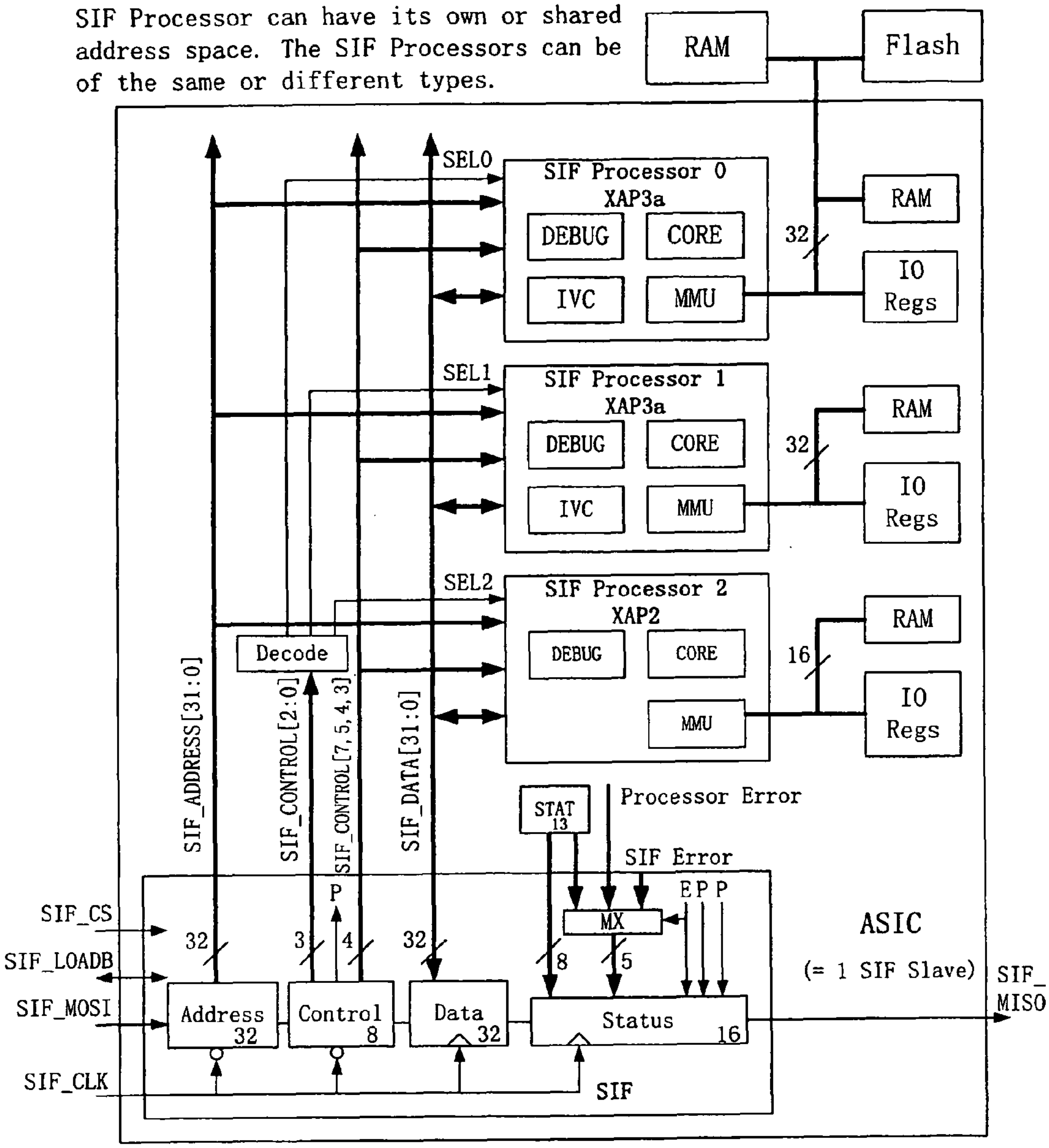
FIG. 19 shows a SIF Slave with 1 SIF interface and multiple processors.

A SIF Slave should only ever contain 1 SIF interface. However, this can support several processors, as shown in FIG. 19. These processors can be of different types. The default SIF supplied with the XAP3 supports up to 8 on-chip SIF Processors.

SIF Pins

More information on the SIF pins and pad types is given in section 3 on the 16-DC SIF Interface.

An ASIC (SIF Slave) containing the SIF will have the following pins:

| SIF Signal | Driven By | Description |
|---|---|---|
| SIF_CS | Master | Chip Select (active high) |
| SIF_LOADB | Master & Slave(s) | Handshake signal (active low) |
| SIF_CLK | Master | Clock |
| SIF_MOSI | Master | Master Out, Slave In (data) |
| SIF_MISO | Slave(s) | Master In, Slave Out (data) |

SIF Slave Pin Order for Package and Silicon Die

Most ASIC packages have pins identified by a single number (QFP, QFN, PLCC, TSOP, SOIC, DIL, etc). The SIF signals should be allocated to package pins in the following order:

TABLE 9

| SIF Signal | Package pin number | Silicon die pad number |
|---|---|---|
| SIF_CS | M | N |
| SIF_MISO | M + 1 | N + 1 |
| SIF_MOSI | M + 2 | N + 2 |
| SIF_CLK | M + 3 | N + 3 |
| SIF_LOADB | M + 4 | N + 4 |

Similarly the SIF pads should all be contiguous and in this order on the silicon die. The pin and pad numbers are expected to increase in an anti-clockwise direction when looking down on the package or silicon die.

BGA packages have pins in a 2D grid of rows and columns. Consequently they use pin names of the form B14. The SIF Pads should be allocated to the BGA pins in a sensible manner, given the above constraint on pad positions on the silicon die.

Sharing SIF Pins with JTAG 3 of the SIF pins can be shared with JTAG pins as follows:

TABLE 10

| SIF Pin | JTAG Pin | Comment |
|---|---|---|
| SIF_CS | | |
| SIF_LOADB | | |
| SIF_CLK | TCK | |
| SIF_MOSI | TDI | Sampled on posedge TCK |
| SIF_MISO | TDO | Changes on negedge TCK |
| | TMS | extra pin |

Separate JTAG controller logic should be included inside the ASIC. This will use the clock edges as defined above (which is the opposite from normal SIF operation):

JTAG samples input on posedge TCK, changes output on negedge TCK

SIF samples input on negedge SIF_CLK, changes output on posedge SIF_CLK.

SIF leaves SIF_CLK low when not being used. This means that:

First edge (posedge) changes the Master and Slave outputs

Second edge (negedge) samples the Master and Slave inputs.

JTAG can use a free running TCK (operation controlled by TMS) or a gated TCK. In the gated case, TCK is low when not used. This is different from SIF and means that:

First edge (posedge) samples the Master and Slave inputs

Second edge (negedge) changes the Master and Slave outputs.

Most JTAG interfaces use a 14-IDC or 20-IDC connector. This often contains TCK_RET. This is a returned clock from the Slave to the Master. TCK is synchronised with the Slave system clock. The Master operates a hand-shaking system called Adaptive Clocking where it won't generate posedge TCK until it receives negedge TCK_RET. Similarly the Master won't generate negedge TCK until it receives posedge TCK_RET. This enables the Slave to slow down the Master, which is sometimes necessary if the Slave is in a slow low-power mode. However it does reduce the maximum shift rate for the JTAG interface.

None of this is necessary in SIF because the SIF shift register is completely asynchronous from the Slave's system clock. The handshaking between Master and Slave is handled by the SIF_LOADB signal. This means that even when the Slave is in a slow low power mode, the Master can still use the fastest shift rates to communicate with the Slave.

Sharing SIF Pins with Scan Path 3 of the SIF pins can be shared with Scan Path pins as follows:

TABLE 11

| SIF Pin | Scanpath Pin | Comment |
|---|---|---|
| SIF_CS | | |
| SIF_LOADB | | |
| SIF_CLK | scan_clk | |
| SIF_MOSI | scan_in | Sampled on posedge scan_clk |
| SIF_MISO | scan_out | Changes on negedge scan_clk |

Shift Register Fields

The SIF shift register consists of 4 fields. The length of these fields can each be from 0 to 32 bits. This is a property of the slave design & remains fixed. The Computer and SIF Master must know the lengths of these 4 fields in order to communicate with the SIF Slave. This is either known by manual configuration or (on newer designs) by auto-discovery using SIF Commands.

For all 4 fields, data is shifted in and out MSB first. The order of the 4 shift register fields in the SIF Slave from input to output must always be:—

SIF_MOSI pin

Address field

Control field

Data field

Status field

SIF_MISO pin

Address Field

The Address field is an output from the SIF Master and an input to the SIF Slave. Address steps are in the same units as those used by the selected SIF Processor in the SIF slave. e.g.:—

XAP1 and XAP2 addresses represent 16 bit steps.

XAP3 address represents 8-bit steps (i.e. byte-addressing).

Control Field

The Control field is an output from the SIF Master and an input to the SIF Slave. It can include several different signals, which from LSB to MSB must be in the following order:

TABLE 12

| Position | Bits | XAP usage | Comment |
|---|---|---|---|
| LSB | PROG_DATAB | XAP1, XAP2 | Specifies Program or Data space for Harvard architecture processors. |
| | PROCESSOR | XAP3 | Selects processor/address space. Used for multiple processor/address spaces within a single SIF slave. XAP3 has 3 bits to support up to 8 processors in the same SIF slave. |
| | DEBUG | XAP2, XAP3 | 0 = Normal SIF Instruction<br>1 = Debug SIF Instruction |
| | SIZE | XAP2, XAP3 | Specifies size of Data word for Read or Write. |
| | PARITY_AC | XAP3 | Odd Parity (odd number of 1s) on Address and Control fields (including the parity bit itself). If used, must be MSB-1 of the Control field. |
| MSB | WRITE | XAP1, XAP2, XAP3 | Write must always be the MSB of the Control field. Can be active high or active low (depends on slave design). |

The length of the Control field is defined to include the PARITY_AC and WRITE bits. Many functions in the xSIF API pass a Control argument. Such Control arguments should:

Not include the WRITE bit in SIF Read and Write functions (as the function already implies the required value for the WRITE bit).

Include the WRITE bit in SIF Cycle functions (as they can be used generically for SIF reads and writes).

Similarly with the PARITY_AC bit, Control arguments in the xSIF API should:

Not include the PARITY_AC bit in SIF Read and Write functions (as the xSIF driver will automatically generate the PARITY_AC bit).

Include the PARITY_AC bit in SIF Cycle functions (as they should be able to explicitly set all bits, causing parity errors or not, as desired).

Data Field

The Data field for a SIF Write is an output from the SIF Master and an input to the SIF Slave.

The Data field for a SIF Read is an output from the SIF Slave and an input to the SIF Master.

The memory or register that the data is written to or read from depends on the Address and Control fields used for the SIF Instruction.

The Shift Register Data field should only be updated for valid SIF Reads. It should not be updated for SIF Writes or any SIF Error.

Status Field

The Status field is always an output from the SIF Slave and an input to the SIF Master (regardless of whether it is a SIF read or a write). The Shift Register Status field is updated after all completed (i.e complete SIF_LOADB handshake) SIF Instructions (valid or error).

The value of the Status field is independent of the Address and Control fields. It is normally updated with an internal hardware register, STAT[ ] and error information on the success of the SIF Instruction.

The SIF Slave hardware module (Verilog) has an input bus for STAT[ ] that feeds into the Status field. The hardware designer can decide what information should be connected to this bus. Examples include:

TimeStamp. i.e a counter (say 20 kHz) that will indicate the exact time at which the SIF read or write took place. LSB=Highest frequency bit of Counter.

Memory-mapped register. SIF Status information can be selected by on-chip software (which can be changed after the silicon is fixed).

The Status field is an output from the SIF Slave and an input to the SIF Master. It can include several different signals, which from LSB to MSB must be in the following order:

TABLE 13

| Position | Bits | XAP usage | Comment |
|---|---|---|---|
| LSB | STAT | XAP1, XAP2, XAP3 | Hardware register in ASIC. Often used as a TimeStamp (with bit-0 as the highest frequency bit). |
| | ERROR_CODE | XAP3 | Details the SIF or Processor Error |
| | ERROR_TYPE | XAP3 | 0 = SIF Error<br>1 = Selected Processor Error |
| | ERROR | XAP3 | 0 = No error in SIF Instruction<br>1 = SIF Instruction could not be executed as there was a SIF or Processor error. |
| | PARITY_D | XAP3 | Odd Parity (odd number of 1s) on Data field (including the parity bit itself). If used, must be MSB-1 of the Status field. |
| MSB | PARITY_S | XAP3 | Odd Parity (odd number of 1s) on Status field (including the parity bit itself). If used, must be MSB of the Status field. |

If there is no error, the ERROR_TYPE and ERROR_CODE fields can be used for higher bits in STAT[]. .

PARITY_D and PARITY_S are set by the SIF Slave and checked by the SIF Master. PARITY_D should be set first. PARITY_S is set afterwards and covers the whole Status field (i.e includes PARITY_D).

XAP and APE Processors

The XAP1, XAP2 and XAP3 processors all include a SIF interface. The APE1 and APE2 processing engines normally contain a SIF interface. The standard lengths for these SIF implementations are:—

TABLE 13

| Processor | Address Bits | Control Bits (inc Write Bit) | Data Bits | Status Bits | Total Bits | Active Write |
|---|---|---|---|---|---|---|
| XAP1 | 16 | 2 | 18 | 0 | 36 | 0 |
| XAP2 | 24 | 8 | 32 | 0 | 64 | 0 |
| XAP3 | 32 | 8 | 32 | 16 | 88 | 1 |
| XAP4 | 16 | 8 | 16 | 12 | 52 | 1 |
| XAP5 | 24 | 8 | 32 | 20 | 84 | 1 |
| APE1 | 15 | 1 | 32 | 0 | 48 | 1 |
| APE2 | 15 | 1 | 16 | 0 | 32 | 0 |

Verilog RTL Implementation

This describes the Verilog xsif module stored in the CCL CVS ASIC Repository.

The SIF Slave implementation below is for a XAP3. Of course it can be scaled to have different field lengths (Address, Control, Data, Status) for other SIF Slave devices.

This circuit uses 2 clocks:

SIF_CLK—used for Shift register and SIF Command logic.

CLK (=SIF Slave system clock)—used for SIF_LOADB logic and the Capture registers for Address, Control, Data_Write, Data_Read and Status.

Figure 20:
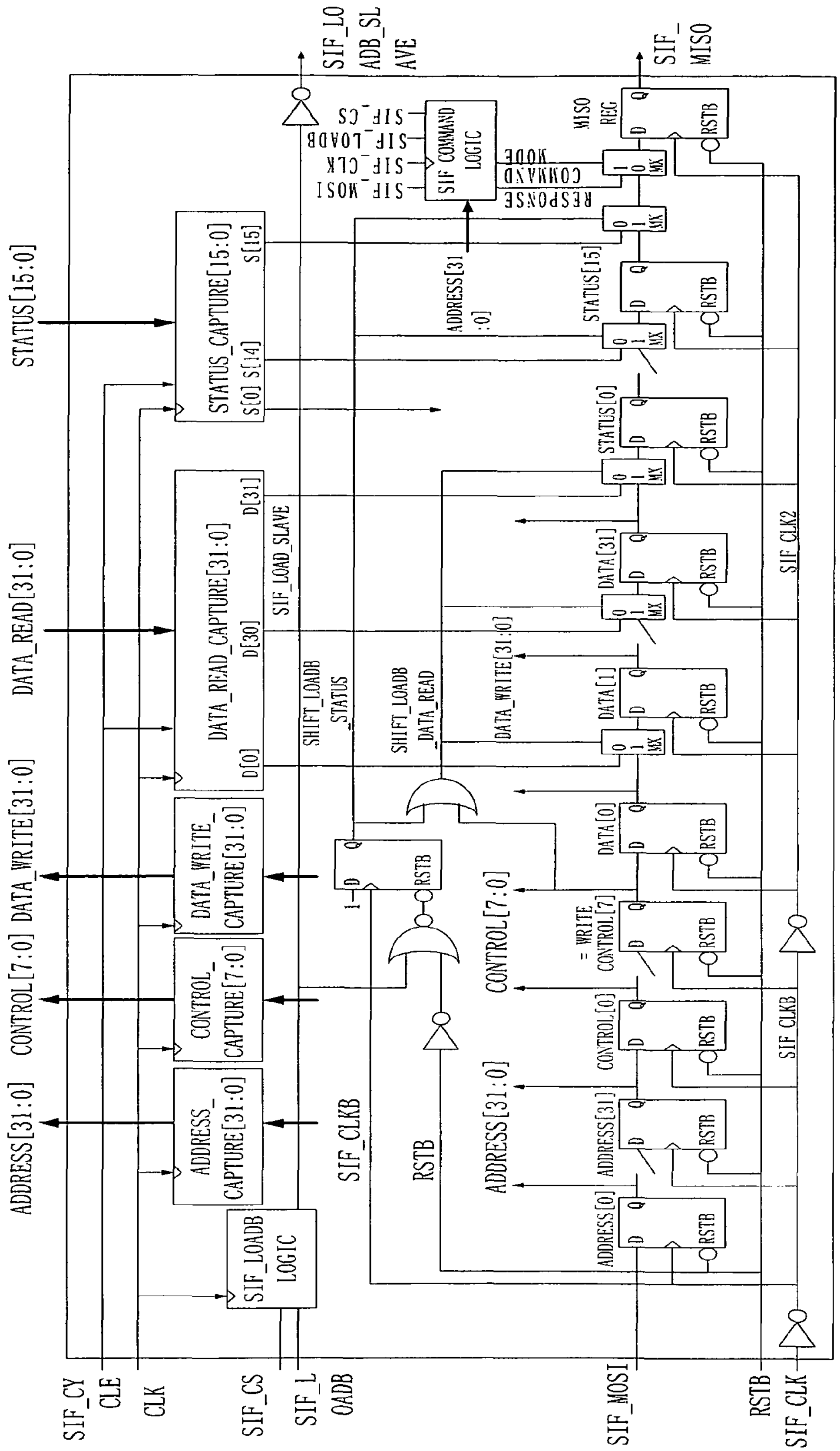
FIG. 20 shows a circuit diagram.

This circuitry must work whether SIF_CLK is faster or slower than CLK, see FIG. 20.

The shift-in and shift-out phases are only clocked by SIF_CLK (do not use CLK at all).

The handshake (SIF_LOADB pulse) phase is only clocked by CLK. Negedge SIF_LOADB is detected synchronously with CLK. Thus SIF_LOADB_SLAVE is clocked by CLK.

After negedge SIF_LOADB has been detected, the Address, Control and Data shift registers are copied to the Address, Control and Data_Write capture registers (which are clocked by CLK). This means that the shift register can be clocked by SIF_CLK afterwards (e.g for a SIF Cancel) without corrupting the Address, Control and Data_Write fields used for the SIF Instruction (in case it is executed before the SIF Cancel has completed).

The Address and Control fields are clocked on negedge SIF_CLK. They always operate as a shift register.

Figure 21:
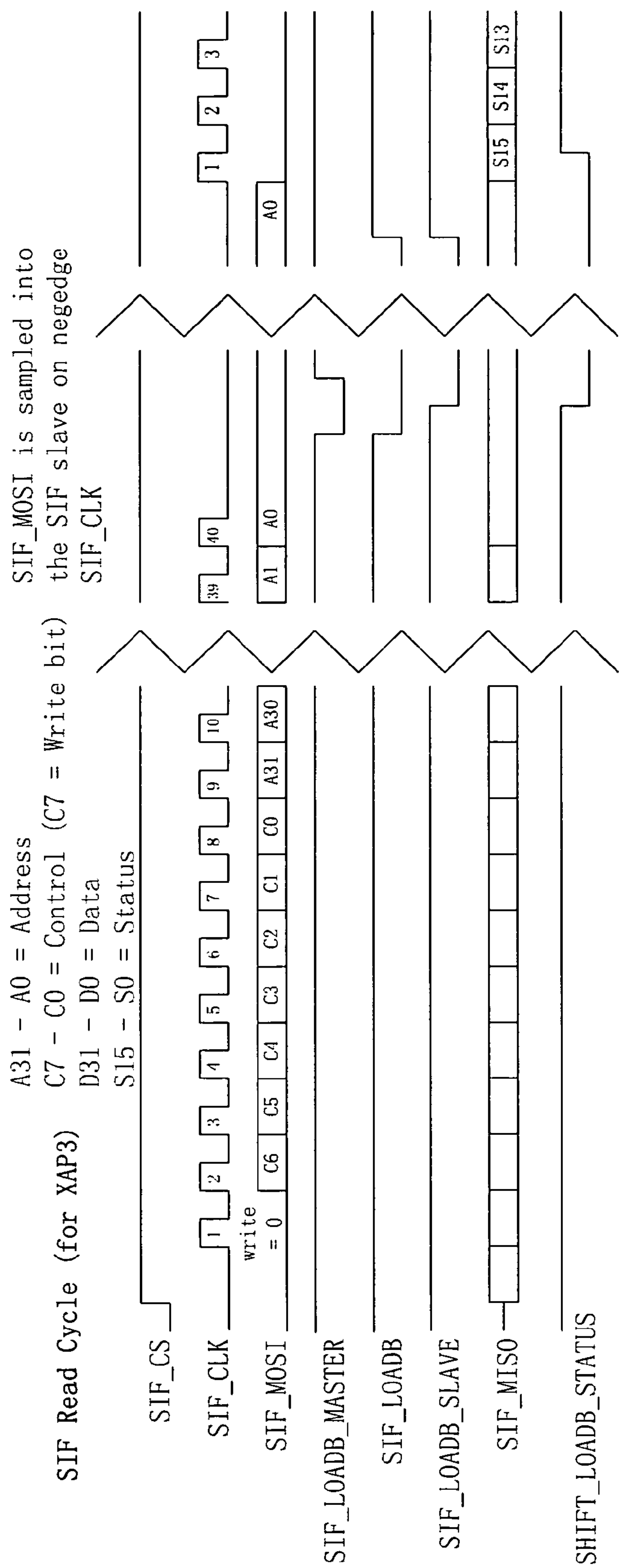
FIG. 21 shows the SIF read cycle (for XAP3)

The Data and Status fields and MISO REG flipflop are clocked on posedge SIF_CLK. They normally operate as a shift register. However, they sometimes do a parallel load from the Data_Read and Status Capture registers. These occur on the first posedge SIF_CLK after posedge SIF_LOADB, see FIG. 21:—

Happens for Data field for valid SIF Reads only (controlled by SHIFT_LOADB_DATA).

Always happens for Status field (controlled by SHIFT-_LOADB_STATUS).

When a parallel load happens, the Capture register bits are shifted up by one bit, when fed into the Data and Status fields. This means that there is never a parallel load into DATA[0]. DATA[0] always acts as a shift register, taking its input from CONTROL[MSB].

The 2 SHIFT_LOADB_* control signals:

Go low on negedge SIF_LOADB_SLAVE (synchronous to CLK)

Go high on first negedge SIF_CLK after posedge SIF_LOADB_SLAVE.

SIF Slave PCB

Strategies

This section contains several diagrams that show the extra components that should be placed on the SIF Slave PCB for the most common configurations of SIF Slave ASICs. These use the 4 main SIF signals (SIF_LOADB, SIF_CLK, SIF_MOSI, SIF_MISO) and one or more SIF_CS signals. The components are for buffering and termination. FIG. 17 shows the components needed in a Slave PCB if all 13 SIF signals are used (which is unusual).

All of these extra components should be placed right next to the 16-IDC connector on the SIF Slave PCB. The SIF Slave ASICs should also be placed as close as possible to the connector. All of the buffers should be powered by the SIF_VDD and GND signals in the 16-IDC interface and should have 100 nF de-coupling capacitors.

The general strategy is that production boards should minimise the number of components fitted. This can be restricted to a few 0603 resistors. This minimises cost but does not provide as much drive strength or protection as a board that contains buffers. It therefore may have to be used at lower shift speeds and because there is less protection should be used with short cables.

Functional Test boards (FTB) and Analogue Test Boards (ATB) are made in lower volumes and can afford to have more components in order to provide:

Greater shift speeds

Longer cables

Greater EMC and ESD protection

The preferred buffers are NC7NZ17 in the US8 package. This is Fairchild TinyLogic. Each 8-pin pack contains 3 non-inverting buffers. They can deliver 24 mA and have a propagation time of 3.6 ns (typical) into a 50 pF load. They are rated for operation over −40 to +85 deg C. There may be some cases where an ATB needs to use a different buffer if the environmental test chamber needs to go above +85 deg C. (sometimes we need +125 deg C.). These devices are very fast and therefore must have good de-coupling capacitors between SIF_VDD and GND (e.g. 100 nF, 0603, X7R). Without this there will be interference on SIF_VDD when the buffers switch.

In multi-slave systems, the buffers are connected in parallel to maintain simple point-to-point links. This reduces reflections and enables faster shift speeds to be used.

The most important signal is SIF_CLK. It is important that there are no oscillations which might cause multiple clock edges at the SIF Slave inputs.

Single Slave

Low-Cost Production Board

Figure 22:
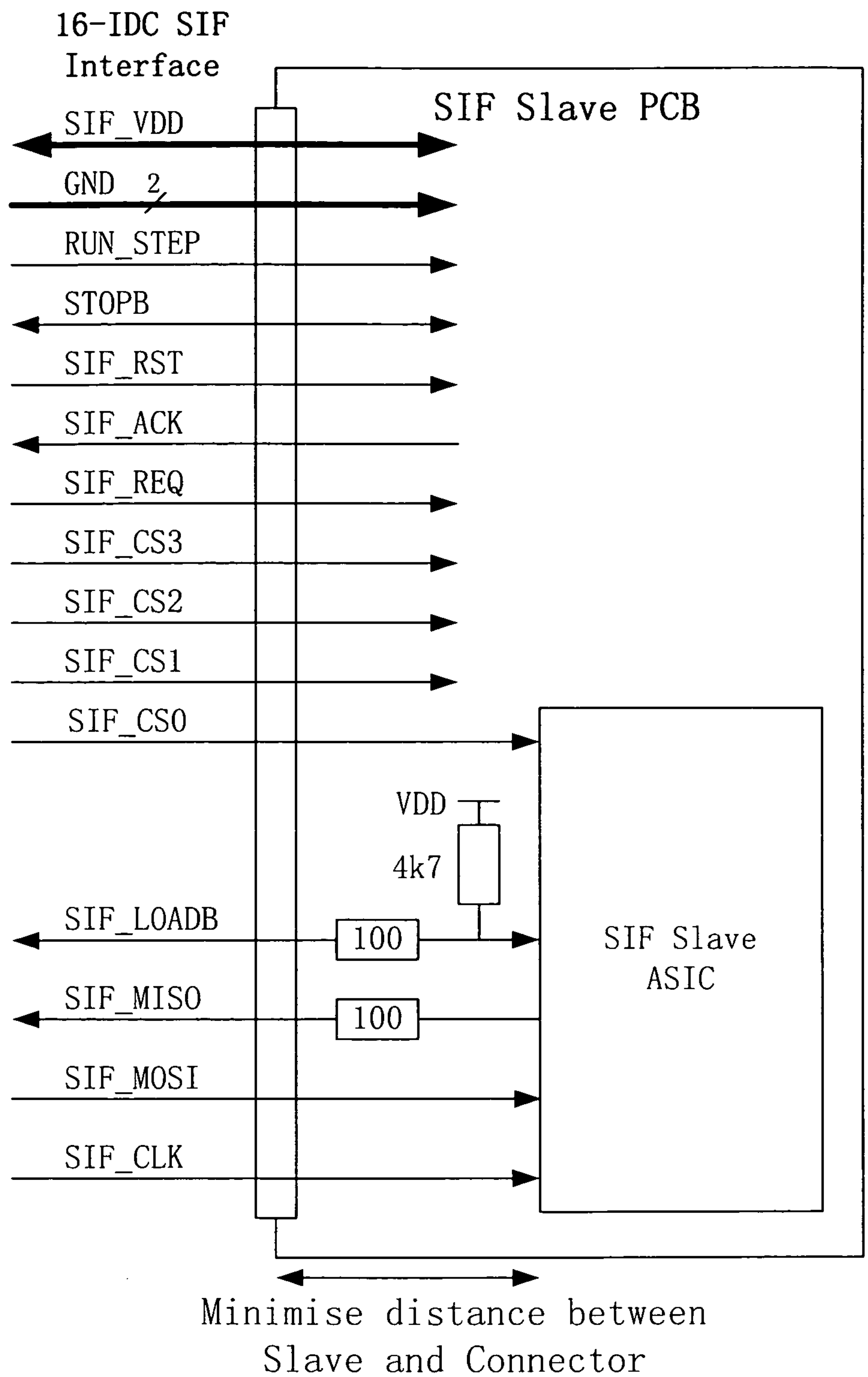
FIG. 22 shows a SIF slave PCB.

The SIF_CS pin is not essential for a single-slave system and may not be included in the SIF Slave ASIC, see FIG. 22.

Figure 23:
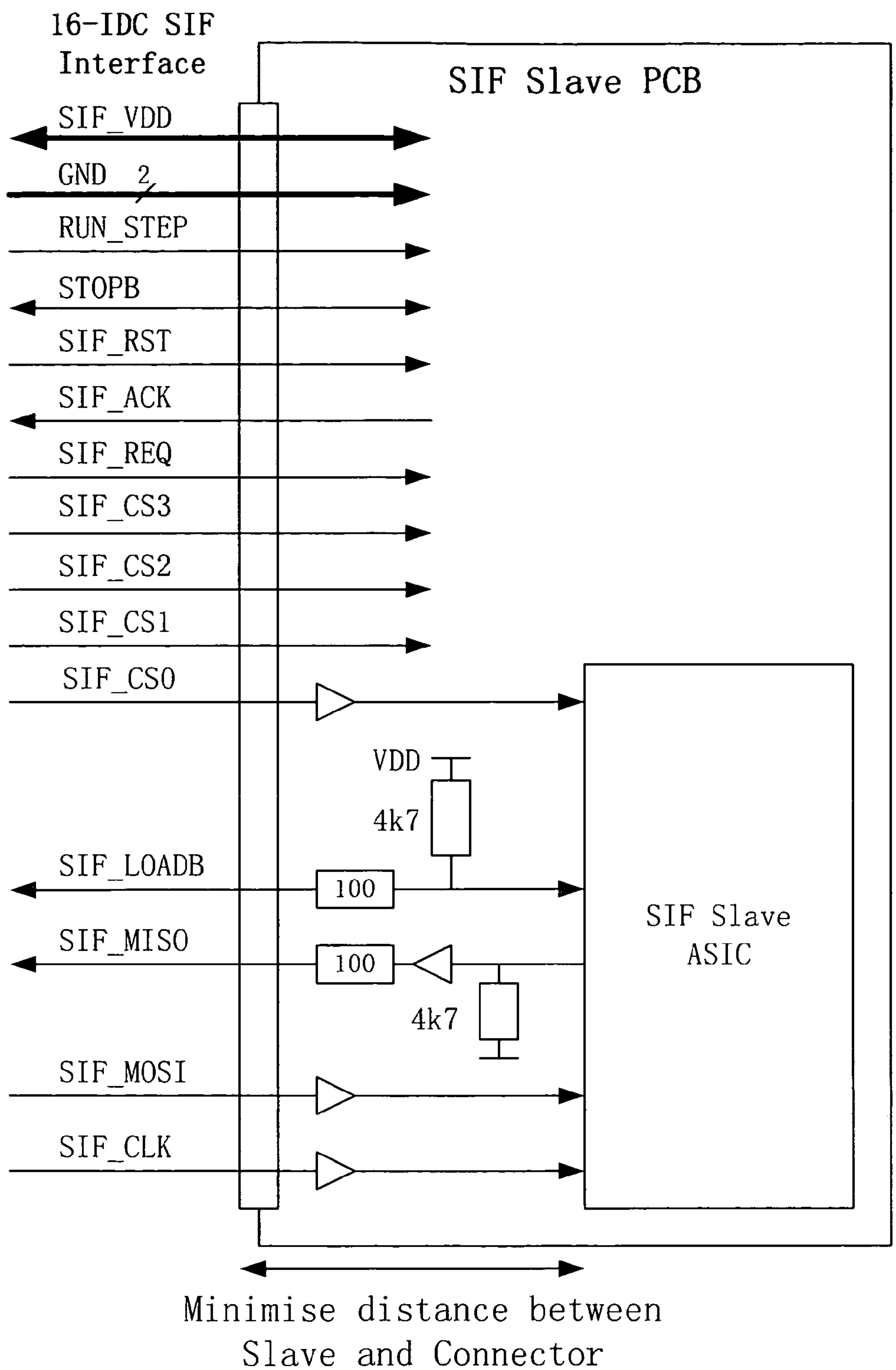
FIG. 23 shows an alternative embodiment of FIG. 22.

This board should be used with a short ribbon cable. If you need the board to work with a long cable it would be sensible to add a buffer and pulldown resistor to the SIF_MISO signal (as shown in FIG. 23 of a single-slave board).

Test Board

The addition of buffers makes this board faster and more immune to interference than the previous low cost Production board for a Single Slave SIF system.

The SIF_CS pin is not essential for a single-slave system and may not be included in the SIF Slave ASIC. If it is not included then the above components can be omitted:

Buffer on SIF_CS0.

4k7 pulldown resistor on SIF_MISO (because ASIC output will always be enabled).

Multi Slave

Low-Cost Production Board

Figure 24:
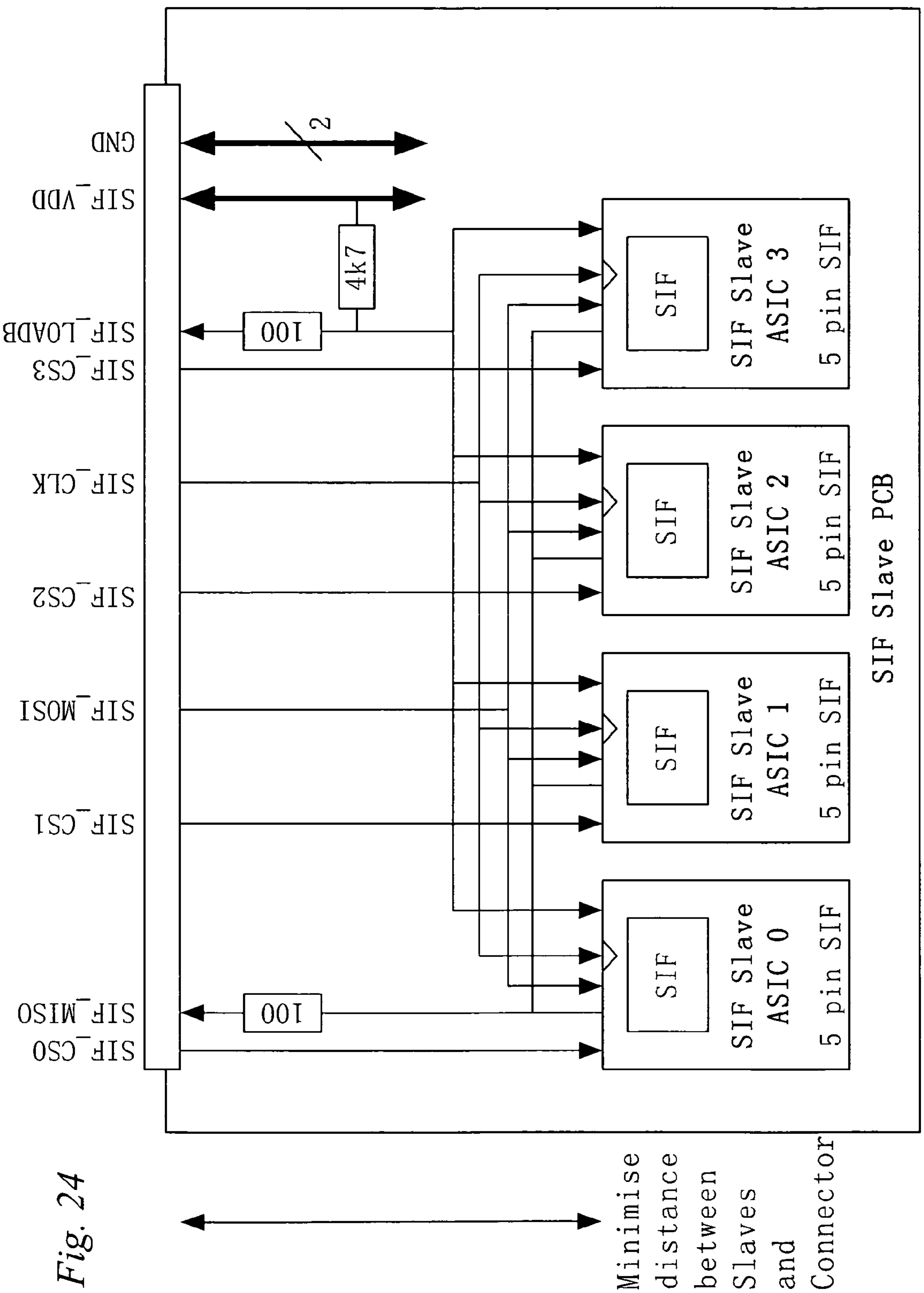
FIG. 24 shows a SIF Slave PCB with multiple SIF slaves.

This board should be used with a short ribbon cable. If you need the board to work with a long cable it would be sensible to add a buffer and pulldown resistor to the SIF_MISO signal (as shown in FIG. 24; a multi-slave board).

It may need to be used with a modified SIF Pod that generates signals with slow edges so as to avoid reflections. This is especially important on SIF_CLK.

The above scheme can be used for Functional (FTB) or Analogue (ATB) Test Boards. Of course a similar scheme can be used for a board containing 2 or 3 SIF Slave ASICs.

Test Board

The addition of buffers makes this board faster and more immune to interface than the previous low cost Production board for a Multi Slave SIF system.

Figure 25:
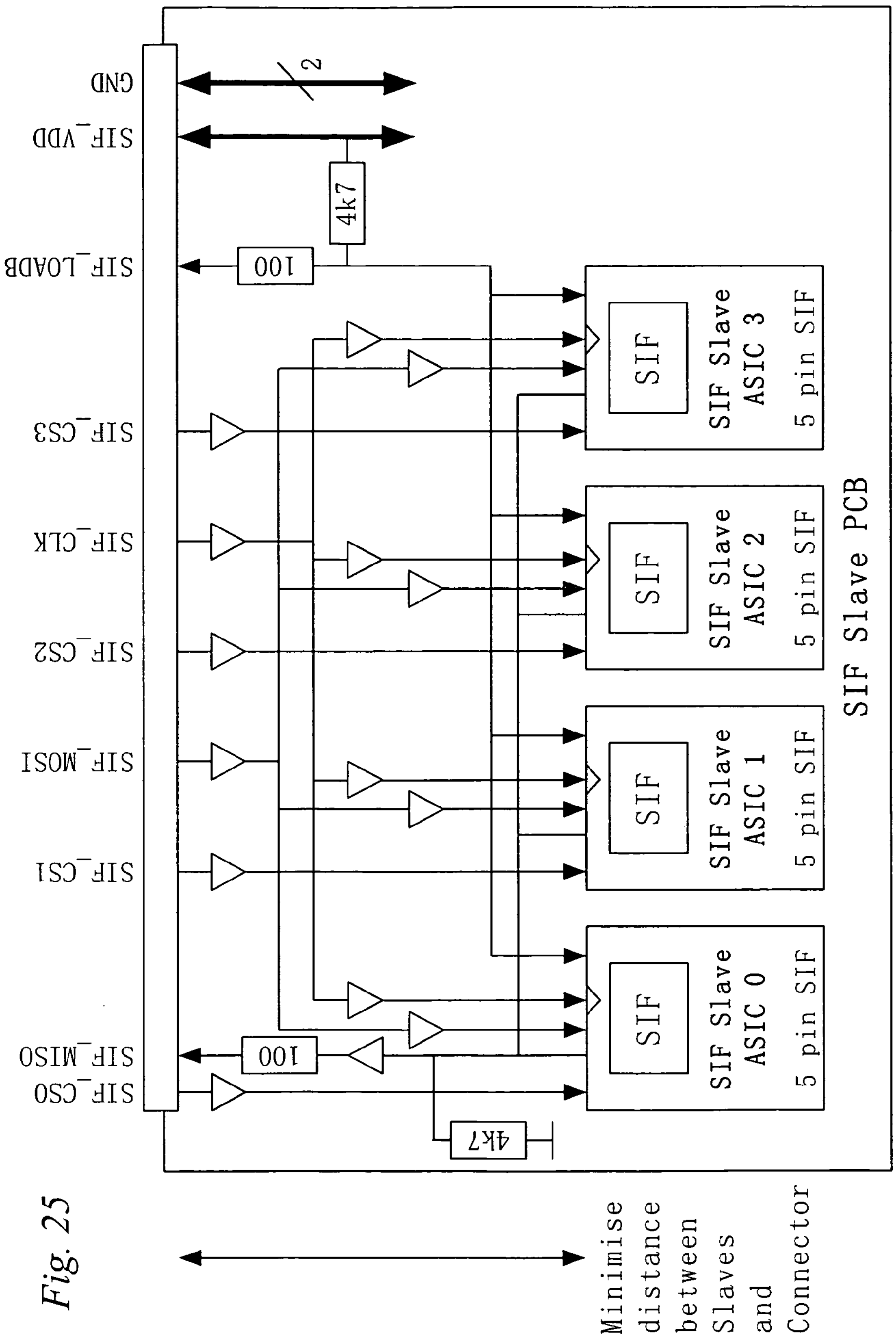
FIG. 25 shows an alternative embodiment of FIG. 24.

The scheme shown in FIG. 25 can be used for Functional (FTB) or Analogue (ATB) Test Boards. It can be used with high speeds and a long ribbon cable to the SIF Pod. Of course a similar scheme can be used for a board containing 2 or 3 SIF Slave ASICs.

All of the external components should be placed close to the SIF Connector.

The SIF Slaves should also be placed as close as possible to the SIF Connector.

The buffers come in packs of 3. Multiple buffers are needed for the SIF_CLK and SIF_MOSI signals. Where possible, all 3 buffers in a pack should be used for the same signal.

SIF Master

The most commonly used SIF Master is a SIF Pod. Separate microprocessors or ASIC test machines can also be SIF Masters. The implementation example given here is for a SIF Pod.

Unique SIF Pod Identifiers

All modem SIF Pods have unique Pod identifiers. These are 16-bit ? in the following ranges:—

TABLE 14

| SIF Pod | Pod Identifier range |
|---|---|
| USB SIF Pod | 0x0000-0x0FFF |
| Ethernet SIF Pod | 0x1000-0x1FFF |
| Universal SIF Pod | 0x2000-0x2FFF |

These numbers can be read by the Computer, using the xSIF API.

Block Diagram

Figure 26:
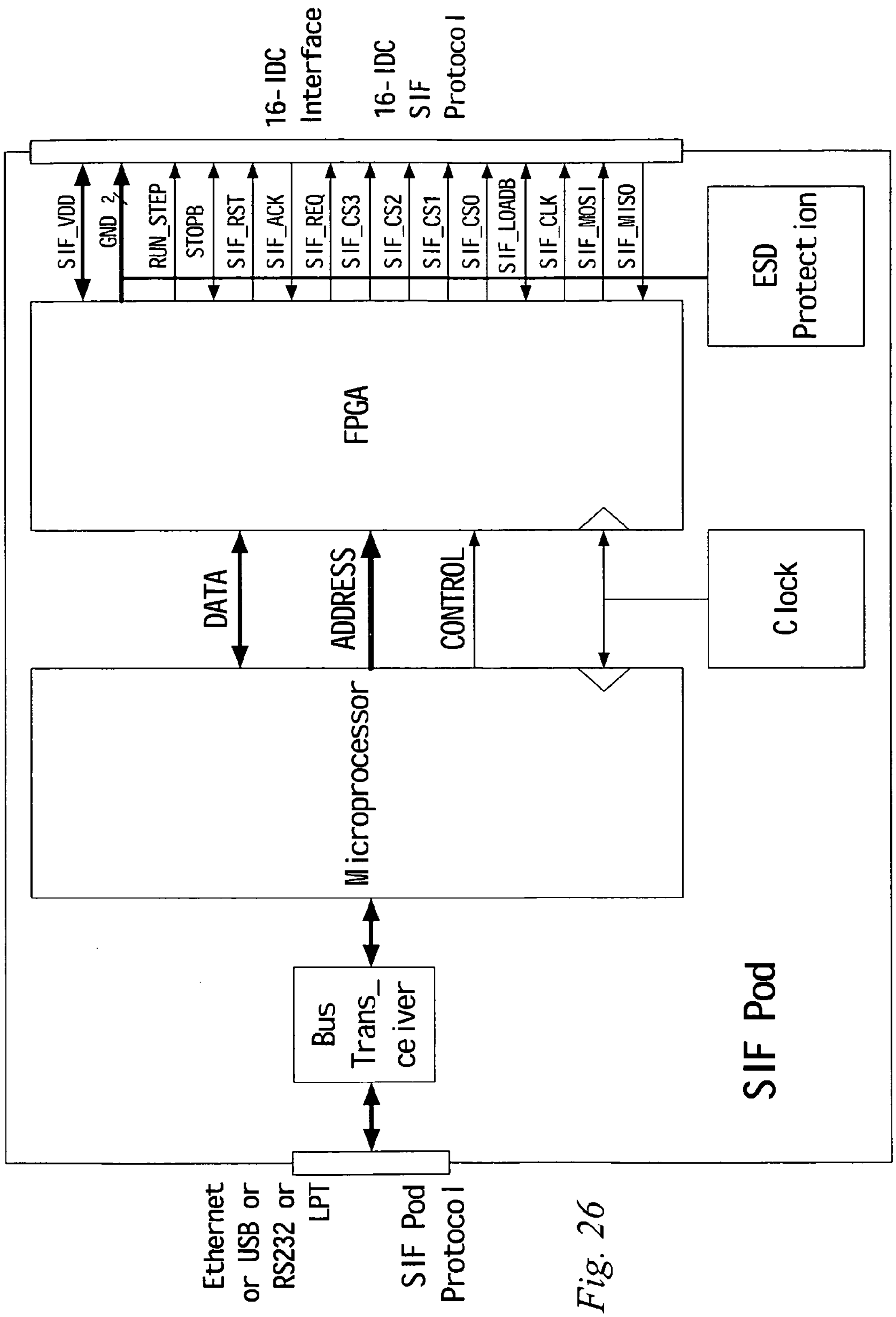
FIG. 26 shows a SIF pod.

A SIF Pod can be implemented in many different ways. The most common way in modern pods is to use, see FIG. 26:—

A microprocessor that includes the MAC (and maybe even the PHY) for the chosen bus interface (e.g USB, Ethernet, RS232) to the computer. The microprocessor must interface with the computer using the SIF Pod Protocol.

An FPGA (e.g Xilinx, Altera) for implementing the fast logic to the 16-IDC SIF Interface. This is able to implement a controlled timing scheme for the signals. The FPGAs used as of February 2005 are Xilinx Virtex2 or Spartan XL. They have good controls for setting pin voltages and impedances. The Spartan XL can supply 24 mA at 3V3.

ESD protection for the various signals in the 16-IDC SIF Interface.

A trade-off can be made between the microprocessor and FPGA, as to which should implement the various parts of the SIF Slave Protocol:—

Simpler to implement if the microprocessor looks after more of the protocol.

Faster and more controlled signal timings if the FPGA looks after more of the protocol.

Figure 27:
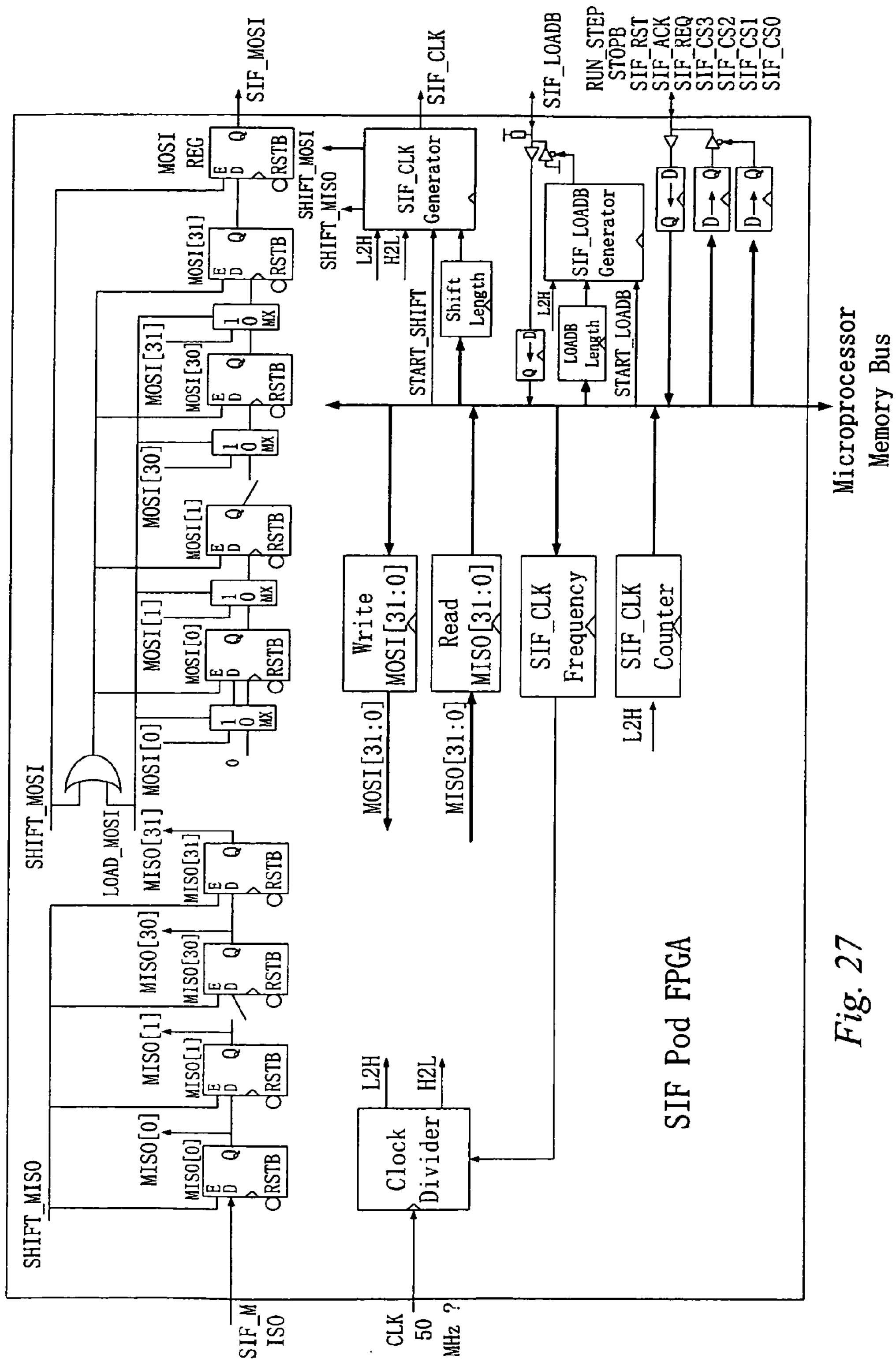
FIG. 27 shows a circuit diagram of a SIF pod FPGA.

Verilog RTL Implementation for FPGA, see FIG. 27

All the flipflops in this design are clocked on posedge of the same system clock called CLK. This is likely to be a fast continuous clock (e.g. 50 MHz). The logic is controlled with enable signals. SIF_CLK is not used as a clock inside the Pod FPGA. It is a generated signal from posedge CLK, see FIG. 28.

The above FPGA design is a simple one which relies on the external microprocessor to do the control for multi-cycle functions such as xsif_read_array( ) or xsif_contread_star( ). It contains:

32 bit MISO register. This samples the SIF_MISO input and shifts on the last posedge CLK before posedge SIF_CLK. The register can be read by the microprocessor bus.

32-bit MOSI register. This can be written by the microprocessor bus. It shifts data out and changes the SIF_MOSI output coincident with posedge SIF_CLK.

A clock divider that generates the continuous running L2H and H2L control signals. These signals have a pulse width of one CLK period. They precede the posedge and negedge respectively of SIF_CLK. The frequency is set by the SIF_CLK Frequency register.

Figure 28:
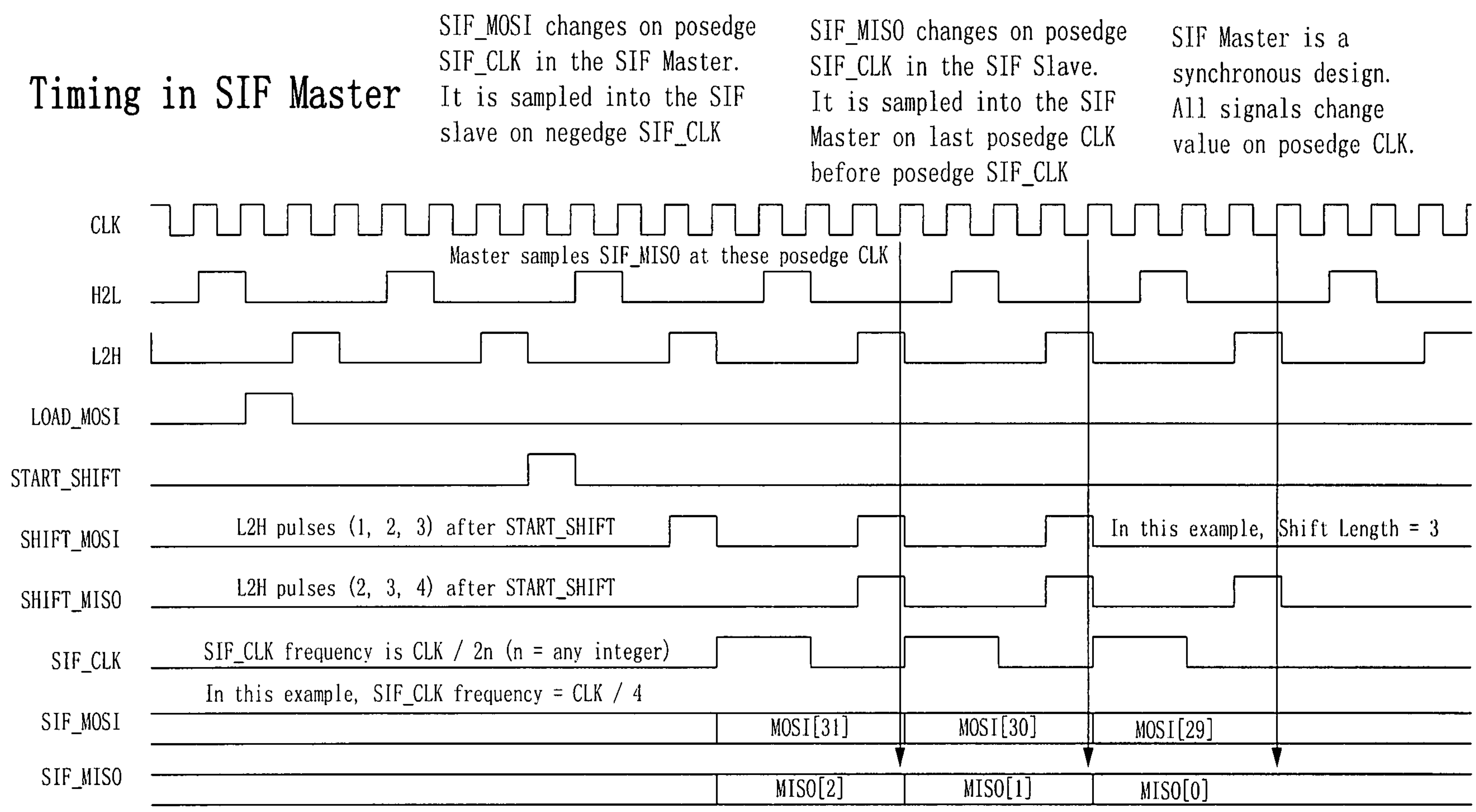
FIG. 28 shows a timing diagram in the SIF master.

SIF_CLK generator. This generates a steam on N pulses on SIF_CLK at the requested frequency. N is specified in the Shift Length register. In FIG. 28, N=3.

SIF_LOADB generator. Generates the SIF_LOADB_MASTER pulse low of the specified time (set by LOADB Length register).

9 IO Registers. Set the direction and output values. Read the input values.

4 IO registers to read (but not write) the present values on the 4 main SIF signals (SIF_LOADB, SIF_CLK, SIF_MOSI, SIF_MISO).

Microprocessor Memory bus interface. External 16 or 32-bit bus interface controls reads and writes to all the above memory-mapped registers (synchronised to CLK).

The MOSI and MISO shift registers could be 64-bit. This would be a bit faster, enabling longer shifts before having to do a parallel load.

STOPB and RUN_STEP Circuitry

Figure 29:
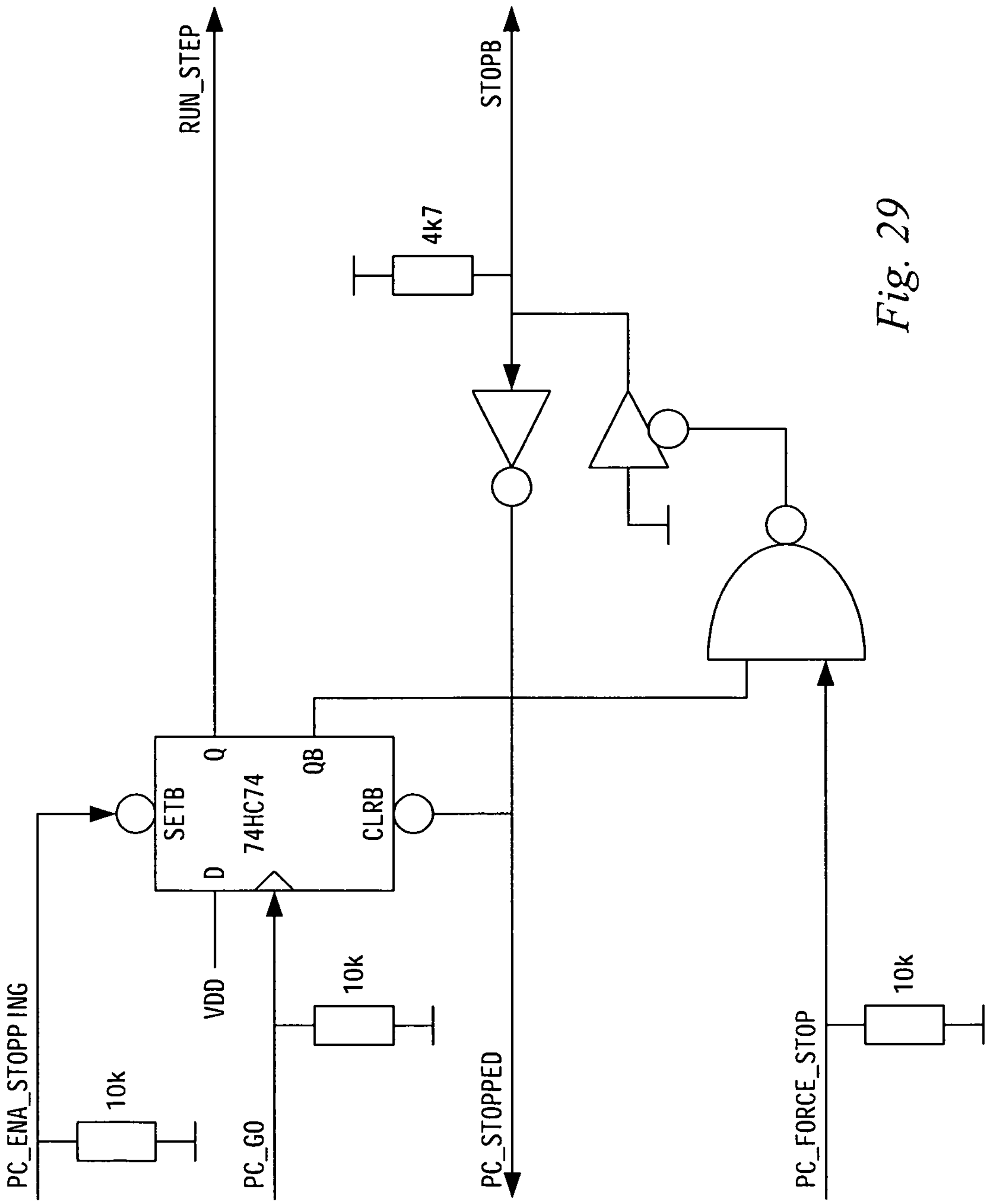
FIG. 29 shows a circuit diagram of the STOPB and run_step feature.

STOPB and RUN_STEP are debug control signals used for the XAP1 Processor. They are not used for any other processors, see FIG. 29. These signals control:

Start

Stop

Single-step

Run to Breakpoint

In the XAP2 and XAP3 ASICs these functions are implemented as SIF Instructions, which is why they do not have STOPB or RUN_STEP pins.

The LPT SIF Pod does not implement any circuitry for STOPB or RUN_STEP. Pins 15 and 16 in the 16-IDC Interface are left unconnected.

The modern Pods (USB, Ethernet, Universal) all implement the STOPB and RUN_STEP functionality in the FPGA. This is implemented as hardware circuitry the same as in the ISA SIF Pod 98. This is interfaced to the memory bus with the following control signals:

PC_STOPPED (Pod input)

PC_ENA_STOPPING (Pod Output)

PC_GO (Pod Output)

PC_FORCE_STOP (Pod Output)

ESD and High Voltage Protection SIF Pod

The recommended circuitry for ESD and high-voltage protection to the 16-IDC interface in a SIF Pod is as follows:

The red circuit protects SIF_VDD.

The blue circuits (instanced 13 times) protect the 4 SIF and 9 IO signals.

Figure 30:
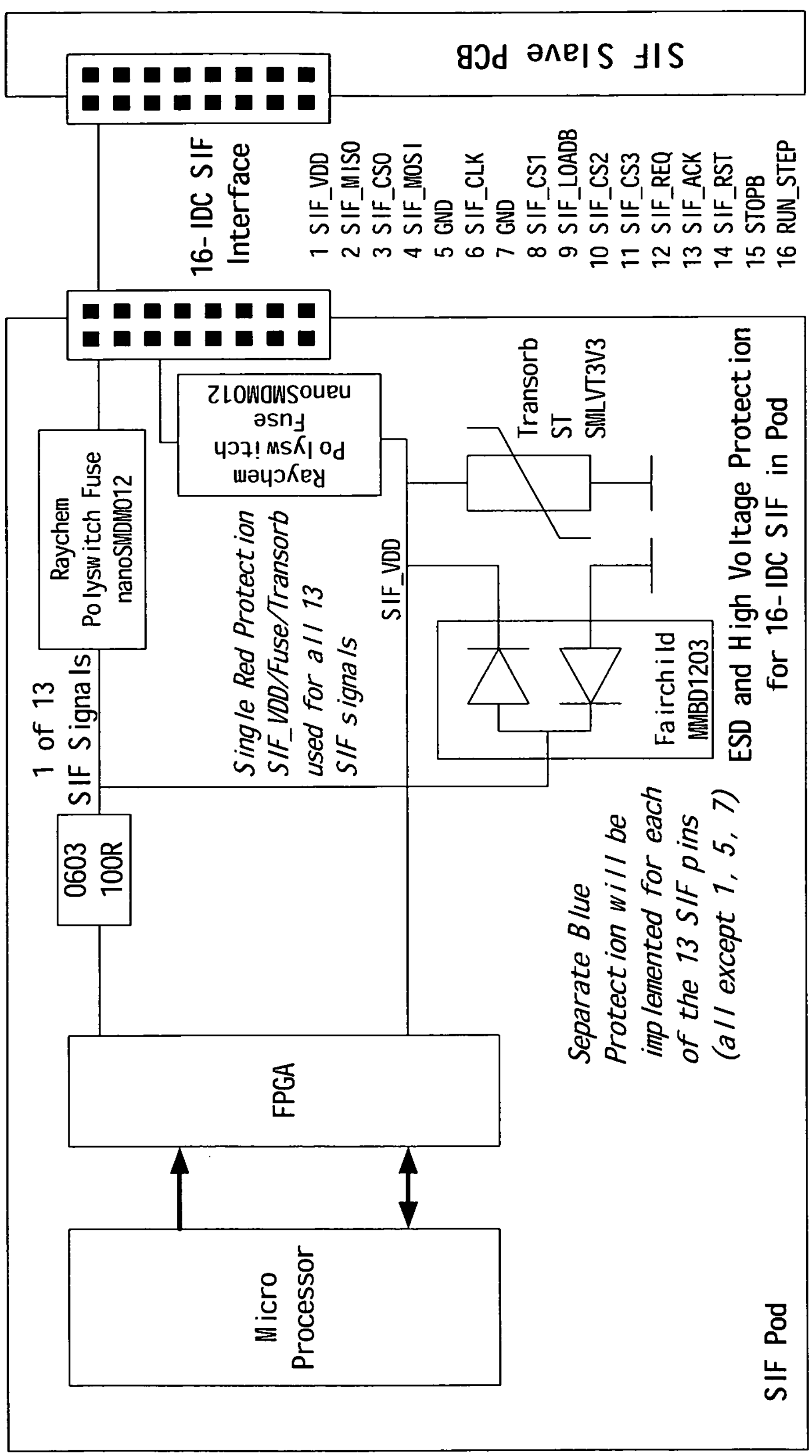
FIG. 30 shows a schematic diagram of the ESD and high voltage protection circuit.

The 100 ohm series resistors in this protection scheme are also useful for source series termination (9 of the 13 ins are outputs from the Pod), see FIG. 30. Termination and the SIF Slave PCB are further described herein.

The resistors are:

0603, 100 ohm.

The fuses are:

Raychem Polyswitch fuse. nanoSMDM012.

The protection diodes are:

Fairchild MMBD1203.

The Transorb is:

ST SMLVT3V3.

Electrical

Power Supply

The power supply voltage (SIF_VDD on Pin 1) used for the 16-IDC interface signals should be the same in the SIF Pod and in the SIF Slave PCB. This voltage can be:

Set on Slave PCB and copied in the Pod

Set by the Pod and copied or used in the Slave PCB

In the latter case, the Pod voltage is controlled from the Computer. The most common output voltages used in SIF Pods (and available in Xilinx Virtex2 FPGAs) are:

3V3

2V5

These allow TTL input logic thresholds to be used.

The Virtex2 FPGAs can also support 1V8 and 1V5, but these have not been used in SIF Pods to date.

Old Pods (ISA, LPT) support 5V. This is why the SIF Slave pads need to be 5V-tolerant Input Voltage Thresholds SIF Pads (in Pod and Slave) use TTL voltage thresholds:

TABLE 15

| Logic Value | Min | Max |
|---|---|---|
| 0 | 0 V | 0.8 V |
| 1 | 2.0 V | SIF_VDD |

Output Voltage Levels

Output pads in SIF Slave and SIF Pods should conform to the following voltage levels:

TABLE 16

| Logic Value | Min | Max |
|---|---|---|
| 0 | 0 V | 0.1 SIF_VDD |
| 1 | 0.9 SIF_VDD | SIF_VDD |

Timing

In Command mode, the maximum frequency for SIF_CLK is 1 MHz

The duty cycle for SIF_CLK must be always between 60:40 and 40:60.

iSIF—Internal SIF

Previous SIF systems have only provided an external serial physical interface to the SIF Slave. This interface was called SIF but will now be called xSIF (external SIF). A new development to SIF technology is to provide a second physical interface to the SIF Slave called iSIF. iSIF is an internal parallel interface:

- The non-debug interface can be used for Normal SIF instructions (i.e to read or write any memory-mapped device).
- The most common usage is that xSIF is used for debug and normal SIF instructions. iSIF is only used for normal SIF instructions, primarily for software download to a XAP RAM.
- iSIF provides a very powerful interface to the iSIF Master (on-chip processor or control hardware outside the XAP/SIF). The iSIF Master can control the XAP as a slave. This functionality must be used with great care by the ASIC designers using XAP/SIF IP (hardware and software engineers). If used wrongly, it could cause complex system errors. When used correctly it provides great functionality for low-power design and precise boot-up control.
- At any one time, the SIF can only process one SIF instruction. This might be from xSIF or from iSIF, but cannot be for both simultaneously.
- SIF instructions are executed at the same time for xSIF and iSIF. SIF Instructions are executed immediately when the selected XAP is stopped or asleep. Otherwise it waits until the next sif instruction executed by the selected XAP processor.
- The XAP can be stopped by the 'Stop' Debug SIF Instruction (from xSIF or iSIF). It can also be stopped by the force_stop input (controlled by on-hip hardware). This could be controlled by the same processor that controls iSIF.
- The SIF has ping-pong hardware to ensure that the SIF cannot be hogged by xSIF or by iSIF. It forces time-multiplexing to share the SIF between xSIF and iSIF. A pending xSIF instruction will be executed when an iSIF instruction is completed. A pending iSIF instruction will be executed when an xSIF instruction is completed.

TABLE 17

| Name | Meaning | Type | Comment |
|---|---|---|---|
| xSIF | External SIF | Serial | Same as original SIF, using pins: SIF_LOADB, SIF_CLK, SIF_MOSI, SIF_MISO, SIF_CS (optional). xSIF Master = external computer accessing Slave via a SIF Pod. |
| iSIF | Internal SIF | Parallel | Provides the same functionality as original SIF, but to an on-chip device with parallel bus interfaces to the SIF fields: Address, Control, DataWrite, DataRead, Status. iSIF Master = on-chip hardware outside SIF/XAP. This could be another on-chip processor or a dedicated hardware state machine. |

Figure 31:
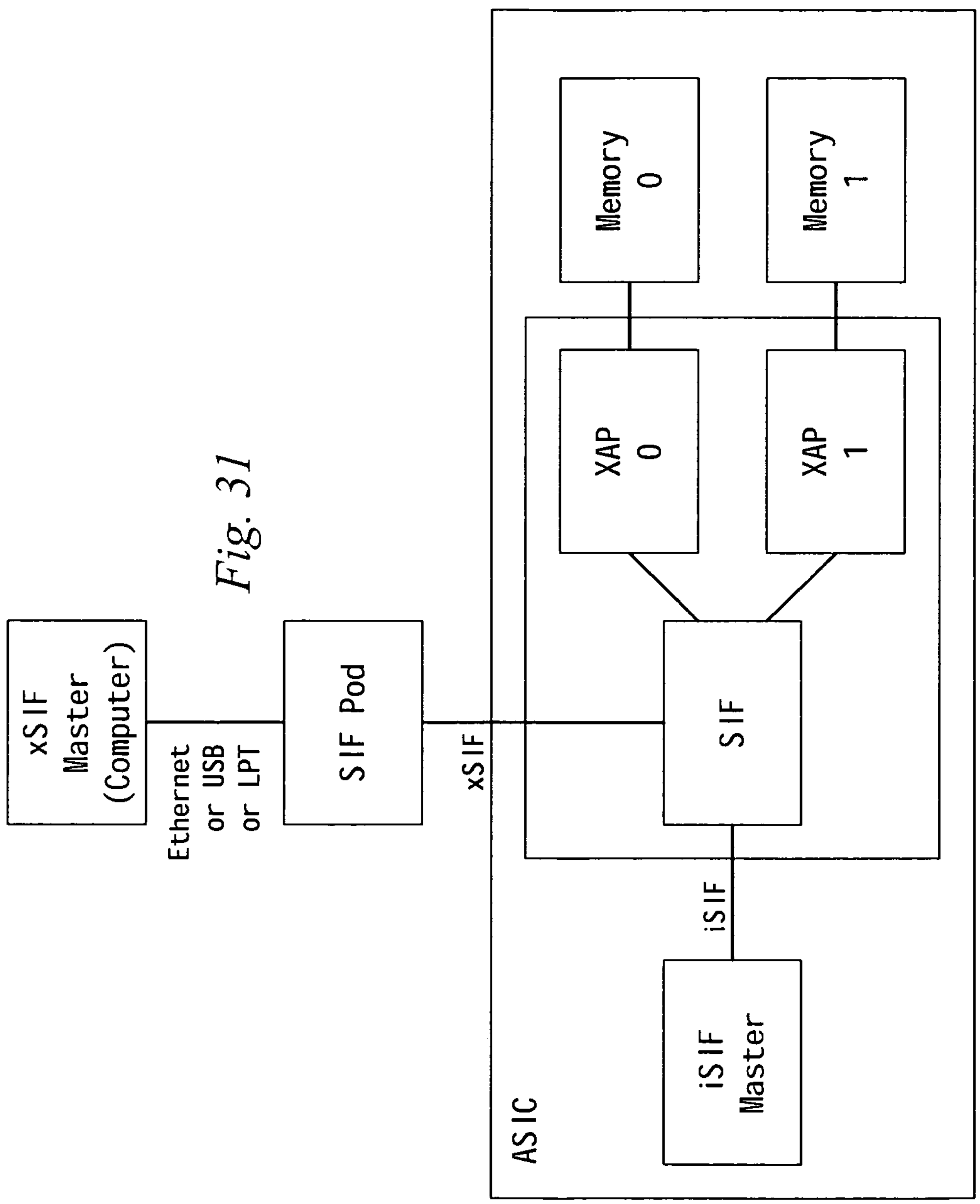
FIG. 31 shows a schematic diagram of the connections between the xSIF master, SIF pod and an ASIC.

Operation of the combined xSIF/iSIF obeys the following principles, see FIG. 31:—

- iSIF is optional. It does not have to be connected up in the ASIC. When not used, the iSIF inputs should be tied low and the iSIF outputs left unconnected. When synthesised, almost all the iSIF circuitry will be optimised away.
- Even when used, the addition of iSIF adds very few gates to those originally required for xSIF.
- The SIF instructions available are identical, whether accessed by xSIF or iSIF. This includes Normal and Debug SIF instructions.
- In general, the xSIF and iSIF interfaces are peer to peer. The only area where one interface takes precedence over the other is in the area of SIF Cancel. xSIF may cancel a stuck xSIF or stuck iSIF instruction. iSIF can only cancel a stuck iSIF instruction.
- The designer should use either xSIF or iSIF for system debug, but not both.

iSIF is normally faster than xSIF as it is parallel and on-chip.

Usage Models

SIF instructions are either Normal or Debug instructions:—

- Normal instructions can read or write memory.
- Debug instructions can directly control the processor in many ways:
  - Put the processor into Debug or Normal mode
  - read and write registers
  - start and stop the processor
  - single-step the processor
  - run the processor until it hits a break point
  - etc
- Most Debug instructions require the processor to already be in Debug Mode.

SIF instructions are executed when:—

Processor executes a sif instruction

Processor is asleep (has executed a sleepsif instruction)

Processor is stopped (only possible in Debug mode or when force_stop signal is pulled high)

Future ASICs using SIF technology should use xSIF and iSIF in one of the following usage models:

TABLE 18

| | xSIF | | iSIF | | |
|---|---|---|---|---|---|
| No | Debug | Normal | Debug | Normal | Comment |
| 1 | Yes | Yes | No | No | iSIF not connected or used. |
| 2 | Yes | Yes | No | Yes | iSIF used for memory access only. e.g for program download or data acquisition. |

TABLE 18-continued

| | xSIF | | iSIF | | |
|---|---|---|---|---|---|
| No | Debug | Normal | Debug | Normal | Comment |
| 3 | No | No | Yes | Yes | xSIF not connected or used. |
| 4 | No | Yes | Yes | Yes | xSIF used for memory access only. e.g for program download or data acquisition. |

iSIF Hardware Implementation

Figure 32:
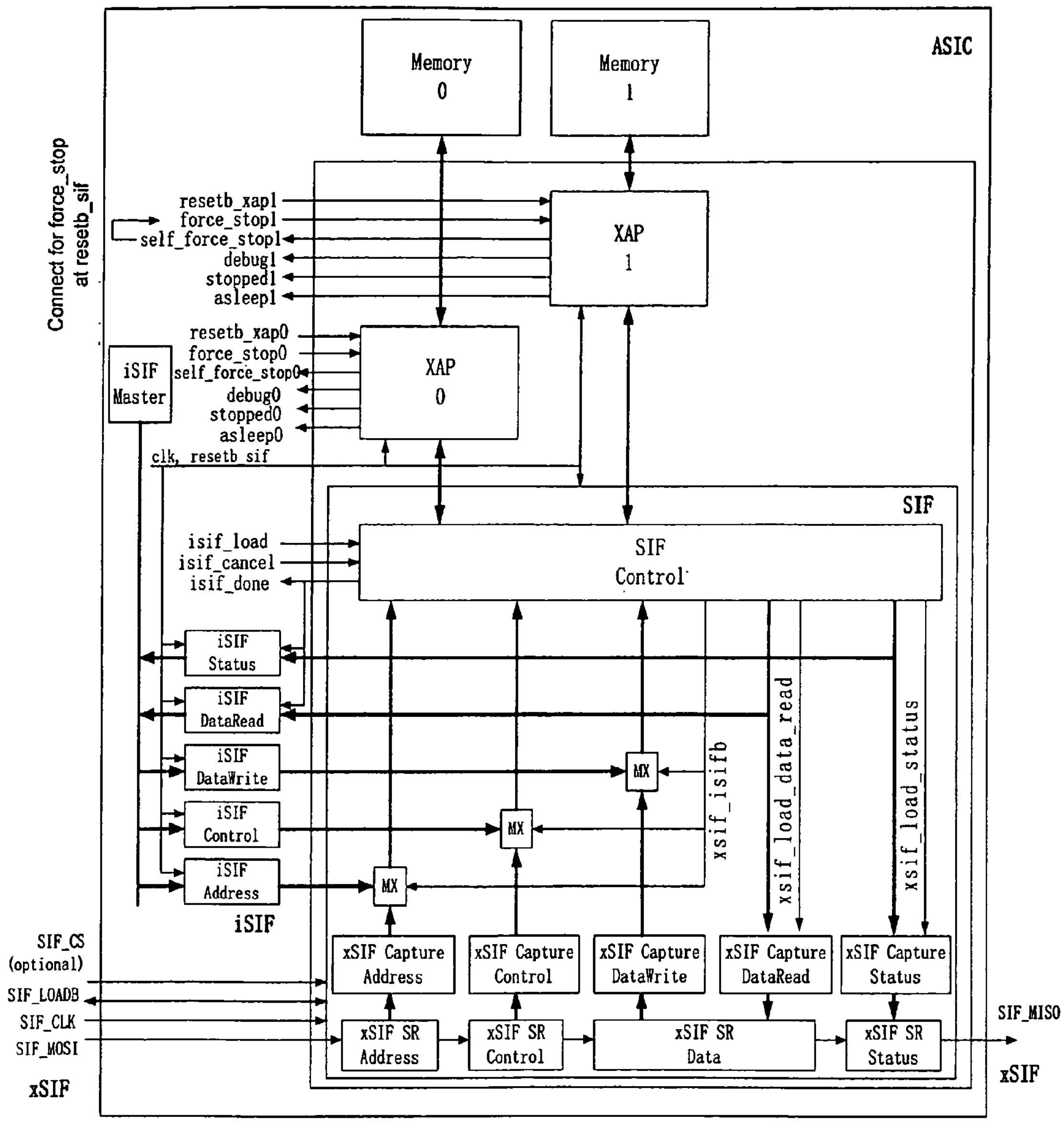
FIG. 32 shows a schematic of an ASIC.

XAP systems should offer the iSIF and xSIF hardware interfaces as shown in FIG. 32. The new signals for iSIF are as follows. All control signals are active-high All iSIF circuitry and interface signals arm clocked on posedge clk and are reset (normally to 0) by the asynchronous reset signal resetb_sif All outputs are reset to 0.

TABLE 19

| Signal | Direction at SIF module | Comment |
|---|---|---|
| isif__address[a:0] | input | Same word format as xSIF Address field. Written to by iSIF Master. |
| isif__control[b:0] | input | Same word format as xSIF Control field. Written to by iSIF Master. Bits indicate - specific processor, debug mode, word size, parity, read/write. Designer may tie some of these bits permanently high or low (e.g to disable Debug SIF Instructions). |
| isif__data__write[c:0] | input | Same word format as xSIF DataWrite field. Written to by iSIF Master. Data to be written to specified address. Data is aligned to bit 0. Unused high bits (for short words) are ignored. |
| isif__data__read[c:0] | output | Same word format as xSIF DataRead field. Read by iSIF Master. Data read from specified address. Data is aligned to bit 0. Unused high bits (for short words) are set to 0. |
| isif__status[d:0] | output | Same word format as xSIF Status field. Read by iSIF Master. Bits indicate —PARITY__S, PARITY__D, ERROR, ERROR__TYPE, ERROR__CODE[], STAT[]. iSIF Master may use or ignore these as it wishes. |
| isif__load | input | SIF starts the iSIF instruction loaded in isif__control[], isif__address[] and isif__data__write[] on posedge clk when isif__load = 1. isif__load should be set to 1 for one clk cycle only and should be 0 at all other times. isif__load may be set by iSIF Master software, or could automatically be set by hardware after iSIF Master writes to isif__control[]. |
| isif__cancel | input | If iSIF Master wants to cancel an iSIF instruction, it does so by setting isif__cancel = 1 for one clk cycle. It should be 0 at all other times. |
| isif__done | output | SIF sets isif__done high for one clk cycle. when the iSIF instruction is complete. The isif__data__read[] and isif__status[] buses are valid on posedge clk when isif__done = 1. isif__done can be used as an enable signal to load these 2 buses into their respective external registers. |

In addition, the following signals should be available for each XAP. These signals are all active-high. They are all sampled and change on posedge clk. The 4 outputs are all reset by resetb_sif. They are all reset to 0, except self_force_stop which is reset to 1:—

TABLE 20

| Signal | Direction at XAP module | Comment |
|---|---|---|
| force__stop | input | When force__stop = 1, the XAP completes the current instruction and then stops executing code. If the XAP was executing a block instruction, it completes the current word and then stops execution (i.e same behaviour as for interrupts). The behaviour is the same as when a SIF instruction sets the STOP bit to 1. XAP execution restarts on posedge clk when force__stop = 0 |

TABLE 20-continued

| Signal | Direction at XAP module | Comment |
|---|---|---|
| | | (provided that the SIF has not put the XAP into the Stopped RUN_STATE). |
| self_force_stop | output | Set to 1 by resetb_sif active. resetb_sif is normally pulled low at power-on-reset.<br>Set to 0 by a specific Debug SIF instruction (from xSIF or iSIF).<br>self_force_stop is used by the hardware designer to set the XAP RUN_STATE after resetb_sif:<br>Stopped: Connect self_force_stop to the force_stop input (or OR with other force_stop sources).<br>Running: Leave self_force_stop unconnected |
| debug | output | This is the same as the DEBUG bit in the XAP Status register. It is 1 when the SIF is in Debug mode, and 0 when the SIF is in Normal mode. This is set by xSIF or iSIF Debug Enable writes. |
| stopped | output | This is 0 when the XAP is executing code and 1 when it is stopped. It goes to 1 on posedge clk after it completes the last instruction. This may have been caused by a Debug SIF write or by setting force_stop = 1. It goes to 0 on posedge clk when it starts executing XAP code again.<br>stopped = 1 when any of the following occur:<br>force_stop = 1<br>RUN_STATE = Stopped<br>RUN_STATE = Single Step |
| asleep | output | This is 0 when the XAP is running code and 1 when it is in sleep mode (caused by a sleepnop or sleepsif XAP instruction). It goes to 1 on posedge clk after it completes the sleepnop or sleepsif instruction. It goes to 0 on posedge clk when it starts executing XAP code again (after a hardware wake_up or a SIF Wakeup instruction). |

xSIF v iSIF Priority

If the SIF is currently unused and xSIF and iSIF load requests happen on the same clk cycle, then the xSIF should be served first. Similarly in all equal cases of contention where xSIF and iSIF request the same service simultaneously, then xSIF should be served first.

The SIF Control circuitry implements a ping-pong system to prevent iSIF from blocking xSIF and to prevent xSIF from blocking iSIF:

- If there is an iSIF load request waiting when the SIF completes an xSIF access, then its next access will be for iSIF.
- If there is an xSIF load request waiting when the SIF completes an iSIF access, then its next access will be for xSIF.

This means that the SIF channel bandwidth (whether due to the XAP being stopped or executing sif or sleepsif instructions) is shared by time-multiplexing between xSIF and iSIF.

Parity Bits

The bit format of the main SIF fields is identical for xSIF and iSIF. The Control and Status fields contain parity bits. Their usage by xSIF is described in section 0 of this TM. In iSIF the parity bits are treated as follows:

TABLE 21

| SIF Field | Parity Bit | Comment |
|---|---|---|
| Control | PARITY_AC | iSIF will ignore this. |
| Status | PARITY_D | iSIF will set this. iSIF Master may use this if it wishes. This is unlikely to be necessary, as the signals are all on-chip. |
| Status | PARITY_S | iSIF will set this. iSIF Master may use this if it wishes. This is unlikely to be necessary, as the signals are all on-chip. |

The SIF fields contain parity bits to expose communication errors. This is a valuable feature for xSIF as the off-chip serial interface is exposed to electrical interference.

Parity bits are not that useful for iSIF as the on-chip parallel interface is not exposed to any more electrical interference than the rest of the chip. This is why iSIF ignores PARITY_AC and the iSIF Master can safely ignore PARITY_D and PARITY_S.

SIF Command Mode

SIF Command Mode is available to xSIF but not to iSIF.

SIF Cancel isif_cancel cancels an iSIF instruction. If there is no iSIF instruction being executed, then isif_cancel is ignored.

When the SIF_CS pin is pulled low, any running xSIF instruction is cancelled. It does not affect any running iSIF instruction.

When SIF_LOADB=0 and SIF_CLK is toggled 32 times it can cause a SIF Cancel. The last 8 bits on SIF_MOSI are sampled on negedge SIF_CLK to specify the type of SIF Cancel. The decode is only performed after the $32^{nd}$ negedge SIF_CLK. These bits [7:0] are interpreted as follows:

TABLE 22

| Value | Meaning |
|---|---|
| 0 | Cancel xSIF instruction. |
| 1 | Cancel iSIF instruction. |
| 2 | Cancel xSIF and iSIF instructions. |
| 3-255 | Reserved for future use. No action at present. |

XAP Status Register

Each XAP has a read-only Status register that includes several bits.

The iSIF requires the following new bits to be added to each XAP Status Register. These will be present in all XAP processors, even if the iSIF is not being used.

TABLE 23

| Name | Meaning | Comment |
|---|---|---|
| FORCE_STOP | Current value on force_stop signal. | Allows xSIF and iSIF to see if the selected XAP is being stopped by force_stop input. |
| FORCE_STOPPED | Set to 1 when force_stop = 1. Set to 0 on clk cycle after iSIF or xSIF write to this XAP Status Reg. | Allows xSIF and iSIF to see if the selected XAP has been stopped by force_stop since the last clear by Status Write. |
| ISIF_ACTIVITY | Set to 1 for the selected XAP when isif_load = 1. Set to 0 on clk cycle after xSIF write to this XAP Status Reg. | Allows xSIF to see if there have been any iSIF accesses to the selected XAP since the last clear by Status Write. |
| XSIF_ACTIVITY | Set to 1 for the selected processor when xsif_load = 1. Set to 0 on clk cycle after iSIF write to this XAP Status Reg. | Allows iSIF to see if there have been any xSIF accesses to the selected XAP since the last clear by Status Write. |

Connecting and Using iSIF

If the application designer does not want to use iSIF, he should tie all iSIF inputs to 0. At synthesis, most iSIF hardware will be optimised away.

If the application designer does want to use iSIF, he should choose his strategies:

- Select a device to be iSIF Master. This might be another microprocessor, or could be a hardware state machine.
- Choose whether iSIF is to be used for just Normal SIF instructions, or for Debug SIF instructions as well. Most users only use iSIF for Normal SIF instructions. This is normally used for program download to RAM-based XAP systems.
- If iSIF is used for debug, then xSIF should not be. This is unusual as it requires a new XAP software toolkit (equivalent to xIDE) to be developed.
- Choose whether iSIF access is to be done when:
  - XAP is stopped (by pulling force_stop high).
  - XAP is executing a sleepsif or sif instruction. This gives lower iSIF bandwidth, but does mean that iSIF accesses do not affect the timing or behaviour of the XAP program being run (unless iSIF writes affect its behaviour).
- Choose how much of the iSIF Control field to connect up. It may be safer to tie certain bits to a fixed value (PROCESSOR [], , DEBUG, PARITY_AC, WRITE). This can be used to disable certain iSIF features.
- The designer should then connect the hardware:
- Connect all iSIF interface signals to registers clocked on posedge clk and reset asynchronously by resetb_sif. If certain signals are not needed (e.g DEBUG bit in isif_control field), they may be tied high or low instead. If the registered signals come from another clock domain, it is recommended that they pass through 2 flipflops clocked by clk, to reduce meta-stability problems. This is especially important for the control signals isif_load and isif_cancel.
- If the XAP cannot execute valid code after reset (e.g because it is a RAM-based system), then force_stop should be pulled high at reset. This will stop the XAP from executing any code until force_stop is pulled low (enabling clean XAP execution):
  - iSIF control: Connect a flipflop (that resets high) to force_stop XAP input iSIF Master clears this flipflop to 0 after it has completed code download.
  - xSIF control: Connect self_force_stop XAP output to force_stop input to same XAP. xSIF Master does a Debug SIF write to clear self_force_stop to 0 after it has completed code download.

The control scheme (whether done as software or as hardware state machine) from iSIF Master to SIF should be as follows:

- Pull force_stop high if desired. This will stop the XAP (which may or may not be desirable) and allow faster iSIF accesses. If force_stop is left low and the SIF is in Normal mode, then most SIF instructions require the XAP code to contain some sif or sleepsif instructions.
- For each iSIF access, the iSIF Master should:
  - Write the isif_address field. In Normal mode, this is the address to be read or written.
  - If the iSIF access is a write, the iSIF master should also write the isif_data_write field. This is the data to be written to the selected address.
  - Write the isif_control field. The control field will indicate whether the access is a read or write, the XAP processor to access and the data-size (8, 16 or 32-bits).
  - Set isif_load=1 for one clk cycle. This could be done automatically by hardware after the isif_control field was updated.
  - Wait for isif_done to go high (which it will for one clk cycle when the iSIF access is completed).
  - If isif_done has still not gone high after a timeout period (selected by the application designer), the iSIF Master should set isif_cancel=1 for one clk cycle.
  - If isif_done does go high, the iSIF Master should then read the new registered field values:
    - Read the registered isif_data_read field (if the iSIF access is a read).
    - Read the registered isif_status field.

The iSIF Master does not need to write to all the write fields (isif_address, isif_data_write, isif_control) if it knows they already contain the correct values XAP3—32-Bit Processor The following will provide a description of the second embodiment, XAP3.

Figure 33A:
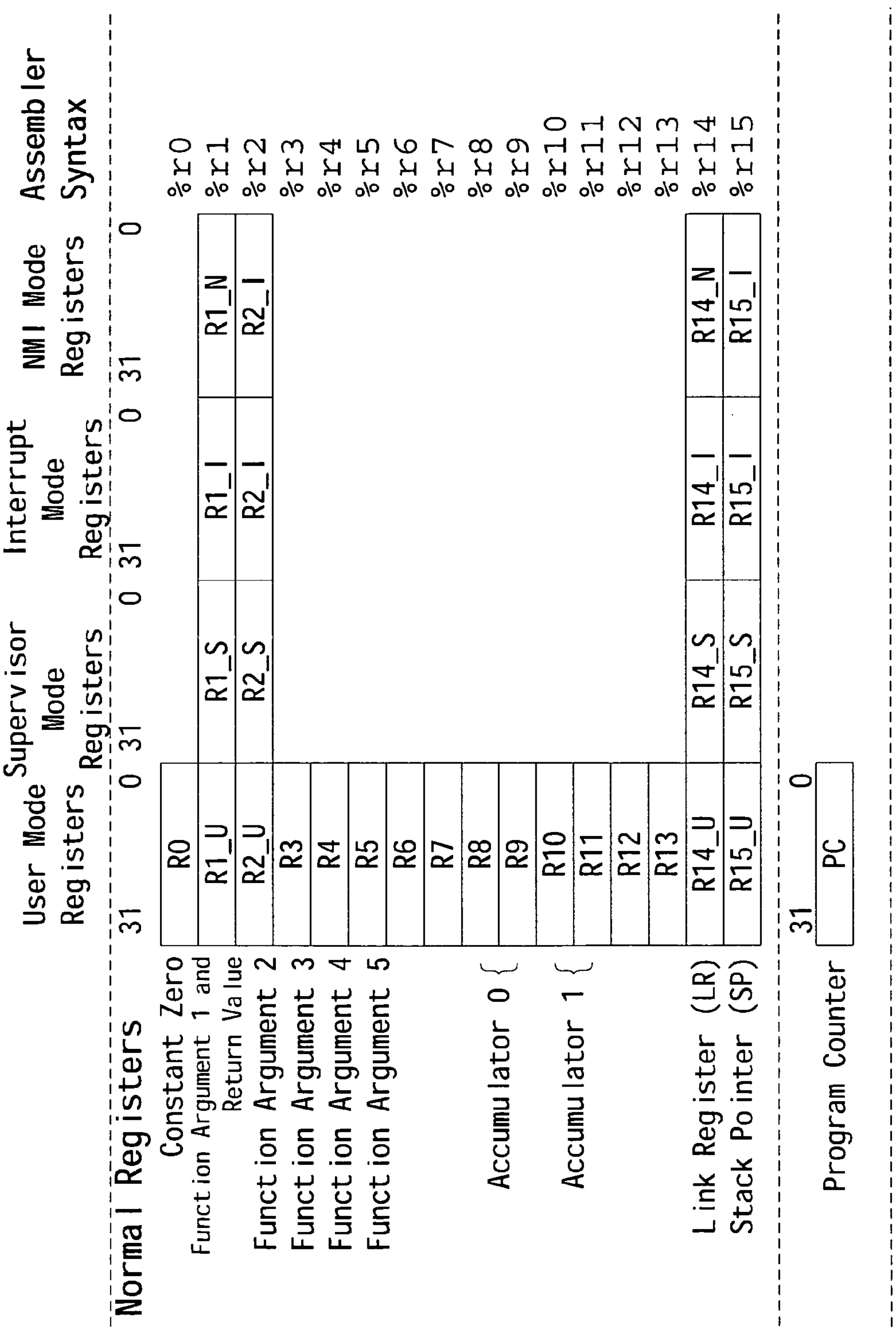
FIG. 33 shows the XAP3 programmers model.

XAP3—Programmer's Model, FIG. 33

Processor Mode

There are four modes of operation:

- User
- Supervisor
- Interrupt
- NMI (Non-Maskable Interrupt)

User mode allows unknown software to be run safely without affecting the operation of the supervisor, interrupt and NMI mode code. The MODE[1:0] signal from xap3_core to xap3_mmu indicates whether the xap3_core is in User, Supervisor, Interrupt or NMI Mode. The xap3-core has a 'memory exception' input that allows the xap3_mmu to indicate when a memory access is attempted that is illegal in the current operating mode.

Figure 34:
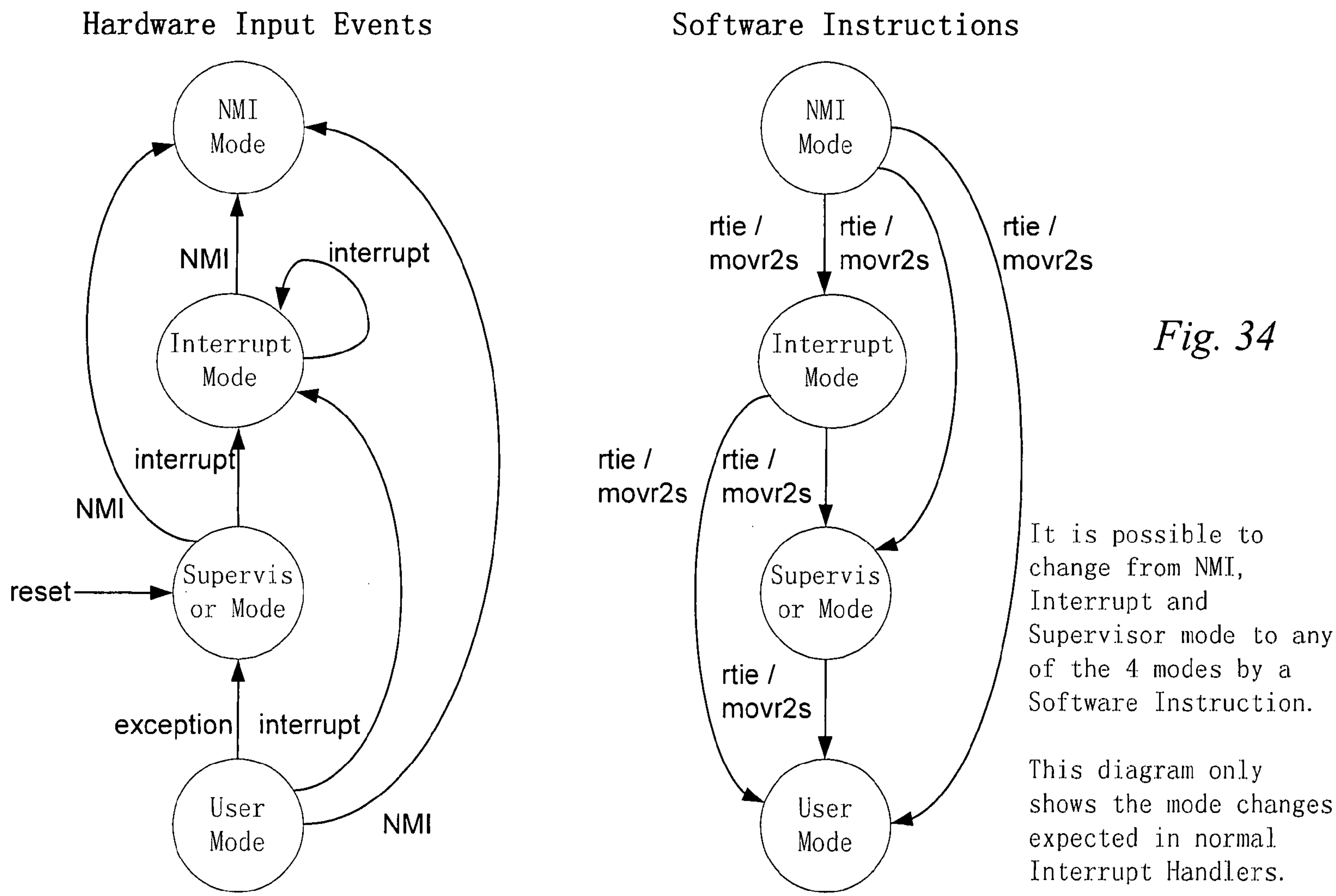
FIG. 34 shows how the mode changes will take place within the programmers model.

FIG. 34 shows how the mode changes will take place.

We expect the four modes to be used as follows:

NMI Mode—Special interrupt mode for supporting non-maskable interrupts.

Interrupt Mode—Hardware Drivers (IVC hardware generates defined interrupt addresses for specified events)

Supervisor Mode—Operating System

User Mode—Application Software

The movr2s instruction can be used to change from any privileged mode to any mode.

It is expected that the majority of code will execute in User Mode and operating system functions will be implemented in Supervisor Mode. User mode code can call Supervisor Mode code by using the trap instruction.

There are two sleep modes. One that allow SIF accesses and one that doesn't.

Program State

The state of the program refers to whether the core is executing instructions or not. The program can be in three states:

Running

Stopped

Stepping

These states will normally only be encountered during interactive debugging.

Normal Registers

Registers R1, R2, R14 and R15 are shadowed such that there is one of each of these registers per processor mode. For these registers, the actual register accessed by an instruction depends on the mode in which the processor is operating.

TABLE 24

| Assembler Syntax | Instruction Encoding | Register Name | Notes |
|---|---|---|---|
| %r0 | 0000 | R0 | Constant zero |
| %r1 | 0001 | R1_U or R1_S or R1_I or R1_N | Dependent on processor mode. Used as function argument 1 and return value. |
| %r2 | 0010 | R2_U or R2_S or R2_I | Dependent on processor mode. R2_I is used for NMI and Interrupt Mode. Used as function argument 2. |
| %r3 | 0011 | R3 | Used as function argument 3. |
| %r4 | 0100 | R4 | Used as function argument 4. |
| %r5 | 0101 | R5 | Used as function argument 5. |
| %r6 | 0110 | R6 | |
| %r7 | 0111 | R7 | |
| %r8 | 1000 | R8 | Accumulator 0 bits [31:0]. |
| %r9 | 1001 | R9 | Accumulator 0 bits [63:32]. |
| %r10 | 1010 | R10 | Accumulator 1 bits [31:0]. |
| %r11 | 1011 | R11 | Accumulator 1 bits [63:32]. |
| %r12 | 1100 | R12 | |
| %r13 | 1101 | R13 | |
| %r14 | 1110 | R14_U or R14_S or R14_I or R14_N | Dependent on processor mode. Used as Link Register (LR). |
| %r15 | 1111 | R15_U or R15_S or R15_I | Dependent on processor mode. R15_I is used for NMI and Interrupt Mode. Used as Stack Pointer (SP). |

The processor resets to Supervisor mode. The initialisation code is then responsible for initialising the stack and starting User Mode. The mode switch is implemented using the movr2s instruction to write to the FLAGS register.

User mode can only access User registers. The Interrupt, NMI and Supervisor modes are known as privileged modes. They can access their own and the User Mode registers. Supervisor Mode cannot access Interrupt or NMI Mode registers and vice versa. In order to initialise Interrupt and NMI Mode registers, programmers must disable interrupts and manually switch to Interrupt or NMI Mode by writing to the FLAGS register.

Code executed in User Mode cannot directly write to the FLAGS register.

Processor State

The processor can be in two states:

Sleeping

Awake

When the processor is awake, SIF accesses can only take place when the CPU is executing a sif instruction.

The C compiler will use R15 as a Stack Pointer. R1, R2, R14 and R15 are shadowed in Supervisor and Interrupt modes. Only, R1 and R14 are shadowed in NMI mode. NMI shares the Interrupt mode R1 and R15 shadow registers. At any one time, a register is only used for a single variable (whether it is 8, 16 or 32 bit). All arithmetic, compare and logical operations operate on full 32-bit words. Load and Store instructions have 16-bit and 8-bit forms (sign and zero extended), however, allowing programs to operate on 16-bit and 8-bit variables.

Breakpoint Registers

Software development on XAP3 can implement break points 2 ways:

Swap normal instruction with brk instruction in memory. This cannot support conditional breaks. This can only be used in memory that supports individual word writes. 'xIDE for XAP3' chooses to use these where possible, as they are an unlimited resource.

Use one of the 8 break registers. These can support conditional breaks. These can be used with any kind of memory (because the memory itself is not modified).

The XAP3 contains eight breakpoint registers, BRK0-7, that can be configured to stop the processor when an address is read, written, or executed.

In addition to this, BRK4-7 have matching count registers, such that the breakpoint is triggered if the address condition described above matches and the value of the corresponding count register is zero. At reset the count registers contain zero, which means the breakpoint registers behave like simple breakpoints. When an address match happens and the count register is not zero, the count register is decremented by one. Note that the count value never cycles: once it reaches zero it stays there, until changed by a write with the movr2b instruction.

In addition to this, BRK6 and BRK7 have associated data and mask registers that allow the breakpoints to be conditional on the data read/written by an instruction. These will only trigger when the address matches, the count is zero and the data and mask conditions are satisfied. The data registers specify 1's and 0's to match against; the mask registers specify don't cares where 1=match, 0=don't care. For example, suppose we want to break on a data value where bit 12 is one, bit 11 is zero and we don't care about the rest of the bits. We specify:

% brk6data=00000000000000000001000000000000

% brk6mask=00000000000000000001100000000000

When a mask register is set to zero the data matching is effectively disabled because all data values will trigger a match. So the break will occur when the address matches and the count is zero.

The count and data match features can be used to implement sophisticated conditional breakpoints in the debugger.

Providing privileged modes access to the breakpoint registers allows Supervisor Mode debuggers to be implemented that allow User Mode tasks to be debugged, without needing to stop the processor. This allows, for example, the main operating system to remain running when debugging User Mode applications.

The bits in the BRKE register are described below.

TABLE 25

| Bit(s) | Flag(s) | Name | Description |
|---|---|---|---|
| 0, 4, 8, 12, 16, 20, 24, 28 | W0, W1, W2, W3, W4, W5, W6, W7 | Write | If set, an instruction making a memory write to the address matching the corresponding BRKn register will halt the processor after the instruction has executed. The PC will point at the next instruction to be executed. |
| 1, 5, 9, 13, 17, 21, 25, 29 | R0, R1, R2, R3, R4, R5, R6, R7 | Read | Similar to above, but for memory reads. |
| 2, 6, 10, 14, 18, 22, 26, 30 | E0, E1, E2, E3, E4, R5, E6, E7 | Execute | If set, an instruction fetch from the address matching the corresponding BRKn register will halt the processor before the instruction is executed. The PC remains at the address of the instruction that caused the break. |

Note:
the BRKE register is one of the Special Registers. The special registers are described herein.

In User mode, the above break conditions will also halt the processor if the B flag is 0. If the B flag is 1 the processor will not halt, but will generate a Break exception instead.

The breakpoint registers can be written and read by privileged modes using the movr2b and movb2r instructions, see below. The movs2r and movr2s instructions allow access to the BRKE register.

TABLE 26

| Assembler Syntax | Instruction Encoding | Register Name | Notes |
|---|---|---|---|
| %brk0 | 0000 | BRK0 | |
| %brk1 | 0001 | BRK1 | |
| %brk2 | 0010 | BRK2 | |
| %brk3 | 0011 | BRK3 | |
| %brk4 | 0100 | BRK4 | |
| %brk5 | 0101 | BRK5 | |
| %brk6 | 0110 | BRK6 | |
| %brk7 | 0111 | BRK7 | |
| %brk4count | 1000 | BRK4COUNT | |
| %brk5count | 1001 | BRK5COUNT | |
| %brk6count | 1010 | BRK6COUNT | |
| %brk7count | 1011 | BRK7COUNT | |
| %brk6mask | 1100 | BRK6MASK | |
| %brk7mask | 1101 | BRK7MASK | |
| %brk6data | 1110 | BRK6DATA | |
| %brk7data | 1111 | BRK7DATA | |

Special Registers

The movs2r and movr2s instructions allow Interrupt, Supervisor and NMI mode access to the Special Registers. These are shown in die table below.

TABLE 27

| Assembler Syntax | Instruction Encoding | Register Name | Notes |
|---|---|---|---|
| %flags | 0000 | FLAGS | |
| %sflags_s | 0001 | SFLAGS_S | Saved Flags. The processor copies FLAGS into this register when an exception happens. |
| %sflags_i | 0010 | SFLAGS_I | Saved Flags. The processor copies FLAGS into this register when an interrupt happens. |
| %sflags_n | 0011 | SFLAGS_N | Saved Flags. The processor copies FLAGS into this register when an NMI happens. |
| %gp_u | 0100 | GP_U | The Global Pointer used by mov.g in User Mode |
| %gp_s | 0101 | GP_S | The Global Pointer used by mov.g in Supervisor Mode |
| %gp_i | 0110 | GP_I | The Global Pointer used by mov.g in Interrupt and NMI Mode |
| %ivtb | 0111 | IVTB | |
| %brke | 1000 | BRKE | |
| | 1001 | reserved | |
| | 1010 | reserved | |
| | 1011 | reserved | |
| | 1100 | reserved | |
| | 1101 | reserved | |
| | 1110 | reserved | |
| | 1111 | reserved | |

The format of the Flags registers and the BRKE is described herein.

Flags

The table below describes the layout of the FLAGS, SIFLAGS_S, SIFLAGS__1 and SIFLAGS_N registers.

TABLE 28

| Bit | Flag | Name | Description |
|---|---|---|---|
| 8 | E | Interrupt Enable | If set, normal interrupts are enabled. (NMI cannot be disabled) |
| 7 | T | Single Step | If set, each User Mode instruction that is executed will throw the SingleStep exception. |
| 6 | B | Break | If set and the processor is in User Mode, a break as a result of a brk instruction or the BRK registers will throw the Break exception. |
| 5:4 | M[1:0] | Mode | 00: Supervisor Mode<br>01: User Mode<br>10: Interrupt Mode<br>11: NMI Mode |
| 3 | V | Overflow | Set if signed arithmetic overflowed |
| 2 | C | Carry | Set if unsigned arithmetic overflowed |
| 1 | N | Negative | Set if result is negative (Rd[31] = 1) |
| 0 | Z | Zero | Set if result is zero (Rd = 0) |

When in the Supervisor, NMI or Interrupt Modes, the entire FLAGS register can be modified by executing the movr2s instruction. The movs2r instruction allows the FLAGS register to be read. The irqe and irqd instructions can be executed in Supervisor, NMI and Interrupt Modes. They are used to enable and disable interrupts.

The mode bits of the FLAGS register are automatically changed when interrupts or exceptions happen. The other bits remain unchanged. At reset the processor will start executing code in supervisor mode.

The condition flags, Z. N, C, and V will be modified as instructions are executed. See the instructions description for details of the instructions that modify flags.

Memory Mold

The memory model has a 32-bit address space (4G Bytes), containing both code and data. The address space is byte addressed. All pointers are kept as full 32-bit byte addresses, and will thus fit in a 32-bit register.

All instructions are aligned to a 16 bit boundary (i.e. bit 0 of the address is 0), but it is not necessary for 32-bit instructions to be aligned to a 32-bit boundary. This means that all 16 bit instructions are aligned, whereas 32 bit instructions can be unaligned.

Figure 35:
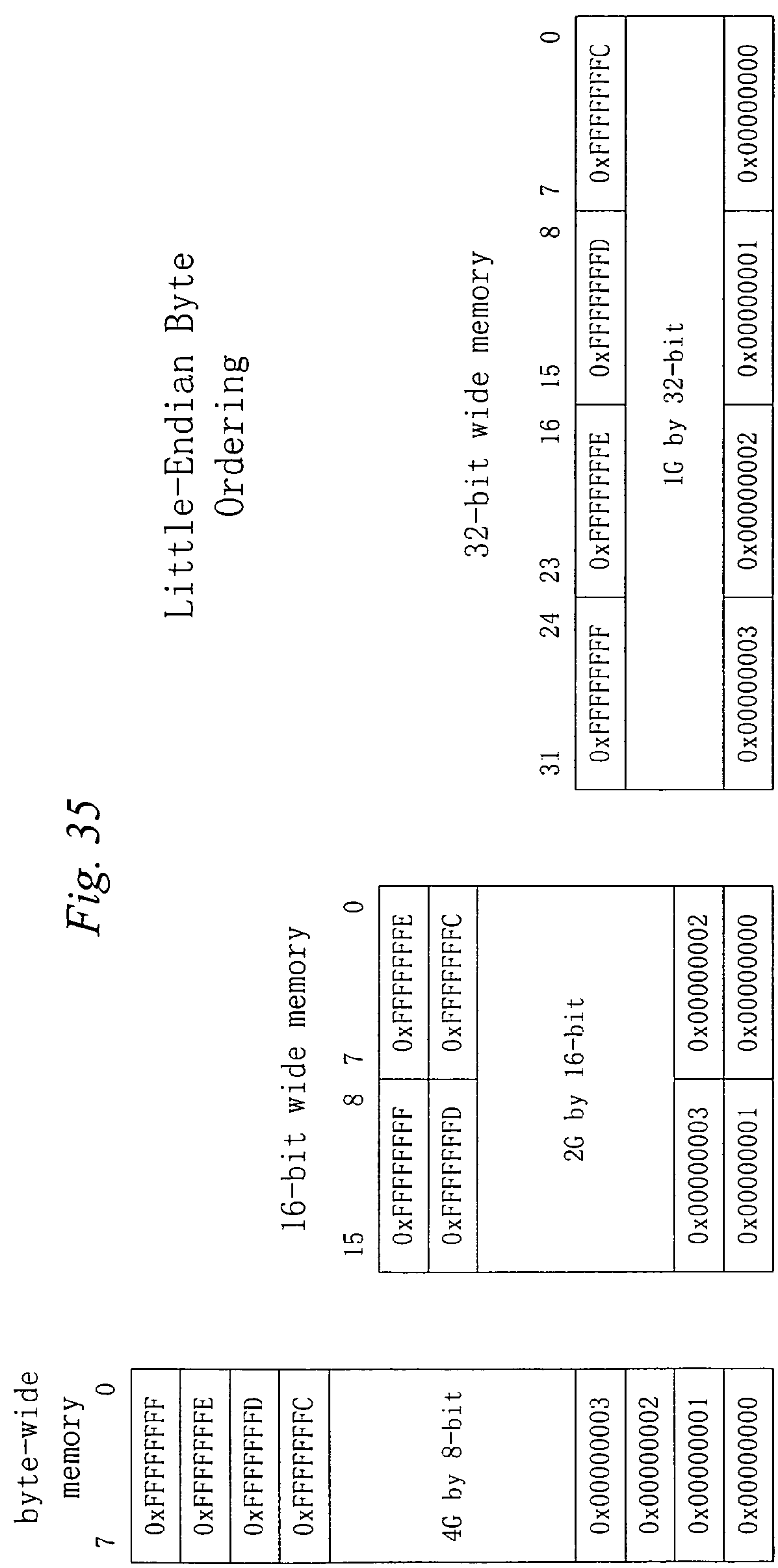
FIG. 35 shows the aligned data objects, with Little-Endian byte ordering.

All data objects are unaligned. This means that 8, 16 and 32-bit data can have any byte address. FIG. 35 only shows aligned data objects.

All words use Little Endian byte ordering, i.e. the low bits of 16-bit or 32-bit or 64-bit words are at the low byte address.

Reset State

All registers and flip-flops in XAP3 are asynchronously set or reset when the RESETB input pin goes low. Wherever possible, the registers and flip-flops should be reset and not set.

Memories (internal and external) cannot be reset and so will not be.

At reset, the XAP3 will be in the following state:—

- Program Counter=0 (i.e. code execution starts from address 0)
- Interrupts disabled
- In Supervisor mode
- Program Running
- Processor Awake
- SIF in Normal mode Calling Convention The bsr.p or bsr.a instruction is used to make function calls. The effect of bsr.p or bsr.a is to transfer the address of the next instruction to the link register, R14, and to transfer the destination address to the PC. Control is returned to the calling function when the contents of R14 is transferred to PC. In practice, the compiler generates the bsr.p instruction. The calling convention for the XAP3 is:—

- The called function does not need to preserve the contents of R1, R2, R3, R4, R5 and R14. R14=Link Register.
- The called function is responsible for preserving the remaining registers (R6-R13, R15) across function calls. This convention is implemented in the xap3ncc C compiler. It is not a hardware property.
- R15 (Stack Pointer) is used to operate a fully covered stack, so interrupt handlers don't need to allow for a partially covered stack as in XAP2 systems. A fully covered stack is when function data is always at positive or zero offset from the stack pointer. A partially covered stack allows negative offsets to be used.

- Arguments are passed to functions in R1, R2, R3, R4, R5 then on the stack. When a 16-bit value is passed to a function in a register, the whole register is used. The upper bits are sign or zero extended according to the type. Structures that are passed in registers are converted to a sequence of 32-bit words.
- The called function places the C function return value in R1 (convention implemented in xap3ncc).
- Special functions may store extra return data in R2, R3, R4, R5.
- When a temporary register is needed, xap3ncc uses R14 (LR)
- Code is compiled independent of processor mode.
- When the processor is interrupted, some assembler code must be executed to store the contents of R3-R5 before the C routine can be called. This is not needed for R1 or R2 as they have hardware shadow registers. C functions will not corrupt (R6-R13, R15), but may corrupt (R1-R5, R14).
- The flags will be set according to the result of comparing the return value, held in R1, with #0. For functions that have no return value (void functions) the flags are undefined.

Application Models

The XAP3 can support various application models.

Statically Linked

This is the basic application model where the locations of all functions and data are known at link time.

Dynamically Loaded

The XAP3 supports systems where applications can be loaded to memory locations that are not known at link time. Statically allocated variables are accessed relative to the GP register.

The relative positions of code and data can be varied at load-time. PC relative addressing for code and constants (probably stored in Flash) means only minimal load time fixups are needed. GP relative addressing for global variables (probably stored in RAM) means only minimal load time fixups for data, too.

If the same program is being run in more than one instance, then the code/constants only need to be loaded once. Each instance will have its own GP value, pointing to its own area of RAM.

Absolute addressing can be used to access code and data at fixed addresses. This means that no load time fixups are required to access absolute code and data locations within the system.

Fixups will be necessary when static initialisers contain an address of a static variable. The location of the static variable is not known until link time, hence the loader will need to fixup the initialisation constant. This code would require a load time fixup when used as part of a dynamically loaded application.

```
static int stVar;
static int * stPtr = &stVar; // Fixup needed because of &
```

XAP3—Immediate Encoding

Many instructions take an immediate value. The width of the immediate bitfield in the instruction varies but is always less than 32 bits. The assembler encodes each immediate operand to generate the correct bitfield for the XAP3 instruction. The rules for performing the encoding vary according to the instruction type. If the encoding is not possible, the assembler generates an error.

The assembler syntax for immediates in instructions is not affected by these rules. Immediate operands can be 32-bit numbers. However, the encoding rules result in only a subset of the $2^{32}$ possible immediates being valid for each rule. The five immediate encoding rules are:

TABLE 29

| Instruction types | Encoding type | Description of immediate encoding rule |
|---|---|---|
| .i<br>.p | no encoding | The immediate operand is entered directly into the bitfield in the instruction. |
| .a | “s” encoding | A slice of bits from the immediate operand is entered into the bitfield in the instruction.<br>XAP3 interprets the bitfield as a signed number and sign-extends it to 32 bits before use. |
| | “u” encoding | A slice of bits from the immediate operand is entered into the bitfield in the instruction.<br>XAP3 interprets the bitfield as an unsigned number and zero-extends it to 32 bits before use. |
| .h | no encoding | The immediate operand is entered directly into the bitfield in the instruction. |
| | “h” encoding | A slice of bits from the immediate operand starting at bit 31 is entered into the bitfield in the instruction.<br>XAP3 extends the bitfield to 32 bits by copying the right-most bit of the bitfield downwards. |

The encoding type is indicated in the encodings for each instruction.

Immediates of zero should be replaced by % r0 for maximum efficiency.

Examples of each type of encoding follow.

.i Instructions—No Immediate Encoding

The cmp.8*.i and cmp.16*.i instructions fall into this category.

The cmp.8*.i instruction specifies an immediate operand and the ALU performs an 8-bit compare against bits [7:0] of Rs. The immediate operand can be signed or unsigned. Valid operands are therefore in the range 0 to 255, or −128 to +127.

The cmp.16*.i instruction specifies an immediate operand and the ALU performs an 16-bit compare against bits [15:0] of Rs. The immediate operand can be signed or unsigned. Valid operands are therefore in the range 0 to 65535, or −32768 to +32767.

.i Instructions—“s” Encoding

This is indicated by an “s” in the instruction bitfield.

The left-most bit in the instruction bitfield is treated as a sign bit. This significance of this bit defines the valid range of the immediate operand. As an example, if the significance of the left-most bit is 28, the range of valid immediates operands is −256 to +255.

Some instructions do not encode the low order bits of the immediate operand. These must be zero in the operand.

Example of "s" Encoding in a 17-bit Immediate .i Instruction

Figure 36:
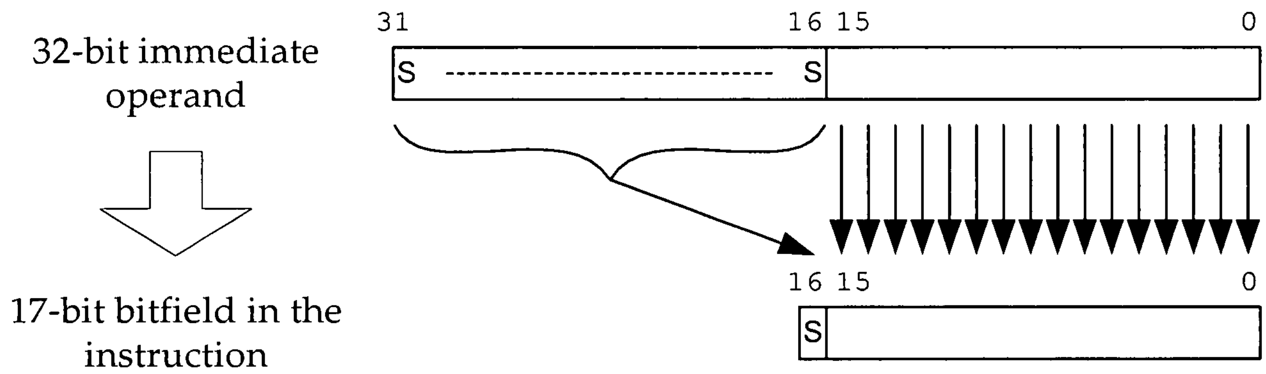
FIG. 36 shows an example of the 32-bit encoding used.

This is used in the 32-bit encoding for the add.i instruction and similar instructions, see FIG. 36.

The valid range for immediate operands is −65536 to +65535. Valid instructions are:

```
add.i          %r1,          %r2,          #65535
add.i          %r1,          %r2,          #-65536
add.i   %r1,   %r2,   #0xFFFF0000   //     -65536
add.i   %r1,   %r2,   #0x0000FFFF   //     +65535
add.i %r1, %r2, #0xFFFF //+65535
```

Example of "s" Encoding in a 7-Bit Immediate .i Instruction

Figure 37:
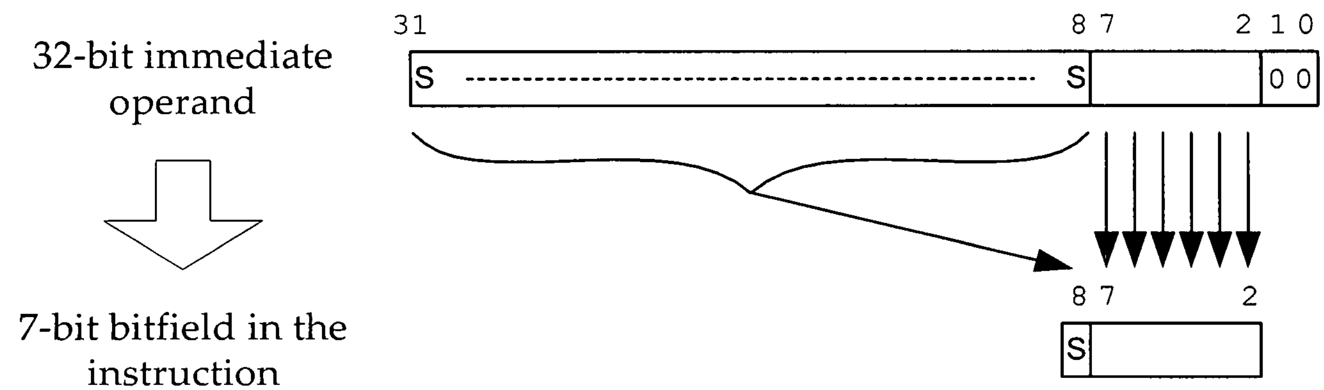
FIG. 37 shows an alternative example of the 32-bit encoding used.

This is used on the 16-bit encoding for the add.i Rd, % r15 instruction. The instruction encodes bits [8:2]s of the immediate. Bits 1 and 0 are not specified in the instruction and must be zero in the immediate operand, see FIG. 37.

The valid range for immediate operands is −256 to +252. Valid instructions are:

```
add.i          %r1,          %r15,          #-256
add.i          %r1,          %r15,          #252
add.i   %r1,   %r15,   #0xFFFFFF00   //     -256
add.i   %r1,   %r15,   #0x000000FC   //     +252
add.i %r1, %r15, #0xFC //+252
```

.i Instructions—"u" Encoding

This is indicated by a "u" in the instruction bitfield. "u" encoding also applies to offsets in the push and pop instructions.

Figure 38:
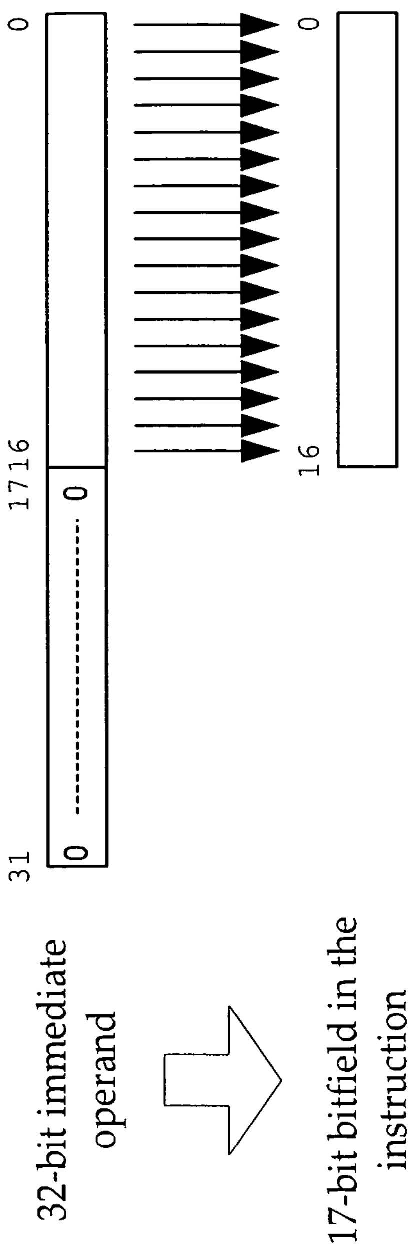
FIG. 38 shows an alternative example of the 32-bit encoding used.

The immediate operand is treated as unsigned. The significance of the left-most bit in the instruction bitfield defines the valid range of the immediate operand. As an example, if the significance of the left-most bit is $2^{16}$, the range of valid immediates operands is 0 to 131071, see FIG. 38.

As with the "s" encoding rule, some instructions do not encode the lowest bits of the operand. These must be zero. Examples of valid instructions are:

ld.16zi % r1, @(2, % r15)//This gives a 16-bit encoding stm.x {% r1-% r6}, @(4, % r15)

.h Instructions—No Immediate Encoding

The cmp.16*.h instructions fall into this category.

The cmp.16*.h instruction specifies an immediate operand and the ALU performs an 16-bit compare against bits [31:16] of Rs. Valid operands are in the range 0xFFFF0000 to 0xFFFFFFFF. The least-significant 16 bits in the immediate operand are not encoded in the instruction and must be zero.

Examples of valid instructions are:

cmp.16.h % r1, #0xFFFF0000 cmp.16c.h % r2, #0xAAAA0000

.h Instructions—"h" Encoding

This is indicated by an "h" in the instruction bitfield.

Figure 39:
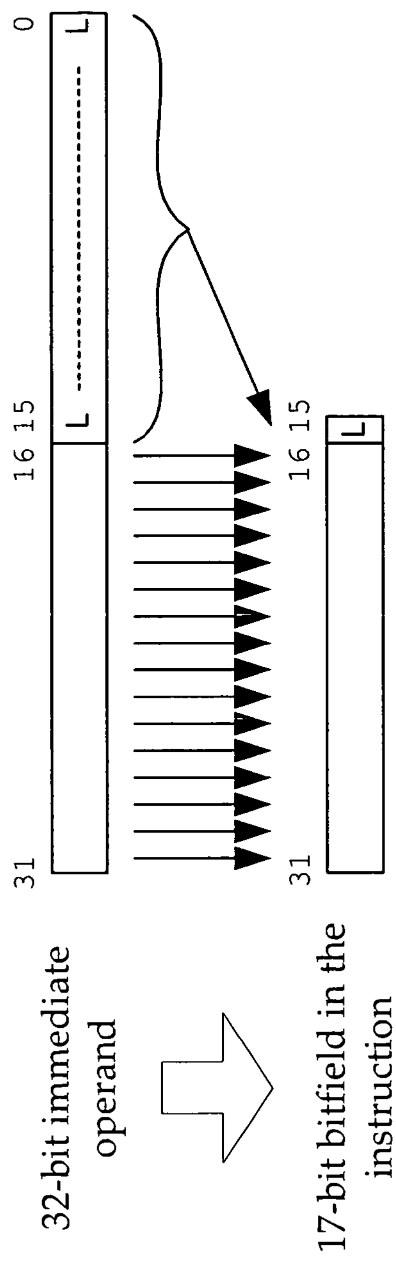
FIG. 39 shows an alternative example of the 32-bit encoding used.

The instruction bitfield encodes bits [31:15] of the immediate operand. Bits [14:0] of the immediate operand must be the same as bit 15, see FIG. 39.

The valid range for immediate operands is 0xFFFF0000 to 0xFFFFFFFF. Valid instructions are:

```
add.h   %r1,   %r2,   #0xFFFF0000   //   +4294901760   or   -65536
add.h      %r1,      %r2,      #0x00FF0000      //+16711680
add.h %r1, %r2, #0x00FFFFFF //+16777215
```

.p Instructions—"s" Encoding bra.p, bsr.p and mov.p take a 25-bit PC-relative offset. The offset is signed and is sign-extended to 32 bits before use. As all instructions start on a 16-bit boundary, bit 0 of the offset must be zero and is not encoded in the instruction.

Example of "s" Encoding in a 25-Bit Immediate .p Instruction

Figure 40:
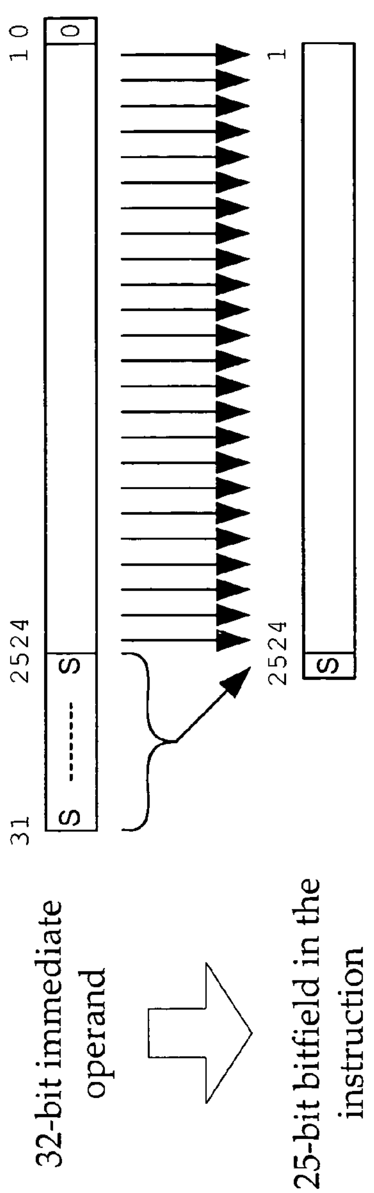
FIG. 40 shows an alternative example of the 32-bit encoding used.

This is used in the 32-bit encodings for the bra.p, bsr.p and mov.p instructions, see FIG. 40.

The valid range for operands is −32 MByte to +32 MByte. The operand represents an offset relative to the current PC.

Figure 41:
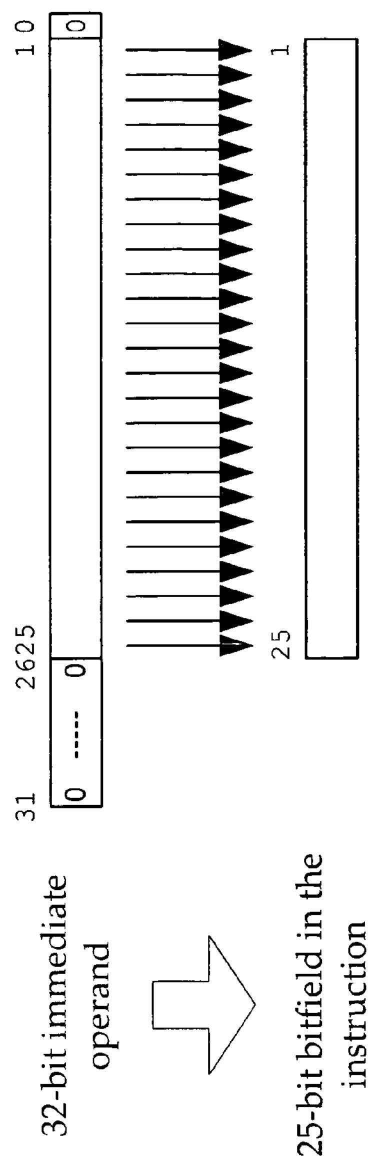
FIG. 41 shows an alternative example of the 32-bit encoding used.

.a Instructions—"u" Encoding bra.a and bsr.a take a 25-bit unsigned absolute address. As all instructions start on a 16-bit boundary, bit 0 of the offset must be zero and is not encoded in the instruction, see FIG. 41.

Figure 42:
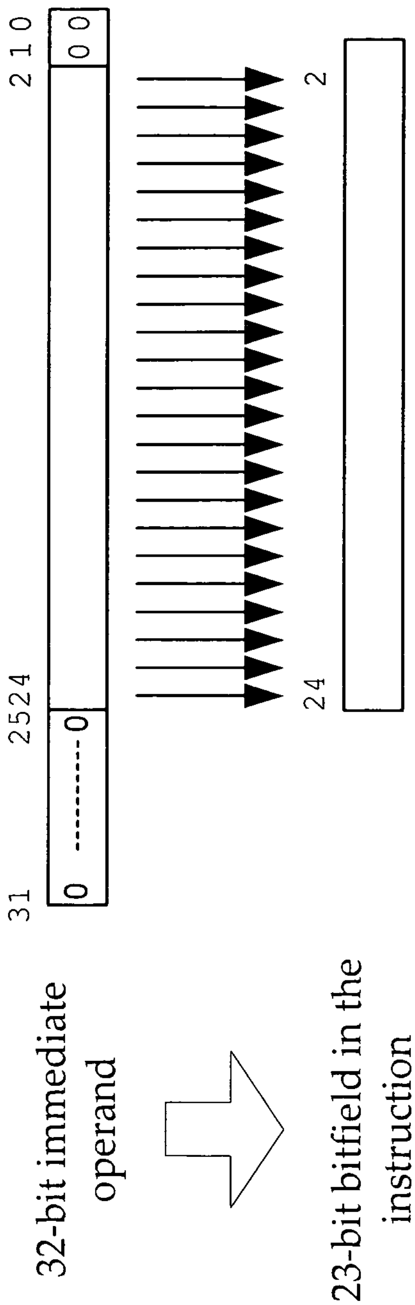
FIG. 42 shows an alternative example of the 32-bit encoding used.

The valid range for operands is 0 to 64 MByte.

mov.g—"u" Encoding mov.g takes a 23-bit signed unsigned offset. The offset is the start address of a data object relative to GP. As all data objects start on a 32-bit boundary, bits [1:0] of the offset must be zero and are not encoded in the instruction, see FIG. 42.

The valid range for operands is 0 to 32 MByte.

Register or Small Immediate Values

Some of the instructions specify either a small immediate or a register (e.g. movm) as an operand. The instruction encoding of each operand uses five bits: one bit selects between register and immediate, four bits specify the register or the immediate.

To specify an immediate value of zero, use register R0. An immediate operand of −1 is encoded in the instruction bitfield as zero. Thus a four-bit immediate bitfield can represent numbers −1, 1, 2, . . . , 15.

Examples of invalid Immediates in Instructions

TABLE 30

| Invalid Instruction | Reason |
|---|---|
| add.i %r1, %r2, #0x00012345 | Not all bits 31:16 are the same. |
| add.h %r1, %r2, #0x12345000 | Not all bits 15:0 are the same. |

The provision of 17-bit immediates enables registers to be set-up in the following way:—

Force an individual bit to 0 & leave all other bits untouched and.i Rd, Rs, #0xFFFF FFFE//forces bit 0 to 0 and.h Rd. Rs, #0x7FFF FFFF//forces bit 31 to 0

Force an individual bit to 1 & leave all other bits untouched or.i Rd, Rs, #0x0000 00011 forces bit 0 to 1 or.h Rd, Rs, #0x8000 0000//forces bit 31 to 1

Because of the way that we use 17-bit immediates in our 32-bit XAP3 instructions:

1 We can interpret the immediates for or.i the same way as we do for and.i.

2 We can interpret the immediates for or.h the same way as we do for and.h.

This would not be possible if we used 16-bit immediates.

The advantage we have can more generally be described for all 4n+1 immediates.

Our *.i instructions can represent immediate values

0x0000 0000 to 0x0000 FFFF and 0xFFFF 0000 to 0xFFFF FFFF

Our *.h instructions can represent immediate values
0x0000 0000 to 0xFFFF 0000
and 0x0000 FFFF to 0xFFFF FFFF XAP3—Instruction Format XAP3—16-Bit Instructions, see FIG. 43

XAP3—32-Bit Instructions, see FIG. 44

TABLE 31

XAP3 - Complete list of instructions

| Mnemonic | Operands | Operation | Flags | Cycles 16-bit | Cycles 32-bit |
|---|---|---|---|---|---|
| Branches | | | | | |
| Unconditional | | | | | |
| bra.a | #address[25:1]u | PC = #address | — | — | 2 |
| bra.p | #offset[25:1]s | PC = PC + #offset | — | 2 | 2 |
| brap.2 | #offset[25:1]s | PC = PC + #offset | — | 2 | — |
| brap.4 | #offset[25:1]s | PC = PC + #offset | — | — | 2 |
| bra.r | Rs | PC = Rs | — | 2 | 2 |
| bsr.a | #address[25:1]u | PC = #address; R14=Return Address | — | — | 3 |
| bsr.p | #offset[25:1]s | PC = PC + #offset; R14=Return Address | — | — | 3 |
| bsr.r | Rs | PC = Rs; R14=Return Address | — | 3 | 3 |
| Conditional | | | | | |
| bcc | #offset[21:1]s | If(C == 0); PC = PC + #offset | — | 1/2 | 1/2 |
| bcs | #offset[21:1]s | If(C == 1); PC = PC + #offset | — | 1/2 | 1/2 |
| beq | #offset[21:1]s | If(Z == 1); PC = PC + #offset | — | 1/2 | 1/2 |
| bge.s | #offset[21:1]s | If(N == V); PC = PC + #offset | — | 1/2 | 1/2 |
| bge.u | #offset[21:1]s | If(C == 0); PC = PC + #offset | — | 1/2 | 1/2 |
| bgt.s | #offset[21:1]s | If(N == V)&&(Z=0); PC = PC + #offset | — | — | 1/2 |
| bgt.u | #offset[21:1]s | If(C == 0)&&(Z=0); PC = PC + #oftset | — | — | 1/2 |
| ble.s | #offset[21:1]s | If(N != V)\|\|(Z=1); PC = PC + #offset | — | — | 1/2 |
| ble.u | #offset[21:1]s | If(C == 1)\|\|(Z=1); PC = PC + #offset | — | — | 1/2 |
| blt.s | #offset[21:1]s | If(N != V); PC = PC + #offset | — | 1/2 | 1/2 |
| blt.u | #offset[21:1]s | If(C == 1); PC = PC + #offset | — | 1/2 | 1/2 |
| bmi | #offset[21:1]s | If(N == 1); PC = PC + #offset | — | — | 1/2 |
| bne | #offset[21:1]s | If(Z == 0); PC = PC + #offset | — | 1/2 | 1/2 |
| bpl | #offset[21:1]s | If(N == 0); PC = PC + #offset | — | — | 1/2 |
| bvc | #offset[21:1]s | If(V == 0); PC = PC + #offset | — | — | 1/2 |
| bvs | #offset[21:1]s | If(V == 1); PC = PC + #offset | — | — | 1/2 |
| bcase.2 | Rs, #imm[12:0]u | If(Rs<#imm); PC += 2*(Rs + 1) | — | — | 2/4 |
| bcase.4 | Rs, #imm[12:0]u | If(Rs<#imm); PC += 4*(Rs + 1) | — | — | 2/4 |
| Note: The number of cycles = a/b. a = branch not taken. b = branch taken. | | | | | |
| Load and Store | | | | | |
| ld.i | Rd, @(offset, Ra) | Rd = *(int32*)(offset + Ra) | ZN- | 2 | 2 |
| ld.16s.i | Rd, @(offset, Ra) | Rd = (sint16)(*(int16*)(offset + Ra)) | ZN- | — | 2 |
| ld.16z.i | Rd, @(offset, Ra) | Rd = (uint16)(*(int16*)(offset + Ra)) | ZN- | 2 | 2 |
| ld.8s.i | Rd, @(offset, Ra) | Rd = (sint8)(*(int8*)(offset + Ra)) | ZN- | — | 2 |
| ld.8z.i | Rd, @(offset, Ra) | Rd = (uint8)(*(int8*)(offset + Ra)) | ZN- | 2 | 2 |
| ld.r | Rd, @(Rx, Ra) | Rd = *(int32*)(4*Rx + Ra) | ZN- | 2 | 2 |
| ld.16s.r | Rd, @(Rx, Ra) | Rd = (sint16)(*(int16*)(2*Rx + Ra)) | ZN- | — | 2 |
| ld.16z.r | Rd, @(Rx, Ra) | Rd = (uint16)(*(int16*)(2*Rx + Ra)) | ZN- | 2 | 2 |
| ld.8s.r | Rd, @(Rx, Ra) | Rd = (sint8)(*(int8*)(Rx + Ra) | ZN- | — | 2 |
| ld.8z.r | Rd, @(Rx, Ra) | Rd = (uint8)(*(int8*)(Rx + Ra) | ZN- | 2 | 2 |
| ldm | Ra, #RegMask[5:1] | %r15 = High Mem; %r0 = Low Mem | ZN- | n + 1 | n + 1 |
| ldm.x | Ra, #RegMask[5:1] | %r0 = High Mem; %r15 = Low Mem | ZN- | — | n + 1 |
| ldm.u | Ra, #RegMask[5:1] | %r15 = High Mem, %flags = Low Mem | ZN- | — | n + 1 |
| st.i | Rs, @(offset, Ra) | *(int32*)(offset + Ra) = Rs | — | 2 | 2 |
| st.16.i | Rs, @(offset, Ra) | (int16)(*(int8*)(offset + Ra)) = Rs[15:0] | — | 2 | 2 |
| st.8.i | Rs, @(offset, Ra) | (sint16)(*(int8*)(offset + Ra)) = Rs[7:0] | — | 2 | 2 |
| st.r | Rs, @(Rx, Ra) | *(int32*)(4*Rx + Ra) = Rs | — | 2 | 2 |
| st.16.r | Rs, @(Rx, Ra) | (int16)(*(int8*)(2*Rx + Ra)) = Rs[15:0] | — | 2 | 2 |
| st.8.r | Rs, @(Rx, Ra) | (sint8)(*(int8*)(Rx + Ra) = Rs[7:0] | — | 2 | 2 |
| stm | Ra, #RegMask[5:1] | High Mem = %r15; Low Mem = %r0 | — | n + 1 | n + 1 |
| stm.x | Ra, #RegMask[5:1] | High Mem = %r0; Low Mem = %r15 | — | — | n + 1 |
| stm.u | Ra, #RegMask[5:1] | High Mem = %r15; Low Mem = %flags | — | — | n + 1 |
| swap.r | Rd, @(0, Ra) | Swap Register with memory: *Ra <–> Rd | ZN- | — | 3 |
| Note: The figures for number of cycles assume aligned memory accesses. Add one cycle per unaligned access. | | | | | |
| Push and Pop | | | | | |
| push | RegList, #offset | push R1-R14 to stack | — | n + 1 | n + 1 |
| push.r | RegList, #offset | push R6-R14 to stack and R1-R5 to higher registers | ZN- | n + 1 | n + 1 |
| pop | RegList, #offset | pop from stack | ZNCV | n + 3 | n + 3 |
| pop.ret | RegList, #offset | pop from stack and return | ZNCV | n + 5 | n + 5 |
| Note: The figures for number of cycles assume aligned memory accesses. Add one cycle per unaligned access. | | | | | |
| n = number of regs pushed/popped | | | | | |

TABLE 31-continued

| XAP3 - Complete list of instructions | | | | | |
|---|---|---|---|---|---|
| | | | | Cycles | |
| Mnemonic | Operands | Operation | Flags | 16-bit | 32-bit |
| Move | | | | | |
| mov.p | Rd, #offset[25:1]s | Rd = Rd + PC + #offset | — | — | 1 |
| mov.g | Rd, #offset[24:2]u | Rd = Rd + GP + #offset | — | — | 1 |
| mov.i | Rd, #imm[15:0] | Rd[15:0] = #imm[15:0] | — | 1 | 1 |
| mov.h | Rd, #imm[31:16] | Rd[31:16] = #imm[31:16]; Rd[15:0] = #imm[16] | — | — | 1 |
| mov.r | Rd, Rt | Rd = Rt | — | 1 | — |
| movm | 5 × Rs or #imm | Moves operands sequentially to R1-R5 | ZN- | 5 | 5 |
| movm.x | 5 × Rs or #imm | Moves operands sequentially to R5-R1 | ZN- | — | 5 |
| Note: movm and movm.x set the flags based on the last register copied | | | | | |
| Conditional Set | | | | | |
| scc.i | Rd, Rs, #imm[12:0] | Rd = (C == 0)? Rs:#imm | — | — | 1 |
| scc.r | Rd, Rs, Rt | Rd = (C == 0)? Rs:Rt | — | — | 1 |
| scs.i | Rd, Rs, #imm[12:0] | Rd = (C == 1)? Rs:#imm | — | — | 1 |
| scs.r | Rd, Rs, Rt | Rd = (C == 1)? Rs:Rt | — | — | 1 |
| seq.i | Rd, Rs, #imm[12:0] | Rd = (Z == 1)? Rs:#imm | — | — | 1 |
| seq.r | Rd, Rs, Rt | Rd = (Z == 1)? Rs:Rt | — | — | 1 |
| sge.s.i | Rd, Rs, #imm[12:0] | Rd = (N == V)? Rs:#imm | — | — | 1 |
| sge.s.r | Rd, Rs, Rt | Rd = (N == V)? Rs:Rt | — | — | 1 |
| sge.u.i | Rd, Rs, #imm[12:0] | Rd = (C == 0)? Rs:#imm | — | — | 1 |
| sge.u.r | Rd, Rs, Rt | Rd = (C == 0)? Rs:Rt | — | — | 1 |
| sgt.s.i | Rd, Rs, #imm[12:0] | Rd = ((N == V)&&(Z == 0))? Rs:#imm | — | — | 1 |
| sgt.s.r | Rd, Rs, Rt | Rd = (N == V)&&(Z == 0))? Rs:Rt | — | — | 1 |
| sgt.u.i | Rd, Rs, #imm[12:0] | Rd = ((C == 0)&&(Z == 0))? Rs:#imm | — | — | 1 |
| sgt.u.r | Rd, Rs, Rt | Rd = ((C == 0)&&(Z == 0))? Rs:Rt | — | — | 1 |
| sle.s.i | Rd, Rs, #imm[12:0] | Rd = ((N != V)\|\|(Z == 1))? Rs:#imm | — | — | 1 |
| sle.s.r | Rd, Rs, Rt | Rd = ((N != V)\|\|(Z == 1))? Rs:Rt | — | — | 1 |
| sle.u.i | Rd, Rs, #imm[12:0] | Rd = ((C == 1)\|\|(Z == 1))? Rs:#imm | — | — | 1 |
| sle.u.r | Rd, Rs, Rt | Rd = ((C == 1)\|\|(Z == 1))? Rs:Rt | — | — | 1 |
| slt.s.i | Rd, Rs, #imm[12:0] | Rd = (N != V)? Rs:#imm | — | — | 1 |
| slt.s.r | Rd, Rs, Rt | Rd = (N != V)? Rs:Rt | — | — | 1 |
| slt.u.i | Rd, Rs, #imm[12:0] | Rd = (C == 1)? Rs:#imm | — | — | 1 |
| slt.u.r | Rd, Rs, Rt | Rd = (C == 1)? Rs:Rt | — | — | 1 |
| smi.i | Rd, Rs, #imm[12:0] | Rd = (N == 1)? Rs:#imm | — | — | 1 |
| smi.r | Rd, Rs, Rt | Rd = (N == 1)? Rs:Rt | — | — | 1 |
| sne.i | Rd, Rs, #imm[12:0] | Rd = (Z == 0)? Rs:#imm | — | — | 1 |
| sne.r | Rd, Rs, Rt | Rd = (Z == 0)? Rs:Rt | — | — | 1 |
| spl.i | Rd, Rs, #imm[12:0] | Rd = (N == 0)? Rs:#imm | — | — | 1 |
| spl.r | Rd, Rs, Rt | Rd = (N == 0)? Rs:Rt | — | — | 1 |
| svc.i | Rd, Rs, #imm[12:0] | Rd = (V == 0)? Rs:#imm | — | — | 1 |
| svc.r | Rd, Rs, Rt | Rd = (V == 0)? Rs:Rt | — | — | 1 |
| svs.i | Rd, Rs, #imm[12:0] | Rd = (V == 1)? Rs:#imm | — | — | 1 |
| svs.r | Rd, Rs, Rt | Rd = (V == 1)? Rs:Rt | — | — | 1 |
| ALU Operations | | | | | |
| Add | | | | | |
| add.c.r | Rd, Rs, Rt | Rd = Rs + Rt + C | ZNCV | — | 1 |
| add.h | Rd, Rs, #imm[31:15] | Rd = Rs+#imm; where #imm[14:0] = #imm[15] | ZNCV | — | 1 |
| add.i | Rd, Rs, #imm | Rd = Rs + #imm | ZNCV | 1 | 1 |
| add.r | Rd, Rs, Rt | Rd = Rs + Rt | ZNCV | 1 | 1 |
| Subtract | | | | | |
| sub.c.r | Rd, Rs, #imm | Rd = Rs−#imm−C | ZNCV | — | 1 |
| sub.r | Rd, Rs, Rt | Rd = Rs−Rt | ZNCV | 1 | 1 |
| sub.x.h | Rd, Rs, #imm[31:15] | Rd = Rs−#imm; where #imm[15:0] = #imm[15] | ZNCV | — | 1 |
| sub.x.i | Rd, Rs, #imm | Rd=#imm−Rs | ZNCV | 1 | 1 |
| Logical | | | | | |
| and.h | Rd, Rs, #imm[31:15] | Rd = Rs&#imm; where #imm[15:0] = #imm[15] | ZN- | — | 1 |
| and.i | Rd, Rs, #imm | Rd = Rs&#imm | ZN- | 1 | 1 |
| and.r | Rd, Rs, Rt | Rd = Rs&Rt | ZN- | 1 | 1 |
| or.h | Rd, Rs, #imm[31:15] | Rd = Rs\|#imm; where #imm[15:0] = #imm[15] | ZN- | — | 1 |
| or.i | Rd, Rs, #imm | Rd = Rs\|#imm | ZN- | 1 | 1 |
| or.r | Rd, Rs, Rt | Rd = Rs\|Rt | ZN- | 1 | 1 |
| xor.h | Rd, Rs, #imm[31:15] | Rd = Rs^#imm; where #imm[15:0] = #imm[15] | ZN- | — | 1 |
| xor.i | Rd, Rs, #imm | Rd = Rs^#imm | ZN- | 1 | 1 |
| xor.r | Rd, Rs, Rt | Rd = Rs^Rt | ZN- | 1 | 1 |
| Multiply | | | | | |
| mult.16s.i | Rd, Rs, #imm[15:0] | Rd = Rs * #imm | ZN- | — | 1 |
| mult.16s.r | Rd, Rs, Rt | Rd = Rs * Rt | ZN- | — | 1 |
| mult.16u.i | Rd, Rs, #imm[15:0] | Rd = Rs * #imm | ZN- | — | 1 |
| mult.16u.r | Rd, Rs, Rt | Rd = Rs * Rt | ZN- | — | 1 |

TABLE 31-continued

XAP3 - Complete list of instructions

| Mnemonic | Operands | Operation | Flags | Cycles 16-bit | Cycles 32-bit |
|---|---|---|---|---|---|
| mult.i | Rd, Rs, #imm[16:0] | Rd = Rs * #imm | ZNCV | — | 3 |
| mult.r | Rd, Rs, Rt | Rd = Rs * Rt | ZNCV | 3 | 3 |
| mult.sh.r | Rd, Rs, Rt, #imm | Rd = (Rs * Rt)>>#imm | ZNCV | — | 5 |
| Divide and Remainder | | | | | |
| div.s.r | Rd, Rs, Rt | Rd = Rs/Rt | ZN-V | — | 32 |
| div.u.r | Rd, Rs, Rt | Rd = Rs/Rt | ZNC- | — | 32 |
| rem.s.r | Rd, Rs, Rt | Rd = Rs%Rt | ZN-V | — | 32 |
| rem.u.r | Rd, Rs, Rt | Rd = Rs%Rt | ZNC- | — | 32 |
| Compare Operations | | Flags= | | | |
| cmp.h | Rs, #imm[31:15] | Rs – #imm; where #imm[15:0] = #imm[15] | ZNCV | — | 1 |
| cmp.16.h | Rs, #imm[31:16] | Rs[31:16] – #imm | ZNCV | — | 1 |
| cmp.i | Rs, #imm[31:0] | Rs – #imm | ZNCV | 1 | 1 |
| cmp.16.i | Rs, #imm[15:0] | Rs[15:0] – #imm | ZNCV | — | 1 |
| cmp.8.i | Rs, imm[7:0] | Rs [7:0] – #imm | ZNCV | — | 1 |
| cmp.r | Rs, Rt | Rs – Rt | ZNCV | 1 | 1 |
| cmp.16.r | Rs, Rt | Rs[15:0] – Rt[15:0] | ZNCV | — | 1 |
| cmp.8.r | Rs, Rt | Rs[7:0] – Rt[7:0] | ZNCV | — | 1 |
| cmp.c.h | Rs, #imm[31:15] | Rs – #imm – C; where #imm[15:0] = #imm[15] | ZNCV | — | 1 |
| cmp.16c.h | Rs, #imm[31:16] | Rs[31:16] – #imm – C | ZNCV | — | 1 |
| cmp.c.i | Rs, #imm[31:0] | Rs – #imm – C | ZNCV | — | 1 |
| cmp.16c.i | Rs, #imm[15:0] | Rs[15:0] – #imm – C | ZNCV | — | 1 |
| cmp.8c.i | Rs, #imm[7:0] | Rs[7:0] – #imm – C | ZNCV | — | 1 |
| cmp.c.r | Rs, Rt | Rs – Rt – C | ZNCV | — | 1 |
| cmp.16c.r | Rs, Rt | Rs[15:0] – Rt[15:0] – C | ZNCV | — | 1 |
| cmp.8c.r | Rs, Rt | Rs[7:0] – Rt[7:0] – C | ZNCV | — | 1 |
| cmp.x.h | Rs, #imm[31:15] | #imm – Rs; where #imm[15:0] = #imm[15] | ZNCV | — | 1 |
| cmp.16x.h | Rs, #imm[31:16] | #imm – Rs[31:16] | ZNCV | — | 1 |
| cmp.x.i | Rs, #imm[31:0] | #imm – Rs | ZNCV | — | 1 |
| cmp.16x.i | Rs, #imm[15:0] | #imm – Rs[15:0] | ZNCV | — | 1 |
| cmp.8x.i | Rs, #imm[7:0] | #imm – Rs[7:0] | ZNCV | — | 1 |
| cmp.xc.h | Rs, #imm[31:15] | #imm – Rs – C; where #imm[15:0] = #imm[15] | ZNCV | — | 1 |
| cmp.16xc.h | Rs, #imm[31:16] | #imm – Rs[31:16] – C | ZNCV | — | 1 |
| cmp.xc.i | Rs, #imm[31:0] | #imm – Rs – C | ZNCV | — | 1 |
| cmp.16xc.i | Rs, #imm[15:0] | #imm – Rs[15:0] – C | ZNCV | — | 1 |
| cmp.8xc.i | Rs, #imm[7:0] | #imm – Rs[7:0] – C | ZNCV | — | 1 |
| Shift and Rotate | | | | | |
| shiftl.64.i | Rd, #shift[5:0]u | | — | — | 2 |

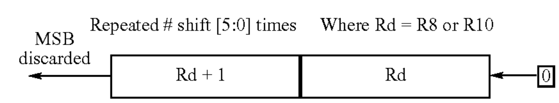

| Mnemonic | Operands | Operation | Flags | Cycles 16-bit | Cycles 32-bit |
|---|---|---|---|---|---|
| shiftl.64.r | Rd, Rt | As above but repeated Rt[5:0] times | — | — | 2 |
| shiftl.r | Rd, Rs, Rt | | ZNC- | — | 1 |

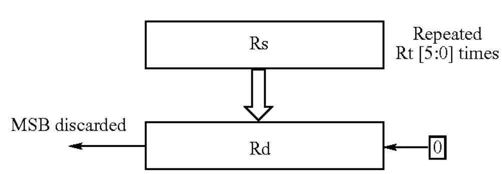

| Mnemonic | Operands | Operation | Flags | Cycles 16-bit | Cycles 32-bit |
|---|---|---|---|---|---|
| shiftr.64s.i | Rd, #shift[5:0]u | | — | — | 2 |

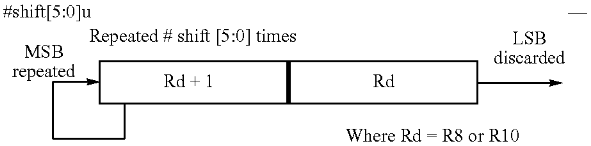

| Mnemonic | Operands | Operation | Flags | Cycles 16-bit | Cycles 32-bit |
|---|---|---|---|---|---|
| shiftr.64s.r | Rd, Rt | As above but repeated Rt[5:0] times | — | — | 2 |
| shiftr.s.r | Rd, Rs, Rt | | ZNC- | — | 1 |

TABLE 31-continued

XAP3 - Complete list of instructions

| Mnemonic | Operands | Operation | Flags | Cycles 16-bit | Cycles 32-bit |
|---|---|---|---|---|---|

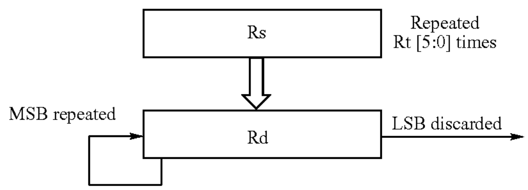

| Mnemonic | Operands | Operation | Flags | Cycles 16-bit | Cycles 32-bit |
|---|---|---|---|---|---|
| shiftr.u.r | Rd, Rs, Rt | As above but MSB is replaced by zero; (unsigned) | ZNC- | — | 1 |
| rlinm.s | Rd, Rs, #shift, #highbit, #lowbit | | ZNC- | 1 | 1 |

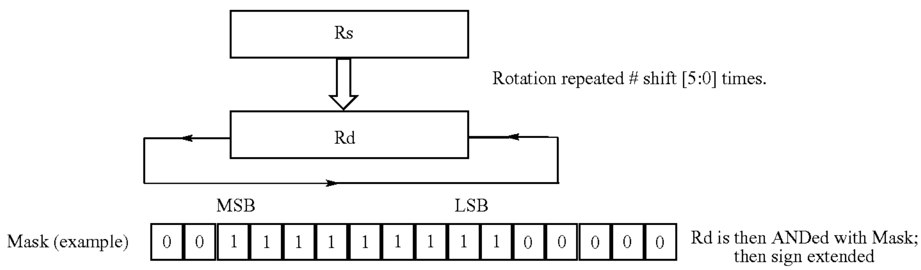

| Mnemonic | Operands | Operation | Flags | Cycles 16-bit | Cycles 32-bit |
|---|---|---|---|---|---|
| rlinm.z | Rd, Rs, #shift, #highbit, #lowbit | As above, but zero extended | ZNC- | 1 | 1 |
| rotatel.r | Rd, Rs, Rt | | ZNC- | — | 1 |

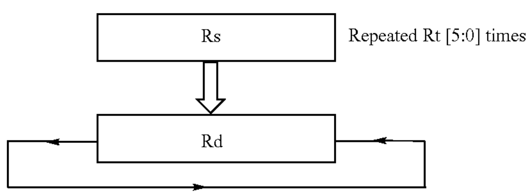

| Mnemonic | Operands | Operation | Flags | Cycles 16-bit | Cycles 32-bit |
|---|---|---|---|---|---|
| DSP instructions | | | | | |
| flip.16b.r | Rd, Rs, Rt, #imm | Flip and byte swap, 16-bit words | ZN- | — | 2 |
| flip.16x.r | Rd, Rs, Rt, #imm | Flip and bit swap, 16-bit words | ZN- | — | 2 |
| flip.8x.r | Rd, Rs, Rt, #imm | Flip and bit swap, in bytes | ZN- | — | 2 |
| flip.b.r | Rd, Rs, Rt, #imm | Flip and byte swap | ZN- | — | 2 |
| flip.r | Rd, Rs, Rt, #imm | Flip | ZN- | — | 2 |
| flip.x.r | Rd, Rs, Rt, #imm | Flip and bit swap | ZN- | — | 2 |
| abs.r | Rd, Rs | Rs >= 0: Rd = Rs; Rs < 0: Rd = −Rs | — | — | 1 |
| msbit.r | Rd, Rs | Rd = (1 + highest bit to contain a 1 in Rs) | — | — | 1 |
| acc.64.r | Rd(R8/R10), Rs | Rd += Rs | — | — | 2 |
| Note: Flip means (Rd = {Rt, Rs}[#imm+3:#imm]) and occurs after the bit or byte swap | | | | | |
| Miscellaneous instructions | | | | | |
| System Instructions | | | | | |
| brk | — | Break | — | 1 | 1 |
| halt | — | Halt | — | — | 1 |
| sleepnop | — | Sleep | — | — | 1 |
| sleepsif | — | Sleep and allow SIF | — | — | 1 |
| flop | — | No Operation | — | 1 | 1 |
| print.r | Rs | Print Register | — | — | 1 |

TABLE 31-continued

XAP3 - Complete list of instructions

| Mnemonic | Operands | Operation | Flags | Cycles 16-bit | Cycles 32-bit |
|---|---|---|---|---|---|
| Debug | | | | | |
| sif | — | Perform SIF cycle | — | 5 | 5 |
| movb2r | Rd, BRs | Rd = BRs | ZN- | — | 1 |
| movr2b | BRd, Rs | BRd = Rs | — | — | 1 |
| ver | Rd | Rd = XAP3 version number | ZN- | | |
| lic | Rd | Rd = XAP3 licence number | ZN- | | |
| Interrupt and exceptions | | | | | |
| rtie | — | Return from interrupt or exception | ZNCV | — | 2 |
| irqe | — | Enables Interrupts (FLAGS.E = 1) | — | — | 1 |
| irqd | — | Disables Interrupts (FLAGS.E = 0) | — | — | 1 |
| irqs | Rd | Interrupt Status (Rd=FLAGS.E?1:0) | ZN- | — | 1 |
| trap.i | #imm[12:0]s | Trap Immediate | — | — | 1 |
| trap.r | Rs | Trap Register | — | 1 | 1 |
| Special Registers | | | | | |
| movs2r | Rd, SRs | Rd = SRs | ZN- | — | 1 |
| movr2s | SRd, Rs | SRd = Rs | — | — | 1 |

Note: All figures for number of cycles assume 32-bit single cycle memory is used.

TABLE 31a

XAP3 - Significant Instructions mult.sh.r

Instruction: mult.sh.r Rd, Rs, Rt, #immediate

Description: 32-bit by 32-bit multiply to give a 64-bit bit result which is then signed-shifted right by the immediate Flags:
- Z Set if the result is zero; cleared otherwise
- N Set if the result is negative; cleared otherwise
- C Set if the result of the unsigned operation is incorrect; cleared otherwise
- V If after the shift Rd[63:32] is not equal to Rd[31].; cleared otherwise Operation: Rd = (Rs * Rt) >> #immediate Usage Notes: The 32×32 multiply of Rs and Rt produces a 64-bit product in a temporary register. The 64-bit product is signed-shifted right by the immediate operand. This shift, like shiftr.64s.i, preserves the sign of the product by re-inserting the sign bit into the vacated most-significant bit.
Finally, the low 32 bits are written to Rd.
This instruction is useful when operating on fixed-point numbers, where a normalising shift is needed after a multiplication.

Examples: mult.sh.r %r1, %r2, %r3, #12

32-bit Encoding

| 31 30 29 28 | 27 26 25 24 | 23 | 22 | 21 | 20 | 19 | 18 | 17 16 15 14 13 12 | 11 10 9 8 | 7 | 6 | 5 | 4 | 3 | 2 | 1 | 0 |
|---|---|---|---|---|---|---|---|---|---|---|---|---|---|---|---|---|---|
| Rd[3:0] | Rs[3:0] | 0 | 0 | 1 | 0 | 0 | 0 | #immediate[5:0]u | Rt[3:0] | 0 | 1 | 1 | 1 | 1 | 1 | 1 | 1 |

16-bit Encoding: There is no 16-bit encoding for this instruction.

TABLE 32 movm

Instruction: movm Rs1/#immediate1,
Rs2/#immediate2,
Rs3/#immediate3,
Rs4/#immediate4,
Rs5/#immediate5

Description: Move multiple values or registers into registers R1 to R5, R1 first Flags:
- Z Set if the result of the last move is zero; cleared otherwise
- N Set if the result of the last move is negative; cleared otherwise
- C Unchanged
- V Unchanged Operation: —

Usage Notes: This instruction allows each of registers R1-R5 to be:
- Loaded with an immediate value in the range −1 to +15, or
- Loaded from another register, or TABLE 32-continued

| | |
|---|---|
| | Unchanged<br>The five operands following the mnemonic control the value written to R1 to R5.<br>Allowed immediate values are −1, 1, 2, . . . 15. To load a register with zero, specify R0 as the source register. |
| Examples | To copy R7 to R1, 7 to R2, R10 to R3, R3 to R4, R12 to R5 (in that order):<br>movm %r7, #7, %r10, %r3, %r12<br>To copy R9 to R2, then −1 to R3:<br>movm %r1, %r9, #−1, %r4, %r5 |
| 32-bit Encoding | |

| 32<br>31 28<br>09 | 22<br>25 24<br>76 | 2 2 2<br>22<br>3 1 0 | 1 1 1 1<br>9 8 7 6 | 1 1<br>13 12<br>5 4 | 11 10 9 8 | 7 | 6 | 5 | 4 | 3 | 2 | 1 | 0 |
|---|---|---|---|---|---|---|---|---|---|---|---|---|---|
| Rs5[3:0]/<br>#imm5[3:0] | Rs4[3:0]/<br>#imm4[3:0] | Rs3[3:0]/<br>#imm3[3:0] | Rs2[3:0]/<br>#imm2[3:0] | Rs1[3:0]/<br>#imm1[3:0] | flags[5:1] | | 0 | 1 | 0 | 1 | 0 | 0 | 1 |

The bits in flags control how each of the Rs fields is interpreted.

A flag bit of 1 indicates that the corresponding Rs field is to be interpreted as an immediate value A flag bit of 0 indicates that the corresponding Rs field is to be treated as a source register specification Immediate values are encoded as follows:

An immediate value of −1 is represented by 0

Immediate values of 1 to 15 are represented by 1 to 15

16-bit Encoding — The following 16-bit encoding can be used:

| 15 | 14 13 12 | 11 10 9 8 | 7 6 5 4 | 3 | 2 | 1 | 0 |
|---|---|---|---|---|---|---|---|
| 0 | rdpr[2:0] | RsB[3:0] | RsA[3:0] | 1 | 0 | 1 | 0 |

The 16-bit version of the instruction can copy to a limited selection of registers. It copies:

RsA to RdA

RsB to RdB

RsA and RsB are defined as follows:

| RsA, RsB | meaning |
|---|---|
| 0 | R0 |
| etc | |
| 7 | R7 |
| 8 | R8 |
| 9 | R9 |
| 10 | R10 |
| 11 | R15 |
| 12 | #4 |
| 13 | #1 |
| 14 | #2 |
| 15 | #3 |

RdA and RdB are defined as follows:

| rdpr | RdB | RdA |
|---|---|---|
| 0 | R2 | R1 |
| 1 | R3 | R1 |
| 2 | R4 | R1 |
| 3 | R5 | R1 |
| 4 | R3 | R2 |
| 5 | R4 | R2 |
| 6 | R4 | R3 |
| 7 | R5 | R4 |

TABLE 33

| | | |
|---|---|---|
| push | | |
| Instruction | | push RegList, #offset |
| Description | | Push registers onto the stack |
| Flags | Z | Unchanged |
| | N | Unchanged |

TABLE 33-continued

| | | |
|---|---|---|
| | C | Unchanged |
| | V | Unchanged |
| Operation | | — |
| Usage Notes | | The offset can take values in the range 0, 4, . . . , 4088,4092.<br>The RegList operand specifies which registers are to be loaded and can contain any of the registers in the range R1 to R14. Refer to section description described herein for details on RegList specifications.<br>The operation sequence is:<br>Decrease the Stack Pointer (R15) by #offset+4n, where n is the number of selected registers.<br>Store the selected registers to memory. R14 is stored first; to the highest address. R1 is stored last, to the lowest address.<br>Registers are pushed onto the stack highest registers first.<br>Refer to description described herein for details of immediate encoding.<br>A NullPointer exception is thrown if the stack pointer descends to zero or within the MMU's defintion of a null pointer. An IllegalDataAccess exception is thrown if the memory access violates the access rules implemented in the MMU. An IllegalStackAddress exception is thrown if the stack pointer is not word-aligned. |
| Examples | | To save registers R1 to R14 and allocate one word on the stack:<br>push {%r1-%r14}, #4<br>push {%r6, %r7, %r8, %r14}, #0 |
| 32-bit Encoding | | |

<table>
<tr><td colspan="8">3 3 2 2 27 26 25 24<br>1 0 9 8</td><td colspan="4">23 22 21 20</td><td colspan="4">19 18 17 16</td><td colspan="4">15 14 13 12</td><td colspan="4">11 10 9 8</td><td colspan="4">7 6 5 4</td><td colspan="4">3 2 1 0</td></tr>
<tr><td>0</td><td colspan="14">RegList[14:1]</td><td colspan="10">#offset[11:2]u</td><td>0</td><td>0</td><td>0</td><td>0</td><td>0</td><td>0</td><td>1</td></tr>
</table>

16-bit Encoding — For push operations of the form push {%r0-%r5}, #0, the following 16-bit encoding can be used:

<table>
<tr><td colspan="4">15 14 13 12</td><td colspan="4">11 10 9 8</td><td colspan="4">7 6 5 4</td><td colspan="4">3 2 1 0</td></tr>
<tr><td>1</td><td>1</td><td>0</td><td colspan="5">RegMask[5:1]</td><td>0</td><td>0</td><td>0</td><td>0</td><td>1</td><td>1</td><td>1</td><td>0</td></tr>
</table>

The following rules apply:
Only registers R1 to R5 can be pushed.
The offset must be zero.

TABLE 34

| | | |
|---|---|---|
| push.r | | |
| Instruction | | push.r RegList, #offset |
| Description | | Push registers to other registers and onto the stack |
| Flags | Z | Set if the result of the final push is zero; cleared otherwise |
| | N | Set if the result of the result of the final push is negative; cleared |
| | C | Unchanged otherwise |
| | V | Unchanged |
| Operation | | — |
| Usage Notes | | The offset can take values in the range 0 to 4092.<br>The RegList operand specifies which registers are to be loaded and can contain any of the registers in the range R1 to R14. Register Ra may be one of the registers specified in RegList. Refer to description described herein for details on RegList specifications.<br>The operation sequence is:<br>Decrease the Stack Pointer (R15) by #offset+4n, where n is the number of selected registers.<br>Store the selected R6-R14 registers to memory. R14 is stored first, to the highest address. R6 is stored last, to the lowest address.<br>Copy selected R1-R5 registers to selected R6-R14, starting with R1.<br>Set the Z and N flags according to the result of the last copy operation. If there is no copy (none of R1-R5 are selected in RegList), the flags are unchanged.<br>Registers are pushed onto the stack highest registers first.<br>If there are more registers in the range R1-R5 than there are in the range R6-R14, the processor copies as many R1-R5 registers as it can to the R6-R14 range, starting with lower-numbered registers. Registers from the R1-R5 range not written to R6-R14 are not moved. The XAP3 assembler does not permit this condition to occur. Refer to description described herein for details of immediate encoding.<br>A NullPointer exception is thrown if the stack pointer descends to zero or within the MMU's defintion of a null pointer. An IllegalDataAccess exception is thrown if the memory access violates the access rules implemented in the MMU. An IllegalStackAddress exception is thrown if the stack pointer is not word-aligned. |

TABLE 34-continued

| | |
|---|---|
| Examples | push.r {%r1, %r3, %r6, %r7, %r8, %r14}, #0 |
| 32-bit Encoding | |

| 31 | 30 29 28 | 27 26 25 24 | 23 22 21 20 | 19 18 17 16 | 15 14 13 12 | 11 10 9 8 | 7 6 5 4 | | | 3 2 1 0 | | | |
|---|---|---|---|---|---|---|---|---|---|---|---|---|---|
| 1 | RegList[14:1] | | | | #offset[11:2]u | | 0 | 0 | 0 | 0 | 0 | 0 | 1 |

16-bit Encoding — The following 16-bit encoding can be used:

| 15 14 13 12 | | | 11 10 9 8 | 7 6 5 4 | 3 2 1 0 | | | |
|---|---|---|---|---|---|---|---|---|
| 1 | 1 | 0 | RegMask[5:1] | RegSet[3:0] | 1 | 1 | 1 | 0 |

The RegMask field has one bit for each of R1 to R5, with the lowest bit selecting R1.
The offset must be zero.
The RegSet field specifies one of the following register sets:

| RegSet[3:0] | registers |
|---|---|
| 0 | { } |
| 1 | {R14} |
| 2 | {R6} |
| 3 | {R6, R14} |
| 4 | {R6, R7} |
| 5 | {R6, R7, R14} |
| 6 | {R6, R7, R8} |
| 7 | {R6, R7, R8, R14} |
| 8 | {R6, R7, R8, R9} |
| 9 | {R6, R7, R8, R9, R14} |
| 10 | {R6, R7, R8, R9, R10} |
| 11 | {R6, R7, R8, R9, R10, R14} |
| 12 | {R6, R7, R8, R9, R10, R11} |
| 13 | {R6, R7, R8, R9, R10, R11, R14} |
| 14 | {R6, R7, R8, R9, R10, R11, R12, R14} |
| 15 | {R6, R7, R8, R9, R10, R11, R12, R13, R14} |

TABLE 35

| | | |
|---|---|---|
| pop | | |
| Instruction | | pop #immediate, RegList, #offset<br>pop Rs, RegList, #offset |
| Description | | Pop registers from stack and load a return value in R1 |
| Flags | Z | Set if the return value is zero; cleared otherwise |
| | N | Set if the return value is negative; cleared otherwise |
| | C | Cleared to zero |
| | V | Cleared to zero |
| Operation | | — |
| Usage Notes | | This instruction can be used to close a stack frame and specify a return value from a subroutine. The return value can be an immediate in the range −1 to +15, or a value from a register. In addition to popping registers off the stack, the stack pointer can be increased by a further amount to remove the callee's local variables. The RegList operand specifies which registers are popped and can contain any of the registers in the range R6 to R14. Refer to description as herein described for details on RegList specifications.<br>The offset can take values in the range 0 to 4092.<br>The operation sequence is:<br>The return value (from a register or an immediate value) is copied to R1<br>Registers R6 to R14 are loaded from the stack, as specified in RegList R6 is loaded from the lowest memory address<br>The stack pointer is increased by #offset+4n, where n is the number of selected registers in RegList.<br>The flags are set based on a comparison of R1 with zero.<br>Registers R1 to R5 cannot be loaded with pop. These registers are not normally preserved over a function call.<br>To return a value of zero from a function, specify R0 as the return value.<br>RegList does not convey the order in which the registers are popped from the stack.<br>Refer to description as herein described for details of immediate encoding.<br>A NullPointer exception is thrown if the stack pointer ascends to zero or to within the MMU's defintion of a null pointer. An IllegalDataAccess exception is |

TABLE 35-continued

| | |
|---|---|
| | thrown if the memory access violates the access rules implemented in the MMU. An IllegalStackAddress exception is thrown if the stack pointer is not word-aligned. |
| Examples | pop #7, {%r6, %r7, %r8, %r14}, #0<br>pop %r9, {%r6, %r7, %r8, %r14}, #8 |
| 32-bit Encoding | |

| 31 | 30 29 28 | 27 26 25 24 | 23 22 21 20 19 18 17 16 | | 15 14 13 12 | 11 10 9 8 | 7 6 5 4 | 3 2 1 0 | | | | | | |
|---|---|---|---|---|---|---|---|---|---|---|---|---|---|---|
| 0 | RegList[14:6] | | | F | Rs[3:0] / #imm[3:0] | #offset[11:2]u | | 0 | 0 | 1 | 1 | 1 | 1 | 1 |

The F bit controls the interpretation of the Rs field:
An F bit of 1 indicates that the Rs field contains an immediate value
An F bit of 0 indicates that the Rs field contains a register specification
Immediate values in the Rs field are encoded as follows:
An immediate value of −1 is represented by 0
Immediate values of 1 to 15 are represented by 1 to 15

16-bit Encoding: The following 16-bit encoding can be used:

| 15 | 14 | 13 | 12 | 11 10 | 9 8 | 7 6 5 4 | 3 | 2 | 1 | 0 |
|---|---|---|---|---|---|---|---|---|---|---|
| 1 | 1 | 1 | 0 | ret[1:0] | #offset[3:2]u | RegSet[3:0] | 1 | 1 | 1 | 0 |

The following rules apply:
The ret field specifies the return value and is:

| ret[1:0] | return value |
|---|---|
| 0 | R0 |
| 1 | R1 |
| 2 | R6 |
| 3 | #1 |

The RegSet field specifies one of the following register sets:

| RegSet | registers |
|---|---|
| 0 | { } |
| 1 | {R14} |
| 2 | {R6} |
| 3 | {R6, R14} |
| 4 | {R6, R7} |
| 5 | {R6, R7, R14} |
| 6 | {R6, R7, R8} |
| 7 | {R6, R7, R8, R14} |
| 8 | {R6, R7, R8, R9} |
| 9 | {R6, R7, R8, R9, R14} |
| 10 | {R6, R7, R8, R9, R10} |
| 11 | {R6, R7, R8, R9, R10, R14} |
| 12 | {R6, R7, R8, R9, R10, R11} |
| 13 | {R6, R7, R8, R9, R10, R11, R14} |
| 14 | {R6, R7, R8, R9, R10, R11, R12, R14} |
| 15 | {R6, R7, R8, R9, R10, R11, R12, R13, R14} |

TABLE 36

| | | |
|---|---|---|
| pop.ret | | |
| Instruction | | pop.ret #immediate, RegList, #offset<br>pop.ret Rs, RegList, #offset |
| Description | | Pop registers from stack and return with a return value in R1 |
| Flags | Z | Set if the return value is zero; cleared otherwise |
| | N | Set if the return value is negative; cleared otherwise |
| | C | Cleared to zero |
| | V | Cleared to zero |
| Operation | | — |
| Usage Notes | | This instruction is identical to pop but additionally returns from a subroutine. The return value can be an immediate in the range −1 to +15, or a value from a register. In addition to popping registers off the stack, the stack pointer can be increased by a further amount to remove the callee's local variables.<br>The RegList operand specifies which registers are popped and can contain any of |

TABLE 36-continued the registers in the range R6 to R14. Refer to section description as herein described for details on RegList specifications.
The offset can take values in the range 0 to 4092.
The operation sequence is:
  The return value (from a register or an immediate value) is copied to R1
  Registers R6 to R14 are loaded from the stack, as specified in RegList R6 is loaded from the lowest memory address
  The stack pointer is increased by #offset+4n, where n is the number of selected registers in RegList.
  The flags are set based on a comparison of R1 with zero.
  The Link Register (R14) is copied to the Program Counter. This is done even if R14 is not in RegList
Registers R1 to R5 cannot be loaded with pop.ret These registers are not normally preserved over a function call.
To return a value of zero from a function, specify, R0 as the return value.
RegList does not convey the order in which the registers are popped from the stack.
Refer to description as herein described for details of immediate encoding.
A NullPointer exception is thrown if the stack pointer ascends to zero or to within the MMU's defintion of a null pointer. An IllegalDataAccess exception is thrown if the memory access violates the access rules implemented in the MMU. An IllegalStackAddress exception is thrown if the stack pointer is not word-aligned. An IllegalCodeAddress exception is thrown if bit 0 of R14 is not zero.

Examples
pop.ret #−1, {%r6, %r7, %r8, %r14}, #0
pop.ret %r11, {%r6, %r7, %r8, %r14}, #8

32-bit Encoding

| 31 | 30 29 28 27 26 25 24 23 22 | 21 | 20 19 18 17 | 16 15 14 13 12 11 10 9 8 7 | 6 | 5 | 4 | 3 | 2 | 1 | 0 |
|---|---|---|---|---|---|---|---|---|---|---|---|
| 1 | RegList[14:6] | F | Rs[3:0] / #imm[3:0] | #offset[11:2]u | 0 | 0 | 1 | 1 | 1 | 1 | 1 |

The F bit controls the interpretation of the Rs field:
  An F bit of 1 indicates that the Rs field contains an immediate value
  An F bit of 0 indicates that the Rs field contains a register specification
Immediate values in the Rs field are encoded as follows:
  An immediate value of −1 is represented by 0
  Immediate values of 1 to 15 are represented by 1 to 15

16-bit Encoding
The following 16-bit encoding can be used:

| 15 | 14 | 13 | 12 | 11 10 | 9 8 | 7 6 5 4 | 3 | 2 | 1 | 0 |
|---|---|---|---|---|---|---|---|---|---|---|
| 1 | 1 | 1 | 1 | ret[1:0] | #off[3:2]u | RegSet[3:0] | 1 | 1 | 1 | 0 |

The following rules apply:
  The ret field specifies the return value and is:

| ret[1:0] | return value |
|---|---|
| 0 | R0 |
| 1 | R1 |
| 2 | R6 |
| 3 | #1 |

The RegSet field specifies one of the following register sets:

| RegSet[3:0] | registers |
|---|---|
| 0 | { } |
| 1 | {R14} |
| 2 | {R6} |
| 3 | {R6, R14} |
| 4 | {R6, R7} |
| 5 | {R6, R7, R14} |
| 6 | {R6, R7, R8} |
| 7 | {R6, R7, R8, R14} |
| 8 | {R6, R7, R8, R9} |
| 9 | {R6, R7, R8, R9, R14} |
| 10 | {R6, R7, R8, R9, R10} |
| 11 | {R6, R7, R8, R9, R10, R14} |
| 12 | {R6, R7, R8, R9, R10, R11} |
| 13 | {R6, R7, R8, R9, R10, R11, R14} |

TABLE 36-continued

| | |
|---|---|
| 14 | {R6, R7, R8, R9, R10, R11, R12, R14} |
| 15 | {R6, R7, R8, R9, R10, R11, R12, R13, R14} |

TABLE 37 add.i

| | | |
|---|---|---|
| Instruction | | add.i Rd, Rs, #immediate |
| Description | | Add a register and an immediate |
| Flags | Z | Set if the result is zero; cleared if the result is non-zero |
| | N | Set if the result is negative; cleared if the result is positive |
| | C | Set if the result of the unsigned operation is not correct; cleared otherwise |
| | V | Set if the result of the signed operation is not correct; cleared otherwise |
| Operation | | Rd = Rs + #immediate |
| Usage Notes | | A number of commonly used combinations of registers and immediates are available as 16-bit encodings.<br>Refer to section further description described herein for details of immediate encoding |
| Examples | | add.i %r1, %r2, #0x00001234<br>add.i %r1, %r2, #0xFFFF4321 |

32-bit Encoding

<table>
<tr><th>31</th><th>30</th><th>29</th><th>28</th><th>27</th><th>26</th><th>25</th><th>24</th><th>23</th><th>22</th><th>21</th><th>20</th><th>19</th><th>18</th><th>17</th><th>16</th><th>15</th><th>14</th><th>13</th><th>12</th><th>11</th><th>10</th><th>9</th><th>8</th><th>7</th><th>6</th><th>5</th><th>4</th><th>3</th><th>2</th><th>1</th><th>0</th></tr>
<tr><td colspan="4">Rd[3:0]</td><td colspan="4">Rs[3:0]</td><td colspan="17">#immediate[16:0]s</td><td>1</td><td>0</td><td>1</td><td>0</td><td>0</td><td>0</td><td>1</td></tr>
</table>

16-bit Encoding - 1 add.i Rd. Rs, #1 is encoded as:

<table>
<tr><th>15</th><th>14</th><th>13</th><th>12</th><th>11</th><th>10</th><th>9</th><th>8</th><th>7</th><th>6</th><th>5</th><th>4</th><th>3</th><th>2</th><th>1</th><th>0</th></tr>
<tr><td colspan="4">Rd[3:0]</td><td colspan="4">Rs[3:0]</td><td>0</td><td>0</td><td>1</td><td>1</td><td>0</td><td>0</td><td>0</td><td>0</td></tr>
</table>

The following rules apply:
Rd=0 is reserved
Rs=0 is reserved 16-bit Encoding - 2 For immediates in the range −64, −63, . . . , −1, 1, 2, . . . , 63, 64, the following encoding can be used:

<table>
<tr><th>15</th><th>14</th><th>13</th><th>12</th><th>11</th><th>10</th><th>9</th><th>8</th><th>7</th><th>6</th><th>5</th><th>4</th><th>3</th><th>2</th><th>1</th><th>0</th></tr>
<tr><td colspan="3">Rd3a[2:0]</td><td>0</td><td>0</td><td colspan="7">#immediate[6:0]s</td><td>0</td><td>0</td><td>1</td><td>0</td></tr>
</table>

The following rules apply:
A #immediate[6:0]s of zero is interpreted as +64. Hence, immediate values in the range −64, −63, . . . , −1, 1, 2, . . . , 63, 64 can be expressed.
Rd and Rs are the same register.
The meaning of the 3-bit Rd3a field is:

| Rd3a | register |
|---|---|
| 000 | R8 |
| 001 | R1 |
| 010 | R2 |
| 011 | R3 |
| 100 | R4 |
| 101 | R9 |
| 110 | R6 |
| 111 | R7 |

16-bit Encoding - 3 add.i Rd, %r15, #immediate is encoded as:

<table>
<tr><th>15</th><th>14</th><th>13</th><th>12</th><th>11</th><th>10</th><th>9</th><th>8</th><th>7</th><th>6</th><th>5</th><th>4</th><th>3</th><th>2</th><th>1</th><th>0</th></tr>
<tr><td colspan="3">Rd3b[2:0]</td><td>0</td><td>1</td><td colspan="7">#immediate[8:2]s</td><td>0</td><td>0</td><td>1</td><td>0</td></tr>
</table>

TABLE 37-continued

The following rules apply:
A #immediate[8:2]s of zero is interpreted as +256. Hence. immediate values in the range −256, −252, . . . , −4, 4, . . . , 252, 256 can be expressed.
The meaning of the 3-bit Rd3b field is:

| Rd3b | register |
|---|---|
| 000 | R15 |
| 001 | R1 |
| 010 | R2 |
| 011 | R3 |
| 100 | R4 |
| 101 | R5 |
| 110 | R6 |
| 111 | R7 |

TABLE 38

| | | |
|---|---|---|
| add.h | | |
| Instruction | | add.h Rd, Rs, #immediate |
| Description | | Add register and a high immediate |
| Flags | Z | Set if the result is zero; cleared if the result is non-zero |
| | N | Set if the result is negative; cleared if the result is positive |
| | C | Set if the result of the unsigned operation is not correct cleared otherwise |
| | V | Set if the result of the signed operation is not correct cleared otherwise |
| Operation | | Rd = Rs + #immediate |
| Usage Notes | | Refer to description as herein described for details of immediate encoding |
| Examples | | add.h %r1, %r2, #0x12340000<br>add.h %r1, %r2, #0x4321FFFF |
| 32-bit Encoding | | |

| 31 30 29 28 | 27 26 25 24 | 23 22 21 20 19 18 17 16 | 15 14 13 12 | 11 10 9 8 | 7 6 5 4 | 3 2 1 0 |
|---|---|---|---|---|---|---|
| Rd[3:0] | Rs[3:0] | #immediate[31:15]h | | | 1 0 0 | 0 0 0 1 |

16-bit Encoding There is no 16-bit encoding for this instruction.

TABLE 39

| | | |
|---|---|---|
| mov.p | | |
| Instruction | | mov.p Rd, #label |
| Description | | Calculate the absolute address of a label |
| Flags | Z | Unchanged |
| | N | Unchanged |
| | C | Unchanged |
| | V | Unchanged |
| Operation | | Rd = #label = PC + #offset |
| Usage Notes | | This instruction calculates the absolute address of a label and is useful in systems where a program's text segment has been loaded to an address other than zero. The label would normally be a label in a text segment rather than a data segment.<br>The label must be aligned to a half-word boundary as the least-significant bit is not encoded in the instruction.<br>The label can be between −32MByte to +32MByte relative to the current PC. To calculate absolute program addresses outside this range, it is necessary to know the actual text segment start address. |
| Examples | | This instruction calculates the absolute address of label36:<br>mov.p %r3, #label36: |
| 32-bit Encoding | | |

| 31 30 29 28 | 27 26 25 24 | 23 22 21 20 | 19 18 17 16 | 15 14 13 12 | 11 10 9 8 | 7 6 5 4 | 3 2 1 0 |
|---|---|---|---|---|---|---|---|
| #offset[25:1]s | | | | | | 0 0 Rd[3:0] | 1 |

The assembler inserts the offset to the label from the current PC into the instruction.
The following rules apply:
Rd cannot be R15 or R0

16-bit Encoding There is no 16-bit encoding for this instruction.

TABLE 40

| | | |
|---|---|---|
| mov.g | | |
| Instruction | | mov.g Rd. #label |
| Description | | Calculate the absolute address of a GP-relative label |
| Flags | Z | Unchanged |
| | N | Unchanged |
| | C | Unchanged |
| | V | Unchanged |
| Operation | | Rd = #label GP + #offset |
| Usage Notes | | This instruction calculates the absolute address of a label and is useful in systems where a program's data segment has been loaded to an address other than zero. The label would normally be a label in a data segment rather than a text segment.<br>The label must be aligned to a word boundary as the two least-significant bits are not encoded in the instruction.<br>For this instruction to produce meaningful results, a program's data segment must be loaded at the address in GP.<br>The GP register appropriate to the current processor's operating mode is used.<br>The label can take values between 0 and 32MB. To calculate absolute addresses for labels outside this range, the addition can be performed with add instructions. |
| Examples | | This instruction calculates the absolute address of label22:<br>mov.g %r3, #label22 |
| 32-bit Encoding | | |

| 31 | 30 | 29 | 28 | 27 | 26 | 25 | 24 | 23 | 22 | 21 | 20 | 19 | 18 | 17 | 16 | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|---|---|---|---|---|---|---|---|---|---|---|---|---|---|---|
| #offset[24:2]u | | | | | | | | | | | | | | | | | | | | | | | Rd[1:0] | | 0 | 1 | 0 | 0 | Rd[3:2] | | 1 |

| | |
|---|---|
| 16-bit Encoding | There is no 16-bit encoding for this instruction. |

TABLE 41

| | | |
|---|---|---|
| sif | | |
| Instruction | | sif |
| Description | | Perform SIF cycle |
| Flags | Z | Unchanged |
| | N | Unchanged |
| | C | Unchanged |
| | V | Unchanged |
| Operation | | if(FLAGS.Mode=UserMode) then<br>allow SIF access<br>else<br>throw IllegalInstruction exception<br>endif<br>The sif instruction allows the XAP3 to perform a SIF cycle. Two SIF cycles are needed to access unaligned data objects in memory.<br>This instruction throws an IllegalInstruction exception if executed in User Mode. |
| Examples | | sif |
| 32-bit Encoding | | |

| 31 | 30 | 29 | 28 | 27 | 26 | 25 | 24 | 23 | 22 | 21 | 20 | 19 | 18 | 17 | 16 | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|---|---|---|---|---|---|---|---|---|---|---|---|---|---|---|
| 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 |

| | |
|---|---|
| | This encoding results in a blank flash memory appearing as sif instructions. |
| 16-bit Encoding | The following 16-bit encoding can be used: |

| 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|
| 0 | 0 | 0 | 0 | 0 | 0 | 0 | 0 | 0 | 0 | 0 | 0 | 0 | 0 | 0 | 0 |

TABLE 42

| | | |
|---|---|---|
| nop | | |
| Instruction | | nop |
| Description | | No operation |
| Flags | Z | Unchanged |
| | N | Unchanged |
| | C | Unchanged |

TABLE 42-continued

| | | |
|---|---|---|
| | V | Unchanged |
| Operation | | — |
| Usage Notes | | — |
| Examples | | nop |
| 32-bit Encoding | | |

| 31 | 30 | 29 | 28 | 27 | 26 | 25 | 24 | 23 | 22 | 21 | 20 | 19 | 18 | 17 | 16 | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|---|---|---|---|---|---|---|---|---|---|---|---|---|---|---|
| 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 0 | 1 | 1 | 1 | 1 | 1 | 1 | 1 | 1 |

16-bit Encoding — The following 16-bit encoding can be used:

| 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|
| 0 | 0 | 0 | 1 | 0 | 0 | 0 | 0 | 0 | 0 | 0 | 0 | 0 | 0 | 0 | 0 |

TABLE 43

| | | |
|---|---|---|
| sleepsif | | |
| Instruction | | sleepsif |
| Description | | Put the XAP3 into SIF Sleep state |
| Flags | Z | Unchanged |
| | N | Unchanged |
| | C | Unchanged |
| | V | Unchanged |
| Operation | | if(FLAGS.Mode = UserMode) then<br>throw IllegalInstruction exception<br>else<br>put XAP3 into SIF Sleep mode<br>endif |
| Usage Notes | | Put the XAP3 into the SIF Sleep state. SIF cycles are allowed in the SIF Sleep state.<br>An IllegalInstruction exception is thrown if this instruction is executed in User Mode. |
| Examples | | sleepsif |
| 32-bit Encoding | | |

| 31 | 30 | 29 | 28 | 27 | 26 | 25 | 24 | 23 | 22 | 21 | 20 | 19 | 18 | 17 | 16 | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|---|---|---|---|---|---|---|---|---|---|---|---|---|---|---|
| 1 | 1 | 1 | 1 | 1 | 1 | 1 | 1 | 1 | 1 | 1 | 1 | 1 | 1 | 1 | 1 | 1 | 1 | 1 | 1 | 1 | 1 | 0 | 1 | 1 | 1 | 1 | 1 | 1 | 1 | 1 | 1 |

16-bit Encoding — There is no 16-bit encoding for this instruction.

TABLE 44

| | | |
|---|---|---|
| sleepnop | | |
| Instruction | | sleepnop |
| Description | | Put the XAP3 into NOP Sleep state |
| Flags | Z | Unchanged |
| | N | Unchanged |
| | C | Unchanged |
| | V | Unchanged |
| Operation | | if(FLAGS.Mode=UserMode) then<br>throw IllegalInstruction exception<br>else<br>put XAP3 into NOP Sleep state<br>endif |
| Usage Notes | | Put the XAP3 into the NOP Sleep state. SIF cycles are not allowed in the NOP Sleep state. xIDE is unable to gain access to XAP3 in this state.<br>An IllegalInstruction exception is thrown if this instruction is executed in User Mode. |
| Examples | | Sleepnop |
| 32-bit Encoding | | |

| 31 | 30 | 29 | 28 | 27 | 26 | 25 | 24 | 23 | 22 | 21 | 20 | 19 | 18 | 17 | 16 | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|---|---|---|---|---|---|---|---|---|---|---|---|---|---|---|
| 1 | 1 | 1 | 1 | 1 | 1 | 1 | 1 | 1 | 1 | 1 | 1 | 1 | 1 | 1 | 1 | 1 | 1 | 1 | 1 | 1 | 1 | 0 | 0 | 1 | 1 | 1 | 1 | 1 | 1 | 1 | 1 |

16-bit Encoding — There is no 16-bit encoding for this instruction.

XAP3—SIF Serial InterFace

A XAP3 ASIC is a single SIF Slave. The ASIC only contains one SIF interface (with 4 or 5 external pins). The default SIF provided with XAP3 can support up to 8 on-chip SIF Processors. These can all be XAP3 or can be a variety of different processors. Each can have its own or shared address space.

The SIF allows the user to debug software and to read or write the registers, memory and IO registers of all the on-chip SIF Processors. The SIF is also used for data acquisition and analogue production test of the ASIC. All memory and IO register reads and writes are performed in a non-invasive manner. The processors continue to operate in functional mode without having their timing affected.

SIF ASIC Block Diagram

FIG. 19 shows an ASIC that contains two XAP3a and one XAP2 processor, each with their own address space. It shows how the single SIF interface is used to access all 3 processors. The SIF_CS pin is not needed for a Single Slave SIF system.

SIF ASIC Modes

At any time, the ASIC has:

One SIF Mode (because the ASIC only contains one SIF).

A SIF Processor Mode for each Processor.

SIF Modes

There are 2 SIF Modes; Normal and Command. These modes are properties of the SIF and are independent of the processor types or states. For the purpose of readability, the 3 statements in each row are defined to be equivalent:

TABLE 46

| Full Statement | Computer Style | Shortened Statement |
|---|---|---|
| The SIF is in Normal SIF Mode | SIF Mode = Normal | The SIF is in Normal mode |
| The SIF is in Command SIF Mode | SIF Mode = Command | The SIF is in Command mode |

SIF Mode=Normal

The ASIC resets with SIF in Normal mode. The properties of Normal SIF Mode are:

SIF Operation is called a SIF Instruction.

The SIF shift register length can be different from one ASIC design to another. This allows the Address, Control, Data and Status fields to have different lengths for different ASIC designs. The default shift register lengths are; XAP1=36 bits, XAP2=64 bits. XAP3=88 bits, XAP4=52 bits. The rest of this document assumes that an 88-bit SIF shift register is being used.

SIF can access all the on-chip processors and their associated memory spaces.

SIF can execute Direct SIF Instructions. These are executed within the SIF itself and do not access a processor.

Direct SIF Instructions require the DEBUG bit to be 1 and the PROCESSOR bits to be 0.

SIF Mode=Command

The SIF Master can issue a special sequence of 256 bits on SIF_MOSI to put the SIF into Command mode. The properties of Command SIF Mode are:

SIF Operation is called a SIF Command.

It uses an 8-bit shift register. This length is the same for all SIF devices.

Commands are 8 bits in to SIF_MOSI.

Responses are 8 bits out from SIF_MISO.

It is used to query or configure the SIF.

It cannot access the processors or their associated memory spaces.

It is used to reveal the hardware details of a particular SIF Slave (field lengths for Address, Control, Data, Status, Polarity of Write bit, etc).

It is used by the SIF Master (e.g. xIDE) at the beginning of a SIF communication. This allows the SIF Master to automatically discover the SIF devices without needing any manual configuration.

Once the SIF Master has discovered all that it needs to know about the SIF Slave, it will put the SIF back into Normal mode. It will normally remain in Normal mode for the rest of the SIF communication.

XAP3 SIF Processor Modes

Most processors have 2 SIF Processor Modes; Normal and Debug. At any time each processor has its own SIF Processor Mode. Each processor's mode can only be changed by the SIF interface.

The SIF Processor can be a variety of different processors. This specification describes the behaviour of the XAP3 in Normal and Debug SIF Processor Modes. For the purpose of readability, the 3 statements in each row are defined to be equivalent:

TABLE 47

| Full Statement | Computer Style | Shortened Statement |
|---|---|---|
| The XAP3 is in Normal SIF Processor Mode | XAP3 SIF Processor Mode = Normal | The XAP3 is in Normal mode |
| The XAP3 is in Debug SIF Processor Mode | XAP3 SIF Processor Mode = Debug | The XAP3 is in Debug mode |

XAP3 SIF Processor Mode=Normal

The ASIC resets with all XAP3 processors in Normal mode. This allows the SIF Master to read and write address-mapped variables (normally IO registers or memory) of the selected XAP3. These can be 8, 16 or 32-bit.

If the XAP3 is in Normal mode, then it will be running. It can only be stopped when in Debug mode.

XAP3 SIF Processor Mode=Debug

The selected XAP3 is put into Debug mode by executing the 'Debug Enable' SIF Instruction. It will then remain in Debug mode until it executes the 'Debug Disable' SIF Instruction (when it will return to Normal mode).

Some SIF Instructions can only be executed if the XAP3 is already in Debug mode. In practise, Debug mode is only used during software development and ASIC test Debug mode allows the user to perform functions such as start, stop, set breakpoint, run to breakpoint, read and write XAP3 internal registers and flags, etc.

It is important to distinguish between (Normal/Debug SIF Instructions) and (Normal/Debug XAP3 SIF Processor Modes):

A Normal SIF Instruction is when the DEBUG bit (bit 35 of SIF shift register)=0. This is for 8, 16 and 32-bit reads and writes to any memory address.

A Debug SIF Instruction is when the DEBUG bit (bit 35 of SIF shift register)=1. This is for all SIF instructions apart from the reads and writes to memory.

Only certain SIF Instructions (Normal Instructions+a few Debug Instructions) can be executed when the XAP3 is in Normal mode. The XAP3 is in Normal mode after reset and after the 'Debug Diasable' SIF Instruction.

All SIF Instructions can be executed when the XAP3 is in Debug Mode. The XAP3 is in Debug Mode after the 'Debug Enable' SIF Instruction.

When are SIF Operations Executed ?

SIF Mode=Command

When the SIF is in Command Mode, SIF Operations (=SIF Commands) are executed immediately. As soon as the 8-bit Command has been shifted in to SIF_MOSI, the 8-bit Response will shift out on SIF_MISO. There is never a wait period. SIF_LOADB is not used. This is why SIF Commands cannot access processors or memory space. They are normally only used to query the SIF configuration (i.e. to read a small ROM inside the SIF).

SIF Mode=Normal

When the SIF is in Normal mode, the SIF Operation (SIF Instruction) consists of 3 stages as follows:

1. Shift In Stage. SIF Master shifts SIF Instruction (Address/Control for Read, Address/Control/Data for Write) into SIF Slave with SIF_CLK and SIF_MOSI.
2. Handshake Stage. SIF Master pulls SIF_LOADB low for a short pulse. SIF Slave holds SIF_LOADB low until the SIF Instruction has been completed. The SIF passes the SIF Instruction on to the selected SIF Processor (e.g. XAP3 identified by CONTROL[2:0]). When/if the selected processor completes the SIF Instruction, it tells the SIF (Slave) which lets go of SIF_LOADB. SIF_LOADB goes high, telling the SIF Master that the SIF Instruction has been completed. Sometimes the handshake is not completed, which is called a SIF Lockup.
3. Shift Out Stage. SIF Master shifts the result (Data/Status for Read, Status for Write) out of SIF Slave with SIF_CLK and SIF_MISO.

In the second stage (Handshake) the SIF Slave holds SIF_LOADB low for varying amounts of time. This depends upon the type of SIF Instruction and whether the selected XAP3 is stopped or running. As soon as the selected XAP3 executes the SIF Instruction, it tells the SIF (Slave). The SIF can then let go of SIF_LOADB, allowing it to return high again. The same handshake process is used for Direct SIF Instructions (which do not access any processor).

Immediate SIF Handshake

In some cases the selected XAP3 executes the SIF Instruction immediately:

- All SIF Instructions if the selected XAP3 is currently executing a 'sleepsif' instruction (in Normal or Debug Mode, Stopped or Running). This implies that the XAP3 is waiting for a 'wake_up' hardware input (to move the processor on to its next instruction).
- All SIF Instructions if the selected XAP3 is stopped (which can only happen in Debug Mode).
- Debug SIF Instructions where (Address=0x0 to 0xFF). This includes Debug Enable, Debug Disable, Stark Stop etc. (see XAP3 SIF Instruction table for details). Such instructions are executed immediately even if the selected XAP3 is running.
- Direct SIF Instructions.

The following SIF Instructions are error conditions which are recognised by the hardware (selected processor or SIF itself). The hardware will respond immediately, returning the appropriate Processor or SIF error code:

- Parity error in PARITY_AC
- Undefined SIF Instruction (Combination of Control and Address fields).
- Wrong data-value for SIF Instructions that require special data-values.
- SIF Write to a read-only register.
- SIF Read from a write-only register.
- Debug SIF Instruction which requires the selected XAP3 to be in Debug mode, when it is actually in Normal mode.
- Debug SIF Instruction which requires the selected XAP3 to be stopped, when it is actually running.

Delayed SIF Handshake

In most cases the selected XAP3 waits for a 'sif' or 'sleepsif' XAP3 instruction before executing the SIF Instruction:

- All Normal SIF Instructions when the XAP3 is running (Normal or Debug mode).
- All Debug SIF Instructions where (Address>0xFF) and when the XAP3 is running (Normal or Debug Mode).

Incomplete SIF Handshake (Ending in SIF Lockup)

The following SIF Instructions are error conditions which cannot be recognised by the hardware (selected processor or SIF itself). In such cases the SIF Slave will permanently hold SIF_LOADB low:

- Normal SIF Instruction when the selected XAP3 is running but never executes a 'sif' or 'sleepsif' instruction.

In such cases the selected XAP3 will never tell the SIF that it has completed the SIF Instruction, so the SIF Slave will never release SIF_LOADB, which the SIF Master will see (and will know that this is being done by the selected SIF Slave). This has the effect of locking up the SIF Interface. The SIF Master must clear this with a SIF Cancel before it can proceed with any further SIF Instructions.

SIF Cancel (to Clear SIF Lockup)

The SIF has locked up because the SIF Master issued an invalid SIF Instruction to the selected SIF Processor in the selected SIF Slave. The SIF Master must be able to detect and recover from such a situation by:

- Having a timeout if SIF_LOADB stays low for too long.
- Issueing a SIF Cancel to clear the lockup in the SIF Slave (or Slaves)

There are 2 types of SIF Cancel:—

- SIF Master toggles SIF_CLK 32 times (this will clear all Slaves that are locked up).
- SIF Master pulls SIF_CS low (not implemented in SIF Slaves before 2005).

In both cases, the SIF Slave will release SIF_LOADB, allowing it to go high again. At this point the SIF lockup has been cleared. This allows the SIF Master to issue further SIF Instructions.

It is possible for the requested SIF Instruction (debug or normal mode, read or write) to be completed even after the Master has started a SIF Cancel. This means that when a Master issues a SIF Cancel, it cannot know whether the previously requested SIF Instruction will happen or not. The Master can assume that if the previous SIF instruction was executed by the Slave, then it will be the correct one requested.

SIF Shift Register

Figure 45:
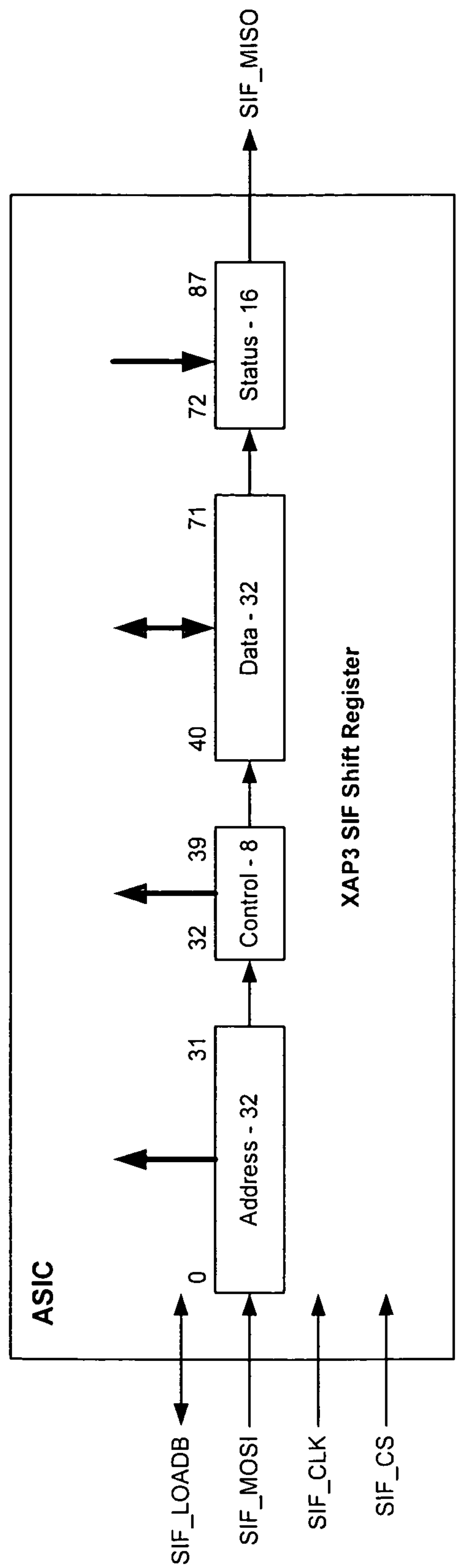
FIG. 45 shows the XAP3 SIF shift register which consists of 4 fields, in total 88-bits long.

XAP3 ASICs contain a SIF shift register which consists of 4 fields, in total 88-bits long, see FIG. 45

Address Field

The 32-bit Address field is interpreted as follows for different SIF Instructions:

- Normal SIF Instructions—Address to read or write in units of the selected processor (e.g. bytes or 16-bit words or 32-bit words).
- Debug SIF Instructions—OpCode for a particular operation Control Field The 8-bit Control field, CONTROL[7:0] consists of:

{WRITE, PARITY_AC, SIZE[1:0], DEBUG, PROCESSOR[2:0]}.

All SIF transactions are one of:

- SIF Read
- SIF Write

The WRITE bit is 1 for SIF Write Instructions and 0 for SIF Read Instructions. For all modes, the only way that the SIF can update any part of the ASIC is with a SIF Write. SIF Reads cannot update any part of the ASIC.

The PARITY_AC bit is set by the SIF Master and checked by the SIF Slave. If the Slave finds a parity error it should set ERROR, ERROR_TYPE and ERROR_CODE[3:0] in the Status field.

The 2 SIZE bits indicate whether the data is 8, 16 or 32-bit The SIZE bits are interpreted for all Normal SIF Instructions (i.e. reads and writes to memory and IO registers), whether the selected XAP3 is in Normal or Debug mode. Debug SIF Instructions which have a Data parameter must set the SIZE bits correctly. Debug SIF Instructions which do not have a Data parameter must set the SIZE bits to 0.

The DEBUG bit is 1 for Debug SIF Instructions and 0 for Normal SIF Instructions.

The 3 PROCESSOR bits select which of the 8 SIF Processors the SIF Instruction should be passed to. All SIF Instructions must select a SIF Processor. Only One SIF Processor can be accessed at a time. There is no state. Successive SIF Instructions can access any SIF Processors in any order. SIF Processor Addresses should be allocated from 0 upwards. If the ASIC only contains one XAP3, it should be at SIF Processor Address 0.

Data Field

The 32-bit Data field is used for SIF Reads and Writes (from or to the specified Memory Address or Register).

For security reasons, some Debug SIF Instructions require the Data field to be set to a specific value.

The Slave should only update the Data field after valid SIF Reads. If there has been any kind of error (i.e. ERROR=1), the Data field should not be updated.

Status Field

The 16-Bit Status field, STATUS[15:0] format depends upon whether there has been an error in the SIF Instruction or not The Slave SIF has a 13-bit input from the main part of the ASIC called STAT[12:0].

The format of the Status field is independent of the specified Address and Control fields. Its format depends upon STAT[12:0] and on whether there was a SIF Error.

Under the various conditions, the SIF should format the Status field as follows:

TABLE 48

| STATUS Bits | STATUS Description | No Error | SIF Error | Processor Error |
|---|---|---|---|---|
| 7:0 | STATUS[7:0] | STAT[7:0] | STAT[7:0] | STAT[7:0] |
| 11:8 | ERROR_CODE[3:0] | STAT[11:8] | SIF Error Code | Proc Error Code |
| 12 | ERROR_TYPE | STAT[12] | 0 | 1 |
| 13 | ERROR | 0 | 1 | 1 |
| 14 | PARITY_D | Data Parity | Data Parity | Data Parity |
| 15 | PARITY_S | Status Parity | Status Parity | Status Parity |

PARITY_D is set first, based on DATA[31:0].

PARITY_S is then set based on STATUS[14:0].

The Slave should update the Status field after all completed (SIF_LOADB handshake) SIF Instructions. This should happen whether there is an error or not Shift Register Bit Definitions The XAP3 SIF shift register is defined as follows:

TABLE 49

| Bit | Name | Comments |
|---|---|---|
| 0 | ADDRESS[0] | Memory address for Normal SIF Instructions. Address is in units of selected SIF Processor (i.e bytes for XAP3, 16-bit words for XAP2 or XAP1). |
| . . . | | |
| 31 | ADDRESS[31] | Parameter for Debug SIF Instructions (see SIF Instruction Table). |
| 32 | PROCESSOR[0] | PROCESSOR[2:0] = CONTROL[2:0]. |
| 33 | PROCESSOR[1] | Selects which SIF Processor (out of 8) to use. |
| 34 | PROCESSOR[2] | SIF Processor addresses should start from 0 and work up to 7. |
| 35 | DEBUG | DEBUG = CONTROL[3].<br>0 = Normal SIF Instruction<br>1 = Debug SIF Instruction |
| 36 | SIZE[0] | SIZE[1:0] = CONTROL[5:4]. |
| 37 | SIZE[1] | Determines the data length of the SIF access.<br>00 = 8-bit, 01 = 16-bit, 10 = 32-bit, 11 = reserved |
| 38 | PARITY_AC | PARITY_AC = CONTROL[6].<br>Set by Master to be odd parity (odd number of 1s) with:<br>CONTROL[7]<br>CONTROL[5:0]<br>ADDRESS[31:0] |
| 39 | WRITE | WRITE = CONTROL[7].<br>0 = Read, 1 = Write<br>Note that this is the opposite polarity from XAP1 and XAP2. The SIF_MOSI pad is tied low, so in XAP3 a random SIF transaction will cause a read and not a write. |
| 40 | DATA[0] | 32-bit: DATA[31:0] is written to or read from the selected address. |
| . . . | | 16-bit Write: DATA[15:0] is written to selected address. |
| 71 | DATA[31] | 16-bit Read: DATA[31:16] = 0, DATA[15:0] = data read from selected address.<br>8-bit Write: DATA[7:0] is written to selected address. |

TABLE 49-continued

| Bit Name | Comments |
|---|---|
| | 8-bit Read: DATA[31:8] = 0, DATA[7:0] = data read from selected address. |
| 72 STATUS[0]<br>. . .<br>79 STATUS[7] | After all completed SIF Instructions, STATUS[7:0] is updated with the hardware status word (STAT[7:0]), independent of the selected Address and Control fields.<br>This will often be used for a TimeStamp, where STAT[0] is the highest frequency bit. |
| 80 ERROR_CODE[0] | STATUS[11:8] is updated with: |
| 81 ERROR_CODE[1] | STAT[11:8], if there is no error. |
| 82 ERROR_CODE[2] | SIF Error Code, if there is a SIF error. |
| 83 ERROR_CODE[3] | Processor Error Code, if there is a Processor error. |
| 84 ERROR_TYPE | STATUS[12] is updated with:<br>STAT[12], if there is no error.<br>0, if there is a SIF error.<br>1, if there is a Processor error. |
| 85 ERROR | ERROR = STATUS[13].<br>0 = No error. SIF Instruction completed successfully.<br>1 = Error. SIF or selected Processor detected an error in the requested SIF Instruction. |
| 86 PARITY_D | PARITY_D = STATUS[14]<br>Set by Slave to be odd parity (odd number of 1s) with:<br>DATA[31:0]<br>This is set before PARITY_S. |
| 87 PARITY_S | PARITY_S = STATUS[15].<br>Set by Slave to be odd parity (odd number of 1s) with:<br>STATUS[14:0]<br>This is set after PARITY_D. |

SIF Instructions

SIF Instruction Types

SIF Operations can be categorised as shown in FIG. 5.

XAP3 SIF instructions are defined by the Control and Address shift register fields.

There are 2 types of SIF Instruction, defined as follows:

Normal SIF Instructions DEBUG=0

Debug SIF Instructions DEBUG=1

A particular kind of Debug SIF Instruction is the Direct SIF Instruction. These are executed in the SIF itself and do not access any processor. Direct SIF Instructions all format the shift register bits as follows:

DEBUG=1

PROCESSOR[2:0]=0

ADDRESS [31:16]=0xFFFF

All other Debug Instructions refer to the selected processor. Such Debug SIF Instructions can be split into 3 categories:

Address<0x80: No mode requirements.

0x7F<Address<0x100 Selected XAP3 must be in Debug mode.

0xFF<Address<0x1000 Selected XAP3 must be in Debug mode and stopped.

Like the XAP3 itself, SIF reads and writes can use any byte address for all word sizes. The words do not need to be memory-aligned. i.e.:

Addresses for 32-bit words do not need to be a multiple of 4

Addresses for 16-bit words do not need to be a multiple of 2

SIF Instruction Table

The following XAP3 SIF Instructions (Normal then Direct then other Debug) cover a subset of possible values for the Control and Address fields. The table does not include the PARITY_AC or WRITE bits in the Control field. The table assumes that PROCESSOR[2:0]=0. All unspecified values are reserved for future use.

TABLE 50

| Control [5:0] | Address | Data | Required XAP3 SIF Processor Modes | R/W | Meaning |
|---|---|---|---|---|---|
| 0x00 | 0xXXXXXXXX | 8-bit | — | RW | Byte Memory Read/Write |
| 0x10 | 0xXXXXXXXX | 16-bit | — | RW | 16-bit Memory Read/Write |
| 0x20 | 0xXXXXXXXX | 32-bit | — | RW | 32-bit Memory Read/Write |
| 0x28 | 0xFFFF0000 | 32-bit | — | R | SIF Read Counter |
| 0x28 | 0xFFFF0001 | 32-bit | — | R | SIF Write Counter |
| 0x28 | 0xFFFF0002 | 32-bit | — | R | SIF Error Counter |
| 0x28 | 0xFFFF0003 | 32-bit | — | R | SIF Cancel Counter |
| 0x28 | 0xFFFF0100 | 0xD5IF | — | W | Reset Everything<br>Off-Chip Devices<br>ASIC |
| 0x28 | 0xFFFF0101 | 0xD5IF | — | W | Debug Reset Everything<br>Off-Chip Devices<br>ASIC<br>Puts all XAP3s into Debug mode and Stopped |

TABLE 50-continued

| Control [5:0] | Address | Data | Required XAP3 SIF Processor Modes | R/W | Meaning |
|---|---|---|---|---|---|
| 0x28 | 0xFFFF0110 | 0xD5IF | — | W | Reset Off-Chip Devices |
| 0x28 | 0xFFFF0120 | 0xD5IF | — | W | Reset ASIC |
| 0x28 | 0xFFFF0121 | 0xD5IF | — | W | Debug Reset ASIC Puts all XAP3s into Debug mode and Stopped |
| 0x28 | 0xFFFF0130 | 0xD5IF | — | W | Reset SIF |
| 0x28 | 0x0 | 0xD0FF | — | W | Debug Disable Puts XAP3 into Normal mode Sets XAP3 Running |
| 0x28 | 0x1 | 0xDBE | — | W | Debug Enable Puts XAP3 into Debug mode |
| 0x28 | 0x2 | 32-bit | — | R | Status Read |
| 0x28 | 0x3 | 32-bit | — | R | Version Number |
| 0x28 | 0x4 | 32-bit | — | R | Licence Number |
| 0x28 | 0x5 | 32-bit | — | R | Register PC |
| 0x28 | 0x6 | 32-bit | — | R | Last PC Address of last completed instruction |
| 0x08 | 0x81 | — | Debug | W | Stop |
| 0x08 | 0x82 | — | Debug | W | Run |
| 0x08 | 0x83 | — | Debug | W | Wakeup |
| 0x08 | 0x84 | — | Debug | W | Single Step |
| 0x08 | 0x85 | — | Debug | W | Run to Break |
| 0x08 | 0x91 | — | Debug | W | Debug Reset selected XAP3 Puts XAP3 into Debug mode and Stopped |
| 0x08 | 0x92 | — | Debug | W | Reset selected User Gates |
| 0x28 | 0x100 | 32-bit | — | R | Register R0 |
| 0x28 | 0x101 | 32-bit | — | R | Register R1 current mode |
| 0x28 | 0x101 | 32-bit | Debug Stopped | W | Register R1 current mode |
| 0x28 | 0x102 | 32-bit | — | R | Register R2 current mode |
| 0x28 | 0x102 | 32-bit | Debug Stopped | W | Register R2 current mode |
| 0x28 | 0x103 | 32-bit | — | R | Register R3 |
| 0x28 | 0x103 | 32-bit | Debug Stopped | W | Register R3 |
| 0x28 | 0x104 | 32-bit | — | R | Register R4 |
| 0x28 | 0x104 | 32-bit | Debug Stopped | W | Register R4 |
| 0x28 | 0x105 | 32-bit | — | R | Register R5 |
| 0x28 | 0x105 | 32-bit | Debug Stopped | W | Register R5 |
| 0x28 | 0x106 | 32-bit | — | R | Register R6 |
| 0x28 | 0x106 | 32-bit | Debug Stopped | W | Register R6 |
| 0x28 | 0x107 | 32-bit | — | R | Register R7 |
| 0x28 | 0x107 | 32-bit | Debug Stopped | W | Register R7 |
| 0x28 | 0x108 | 32-bit | — | R | Register R8 |
| 0x28 | 0x108 | 32-bit | Debug Stopped | W | Register R8 |
| 0x28 | 0x109 | 32-bit | — | R | Register R9 |
| 0x28 | 0x109 | 32-bit | Debug Stopped | W | Register R9 |
| 0x28 | 0x10A | 32-bit | — | R | Register R10 |
| 0x28 | 0x10A | 32-bit | Debug Stopped | W | Register R10 |
| 0x28 | 0x10B | 32-bit | — | R | Register R11 |
| 0x28 | 0x10B | 32-bit | Debug Stopped | W | Register R11 |
| 0x28 | 0x10C | 32-bit | — | R | Register R12 |
| 0x28 | 0x10C | 32-bit | Debug Stopped | W | Register R12 |
| 0x28 | 0x10D | 32-bit | — | R | Register R13 |
| 0x28 | 0x10D | 32-bit | Debug Stopped | W | Register R13 |
| 0x28 | 0x10E | 32-bit | — | R | Register R14 current mode |
| 0x28 | 0x10E | 32-bit | Debug Stopped | W | Register R14 current mode |
| 0x28 | 0x10F | 32-bit | — | R | Register R15 current mode |
| 0x28 | 0x10F | 32-bit | Debug Stopped | W | Register R15 current mode |
| 0x28 | 0x111 | 32-bit | — | R | Register R1_U |

TABLE 50-continued

| Control [5:0] | Address | Data | Required XAP3 SIF Processor Modes | R/W | Meaning |
|---|---|---|---|---|---|
| 0x28 | 0x111 | 32-bit | Debug Stopped | W | Register R1_U |
| 0x28 | 0x112 | 32-bit | — | R | Register R2_U |
| 0x28 | 0x112 | 32-bit | Debug Stopped | W | Register R2_U |
| 0x28 | 0x11E | 32-bit | — | R | Register R14_U |
| 0x28 | 0x11E | 32-bit | Debug Stopped | W | Register R14_U |
| 0x28 | 0x11F | 32-bit | — | R | Register R15_U |
| 0x28 | 0x11F | 32-bit | Debug Stopped | W | Register R15_U |
| 0x28 | 0x121 | 32-bit | — | R | Register R1_S |
| 0x28 | 0x121 | 32-bit | Debug Stopped | W | Register R1_S |
| 0x28 | 0x122 | 32-bit | — | R | Register R2_S |
| 0x28 | 0x122 | 32-bit | Debug Stopped | W | Register R2_S |
| 0x28 | 0x12E | 32-bit | — | R | Register R14_S |
| 0x28 | 0x12E | 32-bit | Debug Stopped | W | Register R14_S |
| 0x28 | 0x12F | 32-bit | — | R | Register R15_S |
| 0x28 | 0x12F | 32-bit | Debug Stopped | W | Register R15_S |
| 0x28 | 0x131 | 32-bit | — | R | Register R1_I |
| 0x28 | 0x131 | 32-bit | Debug Stopped | W | Register R1_I |
| 0x28 | 0x132 | 32-bit | — | R | Register R2_I |
| 0x28 | 0x132 | 32-bit | Debug Stopped | W | Register R2_I |
| 0x28 | 0x13E | 32-bit | — | R | Register R14_I |
| 0x28 | 0x13E | 32-bit | Debug Stopped | W | Register R14_I |
| 0x28 | 0x13F | 32-bit | — | R | Register R15_I |
| 0x28 | 0x13F | 32-bit | Debug Stopped | W | Register R15_I |
| 0x28 | 0x141 | 32-bit | — | R | Register R1_N |
| 0x28 | 0x141 | 32-bit | Debug Stopped | W | Register R1_N |
| 0x28 | 0x14E | 32-bit | — | R | Register R14_N |
| 0x28 | 0x14E | 32-bit | Debug Stopped | W | Register R14_N |
| 0x28 | 0x200 | 32-bit | — | R | Register BRK0 |
| 0x28 | 0x200 | 32-bit | Debug Stopped | W | Register BRK0 |
| 0x28 | 0x201 | 32-bit | — | R | Register BRK1 |
| 0x28 | 0x201 | 32-bit | Debug Stopped | W | Register BRK1 |
| 0x28 | 0x202 | 32-bit | — | R | Register BRK2 |
| 0x28 | 0x202 | 32-bit | Debug Stopped | W | Register BRK2 |
| 0x28 | 0x203 | 32-bit | — | R | Register BRK3 |
| 0x28 | 0x203 | 32-bit | Debug Stopped | W | Register BRK3 |
| 0x28 | 0x204 | 32-bit | — | R | Register BRK4 |
| 0x28 | 0x204 | 32-bit | Debug Stopped | W | Register BRK4 |
| 0x28 | 0x205 | 32-bit | — | R | Register BRK5 |
| 0x28 | 0x205 | 32-bit | Debug Stopped | W | Register BRK5 |
| 0x28 | 0x206 | 32-bit | — | R | Register BRK6 |
| 0x28 | 0x206 | 32-bit | Debug Stopped | W | Register BRK6 |
| 0x28 | 0x207 | 32-bit | — | R | Register BRK7 |
| 0x28 | 0x207 | 32-bit | Debug Stopped | W | Register BRK7 |
| 0x28 | 0x208 | 32-bit | — | R | Register BRK4COUNT |
| 0x28 | 0x208 | 32-bit | Debug Stopped | W | Register BRK4COUNT |
| 0x28 | 0x209 | 32-bit | — | R | Register BRK5COUNT |
| 0x28 | 0x209 | 32-bit | Debug Stopped | W | Register BRK5COUNT |
| 0x28 | 0x20A | 32-bit | — | R | Register BRK6COUNT |
| 0x28 | 0x20A | 32-bit | Debug Stopped | W | Register BRK6COUNT |
| 0x28 | 0x20B | 32-bit | — | R | Register BRK7COUNT |

TABLE 50-continued

| Control [5:0] | Address | Data | Required XAP3 SIF Processor Modes | R/W | Meaning |
|---|---|---|---|---|---|
| 0x28 | 0x20B | 32-bit | Debug Stopped | W | Register BRK7COUNT |
| 0x28 | 0x20C | 32-bit | — | R | Register BRK6MASK |
| 0x28 | 0x20C | 32-bit | Debug Stopped | W | Register BRK6MASK |
| 0x28 | 0x20D | 32-bit | — | R | Register BRK7MASK |
| 0x28 | 0x20D | 32-bit | Debug Stopped | W | Register BRK7MASK |
| 0x28 | 0x20E | 32-bit | — | R | Register BRK6DATA |
| 0x28 | 0x20E | 32-bit | Debug Stopped | W | Register BRK6DATA |
| 0x28 | 0x20F | 32-bit | — | R | Register BRK7DATA |
| 0x28 | 0x20F | 32-bit | Debug Stopped | W | Register BRK7DATA |
| 0x28 | 0x300 | 32-bit | — | R | Register FLAGS |
| 0x28 | 0x300 | 32-bit | Debug Stopped | W | Register FLAGS |
| 0x28 | 0x301 | 32-bit | — | R | Register SFLAGS_S |
| 0x28 | 0x301 | 32-bit | Debug Stopped | W | Register SFLAGS_S |
| 0x28 | 0x302 | 32-bit | — | R | Register SFLAGS_I |
| 0x28 | 0x302 | 32-bit | Debug Stopped | W | Register SFLAGS_I |
| 0x28 | 0x303 | 32-bit | — | R | Register SFLAGS_N |
| 0x28 | 0x303 | 32-bit | Debug Stopped | W | Register SFLAGS_N |
| 0x28 | 0x304 | 32-bit | — | R | Register GP_U |
| 0x28 | 0x304 | 32-bit | Debug Stopped | W | Register GP_U |
| 0x28 | 0x305 | 32-bit | — | R | Register GP_S |
| 0x28 | 0x305 | 32-bit | Debug Stopped | W | Register GP_S |
| 0x28 | 0x306 | 32-bit | — | R | Register GP_I |
| 0x28 | 0x306 | 32-bit | Debug Stopped | W | Register GP_I |
| 0x28 | 0x307 | 32-bit | — | R | Register IVTB |
| 0x28 | 0x307 | 32-bit | Debug Stopped | W | Register IVTB |
| 0x28 | 0x308 | 32-bit | — | R | Register BRKE |
| 0x28 | 0x308 | 32-bit | Debug Stopped | W | Register BRKE |
| 0x28 | 0x314 | 32-bit | — | R | Register GP current mode |
| 0x28 | 0x314 | 32-bit | Debug Stopped | W | Register GP current mode |
| 0x28 | 0x400 | 32-bit | — | R | Register PC |
| 0x28 | 0x400 | 32-bit | Debug Stopped | W | Register PC |

XAP3 Status Register

One of the SIF Debug Instructions reads the selected XAP3 Status Register. Note that this is not the same as the SIF shift register Status field, STATUS[15:0].

The XAP3 Status word contains the following information:

Whether the selected XAP3 is in Debug or Normal mode.

Whether the selected XAP3 program is running or stopped.

Whether the selected XAP3 is awake or asleep.

Current processor mode (User, Supervisor, Interrupt or NMI) of the selected XAP3.

Figure 46:
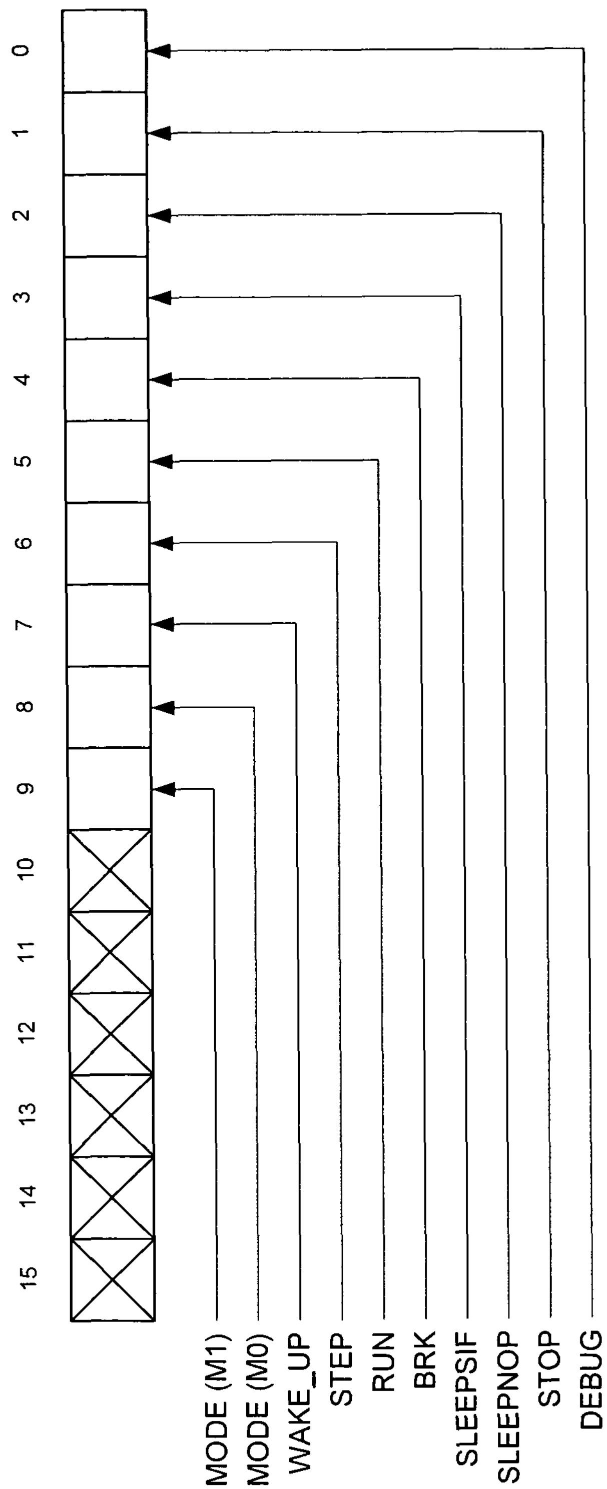
FIG. 46 shows the XAP3 Status Register.

The XAP3 Status Register contains the following bit fields as shown in FIG. 46.

SIF Error Processing

SIF Parity Bits

Normally parity bits can only expose single bit errors. However, the XAP3 SIF has a parity-checking configuration which also detects stuck high and stuck low faults on SIF_MOSI and SIF_MISO.

PARITY_AC

PARITY_AC (Address+Control field parity) is set by the SIF Master and checked by the SIF Slave. It has odd parity, so there are an odd number of 1s in the 40 bits:—

CONTROL[7:0]

ADDRESS[31:0]

If SIF_MOSI is stuck at 1 or stuck at 0, there will be a parity error in PARITY_AC. This is because there is an even number of protected bits (including PARITY_AC) and odd parity checking. This means that the bits cannot all be the same value.

If the Slave detects a parity error in PARITY_AC it should:—

Not pass the SIF Instruction on to a processor.

Set ERROR=1 in Status field

Set ERROR_TYPE=0 in the Status field.

Format ERROR_CODE[3:0] in the Status field.

Complete the SIF Handshake (SIF_LOADB).

PARITY_D

PARITY_D (Data field parity) is set by the SIF Slave and checked by the SIF Computer. It has odd parity, so there are an odd number of Is in the 33 bits:—

PARITY_D
DATA[31:0]
PARITY_D is based on the values in the:
Data Capture Register, for valid SIF Reads (i.e when Data Shift Register is updated with a parallel load from the Data Capture Register).
Data Shift Register for SIF Writes and SIF Errors (i.e when Data Shift Register is not updated with a parallel load from the Data Capture Register).

PARITY_S

PARITY_S (Status field parity) is set by the SIF Slave and checked by the SIF Computer. PARITY_S should be calculated after PARITY_D. It has odd parity, so there are an odd number of 1s in the 16 bits:

STATUS[15:0]

If SIF_MISO is stuck at 1 or stuck at 0, there will be a parity error in PARITY_S. This is because there is an even number of protected bits (including PARITY_S) and odd parity checking. This means that the bits cannot all be the same value.

PARITY_S is based on the values in the Status Capture Register (which will always be parallel loaded into the Status Shift Register when a SIF Instruction is completed).

SIF Error Reporting in Status Field

SIF Error Codes

When the SIF detects an error in the SIF Instruction it should set:

ERROR=1
ERROR_TYPE=0
ERROR_CODE[3:0] as follows:

TABLE 51

| SIF Error Code | Description |
|---|---|
| 0 | Parity error in PARITY_AC |
| 1 | Unrecognised Direct SIF Instruction |
| 2 | Wrong data-value in Direct SIF Instruction |
| 3 | Unrecognised Processor |

Processor Error Codes

When the selected XAP3 detects an error in the SIF Instruction it should set:

ERROR=1
ERROR_TYPE=1
ERROR_CODE[3:0] as follows:

TABLE 52

| Processor Error Code | Description |
|---|---|
| 0 | Unrecognised SIF Instruction |
| 1 | Wrong data-value in SIF Instruction |
| 2 | SIF Write to a read-only register |
| 3 | SIF Read from a write-only register |
| 4 | Processor not in Debug mode |
| 5 | Processor not Stopped |

SIF Counters

The SIF contains four 32-bit counters that can be read by Direct SIF Instructions:

SIF Read Counter
SIF Write Counter
SIF Error Counter
SIF Cancel Counter

The counters reset to 0 (by hardware, ASIC or SIF Reset). The counters wrap and do not have any overflow detection.

The SIF increments each counter by 1 when the relevant event occurs:

Read or Write or Error counter is incremented when the Capture registers are updated. 1 of these counters is incremented at the end of a completed SIF Instruction.
Cancel counter is incremented when SIF_LOADB_SLAVE goes high as a result of a SIF Cancel.

It is possible for a SIF Read or Write to be completed after a SIF Cancel. In this case, the Cancel Counter and one of the other counters will be incremented.

Figure 47:
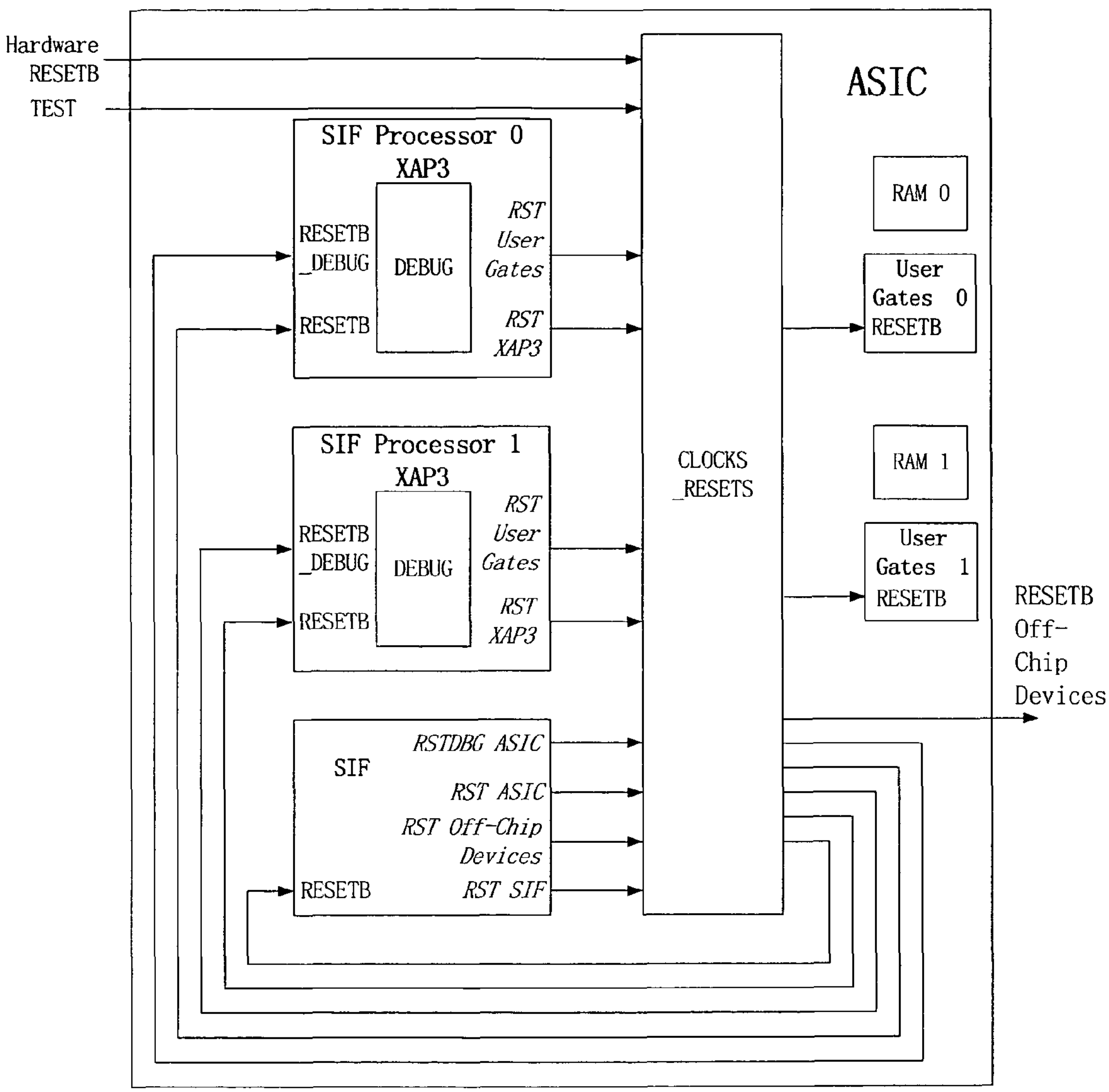
FIG. 47 shows the XAP3 reset schematic.

SIF Resets, see FIG. 47

The SIF and XAP3 Verilog modules contain:

RESETB*—Asynchronous active low reset inputs (all flipflops will be cleared even if clocks are stopped). By default, all flipflops are reset to 0.
RST*—Synchronous (clocked by system CLK) active high reset outputs.

The SIF and XAP3 Verilog modules do not contain any test mode circuitry. They do not impose or assume any test strategy for the ASIC. They are scannable designs that the designer can configure for a variety of test strategies.

All conditioning of clock and reset signals as required for Scan and other test modes should be done in the CLOCKS_RESETS module. This module generates the RESETB resets that are fed to the various modules in the ASIC. These signals will often need to be controlled by external pins in TEST mode, to make the ASIC fully scannable. The CLOCKS_RESETS module is application-specific and should be designed by the user to conform to the test strategy being used for the ASIC.

The SIF Instructions include several resets for different parts of the ASIC and Off-Chip devices. SIF resets are done by 2 mechanisms:

Direct SIF Instructions. Reset 'everything', off-chip devices, whole ASIC, SIF itself
Processor SIF Instructions to a selected processor. Reset that processor, associated user gates To avoid resets occurring by accident:

Direct SIF Instruction resets require special data values.
Processor SIF Instructions require the selected processor to be in Debug mode.

The XAP3 has 2 reset inputs:

RESETB. Resets to the state defined section 0. i.e in Normal mode and Running,
RESETB_DEBUG. Same as RESETB except that it is in Debug mode and Stopped.

RESETB_DEBUG is needed so that the whole ASIC or selected processors can be put into reset state and stopped, before single-stepping for software-debug, XAP4—16 Bit Processor The following will provide a description of the third embodiment, XAP4.

Figure 48:
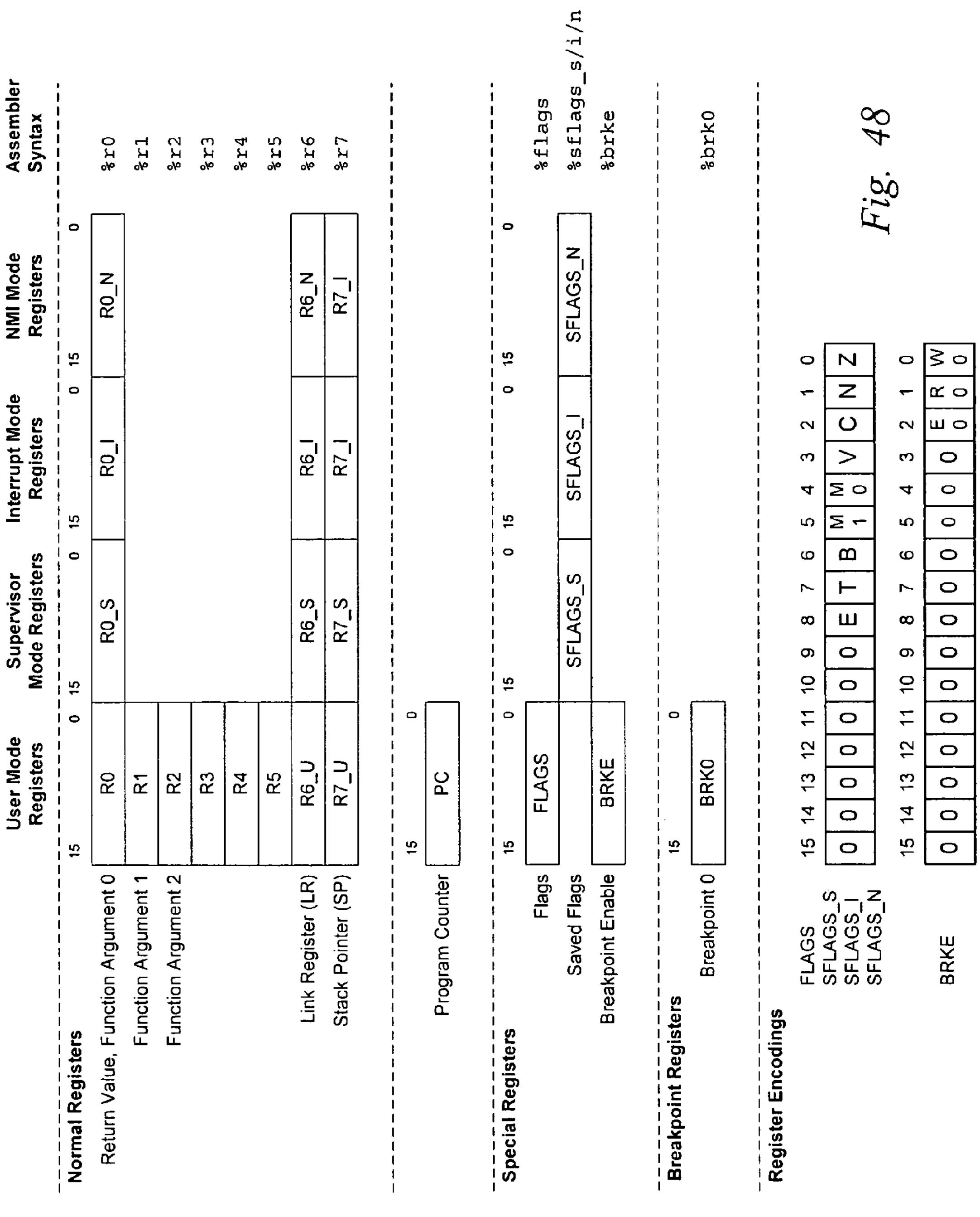
FIG. 48 shows the XAP4 programmers model.

XAP4—Programmer's Model, see FIG. 48

Processor Mode

There are 4 modes of operation:

User
Supervisor
Interrupt
NMI (Non-Maskable Interrupt)

User mode allows unknown software to be run safely without affecting the operation of the interrupt mode code. The other 3 modes are privileged modes.

FIG. 34 shows how the mode changes will take place.

We expect the 4 modes to be used as follows:

NMI Mode—Special Interrupt mode for supporting non-maskable interrupts.

Interrupt Mode—Hardware Drivers (IVC hardware generates defined interrupt addresses for specified events)

Supervisor Mode—Operating System

User Mode—Application Software

The movr2s instruction can be used to change from any privileged mode to any mode.

It is expected that the majority of code will execute in User Mode.

The processor resets to Supervisor mode. The initialisation code is then responsible for initialising the stack and starting User Mode. The mode switch is implemented using the movr2s instruction to write to the FLAGS register.

User mode can only access User registers. The Supervisor, Interrupt and NMI modes are known as privileged modes. They can access their own and the User Mode registers. Supervisor Mode cannot access the Interrupt or NMI Mode registers, and vice-versa. In order to initialise Interrupt and NMI mode registers, programmers must disable interrupts and manually switch to Interrupt mode by writing to the FLAGS register.

Code executed in User Mode cannot directly write to the FLAGS register.

Processor State

The processor can be in two states:

Sleeping

Awake

When the processor is awake, SIF accesses can only take place when the CPU is executing a sif instruction.

There are two sleep modes. One that allows SIF accesses and one that doesn't.

Run State

The state of the program refers to whether the core is executing instructions or not. This is determined by RUN_STATE[1:0] in the XAP4 Status Register (see 0). This is decoded as the following 4 states:

| | |
|---|---|
| 0 | Run Continuous |
| 1 | Run to Breakpoint |
| 2 | Stopped |
| 3 | Single Step |

RunContinuous is the normal state used for program execution. The other 3 states will only be encountered during interactive debugging.

Normal Registers

Registers R0, R6 and R7 are shadowed such that there is one of each of these registers per processor mode. For these registers the actual register accessed by an instruction depends on the mode in which the processor is operating.

TABLE 53

| Assembler Syntax | Instruction Encoding | Register Name | Notes |
|---|---|---|---|
| %r0 | 000 | R0_U or<br>R0_S or<br>R0_I or<br>R0_N | Dependent on processor mode.<br>Used as:<br>return value<br>function argument 0 |
| %r1 | 001 | R1 | Used as:<br>function argument 1 |
| %r2 | 010 | R2 | Used as:<br>function argument 2 |
| %r3 | 011 | R3 | |
| %r4 | 100 | R4 | |
| %r5 | 101 | R5 | |
| %r6 | 110 | R6_U or<br>R6_S or<br>R6_I or<br>R6_N | Dependent on processor mode.<br>Used as:<br>Link Register (LR) |
| %r7 | 111 | R7_U or<br>R7_S or<br>R7_I | Dependent on processor mode.<br>Used as:<br>Stack Pointer (SP) |

Any pair of adjacent registers can be joined to form a 32-bit accumulator. These are used by the mult, div, rem, divrem, shift and rotate instructions. Such accumulators are referred to by the lower register of the pair. e.g:

{R2, R1} is referred to as % r1

{R5, R4} is referred to as % r4

The C compiler uses R7 as Stack Pointer and R6 as Link Register. R0, R6 and R7 are shadowed in Supervisor, Interrupt and NMI modes.

At any one time, a register is only used for a single variable (whether it is 8 or 16-bit). All arithmetic and logical operations operate on full 16-bit words. Load, Store and Compare instructions have 16-bit and 8-bit forms (zero extended), allowing programs to operate on 8-bit variables.

Breakpoint Registers

Software development on XAP4 can implement break points 2 ways:

Swap normal instruction with brk instruction in memory. This cannot support conditional breaks. This can only be used in memory that supports individual word writes. 'xIDE for XAP4' chooses to use these where possible, as they are an unlimited resource.

Use the Break register. This can support conditional breaks. This can be used with any kind of memory (because the memory itself is not modified).

The XAP4 contains one breakpoint register, BRK0, that can be configured to stop the processor when an address is read, written, or executed.

Providing privileged modes access to the breakpoint register allows Interrupt Mode debuggers to be implemented that allow User Mode tasks to be debugged, without needing to stop the processor. This allows, for example, the main operating system to remain running when debugging User Mode applications.

The bits in the BRKE register are described below.

TABLE 54

| Bit(s) | Flag(s) | Name | Description |
|---|---|---|---|
| 0 | W0 | Write | If set, an instruction making a memory write to the address matching the corresponding BRKn register will halt the processor after the instruction has executed. The PC will point at the next instruction to be executed. |
| 1 | R0 | Read | Similar to above, but for memory reads. |
| 2 | E0 | Execute | If set, an instruction fetch from the address matching the corresponding BRKn register will halt the processor |

TABLE 54-continued

| Bit(s) | Flag(s) | Name | Description |
|---|---|---|---|
| | | | before the instruction is executed. The PC remains at the address of the instruction that caused the break. |

Note:
the BRKE register is one of the Special Registers. The special registers are described in section 0.

The above break conditions will only halt the processor if the following conditions are met:

(B flag is 0) or (Processor is in a privileged mode (Supervisor, Interrupt, NMI))

RUN_STATE=RunToBreak

If the B flag is 1 and the processor is in User mode, it will not halt, but will generate a Break exception instead.

The breakpoint registers can be written and read by privileged modes using the movr2b and movb2r instructions, see below. The movs2r and movr2s instructions allow access to the BRKE register.

TABLE 55

| Assembler Syntax | Instruction Encoding | Register Name | Notes |
|---|---|---|---|
| %brk0 | 000 | BRK0 | |
| | 001-111 | reserved | |

Special Registers

The movs2r and movr2s instructions allow Interrupt, Supervisor and NMI mode access to the Special Registers. These are shown in the table below.

TABLE 56

| Assembler Syntax | Instruction Encoding | Register Name | Notes |
|---|---|---|---|
| %flags | 000 | FLAGS | |
| %sflags_s | 001 | SFLAGS_S | Saved Flags. The processor copies FLAGS into this register when an exception happens. |
| %sflags_i | 010 | SFLAGS_I | Saved Flags. The processor copies FLAGS into this register when an interrupt happens. |
| %sflags_n | 011 | SFLAGS_N | Saved Flags. The processor copies FLAGS into this register when an NMI happens. |
| %brke | 100 | BRKE | Break Enable. |
| %r0_u | 101 | R0_U | R0 User Mode Register |
| %r6_u | 110 | R6_U | R6 User Mode Register |
| %r7_u | 111 | R7_U | R7 User Mode Register |

The format of the Flags registers is described in section 0.

Flags

The table below describes the layout of the FLAGS, SIFLAGS_S, SIFLAGS_1 and SIFLAGS_N registers.

TABLE 58

| Bit | Flag | Name | Description |
|---|---|---|---|
| 0 | Z | Zero | Set if result is zero (Rd = 0) |
| 1 | N | Negative | Set if result is negative (Rd[15] = 1) |
| 2 | C | Carry | Set if unsigned arithmetic overflowed |
| 3 | V | Overflow | Set if signed arithmetic overflowed |
| 5:4 | M[1:0] | Mode | 00: Supervisor Mode<br>01: User Mode<br>10: Interrupt Mode<br>11: NMI Mode |
| 6 | B | Break | If set and the processor is in User Mode, a break as a result of a brk instruction or the BRK registers will throw the Break exception. |
| 7 | T | Single Step | If set, each User Mode instruction that is executed will throw the SingleStep exception. |
| 8 | E | Interrupt Enable | If set, normal interrupts are enabled. (NMI cannot be disabled) |

When in Supervisor, Interrupt or NMI modes, the entire FLAGS register can be modified by executing the movr2s instruction. The movs2r instruction allows the FLAGS register to be read. The irqe and irqd instructions can be executed in Supervisor, Interrupt or NMI Mode. They are used to enable and disable interrupts.

The mode bits of the FLAGS register are automatically changed when interrupts or exceptions happen. The other bits remain unchanged. At reset the processor will start executing code in Supervisor mode.

The condition flags, Z, N, C, and V will be modified as instructions are executed. See the instructions description for details of the instructions that modify flags.

The catty versions of add, subtract and compare instructions update the Z flag as follows:

If (result=0) and (Z=1), set Z=1. Otherwise set Z=0.

This means that if (Z=0) before the instruction, then Z will always be 0 after the instruction (regardless of the instruction result).

This is useful for 32-bit arithmetic.

Memory Model

Figure 49:
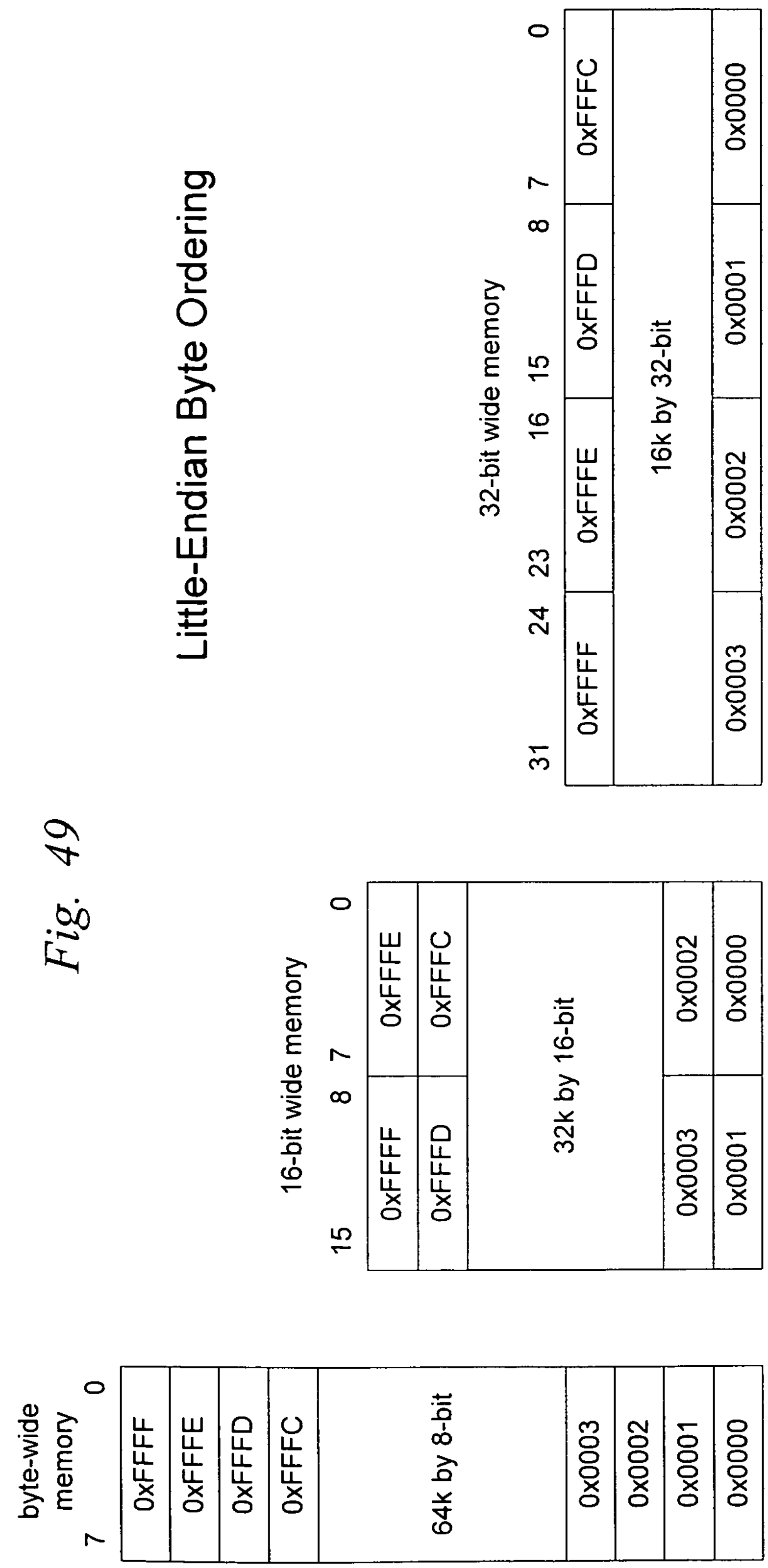
FIG. 49 shows the XAP4 little-endian byte ordering.

The memory model has a 16-bit address space (64 kBytes), containing both code and data. The address space is byte addressed. All pointers are kept as full 16-bit byte addresses, and will thus fit in a 16-bit register, see FIG. 49.

All instructions are aligned to a 16-bit boundary (i.e. bit 0 of the address is 0), but it is not necessary for 32-bit instructions to be aligned to a 32-bit boundary.

All data objects are unaligned. This means that 8, 16 and 32-bit data can have any byte address. The diagram above only shows aligned data objects.

All words use Little Endian byte ordering, i.e. the low bits of a 16-bit or 32-bit word are at the low byte address.

Reset State

All registers and flip-flops in XAP4 are asynchronously set or reset when the RESETB input pin goes low. Wherever possible, the registers and flip-flops should be reset and not set.

Memories (internal and external) cannot be reset and so will not be.

At reset, the XAP4 will be in the following state:—

- Program Counter=0 (i.e. code execution starts from address 0)
- Interrupts disabled
- In Supervisor mode
- Program Running
- Processor Awake
- SIF in Normal mode Calling Convention The bsr.p or bsr.a instruction is used to make function calls. The effect of bsr.p or bsr.a is to transfer the address of the next instruction to the link register, R6, and to transfer the destination address to the PC. Control is returned to the calling function when the contents of R6 is transferred to PC. In practice, the compiler generates the bsr.p instruction.

The calling convention for the XAP4 is:

- The called function does not need to preserve the contents of R0, R1, R2, and R6. R6=Link Register.
- The called function is responsible for preserving the remaining registers (R3-R5, R7) across function calls. This convention is implemented in the xap4-gcc C compiler. It is not a hardware property.
- R7 (Stack Pointer) is used to operate a fully covered stack, so interrupt handlers don't need to allow for a partially covered stack as in XAP2 systems. A fully covered stack is when function data is always at positive or zero offset from the stack pointer. A partially covered stack allows negative offsets to be used.
- Arguments are passed to functions in R0, R1, R2 then on the stack. When an 8-bit value is passed to a function in a register, the whole register is used. The upper bits are sign or zero extended according to the type. Structures that are passed in registers are converted to a sequence of 16-bit words.
- The called function places the C function return value in R0 (convention implemented in xap4-gcc).
- Special functions may store extra return data in R1 (e.g long values).
- Code is compiled independent of processor mode.
- When the processor is interrupted, the contents of R1-R5 must be preserved. This is not needed for (R0, R6, R7) as they have hardware shadow registers.
- C functions must not corrupt (R3-R5, R7), but may corrupt (R0, R1, R2, R6).

Application Models

The XAP4 can support various application models.

Statically Linked

This is the basic application model where the locations of all functions and data are known at link time.

Dynamically Loaded

The XAP4 supports systems where applications can be loaded to memory locations that are not known at link time. Statically allocated variables are accessed relative to the PC register.

The relative positions of code and data can be varied at load-time. PC relative addressing for code and constants (probably stored in Flash) means only minimal load time fixups are needed.

If the same program is being run in more than one instance, then the code/constants only need to be loaded once.

Absolute addressing can be used to access code and data at fixed addresses. This means that no load time fixups are required to access absolute code and data locations within the system.

Fixups will be necessary when static initialisers contain an address of a static variable. The location of the static variable is not known until link time, hence the loader will need to fixup the initialisation constant. This code would require a load time fixup when used as part of a dynamically loaded application.

```
static int stVar;
static int * stPtr = &stVar; // Fixup needed because of &
```

XAP4—Instruction Format

XAP4—16-bit Instructions, see FIG. 73

XAP4—32 bit Instructions, see FIG. 74

TABLE 56

Complete list of instructions

| Mnemonic | Operands | Operation | Flags | Cycles 16-bit | Cycles 32-bit |
|---|---|---|---|---|---|
| Branches Unconditional | | | | | |
| bra.a | address | PC = #address | — | — | 3 |
| brap | #offset | PC = PC + #offset | — | 2 | 3 |
| brap.2 | #offset | PC = PC + #offset | — | 2 | — |
| brap.4 | #offset | PC = PC + #offset | — | — | 3 |
| brar | Rs | PC = Rs | — | 2 | — |
| bsr.a | #address | PC = #address | — | — | 4 |
| bsr.p | #offset | PC = PC + #offset | — | — | 4 |
| bsr.r | Rs | PC = Rs | — | 3 | — |
| Conditional | | | | | |
| bcc | #offset | If(C == 0); PC = PC + #offset | — | — | 2/3 |
| bcs | #offset | If(C == 1); PC = PC + #offset | — | — | 2/3 |
| beq | #offset | If(Z == 1); PC = PC + #offset | — | 1/2 | 2/3 |

TABLE 56-continued

Complete list of instructions

| Mnemonic | Operands | Operation | Flags | Cycles 16-bit | Cycles 32-bit |
|---|---|---|---|---|---|
| bge.s | #offset | If(N == V); PC = PC + #offset | — | 1/2 | 2/3 |
| bge.u | #offset | If(C == 0); PC = PC + #offset | — | — | 2/3 |
| bgt.s | #offset | If(N == V)&&(Z = 0); PC = PC + #offset | — | 1/2 | 2/3 |
| bgt.u | #offset | If(C == 0)&&(Z = 0); PC = PC + #offset | — | 1/2 | 2/3 |
| ble.s | #offset | If(N != V)\|\|(Z = 1); PC = PC + #offset | — | 1/2 | 2/3 |
| ble.u | #offset | If(C == 1)\|\|(Z = 1); PC = PC + #offset | — | 1/2 | 2/3 |
| blt.s | #offset | If(N != V); PC = PC + offset | — | 1/2 | 2/3 |
| blt.u | #offset | If(C == 1); PC = PC + #offset | — | — | 2/3 |
| bmi | #offset | If(N == 1); PC = PC + #offset | — | — | 2/3 |
| bne | #offset | If(Z == 0); PC = PC + #offset | — | 1/2 | 2/3 |
| bpl | #offset | If(N == 0); PC = PC + #offset | — | — | 2/3 |
| bvc | #offset | If(V == 0); PC = PC + #offset | — | — | 2/3 |
| bvs | #offset | If(V == 1); PC = PC + #offset | — | — | 2/3 |
| Note: The number of cycles = a/b. a=branch not taken. b=branch taken. | | | | | |
| Load and Store | | | | | |
| ld.8z.i | Rd, @(offset, Ra) | Rd = (uint16)(*(int8*)(offset + Ra)) | ZN- | 2 | 3 |
| ld.i | Rd, @(offset, Ra) | Rd = *(int16*)(offset + Ra) | ZN- | 2 | 3 |
| ld.8z.r | Rd, @(Rx, Ra) | Rd = (uint16)(*(int8*)(Rx + Ra) | ZN- | 2 | — |
| ld.r | Rd, @(Rx, Ra) | Rd = *(int16*)(2*Rx + Ra) | ZN- | 2 | — |
| ld.8z.p | Rd, @(offset) | Rd = (uint16)(*(int8*)(offset + PC)) | ZN- | — | 3 |
| ld.p | Rd, @(offset) | Rd = *(int16*)(offset + PC) | ZN- | — | 3 |
| st.8.i | Rs, @(offset, Ra) | *(int8*)(offset + Ra) = Rs[7:0] | — | 2 | 3 |
| st.i | Rs, @(offset, Ra) | *(int16*)(offset + Ra) = Rs | — | 2 | 3 |
| stz8.i | Rs, @(offset, Ra) | *(int8*)(offset + Ra) = 0×00 | — | — | 3 |
| stz.i | Rs, @(offset, Ra) | *(int16*)(offset + Ra) = 0×0000 | — | 2 | 3 |
| st8.r | Rs, @(Rx, Ra) | *(int8*)(Rx + Ra) = Rs[7:0] | — | 2 | — |
| st.r | Rs, @(Rx, Ra) | *(int16*)(2*Rx + Ra) = Rs | — | 2 | — |
| stz8.r | Rs, @(Rx, Ra) | *(int8*)(Rx + Ra) = 0×00 | — | — | 3 |
| stz.r | Rs, @(Rx, Ra) | *(int16*)(2*Rx + Ra) = 0×0000 | — | — | |
| st.8.p | Rs, @(offset) | *(int8*)(offset + PC) = Rs[7:0] | — | — | 3 |
| st.p | Rs, @(offset) | *(int8*)(offset + PC) = Rs[7:0] | — | — | 3 |
| stz.8.p | Rs, @(offset) | *(int8*)(offset + PC) = 0×00 | — | — | 3 |
| stz.p | Rs, @(offset) | *(int16*)(offset + PC) = 0×0000 | — | — | 3 |
| swap.i | Rd, @(0, Ra) | Swap Register with memory: *Ra <-> Rd | ZN- | — | 5 |
| Note: The figures for number of cycles assume aligned memory accesses. Add one cycle per unaligned access. | | | | | |
| Push and Pop | | | | | |
| push | RegList, #offset | push to stack | — | 2-8 | — |
| pop | RegList, #offset | pop from stack | — | 2-9 | — |
| pop.ret | RegList, #offset | pop from stack and return | — | 4-11 | — |
| Note: The figures for number of cycles assume aligned memory accesses. Add one cycle per unaligned access. | | | | | |
| Move | | | | | |
| mov.i | Rd, #imm | Rd = #imm | ZN- | 1 | 2 |
| mov.p | Rd, #offset | Rd = Rd + PC + #offset | — | — | 2 |
| mov.r | Rd, Rs | Rd = Rs | ZN- | 1 | — |
| mov.32.r | Rd, Rs | {R(d + 1), Rd} = {R(s + 1), Rs} | ZN- | 1 | — |
| ALU Operations | | | | | |
| Add | | | | | |
| add.c.i | Rd, Rs, #imm | Rd = Rs + #imm + C | ZNCV | — | 2 |
| add.c.r | Rd, Rs, Rt | Rd = Rs + Rt + C | ZNCV | 1 | — |
| add.i | Rd, Rs, #imm | Rd = Rs + #imm | ZNCV | 1 | 2 |
| add.r | Rd, Rs, Rt | Rd = Rs + Rt | ZNCV | 1 | — |
| Subtract | | | | | |
| sub.c.r | Rd, Rs, #imm | Rd = Rs−#imm−C | ZNCV | 1 | — |
| sub.r | Rd, Rs, Rt | Rd = Rs−Rt | ZNCV | 1 | — |
| sub.x.i | Rd, Rs, #imm | Rd = #imm−Rs | ZNCV | — | 2 |
| sub.xc.i | Rd, Rs, #imm | Rd = #imm−Rs−C | ZNCV | — | 2 |
| Logical | | | | | |
| and.i | Rd, Rs, #imm | Rd = Rs&#imm | ZN- | 1 | 2 |
| and.r | Rd, Rs, Rt | Rd = Rs&Rt | ZN- | 1 | — |
| or.i | Rd, Rs, #imm | Rd = Rs\|#imm | ZN- | 1 | 2 |
| or.r | Rd, Rs, Rt | Rd = Rs\|Rt | ZN- | 1 | — |

TABLE 56-continued

Complete list of instructions

| Mnemonic | Operands | Operation | Flags | Cycles 16-bit | Cycles 32-bit |
|---|---|---|---|---|---|
| xor.i | Rd, Rs, #imm | Rd = Rs^#imm | ZN- | — | 2 |
| xor.r | Rd, Rs, Rt | Rd = Rs^Rt | ZN- | 1 | — |
| Multiply | | | | | |
| mult.32s.i | Rd, Rs, #imm | {R(d + 1),Rd} = Rs*#imm | ZN- | — | 17 |
| mult.32s.r | Rd, Rs, Rt | {R(d + 1),Rd} = Rs*Rt | ZN- | — | 17 |
| mult.32u.i | Rd, Rs, #imm | {R(d + 1),Rd} = Rs*#imm | ZN- | — | 17 |
| mult.32u.r | Rd, Rs, Rt | {R(d + 1),Rd} = Rs*Rt | ZN- | — | 17 |
| mult.i | Rd, Rs, #imm | Rd = bttm 16 bits of(Rs*#imm) | ZN- | — | 17 |
| muh.sh.r | Rd, Rs, Rt, #imm | Rd = (Rs*Rt)>>#imm | ZN-V | — | 18 |
| mult.r | Rd, Rs, Rt | Rd = bttm 16 bits of (Rs*Rt) | ZN- | 16 | — |
| Divide and Remainder | | | | | |
| div.32s.i | Rd, Rs, #imm | Rd = {R(s + 1),Rs}/#imm | ZN-V | — | 20 |
| div.32s.r | Rd, Rs, Rt | Rd = {R(s + 1),Rs}/Rt | ZN-V | — | 20 |
| div.32u.i | Rd, Rs, #imm | Rd = {R(s + 1),Rs}/#imm | ZNC- | — | 18 |
| div.32u.r | Rd, Rs, Rt | Rd = {R(s + 1),Rs}/Rt | ZNC- | — | 18 |
| div.s.i | Rd, Rs, #imm | Rd = Rs/#imm | ZN-V | — | 20 |
| div.s.r | Rd, Rs, Rt | Rd = Rs/Rt | ZN-V | — | 20 |
| div.u.i | Rd, Rs, #imm | Rd = Rs/#imm | ZNC- | — | 18 |
| div.u.r | Rd, Rs, Rt | Rd = Rs/Rt | ZNC- | — | 18 |
| divrem.32s.i | Rd, Rs, #imm | Rd = {R(s + 1),Rs}/#imm; R(d + 1) = {R(s + 1), Rs} %#imm | -V | — | 20 |
| divrem.32s.r | Rd, Rs, Rt | Rd = {R(s + 1),Rs}/Rt; R(d + 1) = {R(s + 1), Rs}% Rt | -V | — | 20 |
| divrem.32u.i | Rd, Rs, #imm | Rd = {R(s + 1),Rs}/#imm; R(d + 1) = {R(s + 1), Rs} %#imm | -C- | — | 18 |
| divrem.32u.r | Rd, Rs, Rt | Rd = {R(s + 1),Rs}/Rt; R(d + 1) = {R(s + 1), Rs}% Rt | -C- | — | 18 |
| divrem.s.i | Rd, Rs, #imm | Rd = Rs/#imm; R(d + 1) = Rs%#imm | -V | — | 20 |
| divrem.s.r | Rd, Rs, Rt | Rd = Rs/Rt; R(d + 1) = Rs%Rt | -V | — | 20 |
| divrem.u.i | Rd, Rs#imm | Rd = Rs/#imm; R(d + 1) = Rs%#imm | -C- | — | 18 |
| divrem.u.r | Rd, Rs, Rt | Rd = Rs/Rt; R(d + 1) = Rs%Rt | -C- | — | 18 |
| rem.32s.i | Rd, Rs, #imm | Rd = {R(s + 1),Rs}%#imm | ZN-V | — | 20 |
| rem.32s.r | Rd, Rs, Rt | Rd = {R(s + 1),Rs}%Rt | ZN-V | — | 20 |
| rem.32u.i | Rd, Rs, #imm | Rd = {R(s + 1),Rs}%#imm | ZNC- | — | 18 |
| rem.32u.r | Rd, Rs, Rt | Rd = {R(s + 1),Rs}%Rt | ZNC- | — | 18 |
| rem.s.i | Rd, Rs, #imm | Rd = Rs%#imm | ZN-V | — | 20 |
| rem.s.r | Rd, Rs, Rt | Rd = Rs%Rt | ZN-V | — | 20 |
| rem.u.i | Rd, Rs, #imm | Rd = Rs%#imm | ZNC- | — | 18 |
| rem.u.r | Rd, Rs, Rt | Rd = Rs%Rt | ZNC- | — | 18 |
| Compare Operations | | Flags == | | | |
| cmp.8.i | Rs, imm[7:0] | Rs − #imm | ZNCV | — | 2 |
| cmp.8.r | Rs, Rt | Rs − Rt | ZNCV | 1 | — |
| cmp.8c.i | Rs, #imm[7:0] | Rs − #imm−C | ZNCV | — | 2 |
| cmp.8c.r | Rs, Rt | Rs − Rt − C | ZNCV | 1 | — |
| cmp.8xi | Rs, #imm[7:0] | #imm − Rs | ZNCV | — | 2 |
| cmp.8xc.i | Rs, #imm[7:0] | #imm − Rs − C | ZNCV | — | 2 |
| cmp.c.i | Rs, #imm[15:0] | Rs − #imm − C | ZNCV | — | 2 |
| cmp.c.r | Rs, Rt | Rs − Rt − C | ZNCV | 1 | — |
| cmp.i | Rs, #imm[15:0] | Rs − #imm | ZNCV | 1 | 2 |
| cmp.r | Rs, Rt | Rs − Rt | ZNCV | 1 | — |
| cmp.x.i | Rs, #imm[15:0] | #imm − Rs | ZNCV | — | 2 |
| cmp.xc.i | Rs, #imm[15:0] | #imm − Rs − C | ZNCV | — | 2 |
| Shift and Rotate | | | | | |
| shiftl.32.i | Rd, Rs, #imm[4:0] | | ZNC- | — | 2 |

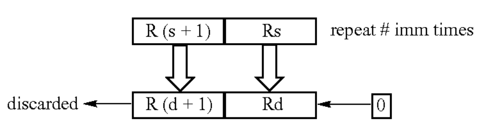

| Mnemonic | Operands | Operation | Flags | Cycles 16-bit | Cycles 32-bit |
|---|---|---|---|---|---|
| shiftl.32.r | Rd, Rs, Rt | As above but repeated Rt[4:0] times. | ZNC- | — | 2 |
| shiftl.i | Rd, Rs, #imm[3:0] | As shiftl.32.i, but not including R(s + 1) □ R(d + 1) | ZNC- | 1 | — |
| shiftl.r | Rd, Rs, Rt | As above but repeated Rt[3.0] times. | ZNC- | 1 | — |
| shiftr.32s.i | Rd, Rs, #imm[4:0] | | ZNC- | — | 2 |

TABLE 56-continued

Complete list of instructions

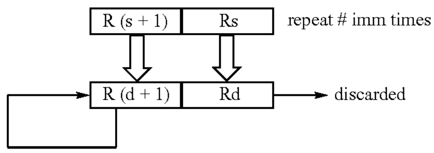

| Mnemonic | Operands | Operation | Flags | Cycles 16-bit | Cycles 32-bit |
|---|---|---|---|---|---|
| shiftr.32s.r | Rd, Rs, Rt | As above but repeated Rt[4:0] times. | ZNC- | — | 2 |
| shiftr.32u.i | Rd, Rs, #imm[4:0] | | ZNC- | — | 2 |

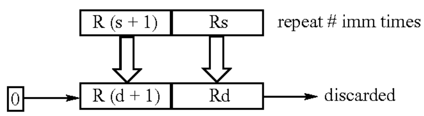

| Mnemonic | Operands | Operation | Flags | Cycles 16-bit | Cycles 32-bit |
|---|---|---|---|---|---|
| shiftr.32u.r | Rd, Rs, Rt | As above but repeated Rt[4:0] times. | ZNC- | — | 2 |
| shiftr.s.i | Rd, Rs, #imm[3:0] | As shiftr.32s.i, but not including R(s + 1) □ R(d + 1) | ZNC- | 1 | — |
| shiftr.s.r | Rd, Rs, Rt | As above but repeated Rt[3:0] times. | ZNC- | 1 | — |
| shiftr.u.i | Rd, Rs, #imm[3:0] | As shiftr.32u.i, but not including R(s + 1) □ R(d + 1) | ZNC- | 1 | — |
| shiftr.u.r | Rd, Rs, Rt | As above but repeated Rt[3:0] times. | ZNC- | 1 | — |
| rotatel.32.i | Rd, Rs, #imm[4:0] | | ZNC- | — | 2 |

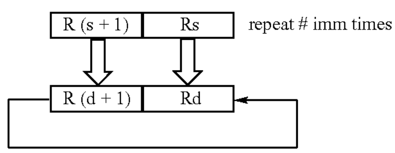

| Mnemonic | Operands | Operation | Flags | Cycles 16-bit | Cycles 32-bit |
|---|---|---|---|---|---|
| rotatel.32.r | Rd, Rs, Rt | As above but repeated Rt[4:0] times. | ZNC- | — | 2 |
| rotatel.i | Rd, Rs, #imm[3:0] | As rotatel.32.i, but not including R(s + 1) □ R(d + 1) | ZNC- | 1 | — |
| rotatel.r | Rd, Rs, Rt | As above but repeated Rt[3:0] times. | ZNC- | 1 | — |
| Block Copy and Store | | | | | |
| blkcp.r | Rd, Rs, Rt | while(Rt > 0) {Rt – *Rd++ = *Rs++} | — | — | 2n + 8 |
| blkcps.r | Rd, Rs, Rt | while(Rt > 0) {Rt – if((*Rd++ = *Rs++) = '\0') break} | — | — | 2n + 8 |
| blkst.8.r | Rd, Rs, Rt | while(Rt > 0) {Rt – *Rd++ = Rs} | — | — | n + 9 |
| blkst.r | Rd, Rs, Rt | while(Rt > 0) {Rt – *Rd++ = Rs} | — | — | n + 9 |
| Note: n is the number of memory transfers. See C7432-UM-002 for more details. | | | | | |
| Miscellaneous instructions | | | | | |
| sext.r | Rd | Sign Extend: Set Rd[15:8] = Rd[7] | ZN- | 1 | — |
| System Instructions | | | | | |
| brk | — | Break | — | 1 | — |
| halt | — | Halt | — | 1 | — |
| nop | — | No Operation | — | 1 | — |
| print.r | Rs | Print Register | — | 1 | — |
| sleepnop | — | Sleep | — | 1 | — |
| sleepsif | — | Sleep and allow SIF | — | 1 | — |
| Debug | | | | | |
| lic | Rd | Rd = XAP4 licence number | — | 1 | — |
| movb2r | Rd, BRs | Rd = BRs | ZN- | — | 2 |
| movr2b | BRd, Rs | BRd = Rs | — | — | 2 |
| sif | — | Perform SIF cycle | — | 4 | 5 |
| ver | Rd | Rd = XAP4 version number | — | 1 | — |
| Interrupt and exceptions | | | | | |
| irqd | — | Disables Interrupts (FLAGS.E = 0) | — | 1 | — |
| irqe | — | Enables Interrupts (FLAGS.E = 1) | — | 1 | — |

TABLE 56-continued

Complete list of instructions

| Mnemonic | Operands | Operation | Flags | Cycles 16-bit | Cycles 32-bit |
|---|---|---|---|---|---|
| irqs | Rd | Interrupt Status (Rd = FLAGS.E?1:0) | ZN- | 1 | — |
| rtie | — | Return from Interrupt/Exception | ZNCV | 2 | — |
| trap.i | #imm | Trap Immediate | — | — | 6 |
| trap.r | Rs | Trap Register | — | — | 6 |
| Special Registers | | | | | |
| movs2r | Rd, SRs | Rd = SRs | ZN- | — | 2 |
| movr2s | SRd, Rs | SRd = Rs | — | — | 2 |

Note: All figures for number of cycles assume 16-bit single cycle memory is used.

TABLE 57

XAP4-Significant Instructions multsh.r

| | | |
|---|---|---|
| Instruction | | mult.sh.r Rd, Rs, Rt, #immediate |
| Description | | 16-bit by 16-bit signed integer multiply to give a 32-bit result which is then signed-shifted right by the immediate |
| Flags | Z | Set if the result is zero; cleared otherwise |
| | N | Set if the result is negative; cleared otherwise |
| | C | Unchanged |
| | V | Set if after the shift Rd[31:16] is not equal to Rd[15]; cleared otherwise |
| Operation | | Rd = (Rs*Rt)>>#immediate |
| Usage Notes | | The 16×16 signed multiply of Rs and Rt produces a 32-bit product in a temporary register. The 32-bit product is signed-shifted tight by the immediate operand. This shift, like shiftr.32s.i, preserves the sign of the product by re-inserting the sign bit into the vacated most-significant bit.<br>Finally, the low 16 bits are written to Rd.<br>This instruction is usefull when operating on fixed-point numbers, where a normalising shift is needed after a multiplication. |
| Examples | | mov.i%r1, #0×3733 // +3.45 in signed 4.12 format<br>mov.i%r2, #0×EC52 // −1.23 in signed 4.12 format<br>mult.sh.r%r3, %r1,%r2, #(16-4)<br>// Here,%r3 is 0×BClB, or −4.24 in 4.12 format |

32-bit Encoding

| 31 30 29 28 | 27 26 25 24 | 23 22 21 20 19 18 17 16 | 15 14 13 12 | 11 10 9 8 | 7 6 5 4 3 2 1 0 |
|---|---|---|---|---|---|

| Rd Rs | Rt | 0 | 0 | # immediate | 1 | 1 | 1 | 1 | 1 | 0 | 1 | 1 | 1 | 1 | 1 | 1 | 1 | 1 | 1 | 1 |
|---|---|---|---|---|---|---|---|---|---|---|---|---|---|---|---|---|---|---|---|---|

TABLE 57 push

| | | |
|---|---|---|
| Instruction | | push RegList, #offset |
| Description | | Push registers onto the stack |
| Flags | Z | Unchanged |
| | N | Unchanged |
| | C | Unchanged |
| | V | Unchanged |
| Operation | | — |
| Usage Notes | | In addition to pushing registers to the stack, the stack pointer can be decreased by a further amount to create a stack frame for the callee's local variables.<br>The RegList operand specifies which registers are to be loaded and can contain registers in the range R0 to R6.<br>Details of RegList specifications are described herein<br>The offset can take values in the range 0, +2, . . . , +30.<br>The operation sequence is:<br>Decrease the Stack Pointer (R7) by #offset+2n, where n is the number of selected registers.<br>Store the selected registers to memory. Higher numbered registers are stored first and to higher memory addresses. Lower numbered registers are stored |

TABLE 57-continued

| push | |
|---|---|
| | last and to lower stack addresses.<br>A NullPointer exception is thrown if the stack pointer descends to zero. An IllegalDataAccess exception is thrown if the memory access violates the access rules implemented in the MMU. |
| Examples | push {%r3-%r6},#4<br>push {%r3-%r6},#0 |
| 16-bit Encoding | |

| 15 14 13 12 | | | | 11 10 9 8 | | 7 6 5 4 3 2 1 0 | | | |
|---|---|---|---|---|---|---|---|---|---|
| 0 | 1 | 1 0 | | 1 | reglist[3:0] | # offset [4:1] u | 1 | 0 | 1 |

TABLE 58

| pop | | |
|---|---|---|
| Instruction | | pop RegList, #offset |
| Description | | Pop registers from stack and load a return value in R0 |
| Flags | Z | Unchanged |
| | N | Unchanged |
| | C | Unchanged |
| | V | Unchanged |
| Operation | | — |
| Usage Notes | | This instruction can be used to close a stack frame. In addition to popping registers off the stack, the stack pointer can be increased by a further amount to remove the callee's local variables.<br>The RegList operand specifies which registers are popped and can contain registers in the range R0 to R6. Details of RegList specifications are described herein<br>The offset can take values in the range 0, +2, . . . , +30.<br>The operation sequence is:<br>Registers R0 to R6 are loaded from the stack, as specified in RegList Lower numbered registers are loaded first and from lower stack addresses. Higher numbered registers are loaded last and from higher memory addresses.<br>The stack pointer is increased by #offset + 2n, where n is the number of selected registers in RegList.<br>A NullPointer exception is thrown if the stack pointer ascends to zero. An IllegalDataAccess exception is thrown if the memory access violates the access rules implemented in the MMU. |
| Examples | | pop {%r3–%r6},#0<br>pop {%r3–%r6},#4 |
| 16-bit Encoding | | |

| 15 14 13 12 | | | | 11 10 9 8 | | 7 6 5 4 | 3 2 1 0 | | |
|---|---|---|---|---|---|---|---|---|---|
| 0 | 1 | 1 | 1 | 0 | reglist[3:0] | # offset [4:1] u | 1 | 0 | 1 |

TABLE 59

| pop.ret | | |
|---|---|---|
| Instruction | | pop.ret RegList, #offset |
| Description | | Pop registers from stack and return with a return value in R0 |
| Flags | Z | Unchanged |
| | N | Unchanged |
| | C | Unchanged |
| | V | Unchanged |
| Operation | | — |
| Usage Notes | | This instruction is identical to pop but additionally returns from a subroutine.<br>In addition to popping registers off the stack, the stack pointer can be increased by a further amount to remove the callee's local variables.<br>The RegList operand specifies which registers are popped and can contain registers in the range R0 to R6. Details of RegList specifications are descri bed herein.<br>The offset can take values in the range 0, +2, . . . , +30.<br>The operation sequence is:<br>Registers R0 to R6 are loaded from the stack, as specified in RegList. Lower numbered registers are loaded first and from lower stack addresses. Higher |

TABLE 59-continued

| pop.ret | |
|---|---|
| | numbered registers are loaded last and from higher memory addresses<br>The stack pointer is increased by #offset + 2n, where n is the number of selected registers in RegList.<br>Register R6 (the Link Register) is copied to the Program Counter. This is done even if R6 is not in RegList. If %r6 is in RegList, the popped value is copied to the Program Counter.<br>A NullPointer exception is thrown if the stack pointer ascends to zero. An IllegalDataAccess exception is thrown if the memory access violates the access rules implemented in the MMU. An IllegalCodeAddress exception is thrown if bit 0 of R14 is not zero. |
| Examples | pop.ret {%r3–%r6}, #0<br>pop.ret {%r3–%r6}, #4 |

16-bit Encoding

| 15 | 14 | 13 | 12 | 11 | 10 9 8 | 7 6 5 4 | 3 | 2 | 1 | 0 |
|---|---|---|---|---|---|---|---|---|---|---|
| 0 | 1 | 1 | 1 | 1 | reglist[3:0] | # offset [4:1] u | | 1 | 0 | 1 |

TABLE 60

| blkcps.r | | |
|---|---|---|
| Instruction | | blkcps.r Rd, Rs, Rt |
| Descnption | | Copy Rt bytes from Rs to Rd |
| Flags | Z | Unchanged |
| | N | Unchanged |
| | C | Unchanged |
| | V | Unchanged |
| Operation | | while (Rt > 0)<br>{<br>Rt–<br>if((*Rd++ = *Rs++) = '\0') break<br>} |
| Usage Notes | | Up to Rt bytes of data are copied from the address specified in Rs to the address specified in Rd, The copy stops on the first of:<br>The count reaching zero.<br>The copied byte being zero (a '\0' character).<br>The final '\0' byte is copied.<br>The source and destination addresses increment during the copy. If the source area and destination area overlap, part of the source data will be overwritten.<br>The instruction can be interrupted before the copy is complete. When the interrupt handler exits, the copy will resume.<br>This instruction is useful for implementing strcpy( ) and stmcpy( )-like functions.<br>Block operations are found within the figures, please refer for more information.<br>If Rt is zero, the instruction copies no data If Rt is 0×FFFF, the instruction copies a maximum of 65535 bytes of memory. This can be used to implement strcpy( ), where the copy is terminated only by a '\0' character.<br>A NullPointer exception is thrown if the memory address is zero. An IllegalDataAccess exception is thrown if the memory access violates the access rules implemented in the MMU. |
| Examples | | blkcps.r%r1,%r0,%r3 |

32-bit Encoding

| 31 30 29 28 | 27 26 25 24 | 23 22 21 20 | 19 18 17 16 | 15 14 13 12 | 11 10 9 8 | 7 6 5 4 | 3 2 1 0 |
|---|---|---|---|---|---|---|---|
| Rd | Rs | Rt 0 0 0 | 1 0 1 0 | 1 1 1 1 | 1 1 1 1 | 1 1 1 1 | 1 1 1 1 |

TABLE 61

| blkst.r | |
|---|---|
| Instruction | blkst.r Rd, Rs, Rt |
| Description | Stores a register to a block of memory |
| Flags Z | Unchanged |
| N | Unchanged |
| C | Unchanged |
| V | Unchanged |
| Operation | while (Rt > 0)<br>{<br>Rt–<br>*Rd++ = Rs<br>} |
| Usage Notes | Rs is stored to a block of memory starting at an address specified in Rd and length specified in Rt.<br>The destination address increments during the store.<br>The instruction can be interrupted before the store is complete. When the interrupt handler exits, the store resumes.<br>This instruction is useful for implementing memset( )-like functions.<br>Block operations are found within the figures, please refer for more information.<br>If Rt is zero, the instruction stores no data.<br>To fill an area of memory with zeros, use %r0 for Rs.<br>A NullPointer exception is thrown if the memory address is zero. An IllegalDataAccess exception is thrown if the memory access violates the access rules implemented in the MMU. |
| Examples | blkst.r%r1,%r2,%r3 |

32-bit Encoding

| 31 30 29 28 | 27 26 25 24 | 23 22 21 20 | 19 18 17 16 | 15 14 13 12 | 11 10 9 8 | 7 6 5 4 | 3 2 1 0 |
|---|---|---|---|---|---|---|---|
| Rd Rs | Rt | 0 0 1 | 0 0 1 0 | 1 1 1 1 | 1 1 1 1 | 1 1 1 1 | 1 1 1 1 |

TABLE 62

| blkst.8.r | |
|---|---|
| Instruction | blkst.8.r Rd, Rs, Rt |
| Description | Stores a register to a block of memory |
| Flags Z | Unchanged |
| N | Unchanged |
| C | Unchanged |
| V | Unchanged |
| Operation | while (Rt > 0)<br>{<br>Rt<br>*Rd++ = Rs<br>} |
| Usage Notes | The low 8 bits of Rs are stored to a block of memory starting at an address specified in Rd and length specified in Rt.<br>The destination address increments during the store.<br>The instruction can be interrupted before the store is complete. When the interrupt handler exits, the store resumes.<br>This instruction is useful for implementing memset( )-like functions.<br>Refer to description described herein for further details.<br>If Rt is zero, the instruction stores no data<br>A NullPointer exception is thrown if the memory address is zero. An IllegalDataAccess exception is thrown if the memory access violates the access rules implemented in the MMU. |
| Examples | blkst.8.r%r1,%r2,%r3 |

32-bit Encoding

| 31 30 29 28 | 27 26 25 24 | 23 22 21 20 | 19 18 17 16 | 15 14 13 12 | 11 10 9 8 | 7 6 5 4 | 3 2 1 0 |
|---|---|---|---|---|---|---|---|
| Rd Rs | Rt | 0 0 1 | 1 0 1 0 | 1 1 1 1 | 1 1 1 1 | 1 1 1 1 | 1 1 1 1 |

TABLE 62

| mov.p | |
|---|---|
| Instruction | mov.p Rd, #label |
| Description | Calculate the absolute address of a label |
| Flags Z | Unchanged |
| N | Unchanged |
| C | Unchanged |
| V | Unchanged |
| Operation | Rd = #label = PC + ~offset |
| Usage Notes | This instruction calculates the absolute address of a label and is useful in systems where a program's text segment has been loaded to an address other than zero. The label would normally be a label in a text segment rather than a data segment The label can be between −32KByte to +32KByte relative to the current PC. |
| Examples | This instruction calculates the absolute address of label36: mov.p%r3,#label36 |

32-bit Encoding

| 31 30 29 28 | 27 26 25 24 | 23 22 21 20 | 19 18 17 16 | 15 14 13 12 | 11 | 10 | 9 | 8 | 7 | 6 | 5 | 4 | 3 | 2 | 1 | 0 |
|---|---|---|---|---|---|---|---|---|---|---|---|---|---|---|---|---|
| # offset [15:0] | | | | Rd 0 | 0 | 1 | 1 | 1 | 0 | 0 | 0 | 0 | 1 | 1 | 1 | 1 |

TABLE 63

| sif | |
|---|---|
| Instruction | sif |
| Description | Perform SIF cycle |
| Flags Z | Unchanged |
| N | Unchanged |
| C | Unchanged |
| V | Unchanged |
| Operation | if(FLAGS.Mode = UserMode) then<br>allow SIF access<br>else<br>throw IllegalInstruction exception<br>endif |
| Usage Notes | The sif instruction allows the XAP4 to perform a SIF cycle. Two SIF cycles are needed to access unaligned data objects in memory.<br>This instruction throws an IllegalInstruction exception if executed in User Mode. |
| Examples | sif |

32-bit Encoding

| 31 | 30 | 29 | 28 | 27 | 26 | 25 | 24 | 23 | 22 | 21 | 20 | 19 | 18 | 17 | 16 | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|---|---|---|---|---|---|---|---|---|---|---|---|---|---|---|
| 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 |

16-bit Encoding

| 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|
| 1 | 1 | 1 | 0 | 0 | 0 | 0 | 0 | 1 | 1 | 1 | 0 | 1 | 1 | 1 | 0 |

TABLE 64

| nop | |
|---|---|
| Instruction | flop |
| Description | No operation |
| Flags Z | Unchanged |
| N | Unchanged |
| C | Unchanged |
| V | Unchanged |
| Operation | — |
| Usage Notes | — |
| Examples | nop |

TABLE 64-continued nop 16-bit Encoding

| 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|
| 1 | 1 | 1 | 1 | 1 | 1 | 0 | 0 | 0 | 1 | 1 | 0 | 1 | 1 | 0 | 1 |

TABLE 65

| sleepsif | | |
|---|---|---|
| Instruction | | sleepsif |
| Description | | Put the XAP4 into SIF Sleep state |
| Flags | Z | Unchanged |
| | N | Unchanged |
| | C | Unchanged |
| | V | Unchanged |
| Operation | | if(FLAGS.Mode = UserMode) then<br>throw IllegalInstruction exception<br>else<br>put XAP4 into SIF Sleep mode<br>endif |
| Usage Notes | | Put the XAP4 into the SIF Sleep state.<br>SIF cycles are allowed in the SIF Sleep state.<br>An IllegalInstruction exception is thrown if this instruction is executed in User Mode. |
| Examples | | sleepsif |

16-bit Encoding

| 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|
| 1 | 1 | 1 | 1 | 1 | 0 | 0 | 0 | 0 | 1 | 1 | 0 | 1 | 1 | 1 | 0 |

TABLE 66

| sleepnop | | |
|---|---|---|
| Instruction | | sleepnop |
| Description | | Put the XAP4 into NOP Sleep state |
| Flags | Z | Unchanged |
| | N | Unchanged |
| | C | Unchanged |
| | V | Unchanged |
| Operation | | if(FLAGS.Mode = UserMode) then<br>throw IllegalInstruction exception<br>else<br>put XAP4 into NOP Sleep state<br>endif |
| Usage Notes | | Put the XAP4 into the NOP Sleep state.<br>SIF cycles are not allowed in the NOP Sleep state. xIDE is unable to gain access to XAP4 in this state.<br>An IllegalInstruction exception is thrown if this instruction is executed in User Mode. |
| Examples | | sleepnop |

16-bit Encoding

| 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|
| 1 | 1 | 1 | 1 | 0 | 1 | 0 | 0 | 0 | 1 | 1 | 0 | 1 | 1 | 1 | 0 |

The XAP4 16 bit processor is able to write to and/or read from any two contiguous register pairs (aligned or unaligned) in a single clock cycle. Any of the "0.32" instructions are able to make use of this feature. Two particular examples follow:

TABLE 66a

| mov.32.r | | move, accumulator |
|---|---|---|
| Instruction | | mov.32.r Rd, Rs |
| Description | | Accumulator-to-accumulator move |
| Flags | Z | Set if the result is zero; cleared otherwise |
| | N | Set if the result is negative; cleared otherwise |
| | C | Unchanged |
| | V | Unchanged |
| Operation | | {R(d + 1),Rd} = {R(s + 1), Rs} |
| Usage Notes | | Rd and Rs must specify one of the 32-bit accumulators (%r0 to %r5).<br>Other registers for Rd or Rs throw an UnknownInstruction exception. |
| Examples | | mov.32.r%r1,%r3 |

16-bit Encoding

| 15 14 13 12 | 11 10 9 8 | 7 6 5 4 3 2 1 0 |
|---|---|---|
| 1 \| 1 \| 1 Rs | Rd | 1 \| 1 \| 1 1 \| 1 \| 1 \| 0 |

TABLE 66b

| mult.32s.i | | Multiply, 32-bit signed, immediate |
|---|---|---|
| Instruction | | mult.32s.i Rd, Rs, #immediate |
| Description | | 16-bit by 16-bit signed integer multiply to give a 32-bit result |
| Flags | Z | Set if the result is zero; cleared otherwise |
| | N | Set if the result is negative; cleared otherwise |
| | C | Unchanged |
| | V | Unchanged |
| Operation | | {R(d + 1),Rd} = Rs * #immediate |
| Usage Notes | | This is a signed 16×16 multiply, giving a 32-bit product in Rd,<br>Rd must specify one of the 32-bit accumulators (%r0 to %r5).<br>Other registers for Rd throw an UnknownInstruction exception.<br>Both operands are treated as 16-bit signed variables and represent numbers in the range −32768 to +32767. |
| Examples | | mult.32s.i%r1,%r2,#0×1234 |

| 31 30 29 28 | 27 26 25 24 | 23 22 21 20 | 19 18 17 16 | 15 14 13 12 | 11 10 | 9 | 8 | 7 | 6 | 5 | 4 | 3 | 2 | 1 |
|---|---|---|---|---|---|---|---|---|---|---|---|---|---|---|
| # immediate [15:0] | | | | Rd | Rs | 0 | 1 | 0 | 0 | 0 | 1 | 0 | 1 | 1 |

XAP4—SIF Serial InterFace

A XAP4 ASIC is a single SIF Slave. The ASIC only contains one SIF interface (with 4 or 5 external pins). The default SIF provided with XAP4 can support up to 8 on-chip SIF Processors. These can all be XAP4 or can be a variety of different processors. Each can have its own or shared address space. The SIF can be accessed by the external serial xSIF interface or by the internal parallel iSIF interface.

The SIF allows the user to debug software and to read or write the registers memory and IO registers of all the on-chip SIF Processors. The SIF is also used for data acquisition and analogue production test of the ASIC. All memory and IO register reads and writes are performed in a non-invasive manner. The processors continue to operate in functional mode without having their timing affected.

SIF ASIC Block Diagram

Figure 50:
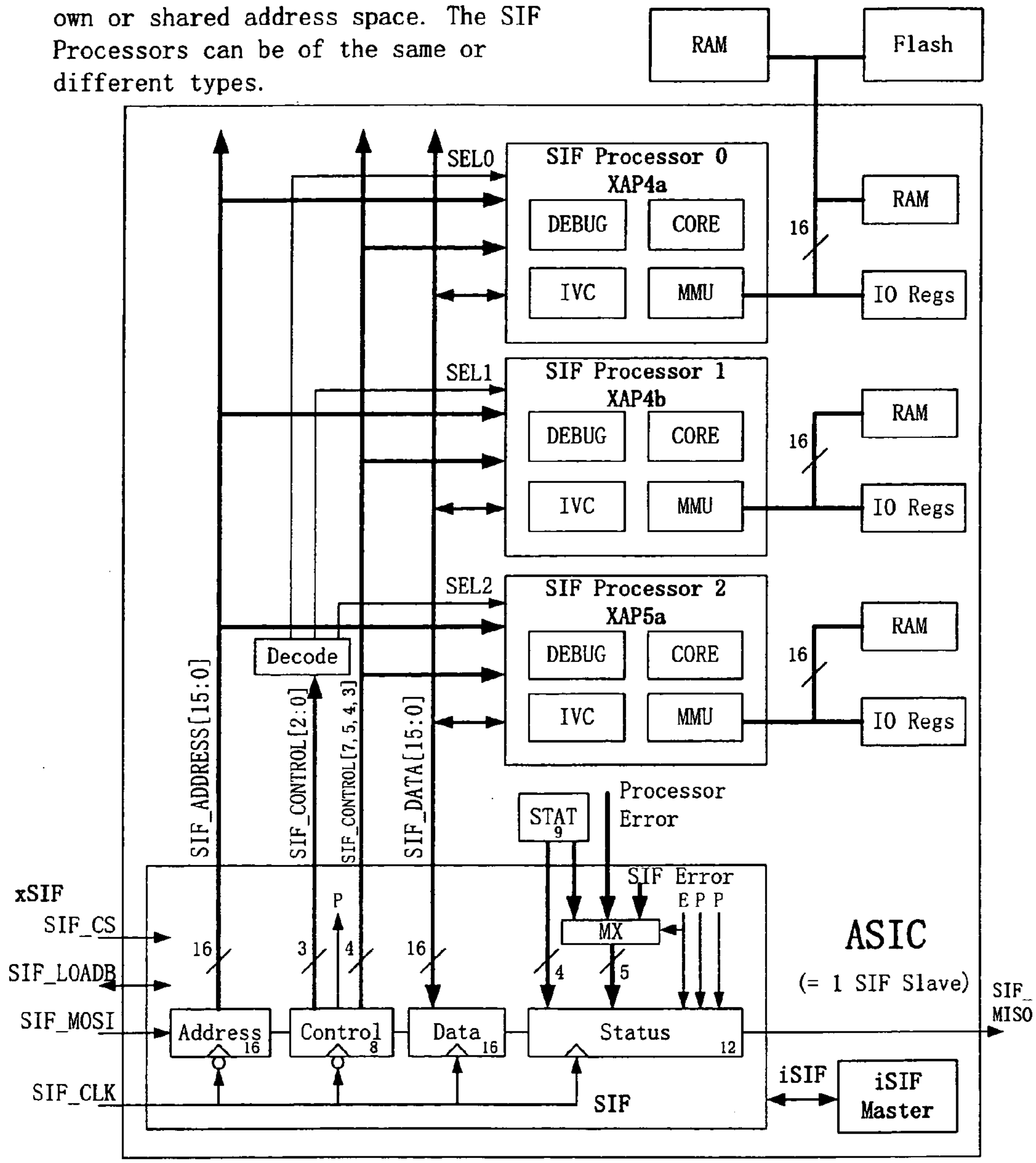
FIG. 50 shows the XAP4 ASIC configuration.

FIG. 50 a block diagram of an ASIC that contains two XAP4 and one XAP5 processor, each with their own address space. It shows how the single SIF interface is used to access all 3 processors. The SIF_CS pin is not needed for a Single Slave SIF system.

xSIF and Usage Modes, see FIG. 31.

The SIF may be used in the following usage modes:

TABLE 67

| | xSIF | | iSIF | | |
|---|---|---|---|---|---|
| No | Debug | Normal | Debug | Normal | Comment |
| 1 | Yes | Yes | No | No | iSIF not connected |
| 2 | Yes | Yes | No | Yes | iSIF used for memory access only. e.g for program download or data acquisistion. |
| 3 | No | No | Yes | Yes | xSIF not connected |
| 4 | No | Yes | Yes | Yes | xSIF used for memory access only. e.g for program download or data acquisition. |

Either xSIF or iSIF may be used for Debug SIF instructions, but not both. The most common modes will be 1 or 2.

Parity checking is performed on xSIF but not on iSIF. iSIF does not check PARITY_AC. It does generate PARITY_D and PARITY_S, but the iSIF Master may ignore them if it wishes.

xSIF may cancel stuck xSIF or iSIF instructions. iSIF may cancel stuck iSIF instructions, but not stuck xSIF instructions.

In all other respects, xSIF and iSIF behave identically. They access equivalent SIF fields (Address, Control, Data, Status) and use the same SIF instruction codes.

SIF ASIC Modes

At any time, the ASIC has:—

One SIF Mode (because the ASIC only contains one SIF).

A SIF Processor Mode for each Processor.

SIF Modes

There are 2 SIF Modes; Normal and Command. These modes are properties of the SIF and are independent of the processor types or states, see FIG. 32. For the purpose of readability, the 3 statements in each row are defined to be equivalent:

TABLE 68

| Full Statement | Computer Style | Shortened Statement |
|---|---|---|
| The SIF is in Normal SIF Mode | SIF Mode = Normal | The SIF is in Normal mode |
| The SIF is in Command SIF Mode | SIF Mode = Command | The SIF is in Command mode |

SIF Mode=Normal

The ASIC resets with SIF in Normal mode. The properties of Normal SIF Mode are:

SIF Operation is called a SIF Instruction.

The SIF shift register length can be different from one ASIC design to another. This allows the Address Control, Data and Status fields to have different lengths for different ASIC designs. The default shift register lengths are; XAP1=36 bits, XAP2=64 bits, XAP3=88 bits, XAP4=52 bits, XAP5=68. The rest of this document assumes that a 52-bit SIF shift register is being used.

SIF can access all the on-chip processors and their associated memory spaces.

SIF can execute Direct SIF Instructions. These are executed within the SIF itself and do not access a processor.

Direct SIF Instructions require the DEBUG bit to be 1 and the PROCESSOR bits to be 0.

SIF Mode=Command

Command mode is available to xSIF but not to iSIF. The xSIF Master can issue a special sequence of 256 bits on SIF_MOSI to put the SIF into Command mode. The properties of Command SIF Mode are:

SIF Operation is called a SIF Command.

It uses an 8-bit shift register. This length is the same for all SIF devices.

Commands are 8 bits in to SIF_MOSI.

Responses are 8 bits out from SIF_MISO.

It is used to query or configure the SIF.

It cannot access the processors or their associated memory spaces.

It is used to reveal the hardware details of a particular SIF Slave (field lengths for Address, Control, Data, Status, Polarity of Write bit, etc).

It is used by the xSIF Master (e.g xIDE) at the beginning of a SIF communication. This allows the xSIF Master to automatically discover the SIF devices without needing any manual configuration.

Once the xSIF Master has discovered all that it needs to know about the SIF Slave, it will put the SIF back into Normal mode. It will normally remain in Normal mode for the rest of the xSIF communication.

XAP4 SIF Processor Modes

Most processors have 2 SIF Processor Modes; Normal and Debug. At any time each processor has its own SIF Processor Mode. Each processor's mode can only be changed by the SIF interface (xSIF or iSIF).

The SIF Processor can be a variety of different processors. This specification describes the behaviour of the XAP4 in Normal and Debug SIF Processor Modes. For the purpose of readability, the 3 statements in each row are defined to be equivalent:

| Full Statement | Computer Style | Shortened Statement |
|---|---|---|
| The XAP4 is in Normal SIF Processor Mode | XAP4 SIF Processor Mode = Normal | The XAP4 is in Normal mode |
| The XAP4 is in Debug SIF Processor Mode | XAP4 SIF Processor Mode = Debug | The XAP4 is in Debug mode |

XAP4 SIF Processor Mode=Normal

The ASIC resets with all XAP4 processors in Normal mode. This allows the SIF Masters (xSIF and iSIF) to read and write address-mapped variables (normally IO registers or memory) of the selected XAP4. These can be 8 or 16 bit If the XAP4 is in Normal mode, then it will be running. It can only be stopped when in Debug mode.

XAP4 SIF Processor Mode=Debug

The selected XAP4 is put into Debug mode by executing the 'Debug Enable' SIF Instruction (issued by xSIF or iSIF Master). It will then remain in Debug mode until it executes the 'Debug Disable' SIF Instruction (when it will return to Normal mode).

Some SIF Instructions can only be executed if the XAP4 is already in Debug mode. In practise, Debug mode is only used during software development and ASIC test. Debug mode allows the user to perform functions such as start, stop, set breakpoint, run to breakpoint, read and write XAP4 internal registers and flags, etc.

It is important to distinguish between (Normal/Debug SIF Instructions) and (Normal/Debug XAP4 SIF Processor Modes):

A Normal SIF Instruction is when the DEBUG bit (bit 19 of SIF shift register)=0. This is for 8 and 16-bit reads and writes to any memory address.

A Debug SIF Instruction is when the DEBUG bit (bit 19 of SIF shift register)=1. This is for all SIF instructions apart from the reads and writes to memory.

Only certain SIF Instructions (Normal Instructions+a few Debug Instructions) can be executed when the XAP4 is in Normal mode. The XAP4 is in Normal mode after reset and after the 'Debug Diasable' SIF Instruction.

All SIF Instructions can be executed when the XAP4 is in Debug Mode. The XAP4 is in Debug Mode after the 'Debug Enable' SIF Instruction.

When are SIF Operations Executed ?

SE Mode=Command

Command mode is available to xSIF but not to iSIF. When the SIF is in Command Mode, SIF Operations (=SIF Commands) are executed immediately. As soon as the 8-bit Command has been shifted in to SIF_MOSI, the 8-bit Response will shift out on SIF_MISO. There is never a wait period. SIF_LOADB is not used. This is why SIF Commands cannot access processors or memory space. They are normally only used to query the SIF configuration (i.e to read a small ROM inside the SIF).

SIF Mode=Normal

When the xSIF is in Normal mode, the SIF Operation (=SIF Instruction) consists of 3 stages as follows: —

4. Shift In Stage. SIF Master shifts SIF Instruction (Address/Control for Read, Address/Control/Data for Write) into SIF Slave with SIF_CLK and SIF_MOSI.
5. Handshake Stage. SIF Master pulls SIF_LOADB low for a short pulse. SIF Slave holds SIF_LOADB low until the SIF Instruction has been completed. The SIF passes the SIF Instruction on to the selected SIF Processor (e.g XAP4 identified by CONTROL[2:0]). When/if the selected processor completes the SIF Instruction, it tells the SIF (Slave) which lets go of SIF_LOADB. SIF_LOADB goes high, telling the SIF Master that the SIF Instruction has been completed. Sometimes the handshake is not completed, which is called a SIF Lockup.
6. Shift Out Stage. SIF Master shifts the result (Data/Status for Read, Status for Write) out of SIF Slave with SIF_CLK and SIF_MISO.

In the second stage (Handshake) the xSIF Slave holds SIF_LOADB low for varying amounts of time. This depends upon the type of SIF Instruction and whether the selected XAP4 is stopped or running. As soon as the selected XAP4 executes the SIF Instruction, it tells the xSIF (Slave). The xSIF can then let go of SIF_LOADB, allowing it to return high again. The same handshake process is used for Direct SIF Instructions (which do not access any processor).

The sequence for iSIF is similar to that just described for xSIF:—

1. Parallel Write Stage. iSIF Master writes to Address, DataWrite and Control iSOF Registers.
2. Handshake Stage. Same as for xSIF.
3. Parallel Read Stage. iSIF Master reads from DataRead and Status iSIF Registers.

Immediate SIF Handshake

In some cases the selected XAP4 executes the SIF Instruction immediately:

All SIF Instructions if the selected XAP4 is currently executing a 'sleepsif' instruction (in Normal or Debug Mode, Stopped or Running). This implies that the XAP4 is waiting for a 'wake_up' hardware input (to move the processor on to its next instruction).

All SIF Instructions if the selected XAP4 is stopped (which can only happen in Debug Mode).

Debug SIF Instructions where (Address=0x0 to 0xFF). This includes Debug Enable, Debug Disable, Star, Stop etc. (see XAP4 SIF Instruction table for details). Such instructions are executed immediately even if the selected XAP4 is running.

Direct SIF Instructions.

The following SIF Instructions are error conditions which are recognised by the hardware (selected processor or SIF itself). The hardware will respond immediately, returning the appropriate Processor or SIF error code:

Parity error in PARITY_AC

Undefined SIF Instruction (Combination of Control and Address fields).

Wrong data-value for SIF Instructions that require special data-values.

SIF Write to a read-only register.

SIF Read from a write-only register.

Debug SIF Instruction which requires the selected XAP4 to be in Debug mode, when it is actually in Normal mode.

Debug SIF Instruction which requires the selected XAP4 to be stopped, when it is actually running.

Delayed SIF Handshake

In most cases the selected XAP4 waits for a 'sif' or 'sleepsif' XAP4 instruction before executing the SIF Instruction:

Normal SIF Instructions when the XAP4 is running (Normal or Debug mode).

Incomplete SIF Handshake (Ending in SIF Lockup)

The following SIF Instructions are error conditions which cannot be recognised by the hardware (selected processor or SIF itself). In such cases the SIF Slave will permanently hold SIF_LOADB low:

Normal SIF Instruction when the selected XAP4 is running but never executes a 'sif' or 'sleepsif' instruction.

In such cases the selected XAP4 will never tell the SIF that it has completed the SIF Instruction, so the SIF Slave will never release SIF_LOADB, which the SIF Master will see (and will know that this is being done by the selected SIF Slave). This has the effect of locking up the SIF Interface. The SIF Master must clear this with a SIF Cancel before it can proceed with any further SIF Instructions.

SIF Cancel (to Clear SIF Lockup)

The SIF has locked up because the SIF Master issued an invalid SIF Instruction to the selected SIF Processor in the selected SIF Slave.

The xSIF Master must be able to detect and recover from such a situation by:—

Having a timeout if SIF_LOADB stays low for too long.

Issuing a SIF Cancel to clear the lockup in the SIF Slave (or Slaves)

There are 2 types of xSIF Cancel:—

SIF Master toggles SIF_CLK 32 times (this will clear all Slaves that are locked up). SIF_MOSI[7:0] indicates a Cancel to xSIF or iSIF or both.

SIF Master pulls SIF_CS low (not implemented in SIF Slaves before 2005). This will only cancel xSIF.

In both cases, the SIF Slave will release SIF_LOADB, allowing it to go high again. At this point the SIF lockup has been cleared. This allows the SIF Master to issue further SIF Instructions.

The iSIF must also be able to detect and recover from a lockup situation by:—

Having a timeout if isif_done stays low for too long

Pulling isif_cancel high to clear the lockup in the SIF Slave (or Slaves)

It is possible for the requested SIF Instruction (debug or normal mode, read or write) to be completed even after the Master has started a SIF Cancel. This means that when a Master issues a SIF Cancel, it cannot know whether the previously requested SIF Instruction will happen or not. The Master can assume that if the previous SIF instruction was executed by the Slave, then it will be the connect one requested.

SIF Shift Register

Figure 51:
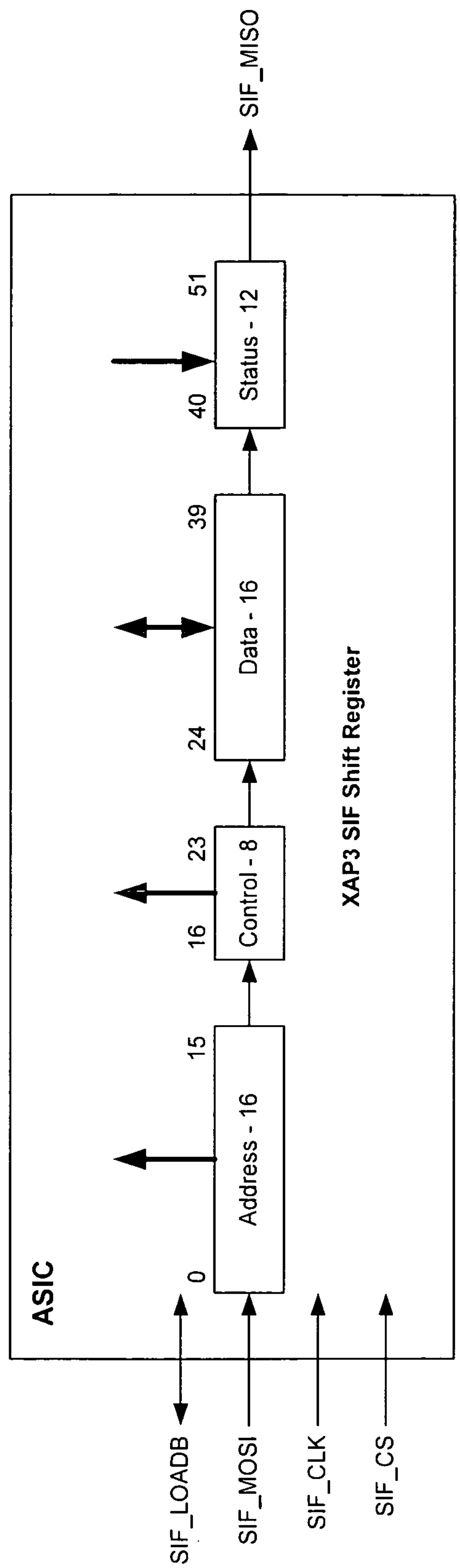
FIG. 51 shows the xSIF shift register which consists of 4 fields, in total 52-bits long.

XAP4 ASICs contain an xSIF shift register which consists of 4 fields, in total 52-bits long, see FIG. 51.

iSIF has the equivalent fields. The field sizes and bit allocations are the same as for the xSIF shift register. However, iSIF splits the Data field into 2 separate fields for DataWrite and DataRead.

Address Field

The 16 bit Address field is interpreted as follows for different SIF Instructions:

Normal SIF Instructions—Address to read or write in units of the selected processor (e.g bytes or 16-bit words).

Debug SIF Instructions—OpCode for a particular operation

Control Field

The 8 bit Control field, CONTROL[7:0] consists of:

{WRITE, PARITY_AC, SIZE[1:0], DEBUG, PROCESSOR[2:0]}.

All SIF transactions are one of:

SIF Read

SIF Write

The WRITE bit is 1 for SIF Write Instructions and 0 for SIF Read Instructions. For all modes, the only way that the SIF can update any part of the ASIC is with a SIF Write. SIF Reads cannot update any part of the ASIC.

The PARITY_AC bit is set by the xSIF Master and checked by the xSIF Slave. If the Slave finds a parity error it should set ERROR, ERROR_TYPE and ERROR_CODE[3:0] in the Status field. iSIF ignores PARITY_AC, so the iSIF Master does not need to set it.

The 2 SIZE bits indicate whether the data is 8 or 16-bit The SIZE bits are interpreted for all Normal SIF Instructions (i.e reads and writes to memory and IO registers), whether the selected XAP4 is in Normal or Debug mode. Debug SIF Instructions which have a Data parameter must set the SIZE bits correctly. Debug SIF Instructions which do not have a Data parameter must set the SIZE bits to 0.

The DEBUG bit is 1 for Debug SIF Instructions and 0 for Normal SIF Instructions.

The 3 PROCESSOR bits select which of the 8 SIF Processors the SIF Instruction should be passed to. All SIF Instructions must select a SIF Processor. Only One SIF Processor can be accessed at a time. There is no state. Successive SIF Instructions can access any SIF Processor in any order. SIF Processor Addresses should be allocated from 0 upwards. If the ASIC only contains one XAP4, it should be at SIF Processor Address 0.

Data Field

The 16 bit Data field is used for SIF Reads and Writes (from or to the specified Memory Address or Register).

For security reasons, some Debug SIF Instructions require the Data field to be set to a specific value.

The Slave should only update the Data field after valid SIF Reads. If there has been any kind of error (i.e ERROR=1), the Data field should not be updated.

Status Field

The 12-Bit Status field, STATUS[11:0] format depends upon whether there has been an error in the SIF Instruction or not. The Slave SIF has a 9-bit input from the main part of the ASIC called STAT[8:0].

The format of the Status field is independent of the specified Address and Control fields. Its format depends upon STAT[8:0] and on whether there was a SIF Error.

Under the various conditions, the SIF should format the Status field as follows:

TABLE 69

| STATUS Bits | STATUS Description | No Error | SIF Error | Processor Error |
|---|---|---|---|---|
| 3:0 | STATUS[3:0] | STAT[3:0] | STAT[3:0] | STAT[3:0] |
| 7:4 | ERROR_CODE[3:0] | STAT[7:4] | SIF Error Code | Proc Error Code |
| 8 | ERROR_TYPE | STAT[8] | 0 | 1 |
| 9 | ERROR | 0 | 1 | 1 |
| 10 | PARITY_D | Data Parity | Data Parity | Data Parity |
| 11 | PARITY_S | Status Parity | Status Parity | Status Parity |

PARITY_D is set first, based on DATA[15:0].

PARITY_S is then set based on STATUS[10:0].

The Slave should update the Status field after all completed (SIF_LOADB handshake) SIF Instructions. This should happen whether there is an error or not.

Shift Register Bit Definitions

The XAP4 xSIF shift register is defined as follows. All bits reset to 0 unless specified otherwise:

TABLE 70

| Bit | Name | Comments |
|---|---|---|
| 0 | ADDRESS[0] | Memory address for Normal SIF Instructions. Address is in units of |
| . . . | | selected SIF Processor (i.e bytes for XAP4 or XAP3, 16-bit words |
| 15 | ADDRESS[15] | for XAP2 or XAP1). |
| | | Parameter for Debug SIF Instructions (see SIF Instruction Table). |
| 16 | PROCESSOR[0] | PROCESSOR[2:0] = CONTROL[2:0]. |
| 17 | PROCESSOR[1] | Selects which SIF Processor (out of 8) to use. |
| 18 | PROCESSOR[2] | SIF Processor addresses should start from 0 and work up to 7. |
| 19 | DEBUG | DEBUG = CONTROL[3]. |
| | | 0 = Normal SIF Instruction |
| | | 1 = Debug SIF Instruction |
| 20 | SIZE[0] | SIZE[1:0] = CONTROL[5:4]. |
| 21 | SIZE[1] | Determines the data length of the SIF access. |
| | | 00 = 8-bit, 01 = 16-bit, 10 = reserved, 11 = reserved |
| 22 | PARITY__AC | PARITY__AC = CONTROL[6]. |
| | | Resets to 1. |
| | | Set by xMaster to be odd parity (odd number of 1s) with: |
| | | CONTROL[7] |
| | | CONTROL[5:0] |
| | | ADDRESS[15:0] |
| | | iSIF Master should always set this bit to 0. |
| 23 | WRITE | WRITE = CONTROL[7]. |
| | | 0 = Read, 1 = Write |
| | | Note that this is the opposite polarity from XAP1 and XAP2. The |
| | | SIF__MOSI pad is tied low, so in XAP4 a random SIF transaction |
| | | will cause a read and not a write. |
| 24 | DATA[0] | 16-bit: DATA[15:0] is written to or read from the selected address. |
| . . . | | 8-bit Write: DATA[7:0] is written to selected address. |
| 39 | DATA[15] | 8-bit Read: DATA[15:8] = 0, DATA[7:0] = data read from selected |
| | | address. |
| 40 | STAT[0] | STAT[3:0] = STATUS[3:0] |
| . . . | | After all completed SIF Instructions, STATUS[3:0] is updated with |
| 43 | STAT[3] | the hardware status word STAT[3:0], independent of the selected |
| | | Address and Control fields. |
| | | This will often be used for a TimeStamp, where STAT[0] is the |
| | | highest frequency bit. |
| 44 | ERROR__CODE[0] | ERROR__CODE[3:0] = STATUS[7:4] is updated with: |
| 45 | ERROR__CODE[1] | STAT[7:4], if there is no error. |
| 46 | ERROR__CODE[2] | SIF Error Code, if there is a SIF error. |
| 47 | ERROR__CODE[3] | Processor Error Code, if there is a Processor error. |
| 48 | ERROR__TYPE | ERROR__TYPE = STATUS[8] is updated with: |
| | | STAT[8], if there is no error. |
| | | 0, if there is a SIF error. |
| | | 1, if there is a Processor error. |
| 49 | ERROR | ERROR = STATUS[9]. |
| | | 0 = No error. SIF Instruction completed successfully. |
| | | 1 = Error. SIF or selected Processor detected an error in the |
| | | requested SIF Instruction. |
| 50 | PARITY__D | PARITY__D = STATUS[10]. |
| | | Resets to 1. |
| | | Set by Slave to be odd parity (odd number of 1s) with: |
| | | DATA[15:0] |
| | | This is set before PARITY__S. |
| 51 | PARITY__S | PARITY__S = STATUS[11]. |
| | | Set by Slave to be odd parity (odd number of 1s) with: |
| | | STATUS[10:0] |
| | | This is set after PARITY__D. |

A particular kind of Debug SIF Instruction is the Direct SIF Instruction. These are executed in the SIF itself and do not access any processor. Direct SIF Instructions all format the shift register bits as follows:—

DEBUG=1

PROCESSOR[2:0]=0

ADDRESS[15:12]=0xF

SIF Instructions

SIF Instruction Types

SIF Operations can be categorised as shown in FIG. 5.

XAP4 SIF instructions are defined by the Control and Address shift register fields.

There are 2 types of SIF Instruction, defined as follows:—

Normal SIF Instructions DEBUG=0

Debug SIF Instructions DEBUG=1

All other Debug Instructions refer to the selected processor. Such Debug SIF Instructions can be split into 3 categories:

Address<0x80: No mode requirements.

0x7F<Address<0x100 Selected XAP4 must be in Debug mode.

0xFF<Address<0x1000 Selected XAP4 must be in Debug mode and stopped.

Like the XAP4 itself, SIF reads and writes can use any byte address for all word sizes. The words do not need to be memory-aligned. i.e.:—

Addresses for 1 bit words do not need to be a multiple of 2

SIF Instruction Table

The following XAP4 SIF Instructions (Normal then Direct then other Debug) cover a subset of possible values for the Control and Address fields. The table does not include the PARITY_AC or WRITE bits in the Control field. The table assumes that PROCESSOR[2:0]=0. All unspecified values are reserved for future use. Instructions marked * are only implemented when the SIF is connected to more than one processor.

TABLE 71

| Control [5:0] | Address | Data | Required XAP4 SIF Processor Modes | R/W | Meaning |
|---|---|---|---|---|---|
| 0x00 | 0xXXXX | 8-bit | — | RW | Byte Memory Read/Write |
| 0x10 | 0xXXXX | 16-bit | — | RW | 16-bit Memory Read/Write |
| 0x18 | 0xF010 | 0xD5IF | — | W | Reset Everything. Pulses all rst_xap, rst_usergates outputs high for one clk. Pulses rst_sif, rst_offchip outputs high for one clk. See below for required connections and behaviour for rst_xap and rst_sif. |
| 0x18 | 0xF012 | 0xD5IF | — | W | Reset Off-Chip Devices. Pulses rst_offchip output high for one clk. |
| 0x18 | 0xF013 | 0xD5IF | — | W | Reset ASIC. Pulses all rst_xap, rst_usergates outputs high for one clk. Pulses rst_sif output high for one clk. See below for required connections and behaviour for rst_xap and rst_sif. |
| 0x18 | 0xF015 | 0xD5IF | — | W | Reset SIF. Pulses rst_sif output high for one clk. This should be connected to resetb_sif which will: Set RUN_STATE[1:0] = 0 = Running. Leaves MODE[1:0] unchanged. |
| 0x18 | 0xF081 | 0xD5IF | — | W | * Stop all processors |
| 0x18 | 0xF082 | 0xD5IF | — | W | * Run all processors |
| 0x18 | 0xF083 | 0xD5IF | — | W | * Wakeup all processors |
| 0x18 | 0xF084 | 0xD5IF | — | W | * Run to Break all processors |
| 0x18 | 0xF085 | 0xD5IF | — | W | * Set BreakMode = 0 = Stop one processor |
| 0x18 | 0xF086 | 0xD5IF | — | W | * Set BreakMode = 1 = Stop all processors |
| 0x18 | 0xF087 | 16-bit | — | R | * Read BreakMode |
| 0x18 | 0x0 | 0xD0FF | — | W | Debug Disable Puts XAP4 into Normal mode Sets XAP4 Running |
| 0x18 | 0x1 | 0xDBE | — | W | Debug Enable Puts XAP4 into Debug mode |
| 0x18 | 0x2 | 16-bit | — | RW | Status Register |
| 0x18 | 0x3 | 16-bit | — | R | Version Number |
| 0x18 | 0x4 | 16-bit | — | R | Licence Number |
| 0x18 | 0x5 | 16-bit | — | R | Register PC |
| 0x18 | 0x6 | 16-bit | — | R | Last PC Address of last completed instruction |
| 0x18 | 0x7 | 16-bit | — | RW | self_force_stop output. Any write sets output low. Read indicates current value. |
| 0x08 | 0x81 | — | Debug | W | Stop |
| 0x08 | 0x82 | — | Debug | W | Run |
| 0x08 | 0x83 | — | Debug | W | Wakeup |
| 0x08 | 0x84 | — | Debug | W | Single Step |
| 0x08 | 0x85 | — | Debug | W | Run to Break |
| 0x08 | 0x91 | — | Debug | W | Reset selected XAP. Pulses selected rst_xap output high for one clk. This should be connected to resetb_xap which will: Leave RUN_STATE[1:0] unchanged. Set MODE[1:0] = 0 = Supervisor mode. |

TABLE 71-continued

| Control [5:0] | Address | Data | Required XAP4 SIF Processor Modes | R/W | Meaning |
|---|---|---|---|---|---|
| 0x08 | 0x92 | — | Debug | W | Reset selected User Gates. Pulses selected rst_usergates output high for one clk. |
| 0x18 | 0x100 | 16-bit | — | R | Register R0 current mode |
| 0x18 | 0x100 | 16-bit | Debug Stopped | W | Register R0 current mode |
| 0x18 | 0x101 | 16-bit | — | R | Register R1 |
| 0x18 | 0x101 | 16-bit | Debug Stopped | W | Register R1 |
| 0x18 | 0x102 | 16-bit | — | R | Register R2 |
| 0x18 | 0x102 | 16-bit | Debug Stopped | W | Register R2 |
| 0x18 | 0x103 | 16-bit | — | R | Register R3 |
| 0x18 | 0x103 | 16-bit | Debug Stopped | W | Register R3 |
| 0x18 | 0x104 | 16-bit | — | R | Register R4 |
| 0x18 | 0x104 | 16-bit | Debug Stopped | W | Register R4 |
| 0x18 | 0x105 | 16-bit | — | R | Register R5 |
| 0x18 | 0x105 | 16-bit | Debug Stopped | W | Register R5 |
| 0x18 | 0x106 | 16-bit | — | R | Register R6 current mode |
| 0x18 | 0x106 | 16-bit | Debug Stopped | W | Register R6 current mode |
| 0x18 | 0x107 | 16-bit | — | R | Register R7 current mode |
| 0x18 | 0x107 | 16-bit | Debug Stopped | W | Register R7 current mode |
| 0x18 | 0x110 | 16-bit | — | R | Register R0_U |
| 0x18 | 0x110 | 16-bit | Debug Stopped | W | Register R0_U |
| 0x18 | 0x116 | 16-bit | — | R | Register R6_U |
| 0x18 | 0x116 | 16-bit | Debug Stopped | W | Register R6_U |
| 0x18 | 0x117 | 16-bit | — | R | Register R7_U |
| 0x18 | 0x117 | 16-bit | Debug Stopped | W | Register R7_U |
| 0x18 | 0x120 | 16-bit | — | R | Register R0_S |
| 0x18 | 0x120 | 16-bit | Debug Stopped | W | Register R0_S |
| 0x18 | 0x126 | 16-bit | — | R | Register R6_S |
| 0x18 | 0x126 | 16-bit | Debug Stopped | W | Register R6_S |
| 0x18 | 0x127 | 16-bit | — | R | Register R7_S |
| 0x18 | 0x127 | 16-bit | Debug Stopped | W | Register R7_S |
| 0x18 | 0x130 | 16-bit | — | R | Register R0_I |
| 0x18 | 0x130 | 16-bit | Debug Stopped | W | Register R0_I |
| 0x18 | 0x136 | 16-bit | — | R | Register R6_I |
| 0x18 | 0x136 | 16-bit | Debug Stopped | W | Register R6_I |
| 0x18 | 0x137 | 16-bit | — | R | Register R7_I |
| 0x18 | 0x137 | 16-bit | Debug Stopped | W | Register R7_I |
| 0x18 | 0x140 | 16-bit | — | R | Register R0_N |
| 0x18 | 0x140 | 16-bit | Debug Stopped | W | Register R0_N |
| 0x18 | 0x146 | 16-bit | — | R | Register R6_N |
| 0x18 | 0x147 | 16-bit | Debug Stopped | W | Register R6_N |
| 0x18 | 0x200 | 16-bit | — | R | Register BRK0 |
| 0x18 | 0x200 | 16-bit | Debug Stopped | W | Register BRK0 |
| 0x18 | 0x300 | 16-bit | — | R | Register FLAGS |
| 0x18 | 0x300 | 16-bit | Debug Stopped | W | Register FLAGS |
| 0x18 | 0x301 | 16-bit | — | R | Register SFLAGS_S |
| 0x18 | 0x301 | 16-bit | Debug Stopped | W | Register SFLAGS_S |
| 0x18 | 0x302 | 16-bit | — | R | Register SFLAGS_I |
| 0x18 | 0x302 | 16-bit | Debug Stopped | W | Register SFLAGS_I |
| 0x18 | 0x303 | 16-bit | — | R | Register SFLAGS_N |
| 0x18 | 0x303 | 16-bit | Debug Stopped | W | Register SFLAGS_N |

TABLE 71-continued

| Control [5:0] | Address | Data | Required XAP4 SIF Processor Modes | R/W | Meaning |
|---|---|---|---|---|---|
| 0x18 | 0x304 | 16-bit | — | R | Register BRKE |
| 0x18 | 0x304 | 16-bit | Debug Stopped | W | Register BRKE |
| 0x18 | 0x400 | 16-bit | — | R | Register PC |
| 0x18 | 0x400 | 16-bit | Debug Stopped | W | Register PC |

XAP4 Status Register

One of the SIF Debug Instructions read the selected XAP4 Status Register. Note that this is not the same as the SIF shift register Status field, STATUS[11:0].

The XAP4 Status Register contains the following bit fields:—

TABLE 72

| Bit | Name | 0 Meaning | 1 Meaning |
|---|---|---|---|
| 0 | DEBUG | XAP4 is in Debug mode | XAP4 is in Normal mode |
| 1 | WAKE_UP | wake_up input = 0 | wake_up input = 1 |
| 2 | FORCE_STOP | force_stop input = 0 | force_stop input = 1 |
| 3 | FORCE_STOPPED | force_stop input has not been high since last SIF instruction (xSIF or iSIF). | force_stop input has been high since last SIF instruction (xSIF or iSIF). |
| 4 | MODE0 | MODE[1:0] = M[1:0] bits in XAP4 Flags Register. See section 0 | |
| 5 | MODE1 | MODE[1:0] indicates the current processor mode of the XAP4:<br>0 Supervisor mode<br>1 User mode<br>2 Interrupt mode<br>3 NMI mode | |
| 6 | BRK_FLAG | = B bit in XAP4 Flags Register. See section 0 | |
| 7 | STEP_FLAG | = T bit in XAP4 Flags Register. See section 0 | |
| 8 | RUN_STATE0 | RUN_STATE[1:0] indicates the current run state of the XAP4. | |
| 9 | RUN_STATE1 | This is not affected by the force_stop input.<br>0 Run Continuous<br>1 Run to Breakpoint<br>2 Stopped<br>3 Single Step | |

TABLE 73

| Bit | Name | 0 Meaning | 1 Meaning |
|---|---|---|---|
| 10 | SLEEPNOP | XAP4 is not executing a sleepnop instruction. | XAP4 is executing a sleepnop instruction. |
| 11 | SLEEPSIF | XAP4 is not executing a sleepsif instruction. | XAP4 is executing a sleepsif instruction. |
| 12 | XSIF_ACTIVITY | An xSIF instruction has not been started since the last iSIF instruction. | An xSIF instruction has been started since the last iSIF instruction. |
| 13 | ISIF_ACTIVITY | An iSIF instruction has not been started since the last xSIF instruction. | An iSIF instruction has been started since the last xSIF instruction. |
| 14 | | | |
| 15 | | | |

SIF Error Processing

SIF Parity Bits

Normally parity bits can only expose single bit errors. However, the XAP4 SIF has a parity-checking configuration which also detects stuck high and stuck low faults on SIF_MOSI and SIF_MISO.

PARITY_AC

PARITY_AC (Address+Control field parity) is set by the SIF Master and checked by the SIF Slave. It has odd parity, so there are an odd number of 1s in the 24 bits:—

CONTROL[7:0]

ADDRESS[15:0]

If SIF_MOSI is stuck at 1 or stuck at 0, there will be a parity error in PARITY_AC. This is because there is an even number of protected bits (including PARITY_AC) and odd parity checking. This means that the bits cannot all be the same value.

If the Slave detects a parity error in PARITY_AC it should:

Not pass the SIF Instruction on to a processor.

Set ERROR=1 in Status field.

Set ERROR_TYPE=0 in the Status field.

Format ERROR_CODE[3:0] in the Status field.

Complete the SIF Handshake (SIF_LOADB).

PARITY_D

PARITY_D (Data field parity) is set by the SIF Slave and checked by the SIF Computer. It has odd parity, so there are an odd number of 1s in the 17 bits:

PARITY_D

DATA[15:0]

PARITY_D is based on the values in the:—

Data Capture Register, for valid SIF Reads (i.e when Data Shift Register is updated with a parallel load from the Data Capture Register).

Data Shift Register for SIF Writes and SIF Errors (i.e when Data Shift Register is not updated with a parallel load from the Data Capture Register).

PARITY_S

PARITY_S (Status field parity) is set by the SIF Slave and checked by the SIF Computer. PARITY_S should be calculated after PARITY_D. It has odd parity, so there are an odd number of Is in the 12 bits:

STATUS[11:0]

If SIF_MISO is stuck at 1 or stuck at 0, there will be a parity error in PARITY_S. This is because there is an even number of protected bits (including PARITY_S) and odd parity checking. This means that the bits cannot all be the same value.

PARITY_S is based on the values in the Status Capture Register (which will always be parallel loaded into the Status Shift Register when a SIF Instruction is completed).

SIF Error Reporting in Status Field

SIF Error Codes

When the SIF detects an error in the SIF Instruction it should set:

ERROR=1

ERROR_TYPE=0

ERROR_CODE[3:0] as follows:

| SIF Error Code | Description |
|---|---|
| 0 | Parity error in PARITY__AC |
| 1 | Unrecognised Direct SIF Instruction |
| 2 | Wrong data-value in Direct SIF Instruction |
| 3 | Unrecognised Processor |
| 4 | iSIF Instruction Cancelled |

Processor Error Codes

When the selected XAP4 detects an error in the SIF Instruction it should set:

ERROR=1

ERROR_TYPE=1

ERROR_CODE[3:0] as follows:

| Processor Error Code | Description |
|---|---|
| 0 | Unrecognised SIF Instruction |
| 1 | Wrong data-value in SIF Instruction |
| 2 | Invalid SIF Write |
| 3 | Invalid SIF Read |
| 4 | Processor not in Debug mode |
| 5 | Processor not Stopped |

Figure 52:
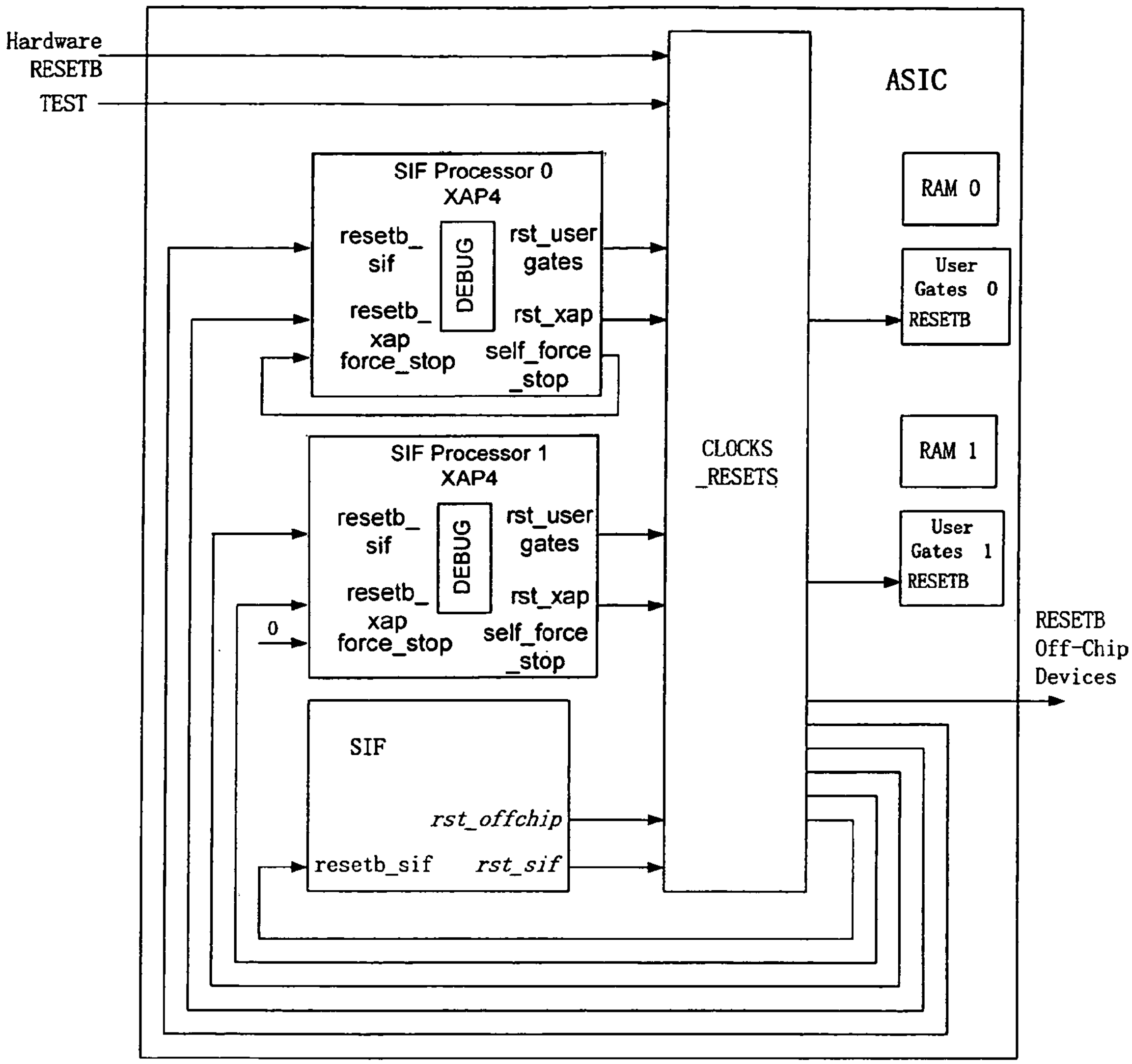
FIG. 52 shows the XAP4 reset schematic.

SIF Resets, see FIG. 52

The SIF and XAP4 Verilog modules contain:— resetb_*—Asynchronous active low reset inputs (all flipflops will be cleared even if clocks are stopped). By default, all flipflops are reset to 0.

rst_*—Synchronous (clocked by system CLK) active high reset outputs.

The SIF and XAP4 Verilog modules do not contain any test mode circuitry. They do not impose or assume any test strategy for the ASIC. They are scannable designs that the designer can configure for a variety of test strategies.

All conditioning of clock and reset signals as required for Scan and other test modes should be done in the CLOCKS_RESETS module. This module generates the resetb resets that are fed to the various modules in the ASIC. These signals will often need to be controlled by external pins in TEST mode, to make the ASIC fully scannable. The CLOCKS_RESETS module is application-specific and should be designed by the user to conform to the test strategy being used for the ASIC.

The SIF Instructions include several resets for different parts of the ASIC and Off-Chip devices. SIF resets are done by 2 mechanisms:

Direct SIF Instructions. Reset 'everything', off-chip devices, whole ASIC, SIF itself Processor SIF Instructions to a selected processor. Reset that processor, associated user gates To avoid resets occurring by accident:—

Direct SIF Instruction resets require special data values.

Processor SIF Instructions require the selected processor to be in Debug mode.

The XAP4 has 2 reset inputs:— resetb_xap. Resets all XAP4 except Debug state. Most flipflops are set to 0.

resetb_sif Resets SIF and Debug state of all XAPs. Most flipflops are set to 0.

The flipflops in XAP4 are either reset by resetb_xap or by resetb_sif, but never by both.

resetb_xap is often pulled low by xIDE executing the relevant Debug SIF Instruction. When resetb_xap is pulled low, the XAP will be reset to:

MODE[1:0]=00=Supervisor Mode resetb_sif is normally only pulled low at power-on-reset. When resetb_sif is pulled low, the XAP will be reset to:—

DEBUG=0=Normal Mode

RUN_STATE[1:0]=00=Running

If the designer wants the XAP to be stopped after resetb_sif is pulled low, he should connect the self_force_stop output to the force_stop input. In the diagram on the previous page, Processor 0 is stopped and Processor 1 is running after reset-b_sif is pulled low.

XAP4—Hardware Manual

Introduction

About XAP4

The XAP4 is a powerful 16-bit processor optimised for low gate count and low power. It has a von Neumann architecture and can address 64 kByte of linear byte-addressable memory.

High Code Density

The XAP4 architecture, instruction set, compiler toolchain and application binary interface are all designed for efficient execution of programs written in C.

Complex Systems

The XAP4 implements the features necessary to support complex software systems where high reliability or high integrity is a requirement. The XAP4 provides hardware support for common real time operating system primitives, including a clear definition of user and supervisor modes, atomic instructions for synchronisation constructs, and position independent code to allow dynamic linkage.

The XAP4 MMU interface enables memory protection systems for instruction and data, throwing exceptions if processes access code or data memory illegally.

Interrupts and Exceptions

The XAP4 supports a total of 16 interrupts and 16 exceptions. Each has its own handler defined in a vector table.

Rich RISC-like Instruction Set

A rich set of instructions is provided, including a complete set of branches, arithmetic operations on 8, 16 and 32 bit data. Several instructions map closely onto C language constructs thereby providing very high code density and fast execution.

16-Bit and 32-Bit Instructions

The XAP4 instruction set contains 145 unique instructions. Most common instructions are 16 bits long with less common instructions using 32 bits. Some instructions have 16-bit and 32-bit forms, with the toolchain using the 16-bit form whenever possible.

This approach gives high code density. Programs can mix 16-bit and 32-bit instructions at will. No switching between modes is necessary and the processor executes all instructions at full speed. The 16-bit instructions can access all of the processor resources available to the 32-bit instructions.

Hardware Acceleration

The XAP4 processor includes a hardware multiplier, divider and barrel shifter. Instruction execution is pipelined, resulting in operating speeds of over 100 MHz on a 0.18 μm ASIC process. The processor can be implemented in any ASIC process between 2.0 μm and 0.065 μm and in any FPGA.

Targeted for Speed or Size

The XAP4 instruction set architecture is available in different hardware implementations. The XAP4a implementation is targeted for low cost, low power applications and requires approximately 12 k gates for the processor core.

Language Support

The GNU Compiler Collection (gcc) provides an industry standard ANSI C compiler plus GCC extensions. xap4-gcc and binutils (assembler and linker) are provided in the XAP4 software toolkit Development Tools The xIDE integrated development environment provides a cross-platform development and debugging tool for XAP4 programmers, using an industry-standard look and feel.

The XAP Family

The XAP4 is the smallest embodiment of the invention within the Von Neumann architecture XAP processor family

- XAP4 16-bit processor supporting up to 64 KB of memory
- XAP5 16-bit processor supporting up to 16 MB of memory
- XAP3 32-bit processor supporting up to 4 GB of memory These processors have all been designed for embedded use in ASICs and FPGAs. They all use Cambridge Consultants' patented SIF interface for debugging and the xIDE development environment for software development. They all have excellent code density when used with their GCC/binutils compile chains. XAP3 also has an ANSI C compiler that provides even higher code-density. They all have 4 processor modes with excellent support for RTOS and low-latency interrupts. They all have the same style of instruction set and programmer's model. The family offers an easy upgrade path between systems of different sizes, offering the programmer a consistent interface.

The new XAP family builds on the success of Cambridge Consultants legacy 16-bit Harvard architecture XAP processor family:

- XAP1 Up to 144 KB Program memory and 128 KB Data memory
- XAP2 to 32 MB Program memory and 128 KB Data memory XAP1 has been used in many ASIC projects since its development in 1994, resulting in over 10 million silicon devices.

The XAP2 is an evolutionary development from XAP1. XAP2 has been used in over 100 million silicon devices since its development in 1999. This includes all of CSR's Bluetooth and 802.11 devices.

XAP4a Implementation

The XAP4 instruction set architecture is available in different hardware implementations.

The XAP4a hardware implementation exists as a soft IP core written entirely in synthesisable Verilog RTL. This can be targeted at either System-on-Chip ASIC or FPGA implementations.

The xIDE toolset includes an instruction set simulator for XAP4a. This can be extended to include models of other parts of the system, including memories and interrupts.

The Verilog design observes the following conventions:

- The XAP4a system does not contain any latches or gated clocks.
- The XAP4a uses only positive-edge clocked flip-flops within the XAP4 core. (Negedge clocked flipflops are used for some control logic in the xap4_sif module.)
- The XAP4a system itself does not contain any memory. The user is responsible for connecting external memory to the design. The XAP4a system is supplied with examples of synchronous memory. For optimal performance it is recommended to have 16 bit wide memory with independent byte write enable capabilities, and single-cycle access.

The XAP4a system itself does not contain any I/O registers, neither does it have specific instruction to perform I/O operations. All I/O must be memory mapped and are accessed using the normal XAP4 instructions. As with the memories the I/O register should be synchronous. The XAP4a system comes with examples of synchronous, memory mapped I/O registers.

- The XAP4a system itself does not contain scan or any other logic for testing. However there should be no problems using it with a standard test compiler as the design is single edge triggered, has a fully asynchronous reset and contains no latches.

All state machines are fully decoded.

TABLE 74

| Glossary and Acronyms | |
|---|---|
| Term | Meaning |
| Double-Word | A 4-byte (or 32-bit) quantity. |
| Word | A 2-byte (or 16-bit) quantity. The XAP4 is a 16-bit processor. |
| Byte | An 8-bit quantity. |
| Little Endian | A system in which the least significant byte of a word is stored at the lowest memory address. The XAP4 is a little Endian processor. |
| Big Endian | A system in which the most significant byte of a word is stored at the lowest memory address. |
| SIF | Debug and Data Acquisition Interface. |
| iSIF | Internal SIF. |
| xSIF | External SIF. |
| ALU | Arithmetic and Logic Unit. |
| IVC | Interrupt Vector Controller. |
| IVT | Interrupt Vector Table. |
| MMU | Memory Management Unit. |
| NMI | Non-Maskable Interrupt. |
| RTL | Register Transfer Level |
| Verilog | The hardware description language used for XAP4 |

Overview

A typical ASIC containing a XAP4a system is shown in the FIG. 50. This illustrates the xap4_system module connected to application-specific circuitry to provide:—

Figure 53:
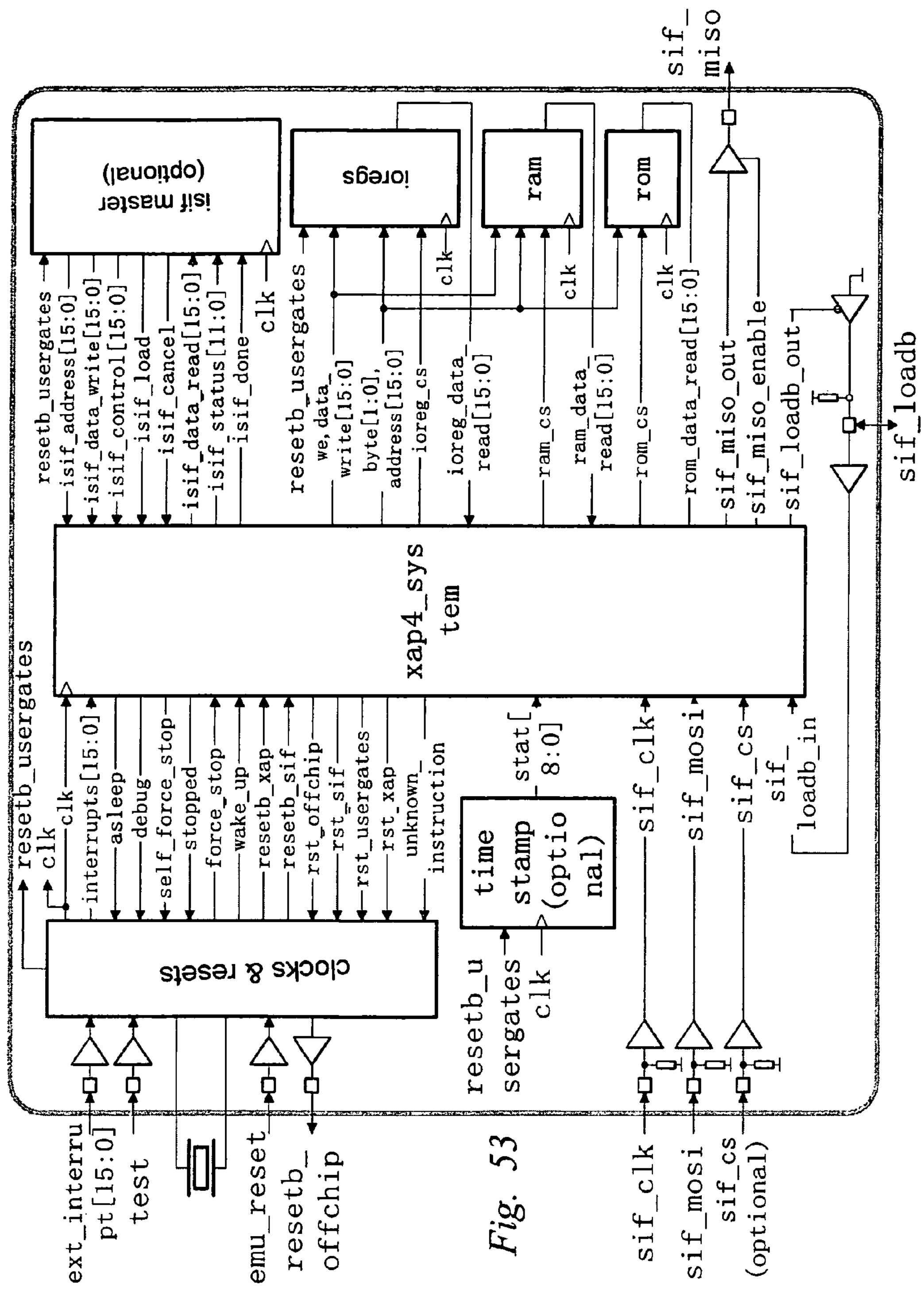
FIG. 53 shows the typical connections for XAP4a within an ASIC.
Figure 54:
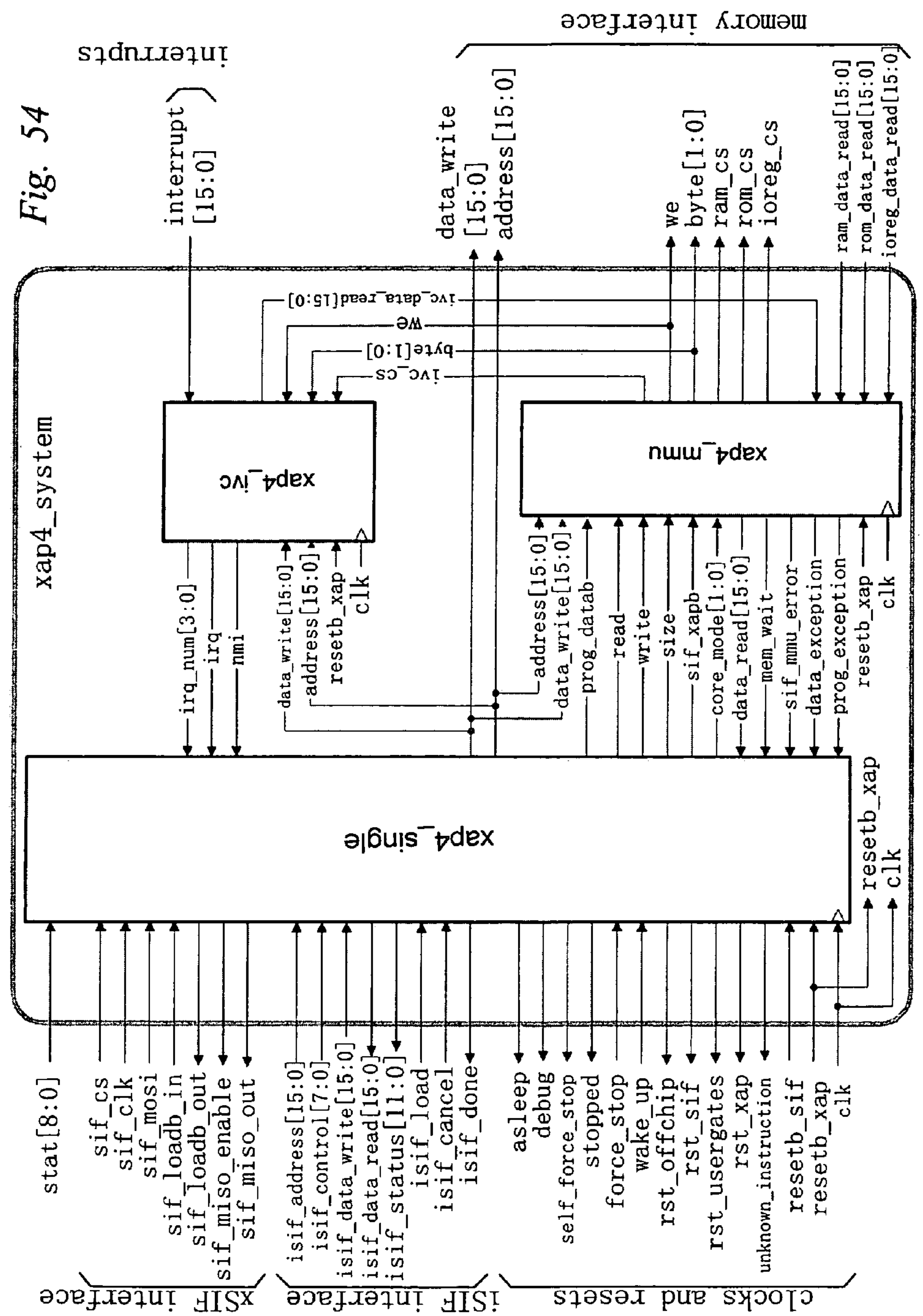
FIG. 54 shows the typical structure within the xap4_system module.

- System control—clock and reset generation, watchdog functions, etc.
- Memories, peripherals and interrupt sources.
- An optional time-stamp module (timer) that provides a time-stamp on all SIF transfers.
- An optional internal SIF (iSIF) interface FIG. 53 shows the typical connections for XAP4a within an ASIC FIG. 54 shows the typical structure within the xap4_system module. Normally, this contains three modules: xap4_single, xap4_mmu, and xap4_ivc.

- xap4_single: this contains a single instance of the xap4a processor, and a SIF interface for debug and development support This module should be used as delivered from Cambridge Consultants. The customer is not expected to modify any part of xap4_single.
- xap4_mmu: this is a Memory Management Unit (MMU) which interfaces with memory-mapped I/O registers and memories, typically ROM and RAM. The xap4_mmu delivered is an example. The customer is expected to modify this as required for his particular ASIC or FPGA.
- xap4_ivc: this is an Interrupt Vector Controller (IVC) that prioritises interrupt sources and provides an interrupt number to the XAP4. The xap4_ivc delivered is an example. The customer is expected to modify this as required for his particular ASIC or FPGA.

FIG. 54 for a typical XAP4a System

Global Strategies

Naming Conventions

All Verilog names (modules, ports, signals) are lower case. Words are separated with an underscore character. Buses are always of the form [high:low]. Module names all start with 'xap4_'. Control signals are normally active high. If active low, the signal name (or intermediate word) ends in 'b'. e.g.:— resetb_xap
prog_datab
xap4_single
address[15:0]
size

The high level modules have been created as Fletcher charts that automatically generate the Verilog RTL to be used. This methodology uses a flat-naming convention. This means that a signal has the same name at all levels of the hierarchy. This means that signals and ports have the same names.

The low level modules are hand written in Verilog RTL. In general this maintains the flat naming strategy, but it may not always be the case.

Test

There are no special features in XAP4a for test. It has been designed for simple scan-path testing. It provides the designer with clean access to the clock and reset signals. It is recommended that any special test mode behaviour is implemented in the xap4_clocks_resets module. This may modify clock and reset behaviour in the various test modes.

Clocks and Resets

We expect the ASIC designer to create a single module called xap4_clocks_resets for the whole ASIC. All clock, reset and test signals should either pass through or be generated from within the xap4_clocks_resets module. This allows the designer to have a single block to analyse for the correct operation of clocks and resets for the ASIC in functional and in all test modes (including scan path).

Clocks

There are no latches or memories inside xap4_system. The only sequential components used am clocked flip-flops. There are only two clocks used in xap4_system. Inside xap4_system, the two clocks are only used to clock flip-flops.

TABLE 75

| Name | Description | Used |
|---|---|---|
| clk | Main system clock | Most flip-flops in xap4__system are clocked by clk. These are all clocked on posedge clk.<br>clk is normally the system clock used for the RAM, ROM and other digital logic outside xap4__system. |
| sif__clk | SIF clock | Used for xSIF shift register. Not expected to use this signal for anything outside xap4__system.<br>Different parts of the xSIF shift register use posedge and negedge of sif__clk. |

For the following XAP4 modules' boundaries:— xap4
xap4_sif
xap4_ivc
xap4_mmu

The XAP4 input sif_mosi is sampled on negedge sif_clk. All other XAP4 inputs are sampled on posedge clk. Some of these inputs go directly into the flip-flop D-pin. Other inputs have combinational logic between the module input and the flip-flop D-pin.

The XAP4 output sif_miso_out changes on posedge sif_clk. All other XAP4 outputs change on posedge clk. Some of these outputs come directly from the flip flop Q-pin. Other outputs have combinational logic between the flip flop Q-pin and the module output. Such signals may bounce for a short period after posedge clk before assuming their new stable value.

Clock Gating

Clocks are not gated at all within xap4_system. If the ASIC designer wishes to gate clocks, (when, for example, the XAP4 is in a sleep state), this should be done outside xap4_system. An example of how to do this in the xap4_clocks_resets module is described herein Resets We expect the xap4_clocks_resets module to generate four active-low resetb signals, these signals should be generated from the associated four 'rst' outputs from xap4_system. They may also be generated by other reset sources such as power-on-reset or watchdog,

TABLE 76

| Name | Description |
|---|---|
| resetb__xap | Resets all other flip-flops in xap4, xap4__ivc, xap4__mmu. The SIF mode (normal or debug) is not altered, nor is the Run State of the XAP4 (run continuous, run to break, single-step, or stop). |
| resetb__sif | Resets all flip-flops in xap4__xsif and the debug section of xap4. The xap4 is reset to normal mode and run continuous. |
| resetb__offchip | [Optional] Resets any devices external to the ASIC. |
| resetb__usergates | [Optional] Resets any user gates within the ASIC (excluding the XAP4/SIF). |
| rst__xap | Should be connected to reset the XAP4 via resetb__xap. |
| rst__sif | Should be connected to reset the SIF via resetb__sif. |
| rst__offchip | May be connected via resetb__offchip to reset off-chip devices. |
| rst__usergates | May be connected via resetb__usergates to reset a region of User gates within the ASIC (excluding the XAP4/SIF). |
| unknown__instruction | Generated when XAP4 encounters an unimplemented opcode in a privileged mode (all modes except User Mode). Can be used by xap4__clocks__resets module to generate resetb__xap. |

Figure 55:
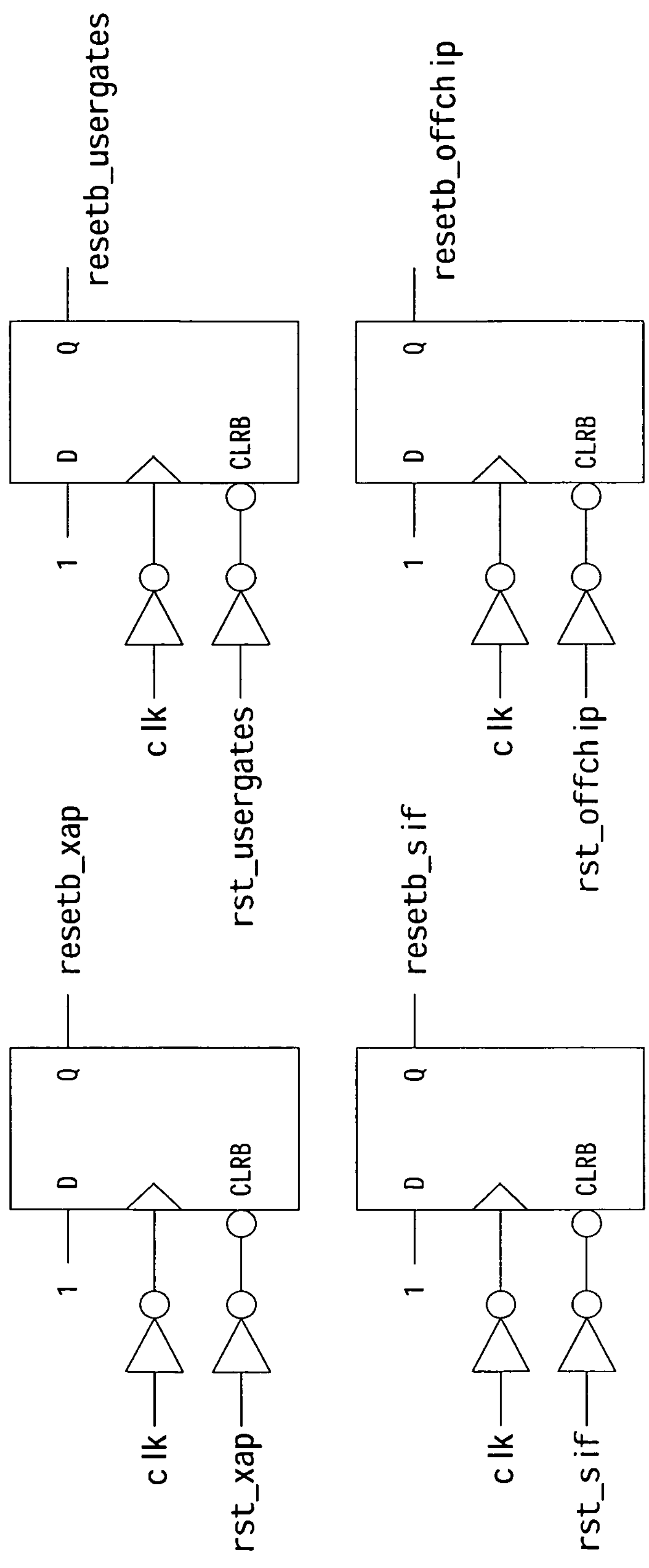
FIG. 55 shows alternative embodiments of the XAP4 clock reset circuit.

The xap4_clocks_resets module which generates the resetb signals should synchronise the end of each reset (i.e. posedge resetb) with negedge clk. A possible circuit is shown in FIG. 55. This shows each resetb signal generated from a flip-flop that is asynchronously cleared either by emu_reset (the external reset signal into the ASIC) or by the associated rst signal. The trailing (rising) edge of each resetb signal is synchronised to the next falling edge of clk when the rst signal or emu_reset is removed.

The four 'rst' signals are all outputs from flip-flops in xap4_system clocked on posedge clk. These signals are all active high and are one clk cycle wide. All four can be generated in various combinations by SIF commands from the debug computer. These can be connected in hardware (via xap4_clocks_resets module) to reset different sections of the ASIC. The ASIC designer is free to connect up some or all of these rst outputs as best supports his system reset strategy. It is only mandatory to connect the rst_xap and rst_sif signals. See the example RTL in xap4_clocks_resets for guidance.

The unknown_instruction output is also clocked on posedge clk. It is generated by the xap4 when it encounters an unrecognised opcode and it is not in User mode. (An unknown instruction in User mode generates an exception that can be processed by an exception handler.) An unknown instruction in any privileged mode (Supervisor, Interrupt, NMI) is typically considered a fatal error. We expect this signal to be used as input to the xap4_clocks_resets module, so that it can be used to set the various resetb signals low.

System Control

XAP4 has a number of inputs and outputs for overall system control. It is recommended that these signals all be connected to the xap4_clocks_resets module.

The system control output signals (from xap4_system) are:

asleep debug self force_stop stopped

The system control input signals (to xap4_system) are:

wake_up (tie low if not used)

force_stop (tie low if not used)

These are all synchronous signals, generated or synchronously sampled by XAP4 on posedge of clk. Further description for these signals is provided below and in section 0.

Asleep, Wake_up

The asleep output signal is set high if the XAP4 is in a sleep state, i.e. if it is executing a sleepnop or sleepsif instruction. The XAP4 remains in this state with asleep set until the XAP4 samples the wake_up signal high at posedge of clk, which then terminates the sleepnop/sleepsif instruction. It is only necessary to set wake_up high for at least one clock cycle. The wake_up signal is ignored by XAP4 if it is not in a sleep state.

It is also possible to wake up the XAP with a SIF wake_up instruction. This causes the XAP4 to exit sleep state exactly as if wakeup had been pulsed high for one clock cycle.

Using Asleep/Wake_up for Clock-Gating

One common use of the asleep and wake_up signals is for an external clock gating scheme to reduce power consumption. An example of this is provided in the xap4_clocks_resets module. This operates according to the timing shown in FIG. 56.

Figure 56:
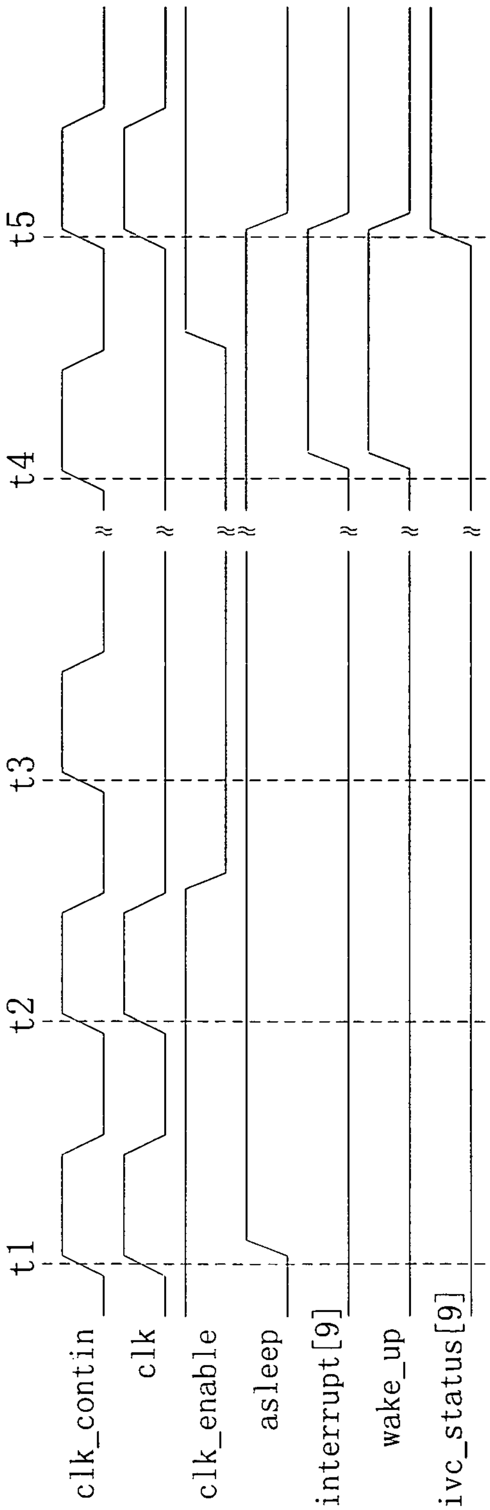
FIG. 56 shows a timing diagram for the XAP4 clock reset.

FIG. 56 shows a Clock Gating example.

The xap4_clocks_resets module gates the main system clock to the XAP4 (clk) from its internal continuous version of the clock (clk_contin). When the XAP4 executes a sleepnop or sleepsif instruction, it goes into a sleep state and sets the asleep signal high, shown at time t1 in FIG. 56. The xap4_clocks_resets module detects this on the following clock edge t2 and turns off clk to XAP4. Internally, clk_contin continues to run, and is used to synchronise and edge-detect external interrupts.

Normally, the user will want to re-awake the XAP4 when some external event occurs. The xap4_clocks_resets module uses a posedge on interrupt[9] as the trigger to re-awake XAP4, but it could of course be some other signal (not necessarily an interrupt) or a combination of several signals. When the wake_up condition occurs at clock edge t4, the xap4_clocks_resets module re-enables the clocks, and pulses interrupt[9] and wake_up high for one clk period. On the first posedge of the re-enabled clock at t5, the XAP4 sees wake_up set high, and resumes program execution, which sets asleep low. Also at t5, the IVC captures the pulse on interrupt[9], which sets ivc_status[9] high. This can then be used to generate an interrupt to XAP4 software.

If an interrupt is used both to re-awake the XAP4 and generate an interrupt to the XAP4 software, the XAP4 will wake up and immediately branch to the interrupt vector, provided that interrupts are enabled in the flags register and in the IVC.

SIF Access While clk is Disabled

Another possible scenario is the need to support xSIF access when the XAP4 is asleep with clk disabled. For example, the XAP4 may have executed a sleepnop instruction which puts the processor in sleep mode but allows SIF access. If the xap4_clocks_resets module disables clk while the XAP is asleep, then the XAP4 cannot complete the SIF access.

The recommended solution is to use the posedge of sif_clk to enable clk to XAP4 at the start of an xSIF access, and then disable clk again when the XAP4 portion of the access is complete, signified by a posedge on sif_loadb_out. Note that there is no need to pulse wake_up or an interrupt for this xSIF access, the only requirement is to turn clk on to XAP4 to allow the xSIF access to complete.

Debug

The debug output signal is set high if the XAP4 is in debug mode. This occurs when the SIF (xSIF or iSIF) executes a particular SIF instruction to put the XAP in debug mode. It remains in debug mode until a corresponding SIF instruction is executed to exit debug mode. The XAP must be in debug mode in order to execute certain SIF instructions of an invasive nature: writing processor registers, processor control (rum, stop, wake-up, run-to-break), etc.

Force_stop, Self_force_stop, Stopped

The force_stop signal provides a way to externally stop the XAP4, this is in addition to mechanisms provided by the SIF interface. The stopped output signal is set high if the XAP4 is stopped, either because the force_stop input is high or because Run State=Stopped. The XAP4 enters Run State=Stopped when any of the following conditions occur.

A SIF instruction explicitly sets Run State=Stopped.

A SIF instruction sets Run State=Run-To-Break, and the processor subsequently hits a breakpoint condition.

A SIF instruction sets Run State=Single-Step, and the processor subsequently executes a single instruction.

The XAP4 starts running (and sets the stopped output low) only when the force_stop input is low and Run State≠Stopped.

Note that setting or clearing force_stop does not have any effect on Run State. Run State is controlled solely by SIF instructions or by the processor terminating a Run-To-Break or Single-Step as described above.

XAP4 Startup With RAM-Resident Program

When the xap4 SIF logic receives a reset on resetb_sif the Run State is reset to Run Continuous. This allows a system with ROM-resident code to begin execution immediately following a power-on reset. For a XAP4 system with RAM-resident code, the XAP4 must be held stopped until the code is loaded into RAM. The force_stop signal provides this ability, using one of two methods:

If the code is downloaded from another processor or a hardware state-machine (typically through an iSIF interface), the force_stop signal should be controlled directly by the download hardware.

If the code is downloaded through the xSIF interface, then the self_force_stop output should be connected to the force_stop input. The resetb_sif signal sets self_force_stop high, so this will hold the processor stopped at reset. After the code has been downloaded, xSIF executes a specific SIF instruction to set self_force_stop low. This releases force_stop, allowing the processor to start running.

Timing of Force_stop and Stopped

The XAP4 tests for a stop request (from force_stop or from a SIF instruction) at the posedge of clk at the end of each XAP4 instruction and at the end of each transfer in a blkcp (block copy) or blkst (block store) instruction. The maximum delay in stopping is therefore equal to the length of the longest atomic instruction (which is the divide instruction).

The XAP4 leaves the stopped state (and sets the stopped output low) only when the force_stop input is low and Run State≠Stopped. So if force_stop is set from high to low, the stopped output may still remain high if Run State=Stopped.

The two timing diagrams below illustrate typical timing relationships between force_stop, stopped, and Run State.

Figure 57:
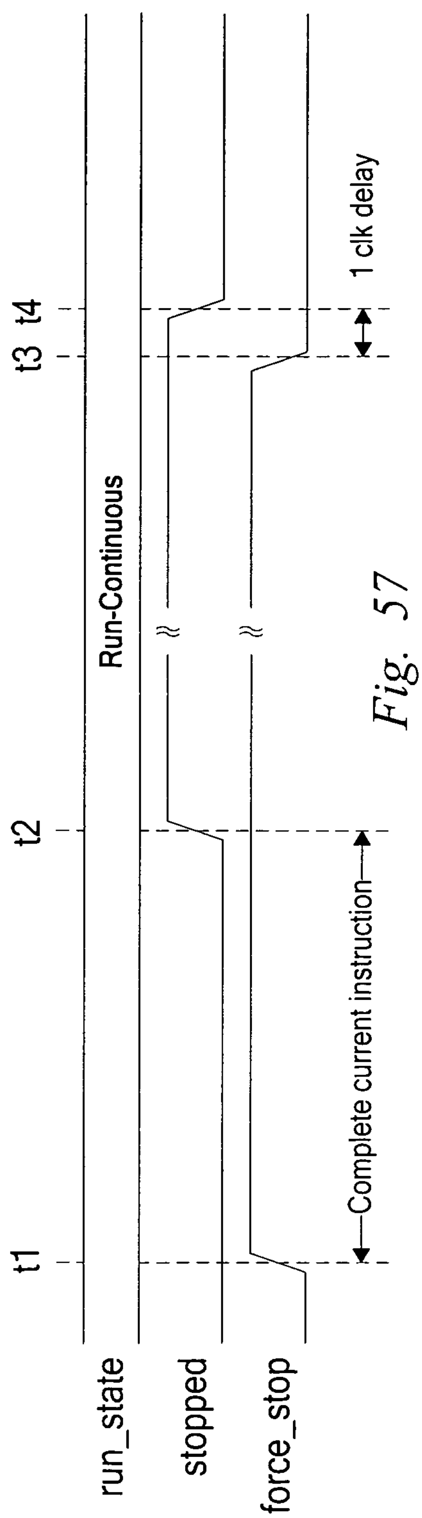
FIG. 57 shows Stop and restart using force_stop.

FIG. 57 shows Stop and restart using force_stop.

Figure 58:
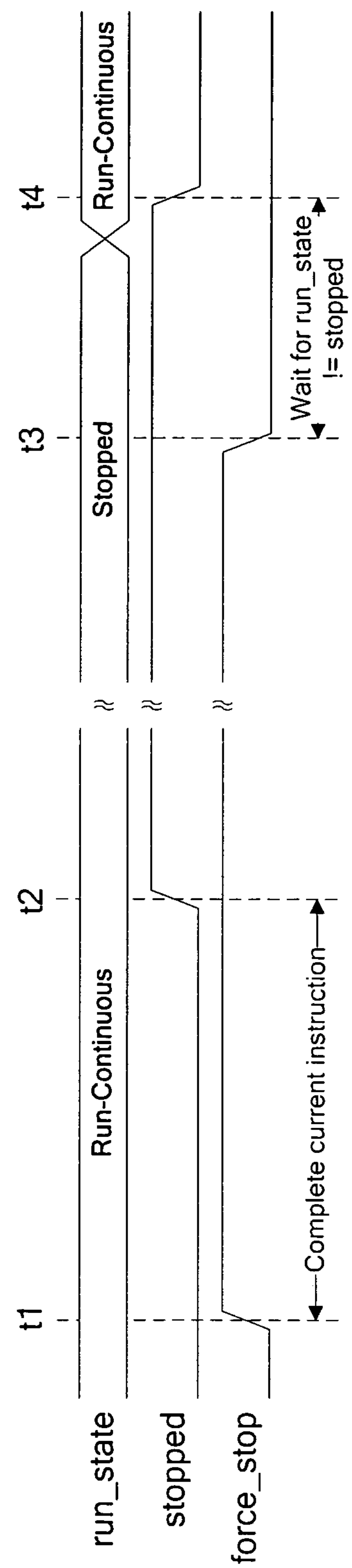
FIG. 58 shows Stop using force_stop, restart delayed by Run State.

FIG. 58 shows Stop using force_stop, restart delayed by Run State.

SIF xSIF Interface

The XAP4 system includes an xSIF interface, this is a serial interface consisting of 4 or 5 pins. This interface is for debug use only, and is not intended to be used for functional purposes.

iSIF Interface

The ASIC block diagram in FIG. 53 shows an optional isif_master module. This uses the iSIF (internal SIF) interface to provide powerful debugging and control capabilities from another processor or control logic within the ASIC. The iSIF is an internal parallel version of the xSIF interface, and differs significantly from xSIF in that it can be used for functional purposes by the ASIC designer. The iSIF is expected to be used in one of the ways:—

Unused. All the iSIF inputs (isif_address[15:0], isif_data_write[15:0], isif_control[7:0], isif_load, and isif_cancel) should be tied low. This will allow synthesis tools to optimise out almost all the iSIF related logic.

Memory access only, such as program download or data acquisition. The xSIF interface (if connected) would continue to provide debugging capability.

Memory access as above, plus debugging capability. The xSIF interface (if connected) would not be used for debugging.

XAP4 Core

The xap4_single module provides the functionality necessary to implement the XAP4 instruction set. It decodes the instruction fetched from memory, and then executes the necessary ALU operation(s) and/or memory load operations, writing the appropriate results back to the internal registers, flags, and memory as necessary. The core contains the following features:

Single cycle for most instructions. The core utilises a two-stage pipeline, fetching the next instruction while decoding and executing the present instruction.

The ALU provides 4 groups of functions: add/subtract, multiply/divide, shift/rotate, and logic operations (and, or, xor, etc.)

Register file for the r0-r7 processor registers, with one write port and three read ports. The registers are split into even and odd groups, allowing a pair of contiguous registers to be read or written in one cycle (for 32-bit data).

Fully integrated support for SIF read/write access to memory, xap4 registers and debug control (breakpoint, single-step, etc.), allowing the system to be debugged with the xIDE integrated development environment. The ASIC is the SIF Slave. The external SIF Pod or an on-chip iSIF interface is the SIF Master.

Memory Management Unit

Overview

The MMU module forms the interface between xap4_single and external memories and peripherals. The XAP4a is provided with an example MMU (xap4_mmu) but should be adapted to the user's specific requirements. The MMU provides the following functions:

Decoding of the address to provide chip-select signals to the memory devices.

Multiplexing of the read data from the memory devices.

Support for slow/busy memory devices, using a mem_wait signal.

Detection and reporting of memory access exceptions.

The xap4_single module initiates a memory access by setting high either read (for a read access) or write (for a write access). It also drives address[15:0] and size to indicate the target address and the width of the access (1 or 2 bytes). If this is a write access, it also drives data_write[15:0].

The MMU decodes the address, and determines first if the access is to be permitted or whether it should cause an exception. If the access is not permitted, the MMU flags an exception (see section 0). Otherwise, the MMU sets high the appropriate chip select signal (e.g. ram_cs for a write to RAM), and sets we high for a write access or low for a read access. It also and sets byte[1:0] according to address[0] and size:

TABLE 77

| Access type | size | address[0] | byte[1:0] |
|---|---|---|---|
| Access to data bits [7:0] | 0 | 0 | 01 |
| Access to data bits [15:8] | 0 | 1 | 10 |
| Access to data bits [15:0] | 1 | x | 11 |

Memory Map

Figure 59:
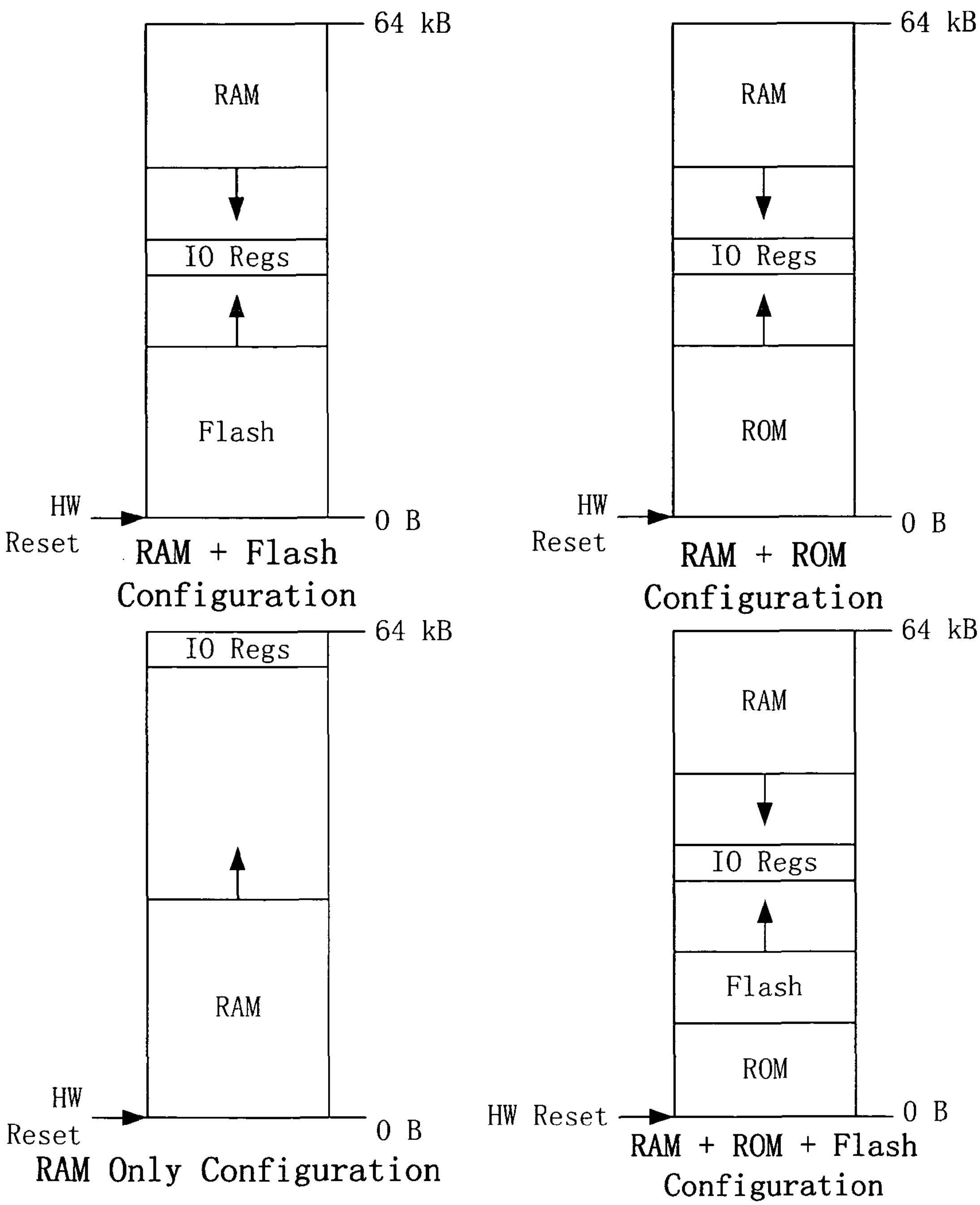
FIG. 59 shows Recommended Memory Maps.

The MMU decodes the incoming address from the XAP to create one or more chip-select signals to the various memory devices. FIGS. 59 to 65 show the recommended memory maps for the four most common configurations. FIG. 59 shows Recommended Memory Maps.

Wait States

The MMU is responsible for informing the xap4 processor if wait states are required. The MMU drives mem_wait high unless this is the selected memory can accept a new address on the next clock cycle. The xap4_single module holds its memory interface outputs stable until mem_wait goes low.

When xap4_single samples mem_wait low at a clock edge, it is free to begin a new memory access. Note that for a read access, the read data is returned on the clock after the one in which mem_wait goes low—see the memory read timing described herein.

For best performance, the xap4 should be connected to memory (data and program) that operates with zero wait states, i.e. single cycle memory. This means that the memory should be ready to accept a new address for a read or write access on every clock cycle. Since most xap4 instructions make full use of the memory bandwidth, the use of memory with one or more wait states will degrade xap4 performance almost linearly.

The example MMU defines memory with the following performance:—

RAM: zero wait states (one cycle)

ROM: one wait state (two cycles).

I/O space: zero wait states (one cycle)

The user can modify the xap4_mmu module to suit the memory and peripherals connected to the MMU. If memory with one or wait states is to be used, then the user should refer to section 0 that discusses how this impacts the use of the XAP4 sif instruction.

Memory Exceptions

The MMU has two memory exception flags that it drives to the xap4: data_exception and prog_exception. These can be used to notify the xap4 of illegal data or program accesses respectively. In addition, the MMU outputs an error flag, sif_mmu_error, that it can set or clear during SIF accesses to memory. This signal can be used by the MMU to notify the SIF interface of an illegal memory access The MMU receives various qualifiers from the xap4_single module to assist it in qualifying memory access exceptions:— sif_xapb—to indicate the source of the memory access (sif or xap4), prog_datab—to indicate whether xap4 accesses are for data or program, sif_xsifb—to indicate whether sif accesses are from iSIF or xSIF, core_mode[1:0]—to indicate the current mode of the xap4 processor In the example MMU provided, exceptions are generated as follows:— prog_exception is set high for a program access to I/O register space, MMU register space, or IVC register space.

data_exception is set high for a data write to ROM space or for a data read/write to MMU register space.

sif_mmu_error is always set low (i.e. xSIF and iSIF are permitted full access to the entire memory space).

It is a straightforward task for the user to modify the MMU to extend exception detection as required. For example, it may be desired to prevent program access to certain areas of RAM in User mode, or to prevent data access to portions of RAM, or to flag byte writes to memory without byte-enables, or to differentiate between SIF access and xap4 access to memory. These and other combinations can be achieved with the signals provided to the MMU.

Timing

Memory Exception

Figure 60:
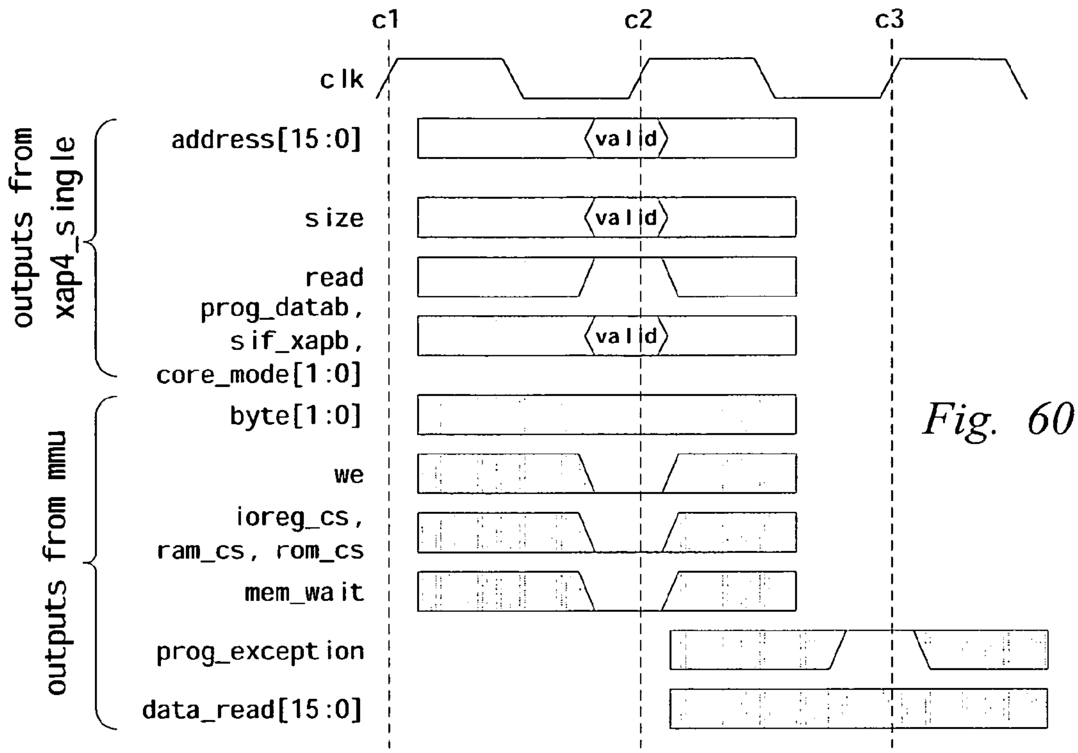
FIG. 60 illustrates an access to memory that generates an exception.

FIG. 60 illustrates an access to memory that generates an exception. The xap4 processor begins the access (a program read in this example) at clock edge c1. The MMU decides that this is an invalid access, and drives mem_wait low in the same cycle. No chip selects are set high, so no memory access occurs. The MMU signals that this was a invalid program access by driving prog_exception high for the xap4 processor to sample on the next clock edge, c3. If this were a data access that the MMU detected as invalid (i.e. if prog_datab is low), then the MMU would set high data_exception instead of prog_exception.

Memory Write

Figure 61:
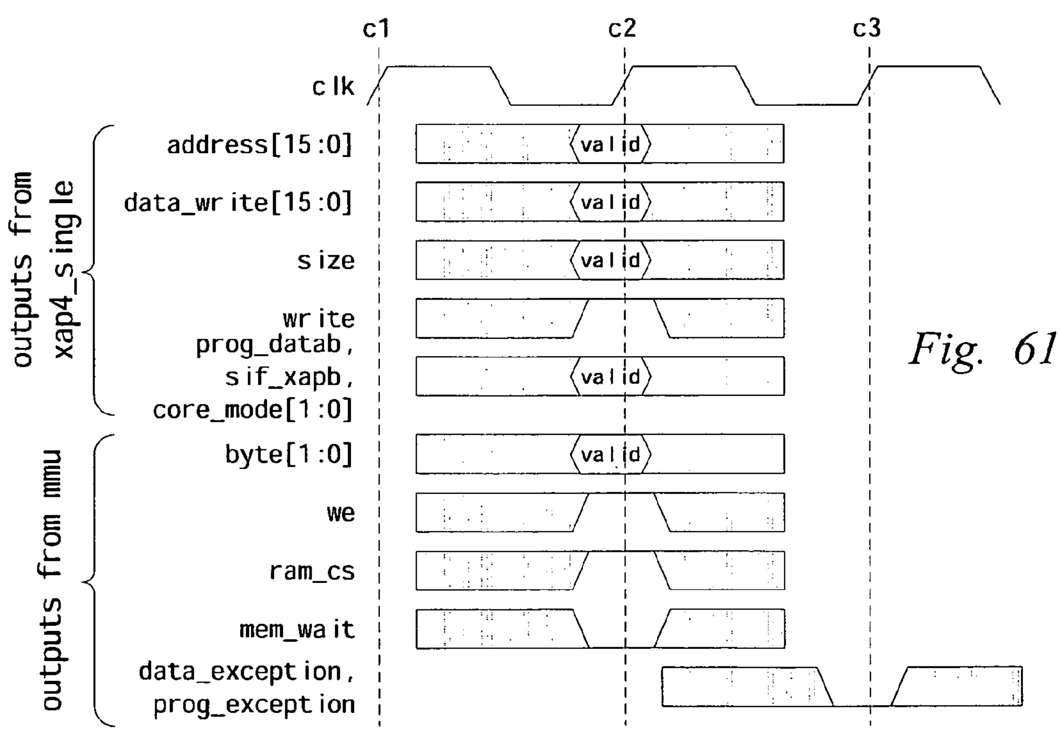
FIG. 61 illustrates a write access to memory with zero wait states.

FIG. 61 illustrates a write access to memory with zero wait states. The xap4 processor begins a write access at clock edge c1. The MMU decides that this is a valid write access requiring no wait states, and drives mem_wait and its outputs to the memory in the same cycle. Thus all inputs to the memory are valid at edge c2. The MMU signals that this was a valid access by driving data_exception and prog_exception both low for the xap4 processor to sample on the next clock edge, c3.

Figure 62:
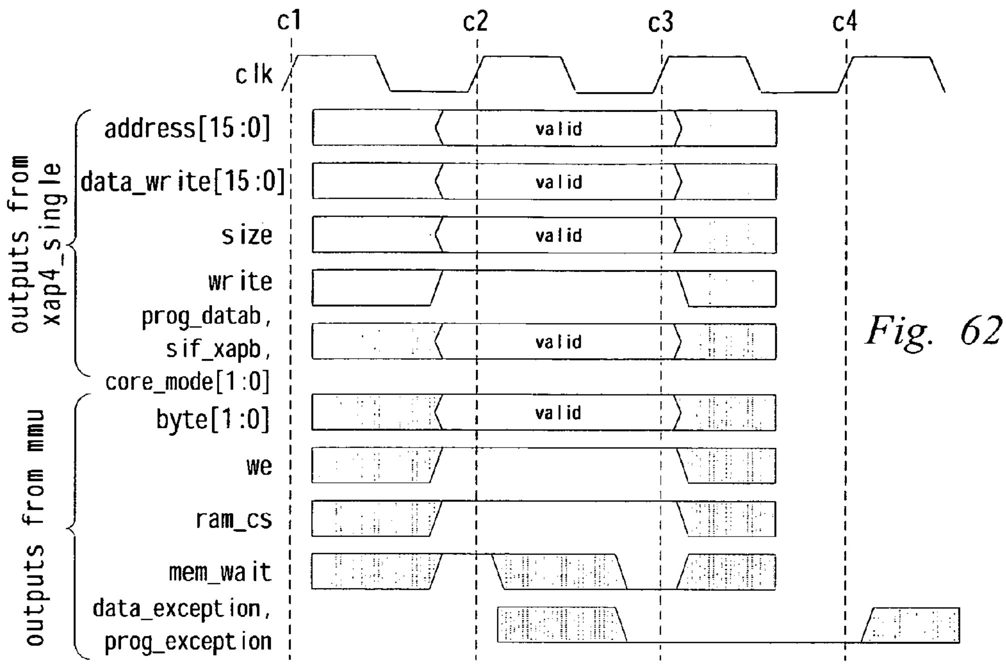
FIG. 62 illustrates a memory write access requiring one wait state.

FIG. 62 illustrates a memory write access requiring one wait state. Note that the MMU drives mem_wait high for clock edge c2, and then low for clock edge c3. Note also that the xap4_single and the mmu module both maintain their outputs to the memory through to clock edge c3.

Memory Read

Figure 63:
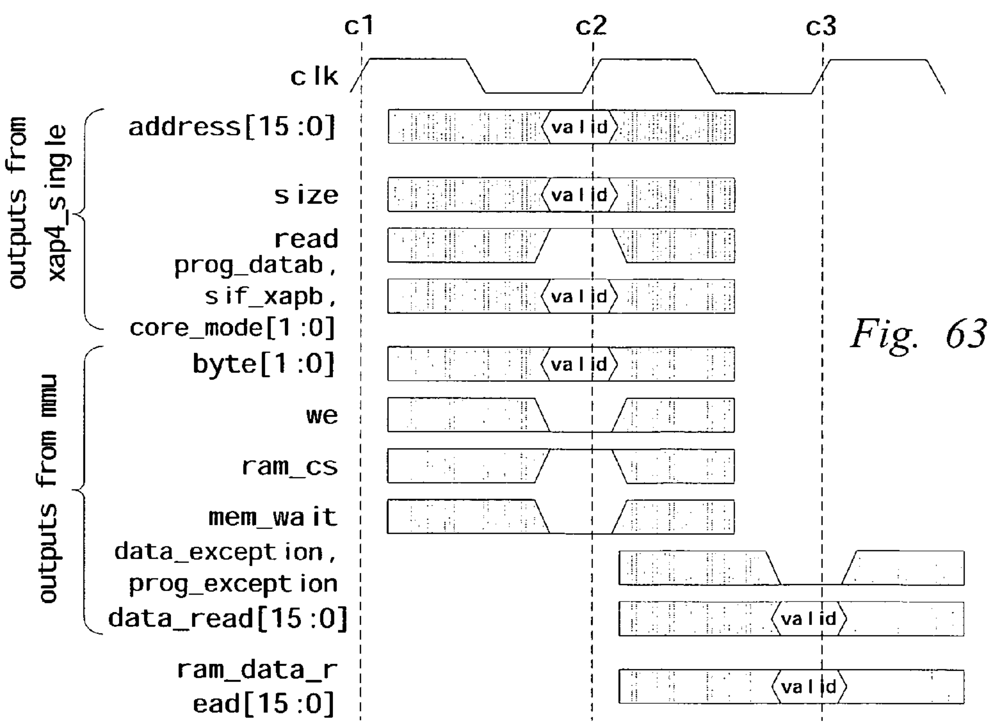
FIG. 63 illustrates a read access to memory with zero wait states.

FIG. 63 illustrates a read access to memory with zero wait states. The xap4 processor begins a read access at clock edge c1. The MMU decides that this is a valid read access requiring no wait states, and drives mem_wait and its outputs to the memory in the same cycle. Thus all inputs to the memory are valid at edge c2. The MMU signals that this was a valid access by driving data_exception and prog_exception both low for the xap4 processor to sample on the next clock edge, c3. The MMU selects the appropriate read data (e.g. ram_data_read [15:0] for a read from RAM) and passes this through as data_read[15:0] in time for the xap4 processor to capture at clock edge c3.

Figure 64:
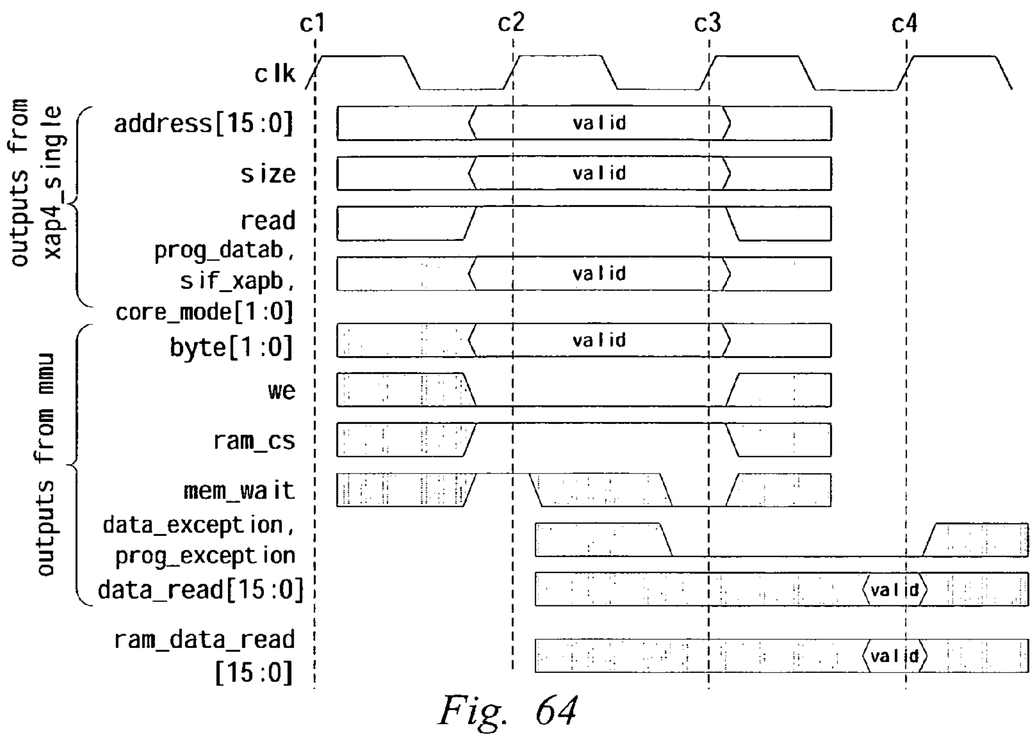
FIG. 64 illustrates a memory read access requiring one wait state.

FIG. 64 illustrates a memory read access requiring one wait state. Note that the MMU drives mem_wait high for clock edge c2, and then low for clock edge c3. Note also that the xap4_single and the mmu module both maintain their outputs to the memory through to clock edge c3. The MMU drives data_read[15:0] in time for the xap4 processor to capture at clock edge c4.

Sequential Memory Access

Figure 65:
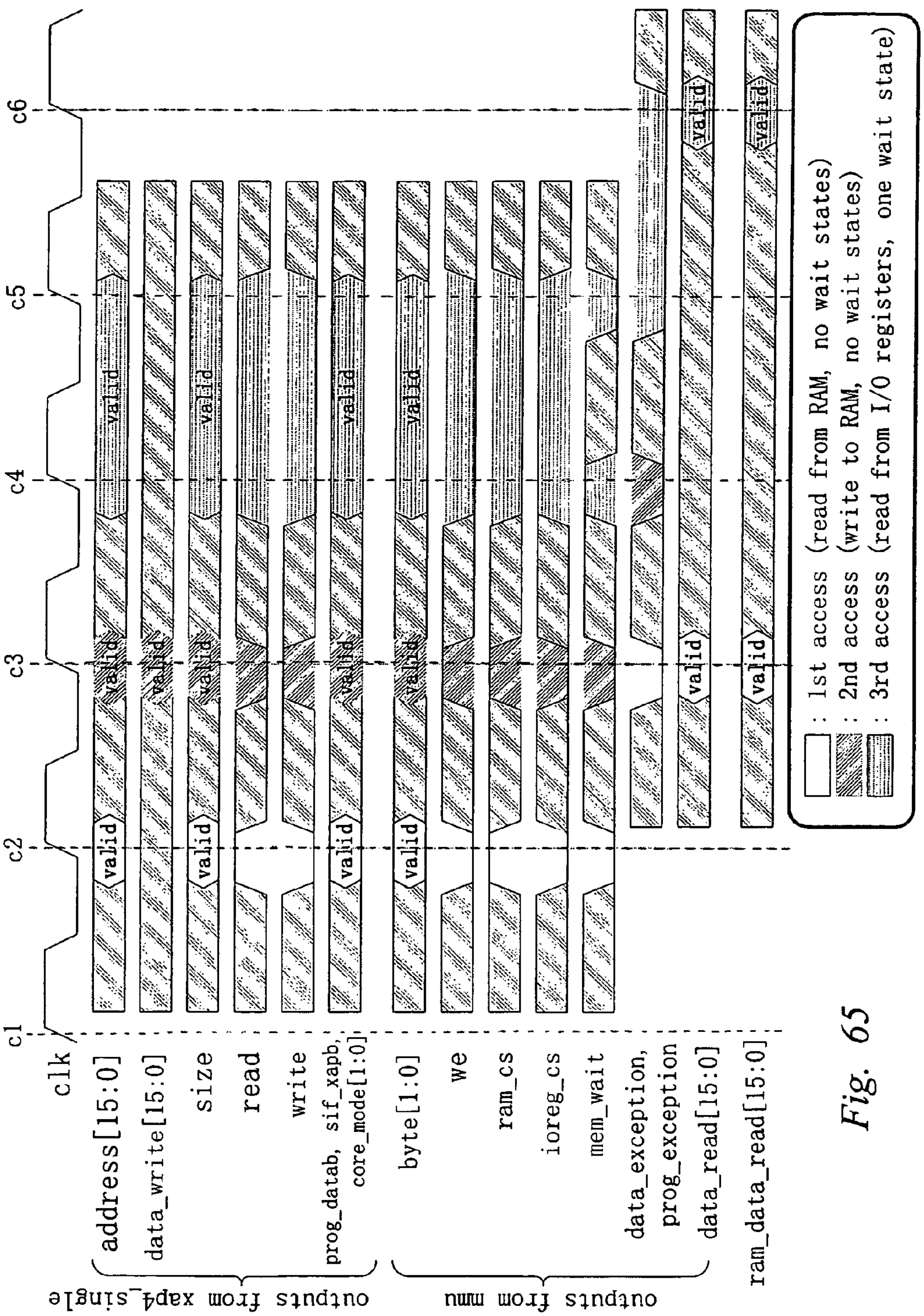
FIG. 65 illustrates a sequence of operations carried out in FIGS. 59 to 64.

In normal operation, accesses to memory will be sequential. The xap4 system design provides pipelined operation for maximum throughput. Total throughput is one clock per access for zero wait state memory, two clocks per access for one wait state, etc. FIG. 65 illustrates a sequence comprising:—

Read RAM, zero wait states

Write RAM, zero wait states

Read I/O registers, one wait state

Configurability

This section has discussed various capabilities provided by the MMU, including address decoding, exception detection, and wait-state control. For most users, these capabilities will be fixed and can be coded directly into the RTL. However, some users may require that some or all of these capabilities be software-configurable. This can be achieved by modifying the MMU to include I/O mapped registers within the MMU to specify these parameters. For example, a pair of registers could be added to specify the base address and size for RAM, or a set of registers to specify the address range for which data access is permitted. Alternatively, some users may wish to add registers that capture certain signals when memory exceptions are detected.

These registers are not included in the example MMU, since the need for them and their precise format will be highly application dependent. In addition, their inclusion would unnecessarily increase chip area and power for those users that do not need this capability. However, it is relatively straightforward to add these registers if needed, and the example MMU does provide address decoding to access these registers.

Interrupt Vector Controller

Overview

The IVC module forms the interface between xap4_single and all external interrupts. The XAP4a is provided with an example IVC (xap4_ivc) but should be adapted to the user's specific requirements.

The Interrupt Vector Controller (IVC) accepts up to 16 interrupts, named interrupt[15:0]. The IVC captures incoming interrupt pulses, and then generates an interrupt and interrupt number to xap4_single. The interrupt priority scheme can be customised to meet the user's requirements.

Operation

Registers

The example IVC includes three 16-bit registers:— ivc_status register (read-only)

ivc_clear register (write-only; read always returns all zeros)

ivc_enable register (read/write)

The functions of these three registers are explained in the following paragraphs.

Interrupt Capture & Clear

The IVC accepts 16 external interrupts (interrupt[15:0]). It assumes that these inputs have already been synchronised and converted to high-going pulses, one clock wide.

The example IVC sets the corresponding bit in the ivc_status register if a pulse is detected on interrupt[7:0]. If more than 8 interrupts are required, it is a simple matter to modify the IVC to use the remaining 8. If more than 16 interrupts are required, this can be achieved by grouping several interrupts to share a single interrupt number. The interrupt handler software would then need to read additional registers in the IVC to determine and clear the precise source of the interrupt.

Software can read the ivc_status register at any time to determine which interrupts have been detected since the last time any have been cleared. Software can clear one or more bits in the ivc_status register by setting the corresponding bit(s) in the ivc_clear register. For each bit set high during a write to the ivc_clear register, the IVC will reset to zero the corresponding bit in the ivc_status register. For each bit set low during a write to the ivc_clear register, the corresponding bit in the ivc_status register will be unaffected.

Note that if a new interrupt arrives on the same clock cycle as it is being cleared by software, the arriving interrupt takes precedence and will set the corresponding bit in the ivc_status register. This ensures that an incoming interrupt cannot be inadvertently 'lost'.

Interrupt Enable

Each captured interrupt is then individually 'AND'-ed with its corresponding bit in the ivc_enable register. The ivc_enable register allows software to control which interrupt sources are allowed to generate an interrupt to the xap4. If a bit in the ivc_enable register is set high the corresponding interrupt is enabled, otherwise it is disabled.

Priority Encoding

All enabled interrupts are then passed to a priority encoder. This sets the irq signal to the xap4 if any of the enabled interrupts are active, and also sets irq_num[3:0] to indicate the number of the highest priority active interrupt. The example IVC implements a straightforward fixed priority scheme, with interrupt[7] being the highest priority and interrupt[0] being the lowest. This can of course be modified if a more complex priority scheme is required, such as a round-robin or a hybrid scheme.

When xap4_single detects irq set high, and it is in the appropriate mode (any mode except NMI Mode), it will vector to the interrupt at the end of the next instruction. It uses the value provided by irq_num to create a branch address into the Interrupt Vector Table (IVT). This branch address is simply 0x40+(irq_num*4).

Non-Maskable Interrupt (NMI)

In the example IVC, nmi is connected to ivc_status[8]. Since this is derived from interrupt[8] which is not used by the example IVC, nmi is always inactive. If the NMI function is required by the ASIC designer, it should be connected to the desired signals (ensure that the sources are properly synchronised to clk).

Interrupt Timing

Interrupt Sampling

The xap4_single module samples irq and irq_num on the posedge of clk. It expects these to remain valid until it has branched to the IVT and interrupt handler software has written to the IVC to clear the respective bit in the ivc_status register. It is not necessary that irq_num remain stable throughout this period—the IVC may change irq_num to reflect the arrival of another interrupt with higher priority (an example of this is shown later in sections 0 and 0). However, any change on irq_num must settle in time for xap4_single to sample it reliably on each posedge of clk.

Interrupt Latency

The XAP4 tests for exceptions and interrupts at the posedge of clk at the end of each instruction and at the end of each transfer in a blkcp (block copy) or blkst (block store) instruction. If the XAP4 detects irq set, interrupts are enabled in the FLAGS register the E bit is set), and the XAP4 is in User, Supervisor, or Interrupt Mode, it will take 4 clks to change to Interrupt Mode and branch to the appropriate entry in the IVT.

The XAP4 gives highest priority to exceptions (if in User Mode), then to interrupts (if in User, Supervisor, or Interrupt Mode), and finally lowest priority to nmi (in any mode). This means that if an interrupt arrives in User Mode just as an exception occurs, the XAP4 will process the exception first. It does this by switching to Supervisor Mode and clearing the E bit in the FLAGS register which disables interrupts. The exception handling code must be designed to re-enable interrupts as soon as it can safely be interrupted. When it does so, the exception handler will be interrupted by the pending interrupt which will then cause XAP4 to go from Supervisor Mode to Interrupt Mode and begin servicing the interrupt.

Figure 66:
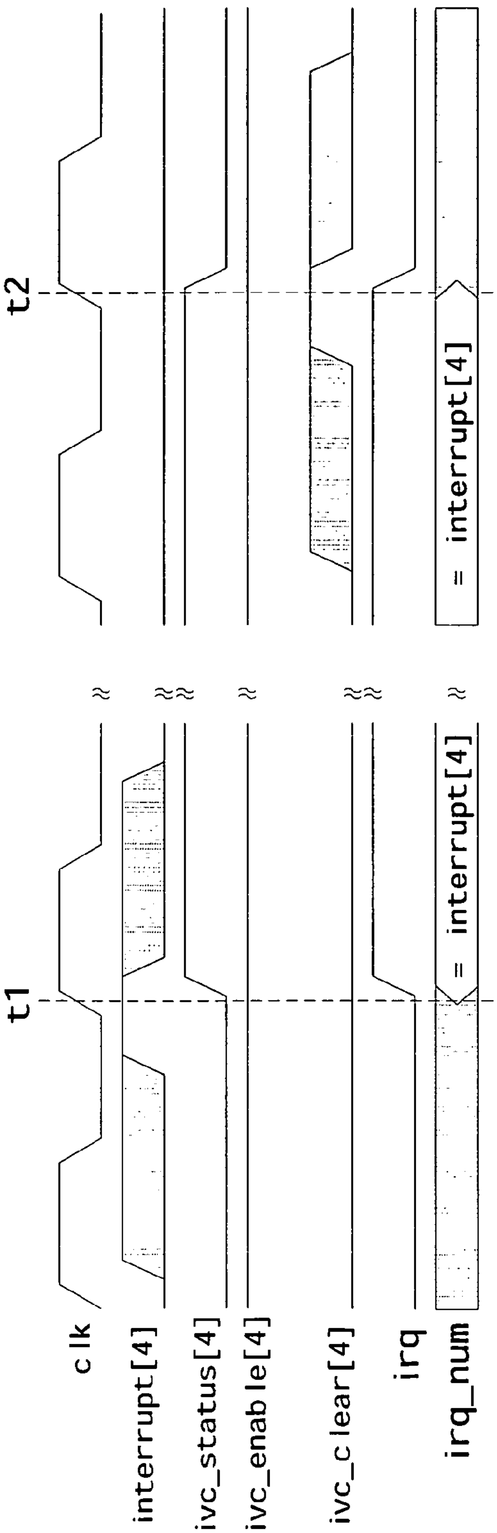
FIG. 66 shows the timing for a single interrupt event.

The minimum interrupt latency is therefore 4 clk cycles, assuming that irq is asserted just as an instruction is completing, that the instruction does not generate a User Mode exception, and that the system is using zero wait state memory. The maximum interrupt response time is 4+N+M, where N is the number of memory wait states and M is the length of the longest atomic instruction. This assumes that:— the E bit in the FLAGS register is set, either initially or as a result of an exception generated in a User Mode instruction the XAP4 is not in NMI Mode Single Interrupt Event FIG. 66 shows the timing for a single interrupt arriving at the IVC on interrupt[4]. This sets ivc_status[4] high at clock edge t1, which immediately sets irq high (this happens immediately because ivc_enable[4] is already set high). At the same time, the IVC sets irq_num to the priority code for interrupt[4]. Some time later, xap4_single recognises the interrupt, disables further interrupts and branches to the IVT. For irq_num=0x6 for example, the branch address would be 0x40+(0x6*4)=0x58. Some time later at clock edge t2, the interrupt handler software writes to the ivc_clear register and sets bit 4. This clears ivc_status[4] which removes irq. Once irq is removed, the value on irq_num is ignored by xap4_single. Finally, the interrupt handler software executes an irqe instruction which re-enables interrupts.

Single Interrupt, Delayed Enable

Figure 67:
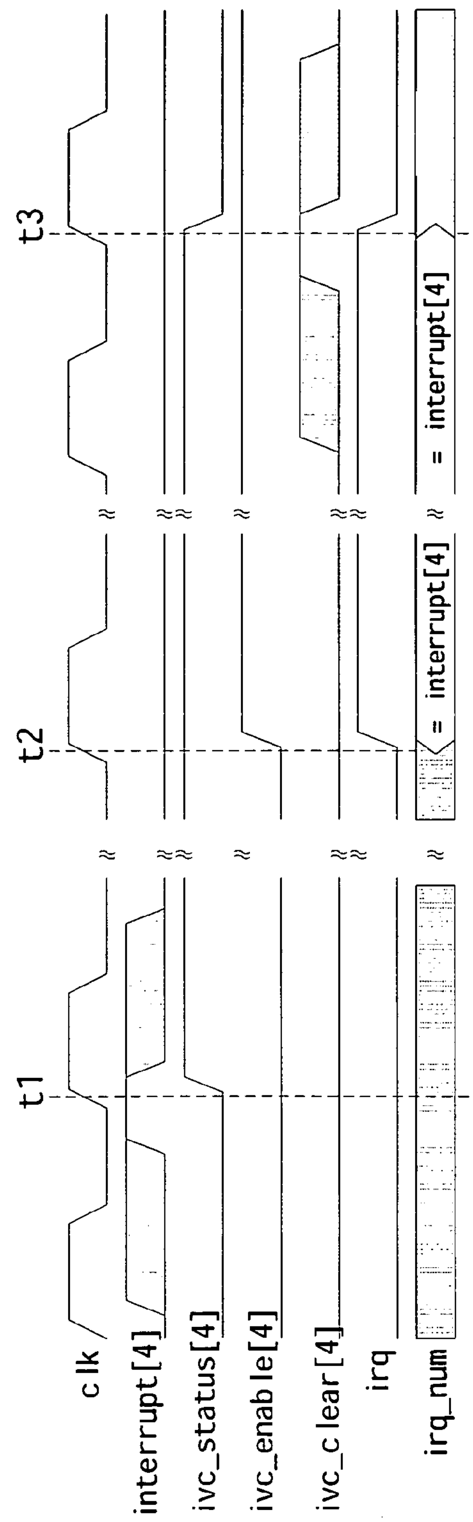
FIG. 67 shows the timing for a single interrupt delayed enable.

FIG. 67 shows the timing for a single interrupt that is not initially enabled. As in the previous diagram, interrupt[4] arriving at the IVC sets ivc_status[4] high at clock edge t1. However, this does not affect irq and irq_num. yet, because ivc_enable[4] is low. Some time later at clock edge t2, the XAP4 software sets ivc_enable[4] high, which now allows the IVC to set irq and irq_num. Some time later, xap4_single recognises the interrupt, disables further interrupts and branches to the IVT. Some time later at clock edge t3, the interrupt handler software sets ivc_clear[4] high which clears ivc_status[4], removing irq. Finally, the interrupt handler software executes an irqe instruction which re-enables interrupts.

Multiple Interrupts, Case 1

Figure 68:
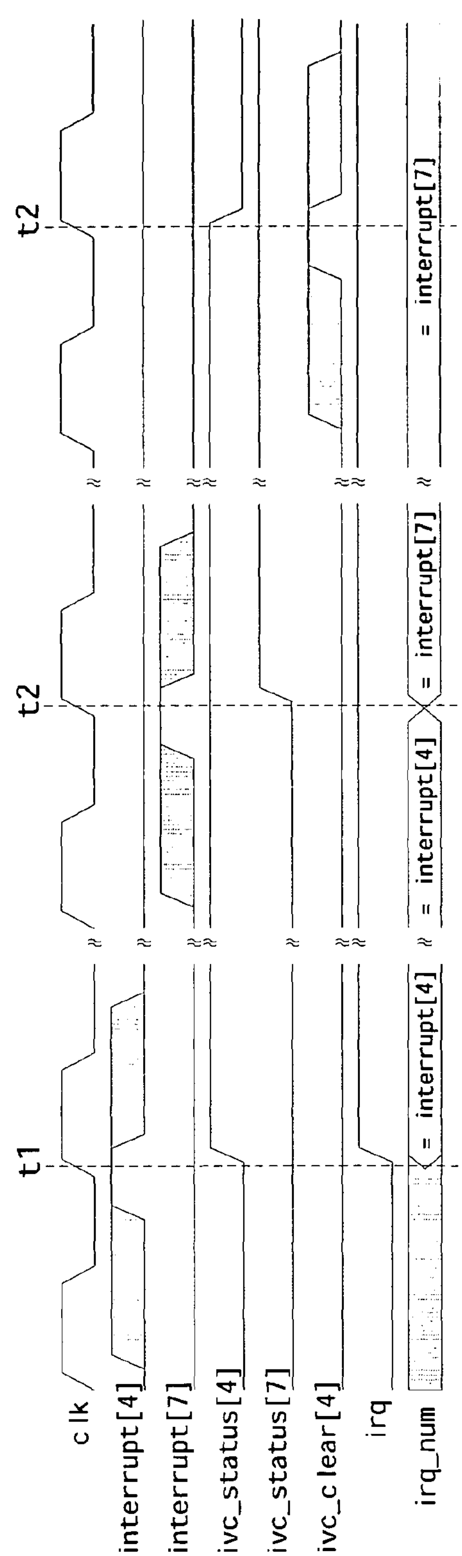
FIG. 68 show the timing for multiple interrupts.

FIG. 68 show the timing for multiple interrupts. In this first case, a higher priority interrupt arrives after the XAP4 recognises the first interrupt, but before the XAP4 has cleared the first interrupt. For this example, the first (lower priority) interrupt is interrupt[4] and the second (higher priority) interrupt is interrupt[7], and we will assume that both are already enabled in the IVC.

At clock edge t1, interrupt[4] arrives at the IVC and sets ivc_status[4] high. Some time later, xap4_single recognises the interrupt, disables further interrupts and branches to the IVT for interrupt[4]. Some time later at clock edge t2, interrupt[7] arrives at the IVC and sets ivc_status[7] high, which changes irq_num to reference this higher priority interrupt. Some time later at clock edge t3, the interrupt handler software sets ivc_clear[4] high which clears ivc_status[4]. However, this does not remove irq, which is still set due to interrupt [7]. When the interrupt handler software executes an irqe instruction to re-enable interrupts, it will now recognise this second interrupt and branch to its interrupt handler code.

Multiple Interrupts, Case 2

Figure 69:
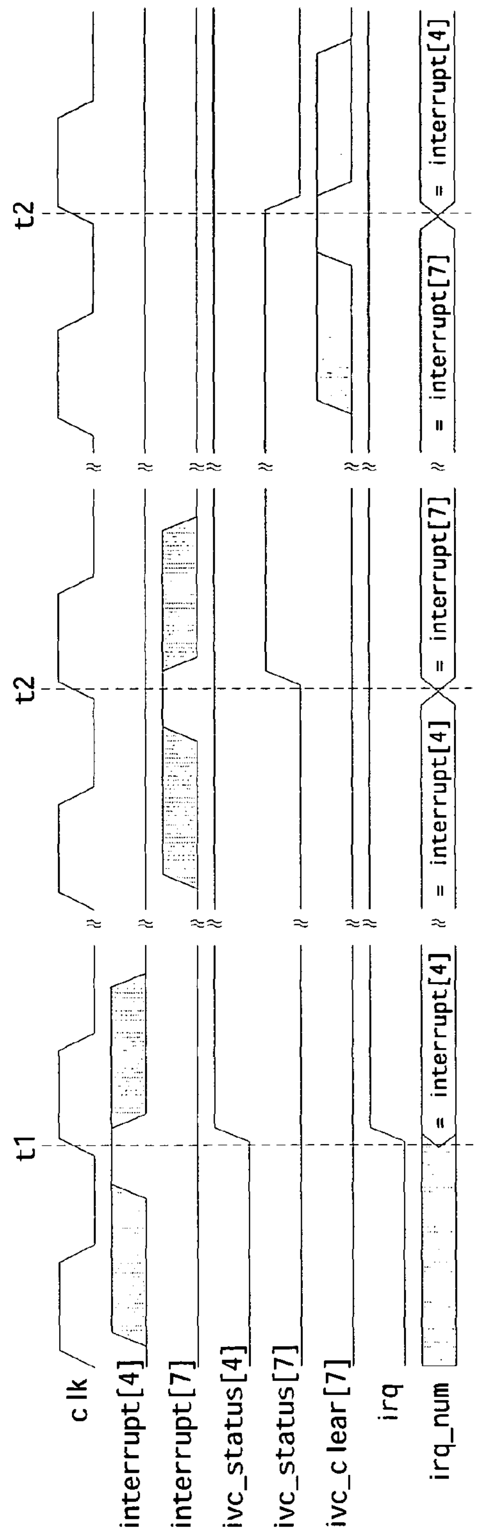
FIG. 69 shows a further embodiment of FIG. 68.

In this second case, a higher priority interrupt arrives before the XAP4 recognises the first interrupt and therefore gets serviced first. As for case 1, the first (lower priority) interrupt is interrupt[4] and the second (higher priority) interrupt is interrupt[7], and we will assume that both are already enabled in the IVC, see FIG. 69.

At clock edge t1, interrupt[4] arrives at the IVC and sets ivc_status[4] high. Some time later at clock edge t2, interrupt [7] arrives at the IVC and sets ivc_status[7] high, which changes irq_num to reference this higher priority interrupt. Some time later, xap4_single recognises the interrupt, disables further interrupts and branches to the IVT for interrupt [7]. Some time later at clock edge t3, the interrupt handler software sets ivc_clear[7] high which clears ivc_status[7]. However, this does not remove irq, which is still set due to interrupt[4]. When the interrupt handler software executes an irqe instruction to re-enable interrupts, it will now recognise the original first interrupt and branch to its interrupt handler code.

NMI Timing

NMI Sampling

The xap4_single module samples nmi on the posedge of clk. Similarly to the interrupt clearing method described herein, it is expected that the NMI handler will write to the IVC when it wishes to clear the captured nmi state in the IVC.

In some implementations, an NMI may be considered a fatal error or a shutdown request, recoverable only through a reset. In this case, it would not be necessary for the IVC module to support a write-to-clear mechanism for nmi. Instead, nmi could be left set high until cleared by a system reset.

NMI Latency

The XAP4 tests for NMI at the posedge of clk at die end of each instruction and at the end of each transfer in a blkcp or blkst instruction. If the XAP4 detects nmi set and it is in User, Supervisor, or Interrupt Mode, it will take 4 clks to change to NMI Mode and branch to the NMI entry in the IVT.

The XAP4 gives lowest priority to nmi, behind exceptions and interrupts. This means that if an NMI arrives just as an interrupt or User Mode exception occurs, the XAP4 will start to process the interrupt or exception first. It does this by switching to Interrupt or Supervisor Mode and clearing the E bit in the FLAGS register which disables interrupts. The XAP4 will then recognise the pending NMI, switch to NMI Mode and begin servicing the NMI.

The minimum NMI latency is therefore 4 clk cycles, assuming that nmi is asserted just as an instruction is completing, that the system is using zero wait state memory, and that there are no valid exceptions or interrupts to be acted upon. The maximum NMI response time is 7+N+M, where N is the number of memory wait states and M is the length of the longest atomic instruction. (The initial 7 clks accounts for an exception or interrupt branch occurring first, followed by the branch to the NMI.)

NMI Timing Example

Figure 70:
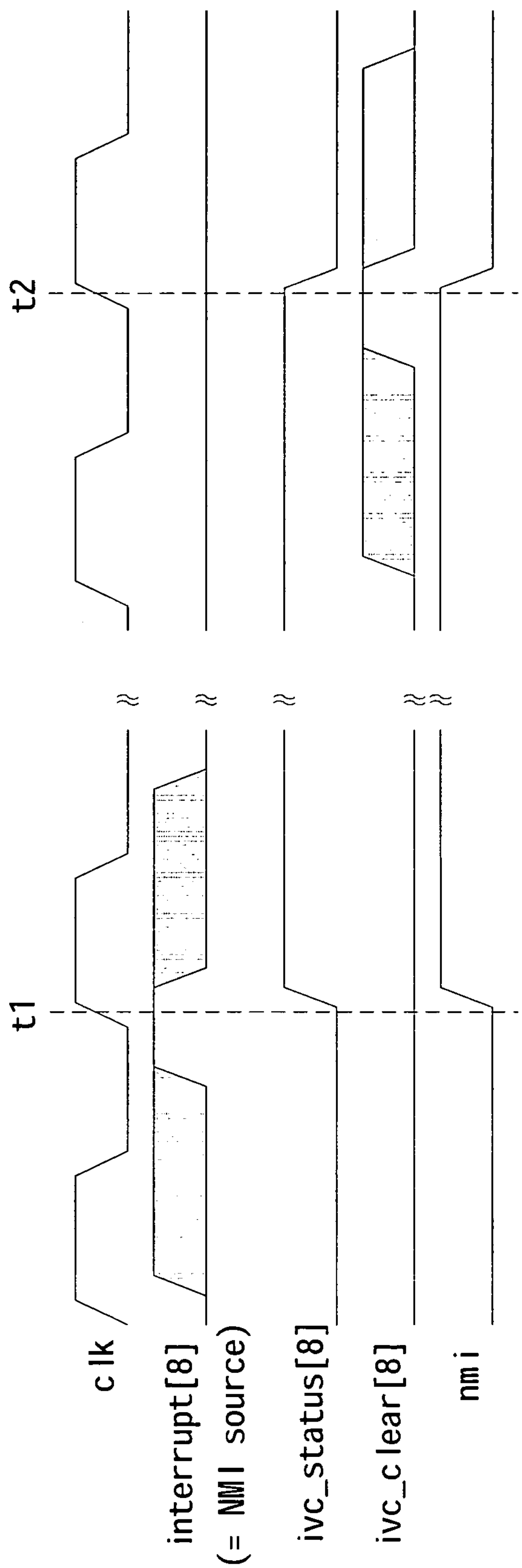
FIG. 70 shows an NMI event.
Figure 71:
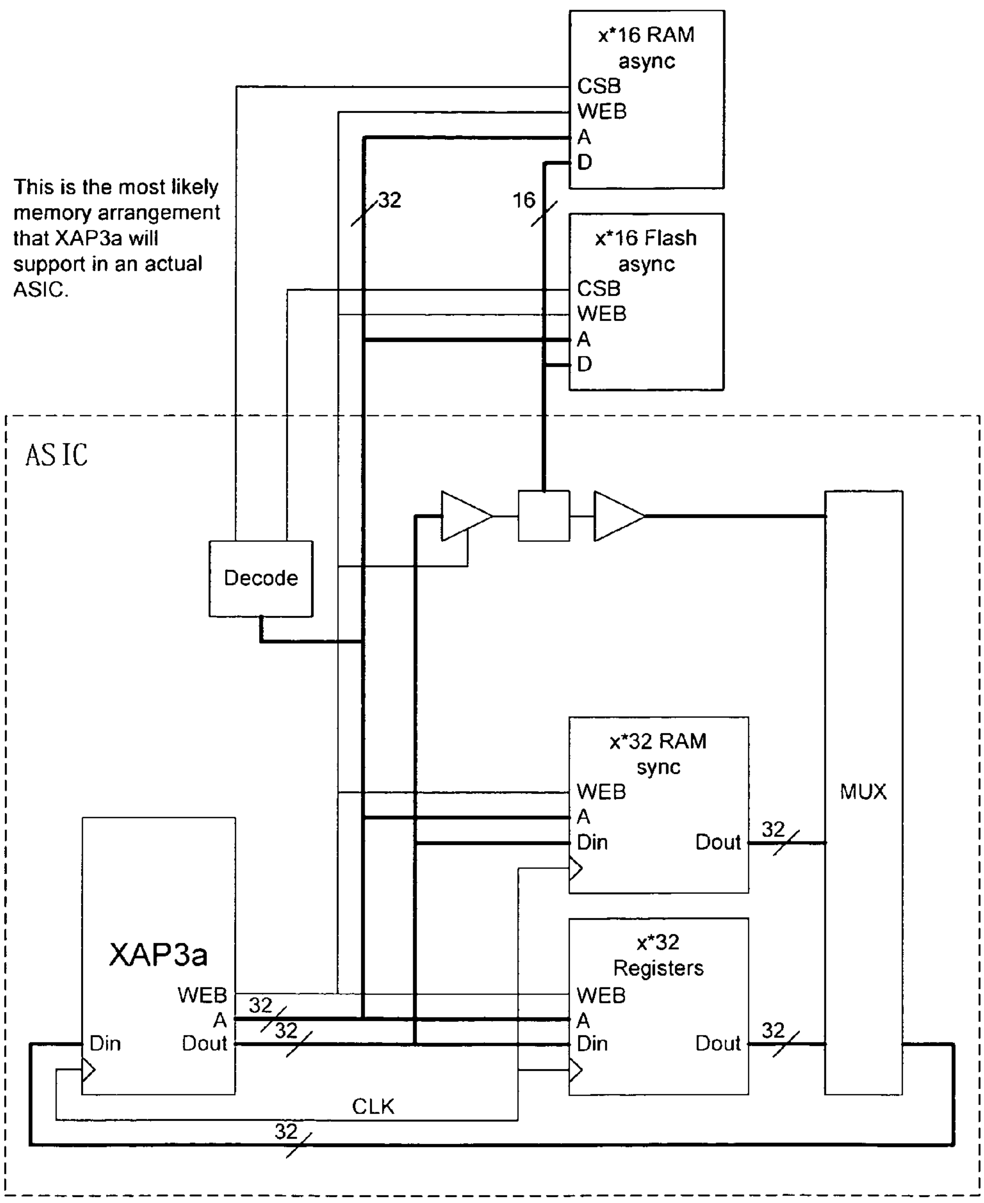
FIG. 71 shows XAP3 hardware architecture.
Figure 72:
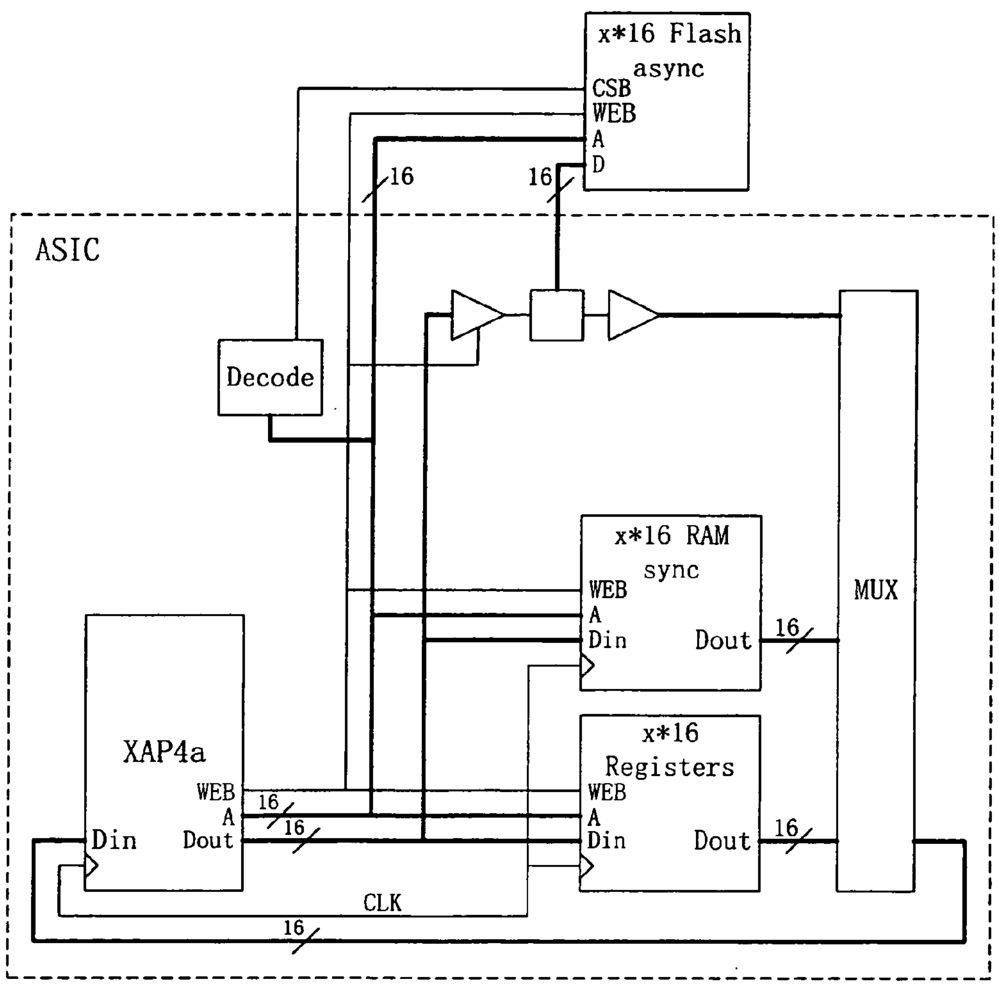
FIG. 72 shows XAP4 hardware architecture.

FIG. 70 shows the timing for an NMI. In the example IVC, nmi is connected to ivc_status[8], so it set by interrupt[8] and cleared by ivc_clear[8]. In a customer design, nmi can be connected to any appropriate signal source (properly synchronised to clk).

When the IVC detects a pulse on interrupt[8] at clock edge t1, it sets ivc_status[8] high. This immediately sets nmi high (this happens immediately because NMI is by definition always enabled). At the end of the next XAP4 instruction, xap4_single recognises the NMI, disables further interrupts and branches to the IVT. The branch address for an NMI=0x04. Some time later at clock edge t2, the nmi handler software writes to the ivc_clear register and sets bit 8. This clears ivc_status[8] which removes nmi.

External Signal Descriptions

This section describes the external signals for the xap4_system module.

TABLE 78

Time_stamp

| Signal Name | Direction | Description |
|---|---|---|
| stat[8:0] | input | General purpose status inputs; can be read in bits 8:0 of the status returned to xSIF or iSIF. This is typically used as a Time-Stamp, driven by a free-running counter. |

TABLE 79

Interrupts

| Signal Name | Direction | Description |
|---|---|---|
| interrupt[15:0] | input | External interrupt sources (up to 16). Interrupt events are detected and synchronised to clk before routing to the IVC. (In the example design, this synchronisation and edge detection is done in the xap4_clocks_resets module). If the IVC detects a logic high level on any interrupt at posedge clk, it captures this for use in generating irq_num[3:0] and irq to xap4_single. |

TABLE 80 xSIF Interface

| Signal Name | Direction | Description |
|---|---|---|
| sif_cs | input | Chip select signal for SIF. Active high.<br>When SIF Pod has to support more than one SIF Slave ASIC, sif_cs must be brought off-chip. i.e. ASIC has 5 SIF pins.<br>When SIF Pod only has to support one SIF Slave ASIC, sif_cs should be tied high inside the ASIC. i.e. ASIC has 4 SIF pins. |
| sif_clk | input | Clock used by the SIF. The frequency of this clock is restricted to ≤1 MHz in command mode, but may be up to 50 MHz in normal mode. |
| sif_mosi | input | MasterOut, Slave In data signal: clocked into SIF logic on falling edge of sif_clk. |
| sif_loadb_in | input | This returns the state of the sif_loadb signal at the ASIC top-level. If this signal is set low and sif_loadb_out is not set low, then the SIF logic can detect that the SIF master is driving sif_loadb. |
| sif_loadb_out | output | This sets low the active-low handshake signal for SIF instructions (Normal mode SIF). It is the input to an open-drain driver for the bi-directional sif_loadb pin at the ASIC top-level. |
| sif_miso_enable | output | MasterIn, SlaveOut enable signal: when set high, this enables the tristate driver for sif_miso at the ASIC top-level. Is controlled by sif_cs. |
| sif_miso_out | output | MasterIn, SlaveOut data signal: clocked out of SIF logic on rising edge of sif_clk. This is the input to a tristate driver for sif_miso at the ASIC top-level. |

TABLE 81 iSIF Interface

| Signal Name | Direction | Description |
|---|---|---|
| isif_address[15:0] | input | For normal SIF Instructions, this provides the byte address at which to read or write XAP memory space. For Debug SIF Instructions, |

TABLE 81-continued

| iSIF Interface | | |
|---|---|---|
| Signal Name | Direction | Description |
| | | this field provides an OpCode for a particular operation. Tie this field to all zeros if iSIF is unused. |
| isif_control[7:0] | input | [7]: 0 = read,<br>1 = write<br>[6]: unused<br>[5:4]: 0 = byte access,<br>1 = word access,<br>2, 3 = illegal<br>[3]: 0 = Normal iSIF instruction,<br>1 = Debug iSIF Instruction<br>[2:0]: processor ID = 0 for single XAP<br>Tie this field to all zeros if iSIF is unused. |
| isif_data_write[15:0] | input | This provides the data to write XAP memory space or XAP registers. Some Debug SIF Instructions require this field to be set to a specific value. Tie this field to all zeros if iSIF is unused. |
| isif_data_read[15:0] | output | This returns the read data from XAP memory space or XAP registers. This should be clocked into a register at posedge of clk when isif_done is high. |
| isif_status[11:0] | output | This returns the status from an iSIF read or write instruction. This should be clocked into a register at posedge of clk when isif_done is high. The bits are interpreted as follows:<br>[11]: Status parity - can usually be ignored<br>[10]: Read data parity - can usually be ignored<br>[9]: 0 = no error,<br>1 = error<br>[8:4]: If bit 9 = 1, this contains a 5-bit error code. Otherwise, this contains stat[8:4].<br>[3:0]: Contains stat[3:0]. |
| isif_load | input | This indicates the start of an iSIF instruction request. If the xap4_system samples isif_load high on posedge of clk, then it samples isif_address, isif_data_write and isif_control on the same posedge clk. Tie this signal to zero if iSIF is unused. |
| isif_cancel | input | After an appropriate timeout, the iSIF master can abort an iSIF access that has not responded (with isif_done) by setting iSIF cancel. If the xap4_system samples isif_cancel high on posedge of clk, it aborts the access and then sets isif_done = 1, with an error code in isif_status to indicate abnormal completion. |
| isif_done | output | When xap4_system complete an iSIF access or if the access is cancelled (either by isif_cancel or by a cancel command from xSIF), it sets isif_done = 1 for one clk period. This should be used as a clock enable by the iSIF master to capture isif_status and isif_data_read on posedge clk. |

TABLE 82

| Clocks & Resets | | |
|---|---|---|
| Signal Name | Direction | Description |
| clk | input | This is the main system clock used by xap4_single, xap4_mmu, xap4_ivc, and the synchronous memory devices connected to the MMU. All flip-flops in xap4_system that use clk are clocked on its posedge. |
| resetb_xap | input | This reset is used by xap4_single (except for the SIF logic), xap4_mmu, xap4_ivc. It is an active-low asynchronous reset. It resets the xap4 processor, but does not change the SIF mode (debug or normal) or the XAP4 run state (run continuous, run-to-break, single-step, or stop). |

TABLE 82-continued

| Clocks & Resets | | |
|---|---|---|
| **Signal Name** | **Direction** | **Description** |
| resetb_sif | input | This reset is used by the SIF logic within xap4_single. It is an active-low asynchronous reset. |
| rst_usergates<br>rst_xap<br>rst_sif<br>rst_offchip | output | These synchronous reset outputs are generated by specific SIF commands. See section 0 for recommended usage. |
| unknown_instruction | output | This signal is generated when the processor encounters an unimplemented op-code in a privileged mode (all modes except User Mode). This is typically considered a fatal error, this signal can be used to generate a system reset. |
| wake_up | input | This signal is only used by XAP4 when it is in a sleep state (signified by asleep set high). If wake_up is pulsed high for at least one clk cycle, the XAP4 will wake from its sleep state, resume operation, and set the asleep signal low. |
| force_stop | input | This signals to the XAP4 that it should stop unconditionally at the end of the next instruction. Active-high. A typical use of this signal is to hold a RAM-based system halted at reset until an external means (such as iSIF) has loaded code into the RAM. |
| self_force_stop | output | This synchronous output resets to high (active). To stop the XAP when resetb_sif is pulled low, connect the self_force_stop output to the force_stop input. The reset can later be removed by clearing self_force_stop by writing to a specific address from the iSIF or xSIF interface |
| asleep | output | This synchronous output is set high if the XAP4 is executing a 'sleepnop' or 'sleepsif' instruction |
| debug | output | This synchronous output is set high if the XAP4 is in debug mode (which can be set by the iSIF or xSIF interface). |
| stopped | output | This synchronous output is set high if the XAP4 is stopped. |

TABLE 83

| Memory Interface | | |
|---|---|---|
| **Signal Name** | **Direction** | **Description** |
| ram_data_read[15:0]<br>rom_data_read[15:0]<br>ioreg_data_read[15:0] | input | 16-bit read data. These 3 data busses are driven by the RAM, ROM, and I/O register blocks. The MMU multiplexes these to provide a single read data bus to xap4_single |
| data_write[15:0] | output | 16-bit write data to memory and I/O registers. Also to MMU and IVC. |
| address[15:0] | output | 16-bit byte address to memory or external registers. Used internally by the MMU and IVC. 16-bit memory devices should ignore address[0] and use byte[1:0] instead.<br>8-bit memory devices should use address[0]. |
| byte[1:0] | output | Byte selects: byte[0] is set high during the address cycle for read or write accesses to the low byte (data bits 7:0), and byte[1] is set high for read or write accesses to the high byte (data bits 15:8). Full word accesses (data bits 15:0) cause both byte select signals to be set high. |
| ram_cs<br>rom_cs<br>ioreg_cs<br>ivc_cs | output | Chip-selects. One of these signals is set high during the address cycle to select RAM, ROM, I/O registers, IVC registers, or internal MMU registers. For example, the default MMU implements the following memory map:<br>ROM (rom_cs): not implemented<br>RAM (ram_cs): 0x0000-0xFEFF<br>I/O (ioreg_cs): 0xFF00-0xFF7F<br>IVC (ivc_cs): 0xFF80-0xFFBF<br>MMU regs: 0xFFC0-0xFFFF |

TABLE 83-continued

| Memory Interface | | |
|---|---|---|
| Signal Name | Direction | Description |
| we | output | Write-enable. This signal is set high during the address cycle for a write access. It is set low at all other times (during read access and no access). |

Internal Signal Descriptions

This section describes the internal signals within the xap4_system module.

TABLE 84

| Interface between xap4_single and xap4_ivc | | |
|---|---|---|
| Pin Name | Direction | Description |
| irq | xap4_ivc to xap4_single | Interrupt request. Active-high. This signals to the core that there is a pending interrupt request. |
| irq_num[3:0] | xap4_ivc to xap4_single | Interrupt number. This is generated by the IVC from the incoming interrupt sources, based on the chosen priority scheme. It is used by the core to help form the address into the interrupt vector table. |
| nmi | xap4_ivc to xap4_single | Non-Maskable Interrupt. Active-high. |
| address[15:0] | xap4_single to xap4_ivc | See description in section 0 |
| data_write[15:0] | xap4_single to xap4_ivc | See description in section 0 |

TABLE 85

| Interface between xap4_mmu and xap4_ivc | | |
|---|---|---|
| Pin Name | Direction | Description |
| ivc_data_read[15:0] | xap4_ivc to xap4_mmu | Data bus used to read registers in IVC. |
| byte[1:0] | xap4_mmu to xap4_ivc | See description in section 0 |
| we | xap4_mmu to xap4_ivc | See description in section 0 |
| ivc_cs | xap4_mmu to xap4_ivc | See description in section 0 |

TABLE 86

| Interface between xap4_single and xap4_mmu | | |
|---|---|---|
| Pin Name | Direction | Description |
| read | xap4_single to xap4_mmu | This signal is high for a read access. |
| write | xap4_single to xap4_mmu | This signal is high for a write access. |
| size | xap4_single to xap4_mmu | This signal is high for a 16-bit access, and low for an 8-bit access. |
| prog_datab | xap4_single to xap4_mmu | This signal is high for a program (instruction) access, and low for a data access. It can be used to distinguish between exception conditions that need to be flagged by the MMU. |
| sif_xapb | xap4_single to xap4_mmu | This signal is high for a sif access, and low for a xap4 access. It can be used to distinguish between exception conditions that need to be flagged by the MMU. |
| isif_xsifb | xap4_single to xap4_mmu | This signal is high for an iSIF access, and low for an xSIF access. It can be used to distinguish between exception conditions that need to be flagged by the MMU. |
| core_mode[1:0] | xap4_single to xap4_mmu | This bus shows the xap4 processor mode. It can be used to distinguish between exception |

TABLE 86-continued

| Interface between xap4_single and xap4_mmu | | |
|---|---|---|
| Pin Name | Direction | Description |
| | | conditions that need to be flagged by the MMU. The encoding is:<br>00: Supervisor Mode<br>01: User Mode<br>10: Interrupt Mode<br>11: NMI Mode |
| address[15:0] | xap4_single to xap4_mmu | See description in section 0 |
| data_write[15:0] | xap4_single to xap4_mmu | See description in section 0 |
| data_read[15:0] | xap4_mmu to xap4_single | This is the data read by the MMU from a previous read cycle. It is only valid if mem_wait is low. |
| mem_wait | xap4_mmu to xap4_single | This signal is set high by the MMU if a memory device or I/O registers need more then one cycle to provide or accept data. This signal may be tied low if all addressed devices accept write data or provide read data on the second clk edge after their chip select signal is set high. |
| data_exception<br>prog_exception<br>sif_mmu_error | xap4_mmu to xap4_single | The two exception signals are only recognised by the XAP4 when it is in User mode.<br>These three signals are set high by the MMU if there is a fatal error during a memory data or program access. They cause the XAP4a to start exception processing.<br>In the example MMU, prog_exception is set high if a program access is made to I/O register space; data_exception is set high if a data write access is made to ROM space. |

Debug Support

Breakpoints

Software Breakpoints

Software breakpoints can be inserted by swapping normal instruction with the 'brk' instruction in memory. The 'xIDE for XAP4' debugger uses this method whenever possible (i.e. if programs are stored in RAM) as there is no limit as to how many breakpoints can be used. However, this method cannot be used with memory that does not support individual word writes, nor does it support conditional breaks.

Hardware Breakpoints

XAP4 also provides a hardware breakpoint capability. This can be used with any kind of memory, because the memory itself is not modified. It can also support real-time conditional breaks. However, XAP4 only supports a single hardware breakpoint address. The 'xIDE for XAP4' debugger only uses this method when it is unable to use software breakpoints.

The XAP4 contains one breakpoint register, BRK0, that holds the breakpoint address. This can be configured using the breakpoint-enable register, BRKE, to stop the processor or cause an exception when an address is read, written, or executed. The BRK0 and BRKE registers can be accessed by privileged modes using the movr2b, movb2r, movs2r, and movr2s instructions.

The bits in the BRKE register are described below.

TABLE 87

| Bit | Name | Description |
|---|---|---|
| 0 | W0 | Break-on-write: if this bit is set, an instruction making a data write to the address matching the BRK0 register may cause an exception or halt the processor after the instruction has executed. The PC will point at the next instruction to be executed. |
| 1 | R0 | Break-on-read: if this bit is set, an instruction making a data read to the address matching the BRK0 register may cause an exception or halt the processor after the instruction has executed. The PC will point at the next instruction to be executed. |
| 2 | E0 | Break-on-execute: if this bit is set, an instruction fetch from the address matching the BRK0 register may cause an exception or halt the processor before the instruction is executed. (This also works if a breakpoint is set for the second word of a 32-bit instruction.) The PC will remain at the address of the instruction that caused the break. |

Breakpoint Event Handling

When a software or hardware breakpoint is detected by the XAP4, it can respond by taking an exception or by halting or by doing neither. The XAP4 will generate a break exception only if the XAP4 is in User Mode and the B flag in the FLAGS register is set. If these conditions are not met, then the XAP4 will halt if the Run State (set by the SIF interface) is Run-To-Break. If this condition is also not met, then the breakpoint will be ignored.

Single Step

The XAP4 supports software-controlled single-stepping. If the T bit in the FLAGS register is set, a single-step exception will be triggered after every User Mode instruction. If there is another exception pending this will take precedence over the single-step exception. (This ensures that an exception caused by the instruction itself, such as a DivideByZero exception, is not lost when stepping) The Link Register (R6) will point to the next instruction to be executed and R0 will point to the instruction that caused the exception. This capability supports remote debugging and single stepping of User Mode applications.

In addition, XAP4 supports hardware-based single-stepping when used with a SIF-based debugger such as 'xIDE for XAP4'. When the Run State is set by the SIF interface to Single-Step, the XAP4 will execute one instruction and then stop. Similarly to software-controlled single-step, the XAP4 will not stop immediately if there is an interrupt or exception pending; instead it will process the interrupt or exception to the point where it is about to branch into the IVT. The next step will therefore execute the appropriate instruction in the IVT.

Block copy and block store instructions (blkcp and blkst) are non-atomic instructions, meaning that they can take an interrupt or exception after each transfer of the copy or store operation. This includes the ability to step through a block copy or store instruction one transfer at a time.

Single-stepping on a brk instruction or a hardware execution breakpoint will cause the PC to remain unchanged, until the break condition is removed or disabled.

The sif Instruction

The XAP4 provides a sif instruction that can be used to provide predictable time-slots for non-invasive debugger monitoring. In a typical application, the user would insert one or more sif instructions in the code (contiguous or dispersed) to provide the desired debug bandwidth. When the XAP4 encounters a sif instruction and is not in User Mode, it sends a signal to the SIF interface that a fixed-length time-slot is available for a single SIF access. If there is a SIF access waiting it will use this time-slot to read or write memory space, or read a XAP4 register. At the end of the time-slot, the XAP4 continues with the next instruction.

The length of the sif instruction is configured according to the maximum number of wait states that may be encountered by the sif access. This ensures that if a sif access does occur, it will have completed by the end of its time-slot Consequently, the XAP4 program timing is unaffected by whether or not a sif access actually occurs during a sif instruction.

The sif instruction length can be tailored to the number of memory wait states by including a file called xap4_user_constants.h, This should include a statement to indicate the maximum number of memory wait states:

'define MAX_WAIT_STATES 4'hN where N is a hexadecimal number in the range 0 to F (0 to 15 decimal). The actual number of clock cycles taken by the sif instruction is:

16-bit SIF instruction: (MAX_WAIT_STATES*2)+PROG_WAIT_STATES+5 clks 32-bit SIF instruction: (MAX_WAIT_STATES*2)+(PROG_WAIT_STATES*2)+6 clks where MAX_WAIT_STATES is as defined above, and PROG_WAIT_STATES is the number of wait states seen when accessing program memory. If the xap4_user_constants.h file is not present, then the XAP4 assumes that the default sif instruction length need only support zero wait-state memory.

The processors and/or interfaces as herein described preferably possess the ability to enable them to perform all of the functionality described in the appended set of claims, and possess the structure necessary to achieve that functionality.

It will be understood that the present invention has been described above purely by way of example, and modifications of detail can be made within the scope of the invention.

Each feature disclosed in the description, and (where appropriate) the claims and drawings may be provided independently or in any appropriate combination.

The invention claimed is:

1. A data processing apparatus comprising:

a processor constructed to operate under control of a stored program comprising a sequence of program instructions selected from a predetermined instruction set;

a master processor provided on the same integrated circuit as said processor operable to request access to storage locations of said processor, wherein said processor is configured to function as a slave with respect to the master processor;

an interface circuit provided on the same integrated circuit as said processor which is operable to provide a common interface for both an external master apparatus and for said master processor to signal requests for access to storage locations of said processor, wherein said processor is configured to function as a slave with respect to the external master apparatus; and at least one of a control means and a controller operable to provide access between the storage locations and the interface circuit in response to the requests only at predetermined points in the execution of the stored program by said processor, wherein said one of the control means and the controller comprise a generic communication instruction of the processor instruction set, the generic communication instruction being available for execution only at said predetermined points by said processor in dependence upon a position of the generic communication instructions within the sequence of stored processor instructions as specified at program time such that execution timing of the stored processor instructions is independent of whether or not a request is supplied by one of said external master apparatus and said master processor at run time to said interface circuit, and wherein debug instructions are passed via said generic communication instruction;

wherein the master processor and the external master apparatus are operable to access storage locations of said processor during real time operation of said processor without altering the timing and functionality of said processor, and are further adapted to provide at least one of control and debugging of said processor.

2. An apparatus according to claim 1, wherein said master processor comprises one of a processor and a hardware state machine.

3. An apparatus according to claim 1, wherein a parallel interface is provided between said master processor and said interface circuit and a serial interface is provided for connecting the interface circuit to said external master apparatus.

4. An apparatus according to claim 1, wherein the integrated circuit is in the form of one of an Application Specific Integrated Circuit (ASIC) and a Field Programmable Gate Array (FPGA).

5. An apparatus according to claim 1, which comprises a plurality of processors provided on the same integrated circuit, each processor constructed to operate under control of a respective stored program comprising a sequence of program instructions selected from a predetermined instruction set, and wherein the interface circuit is provided in common to said plurality of processors and is operable to provide an interface for one of the external master apparatus and said master processor to signal requests for access to storage locations of said plurality of processors during real time operation of said plurality of processors without altering the timing and functionality of said processors, and to enable one of the external master apparatus and the master processor to provide at least one of control and debugging of any of said processors, wherein each of said processors are configured to function as slaves with respect to the master processor and the external master apparatus.

6. An apparatus according to claim 1, further comprising a controller operable to control input and output to and from the interface circuit and operable to generate odd parity over an even number of bits to allow identification by one of said external master apparatus and said master processor if one of an input and an output of said interface circuit is stuck at one of a logic low and a logic high signal.

7. An apparatus according to claim 1, wherein the interface circuit is operable to provide an interface for one of an external master apparatus and the master processor to signal a request to control the processor.

8. An apparatus according to claim 7, wherein said request to control the data processing apparatus is operable to cause at least a portion of the data processing apparatus to reset.

9. An apparatus according to claim 8, wherein said request is operable to cause said interface circuit to reset.

10. An apparatus according to claim 8, wherein said request is operable to cause said processor to reset.

11. An apparatus according to claim 1, further comprising at least one counter for maintaining counts relating to the operation of the interface circuit, wherein in response to receiving a request for a count held by at least one of said at least one counter, said interface circuit is operable to read the value of said at least one counter and to output the value to one of said external master apparatus and said master processor.

12. An apparatus according to claim 11, wherein counters are provided to count at least one of: the number of data reads requested by one of the external master apparatus and the master processor; the number of data writes requested by one of the external master apparatus and the master processor; the number of errors; and the number of cancelled requests that have been made by one of the external master apparatus and the master processor.

13. An apparatus according to claim 1, wherein the interface circuit is operable to provide an interface for the external master apparatus to signal a request to control the data processing apparatus, wherein pending requests are stored in said interface circuit, and wherein the apparatus further comprises a control circuit operable to cancel a pending request upon receipt of a cancel request from said external master apparatus.

14. An apparatus according to claim 13, wherein the master processor is further operable to request access to storage locations of said processor via said interface circuit and wherein said control circuit is operable to cancel a request from said master processor upon receipt of said cancel request from said external master apparatus.

15. An apparatus according to claim 1, wherein the interface circuit is operable to provide an interface for the external master apparatus to signal a request for data from a storage location of the processor, and wherein the apparatus further comprises a controller operable to cause the data to be read from the storage location, the controller being further operable to generate a time stamp indicating a time at which the data was read from said storage location and operable to cause said read data and said time stamp to be output to said external device.

16. An apparatus according to claim 1, further comprising acquisition circuitry operable to acquire signals from an analogue input; and a controller operable to prevent output of signals to said external master apparatus at a time that said acquisition circuitry is acquiring said signals from said analogue input.

17. An apparatus according to claim 16, wherein said controller comprises a hardware circuit which is operable to enable and disable output of signals from said interface circuit to said external master apparatus.

18. An apparatus according to claim 16, wherein said controller is defined by at least one of said instructions that control the operation of said processor, such that upon execution of a specific instruction allows said interface circuit to provide said external master apparatus with access to said storage locations.

19. An apparatus according to claim 1, wherein the access request includes a specific interface communication instruction loaded by at least one of the external master apparatus and said master circuitry processor at run time into an interface register of the interface circuit, and wherein the control means is operable to provide access between a specified storage location and the interface register under control of the specific interface communication instruction.

20. An apparatus according to claim 19, wherein the control means is responsive to the specific interface communication instruction at the predetermined points during the execution of the sequence of stored processor instructions to allow reading, writing or a selection of reading and writing to be performed between the interface circuit and the specified storage location in dependence upon the specific interface communication instruction issued by at least one of said external master apparatus and said master circuitry processor at run time to said interface circuit.

21. An apparatus according to claim 20, wherein said specific interface communication instruction includes: an address field which is interpreted by the or each processor as specifying a storage location of a storage space of that processor; a control field for at least one of selecting a processor and specifying the nature of the instruction; a data field for the input and output of data; and a status field, wherein said interface circuit is operable to use said status field for reporting status information to one of said master processor and said external master apparatus.

22. An apparatus according to claim 21, wherein a portion of the address field is adapted to specify whether the interface communication instruction is a debug instruction.

23. An apparatus according to claim 22, wherein the specific interface communication instruction includes a field for specifying the length of the data access.

24. A data processing apparatus comprising:

a plurality of processors each constructed to operate under control of a respective stored program comprising a sequence of program instructions selected from a predetermined instruction set;

a master processor provided on the same integrated circuit as said plurality of processors operable to request access to storage locations of said plurality of processors, wherein said plurality of processors are each configured to function as slaves with respect to the master processor;

an interface circuit provided in common to and on the same integrated circuit as said plurality of processors and which is operable to provide a common interface for both an external master apparatus and for said master processor to signal a request for access to a storage location of one of the processors selected by the request, wherein said processors are configured to function as slaves with respect to the external master apparatus; and at least one of a control means and a controller operable to provide access between the storage locations and the interface circuit in response to the request only at predetermined points in the execution of the stored program by said processors, said one of the control means and the controller comprising a generic communication instruction of the processor instruction set, the generic communication instruction being available for execution only at said predetermined points by said processor in dependence upon a position of the generic communication instructions within the sequence of stored processor instructions as specified at program time such that execution timing of the stored processor instructions is independent of whether or not a request is actually supplied by one of said external master apparatus and said master processor at run time to said interface circuit, and wherein debug instructions are passed via said generic communication instruction;

wherein the master processor and the external master apparatus are operable to access storage locations of said processors during real time operation of said processor without altering the timing and functionality of said processors, and are further adapted to provide at least one of control and debugging of said processors.

25. An apparatus according to claim 1, wherein the control means is operable to selectively transmit a request from one of the external master apparatus and the master processor to the interface circuit thereby selectively to enable the master processor or the external master apparatus to access storage locations of said processor and to control and debug said processor.

26. An apparatus according to claim 25, wherein the control means is operable to implement a ping-pong arbitration scheme between the external master apparatus and the master processor, thereby to prevent one of the external master apparatus and the master processor from hogging the interface circuit, and wherein the master processor and the external master apparatus operate independently and asynchronously of one another.

27. An apparatus according to claim 26, wherein a request for access received from the external master apparatus takes precedence over a request for access received from the master processor.

28. An apparatus according to claim 27, wherein the control means is operable to cancel a request for access received from the master processor upon receipt of a request for access received from the external master apparatus.

* * * * *